(12) United States Patent
Ishimaru et al.

(10) Patent No.: US 6,910,985 B2
(45) Date of Patent: Jun. 28, 2005

(54) GEAR-OPERATED SPEED CHANGE APPARATUS FOR AUTOMATIC TRANSMISSION

(75) Inventors: Wataru Ishimaru, Kanagawa (JP); Yasuo Sumi, Kanagawa (JP)

(73) Assignee: JATCO Ltd, Fuji (JP)

( * ) Notice: Subject to any disclaimer, the term of this patent is extended or adjusted under 35 U.S.C. 154(b) by 0 days.

(21) Appl. No.: 10/343,999

(22) PCT Filed: May 29, 2002

(86) PCT No.: PCT/JP02/05182
§ 371 (c)(1),
(2), (4) Date: Feb. 6, 2003

(87) PCT Pub. No.: WO02/099315
PCT Pub. Date: Dec. 12, 2002

(65) Prior Publication Data
US 2003/0186775 A1 Oct. 2, 2003

(30) Foreign Application Priority Data
May 30, 2001 (JP) .................................... 2001-161578

(51) Int. Cl.⁷ ................................................ F16H 3/62
(52) U.S. Cl. .................... 475/275; 475/271; 475/276
(58) Field of Search ............................. 475/271, 275, 475/276

(56) References Cited

U.S. PATENT DOCUMENTS

| | | | |
|---|---|---|---|
| 3,440,901 A | * | 4/1969 | Chambers .................... 475/35 |
| 3,722,323 A | * | 3/1973 | Welch .......................... 475/55 |
| 3,835,732 A | * | 9/1974 | Mori et al. .................. 475/276 |
| 4,027,551 A | | 6/1977 | Murakami et al. |
| 4,027,552 A | | 6/1977 | Murakami et al. |
| 4,513,634 A | * | 4/1985 | Ohtsuka ....................... 475/54 |
| 5,106,352 A | | 4/1992 | Lepelletier |
| 6,558,287 B2 | * | 5/2003 | Hayabuchi et al. .......... 475/271 |
| 6,752,737 B2 | | 6/2004 | Ishimaru et al. |
| 2002/0091032 A1 | * | 7/2002 | Hayabuchi et al. .......... 475/278 |
| 2004/0077452 A1 | | 4/2004 | Ishimaru et al. |

FOREIGN PATENT DOCUMENTS

| | | |
|---|---|---|
| JP | 50-160649 | 12/1975 |
| JP | 51-64156 | 6/1976 |
| JP | 51-91465 | 8/1976 |
| JP | 2001-182785 A | 7/2001 |

* cited by examiner

Primary Examiner—Charles A Marmor
Assistant Examiner—David D. Le
(74) Attorney, Agent, or Firm—Foley & Lardner LLP

(57) ABSTRACT

A gear-operated speed change apparatus for an automatic transmission, which can make the degree of freedom for selecting a gear ratio higher than that of the case using the Ravigneaux type composite planetary gear train, while achieving a strength advantage of the gear train, an improvement in the fuel economy, coaxial positioning of the input port and output portions and size reduction of the automatic transmission altogether. The apparatus can achieve at least seven forward speeds and one reverse speed by engaging/releasing four clutches and two brakes. One of the three planetary gear sets can reduce the speed of an input rotation always or increase the input rotation always. One of the remaining two planetary gear sets is a double sun gear type planetary gear set including a third carrier having a center member positioned between two sun gears for inputting or outputting a rotation.

20 Claims, 80 Drawing Sheets

FIG. 2a

7th engagement table

|  | C1 | C2 | C3 | C4 | B1 | B2 | Gear ratio |
|---|---|---|---|---|---|---|---|
| 1st | ● |  |  |  | ● |  | 4.536 |
| 2nd | ● |  |  |  |  | ● | 2.900 |
| 3rd | ● | ● |  |  |  |  | 2.000 |
| 4th | ● |  |  | ● |  |  | 1.283 |
| 5th |  |  | ● | ● |  |  | 1.000 |
| 6th |  | ● | ● |  |  |  | 0.784 |
| 7th |  |  | ● |  |  | ● | 0.645 |
| REV-1st |  | ● |  |  | ● |  | -3.636 |
| α1 |  |  |  |  |  |  | 0.500 |
| α2 |  |  |  |  |  |  | 0.550 |
| α3 |  |  |  |  |  |  | 0.450 |

FIG. 2b

8th engagement table

|  | C1 | C2 | C3 | C4 | B1 | B2 | Gear ratio |
|---|---|---|---|---|---|---|---|
| 1st | ● |  |  |  | ● |  | 4.392 |
| 2nd | ● |  |  |  |  | ● | 2.325 |
| 3rd | ● | ● |  |  |  |  | 1.550 |
| 4th | ● |  |  | ● |  |  | 1.310 |
| 5th | ● |  | ● |  |  |  | 1.143 |
| 6th |  |  | ● | ● |  |  | 1.000 |
| 7th |  | ● | ● |  |  |  | 0.883 |
| 8th |  |  | ● |  |  | ● | 0.727 |
| REV-1st |  | ● |  |  | ● |  | -4.133 |
| REV-2nd |  |  |  | ● | ● |  | -2.667 |
| α1 |  |  |  |  |  |  | 0.550 |
| α2 |  |  |  |  |  |  | 0.500 |
| α3 |  |  |  |  |  |  | 0.375 |

FIG. 2c

6th engagement table

|  | C1 | C2 | C3 | B1 | B2 |
|---|---|---|---|---|---|
|  | LOW/C | 35R/C | H/C | L&R/B | 26/B |
| 1st | ● |  |  | ● |  |
| 2nd | ● |  |  |  | ● |
| 3rd | ● | ● |  |  |  |
| 4th | ● |  | ● |  |  |
| 5th |  | ● | ● |  |  |
| 6th |  |  | ● |  | ● |
| REV-1st |  | ● |  | ● |  |

FIG. 4a 1st
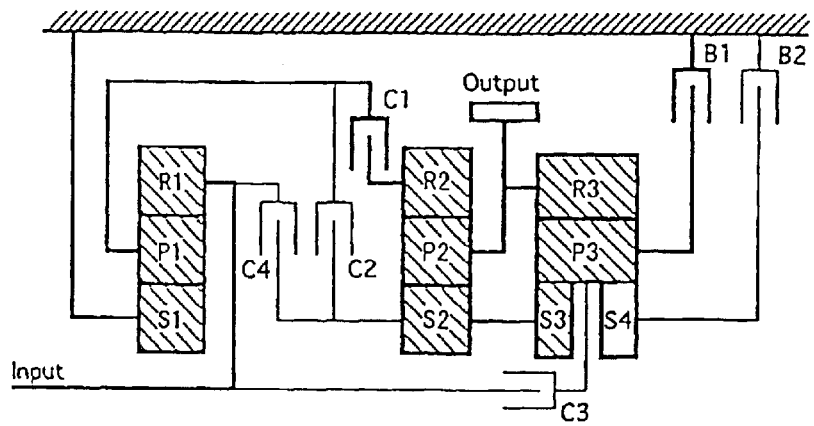
FIG. 4b 2nd
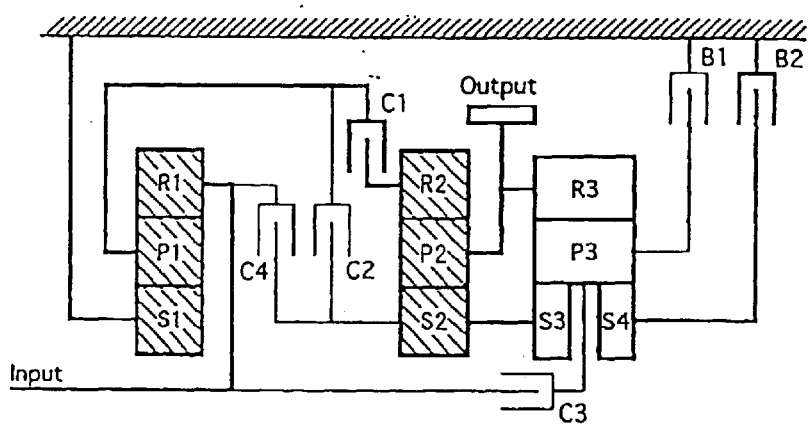
FIG. 4c 3rd
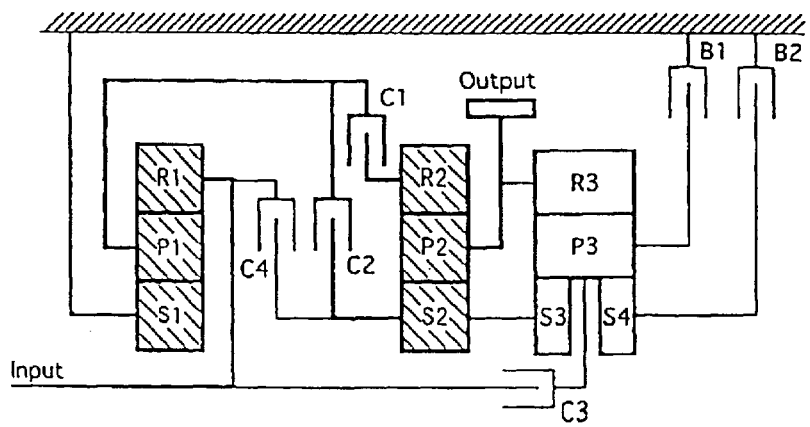

FIG. 5a 4th
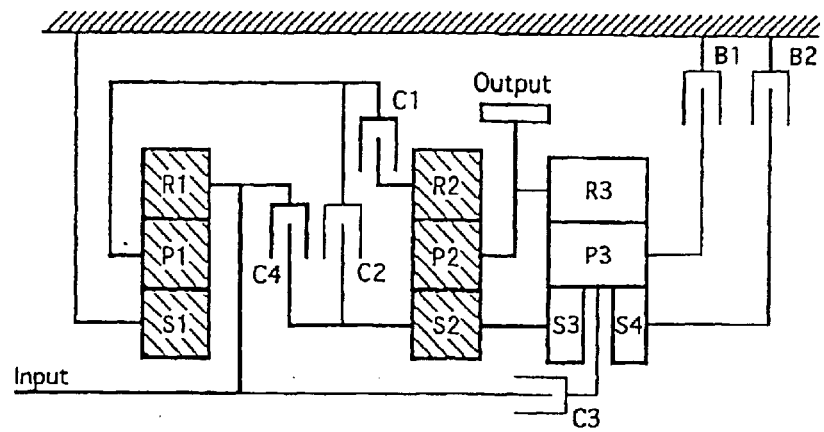
FIG. 5b 5th
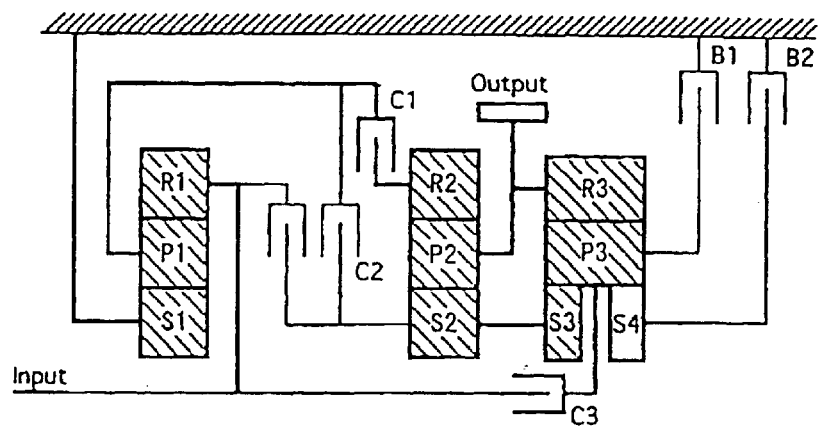
FIG. 5c 6th
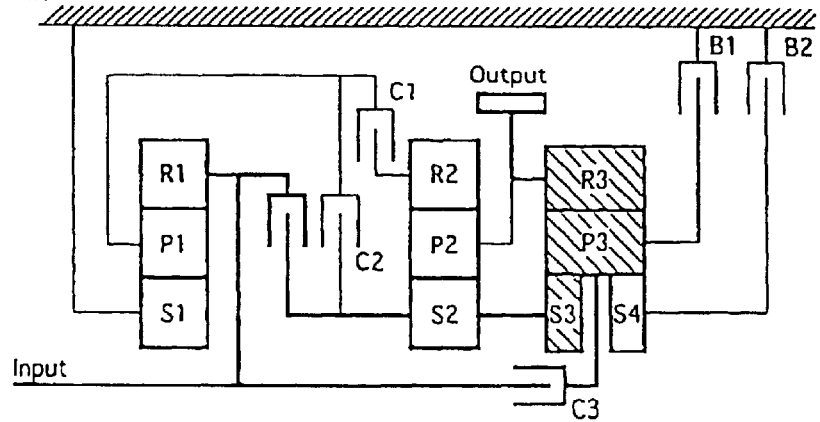

FIG. 6a 7th
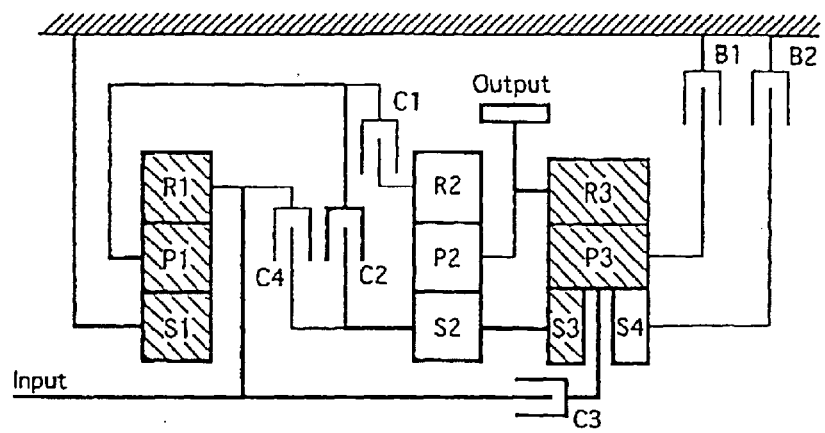
FIG. 6b 8th
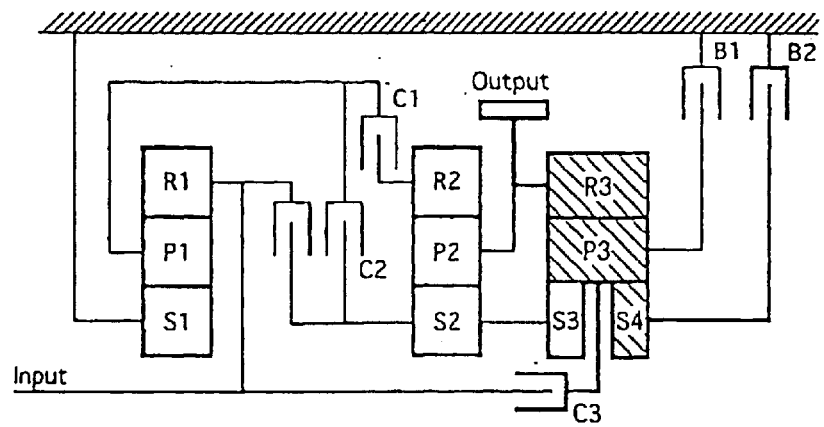
FIG. 6c Rev1
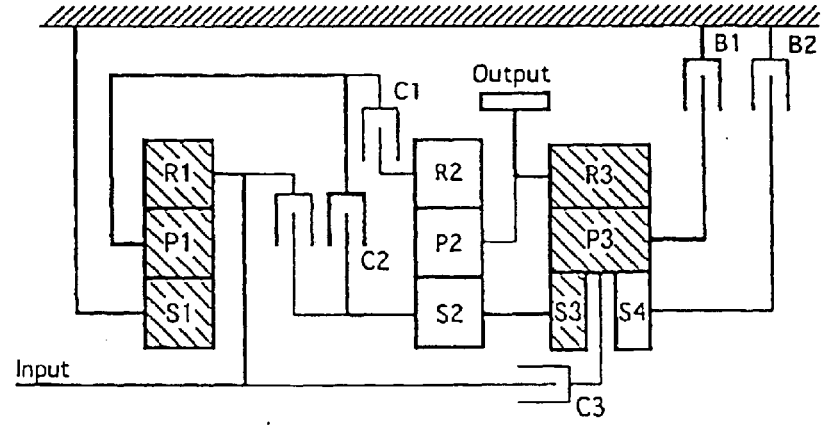

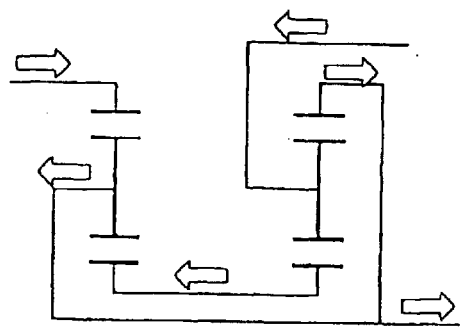
FIG. 9a
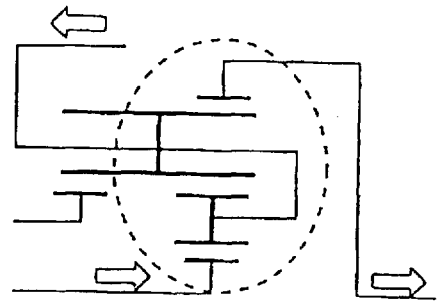
FIG. 9b
FIG. 10
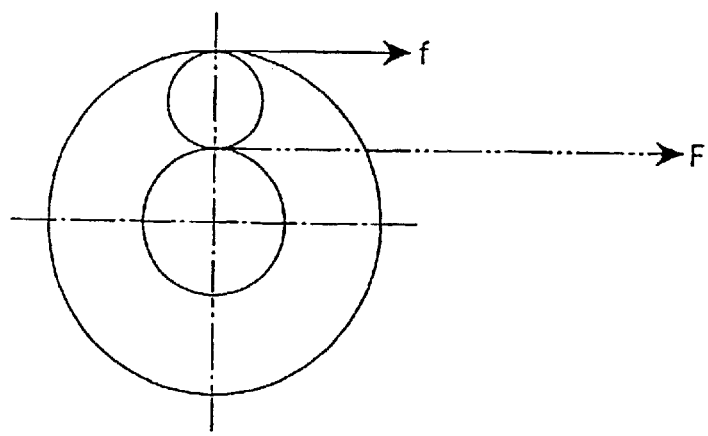
FIG. 11a  FIG. 11b  FIG. 11c
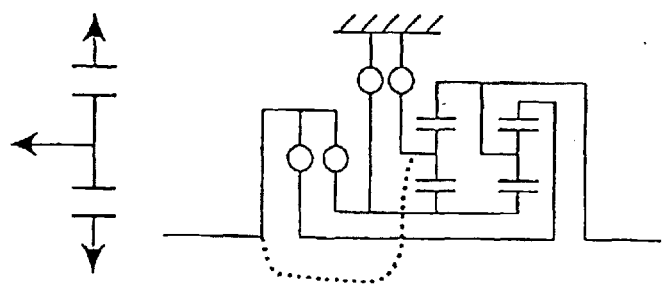

FIG. 14
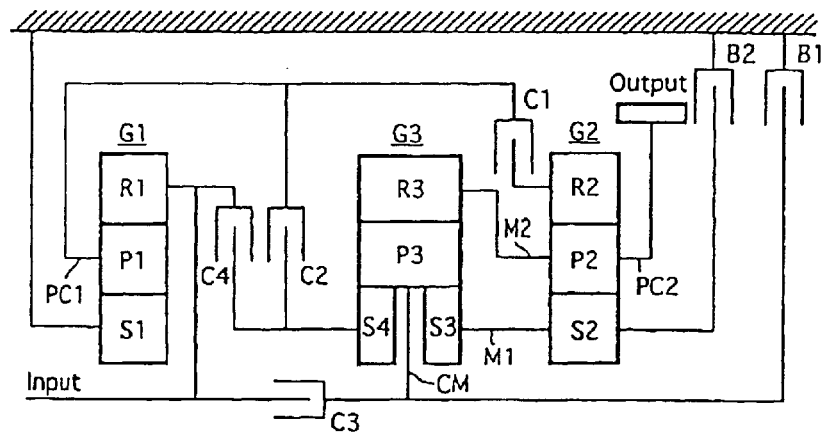
FIG. 15a 1st
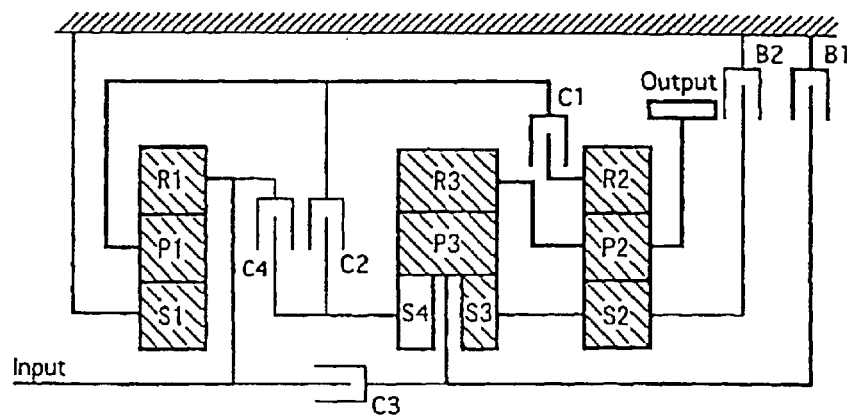
FIG. 15b 2nd
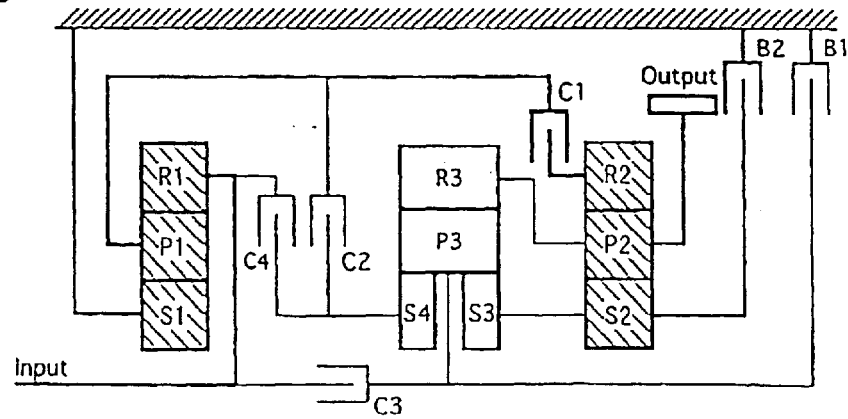

FIG. 16a 3rd
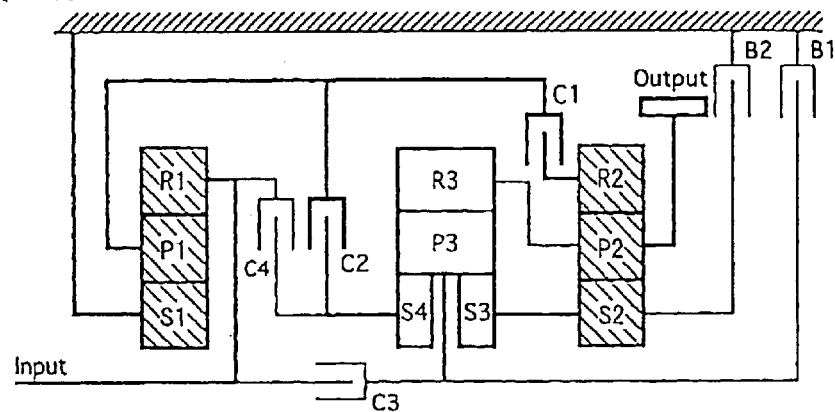
FIG. 16b 4th
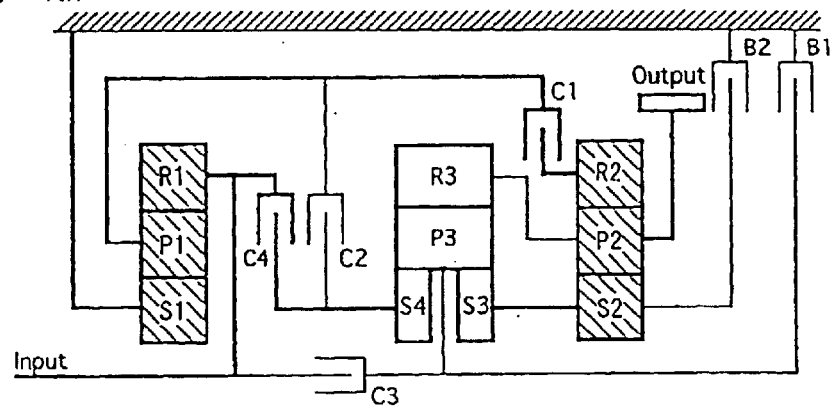
FIG. 16c 5th
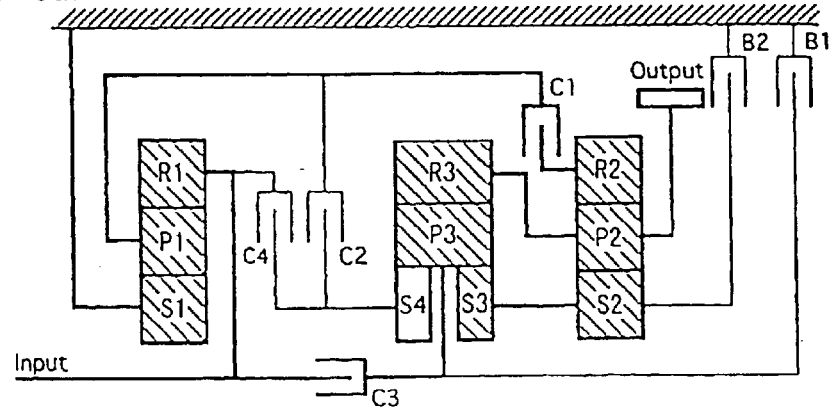

FIG. 17a 6th
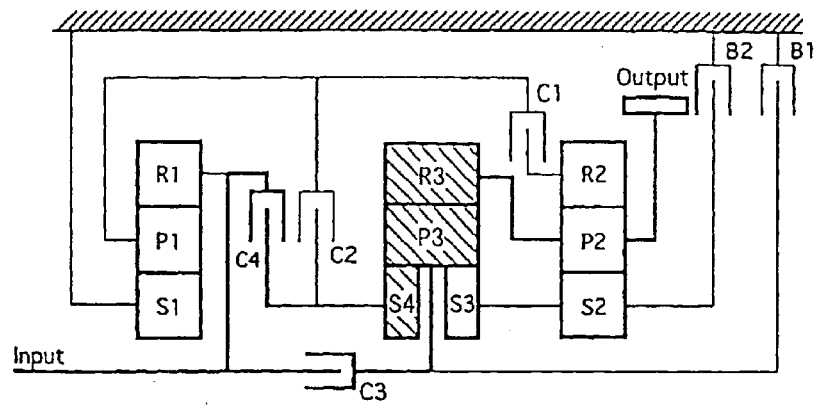
FIG. 17b 7th
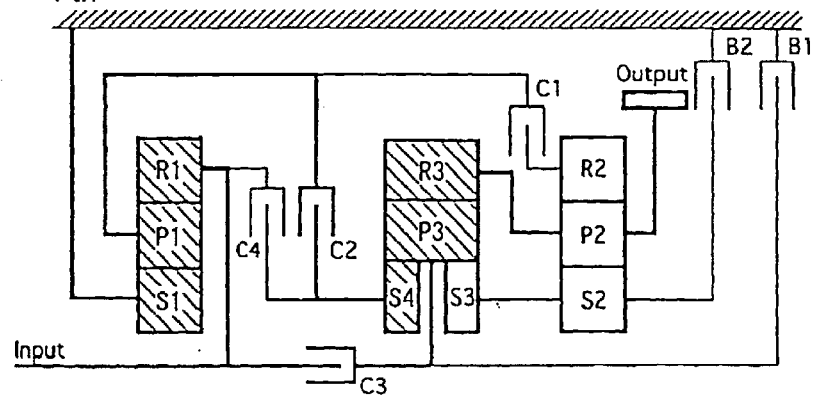
FIG. 17c 8th
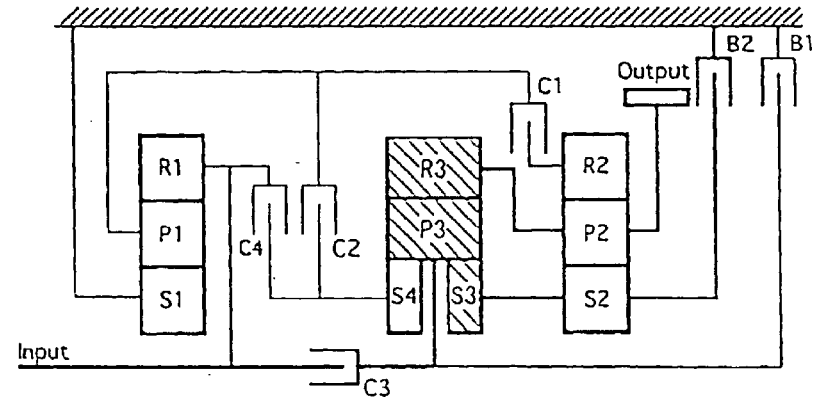

FIG. 23a 1st
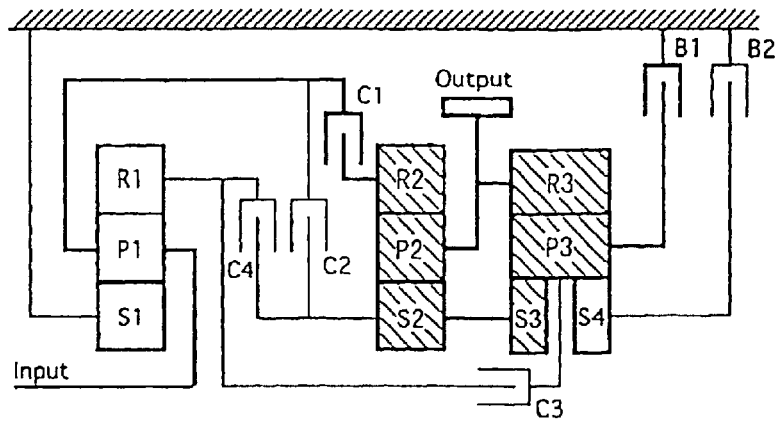
FIG. 23b 2nd
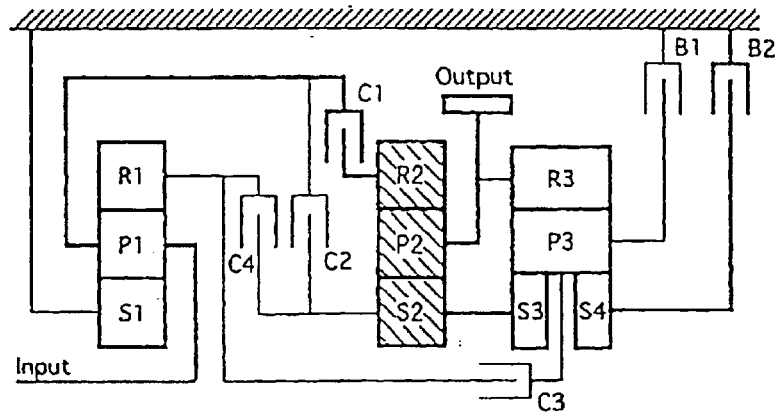
FIG. 23c 3rd
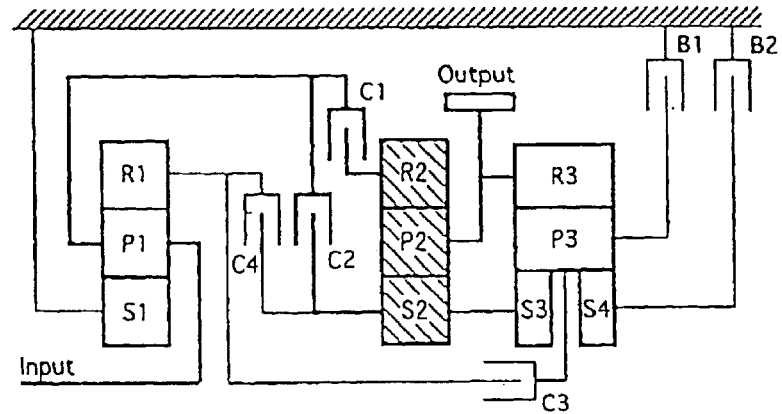

FIG. 24a 4th
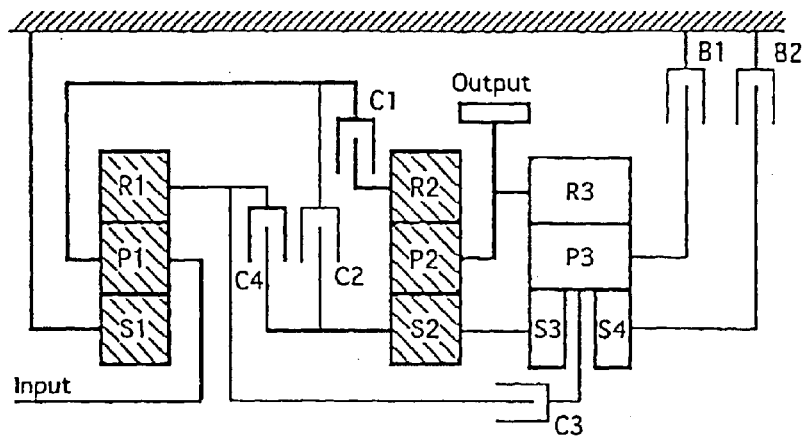
FIG. 24b 5th
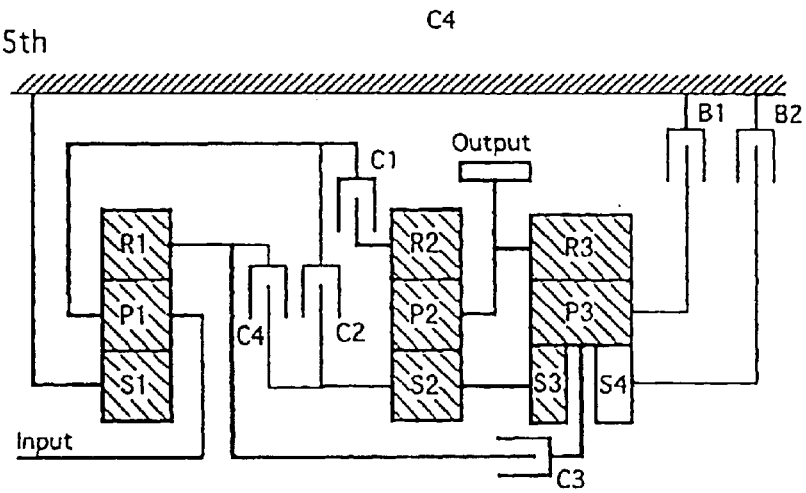
FIG. 24c 6th
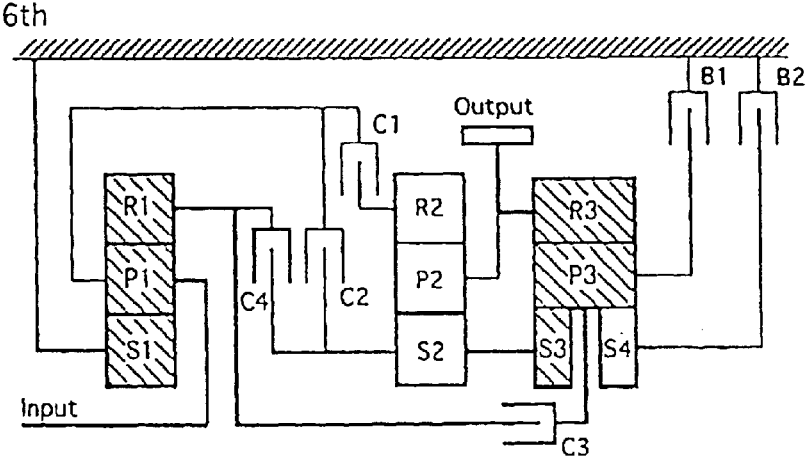

7th

8th

FIG. 29
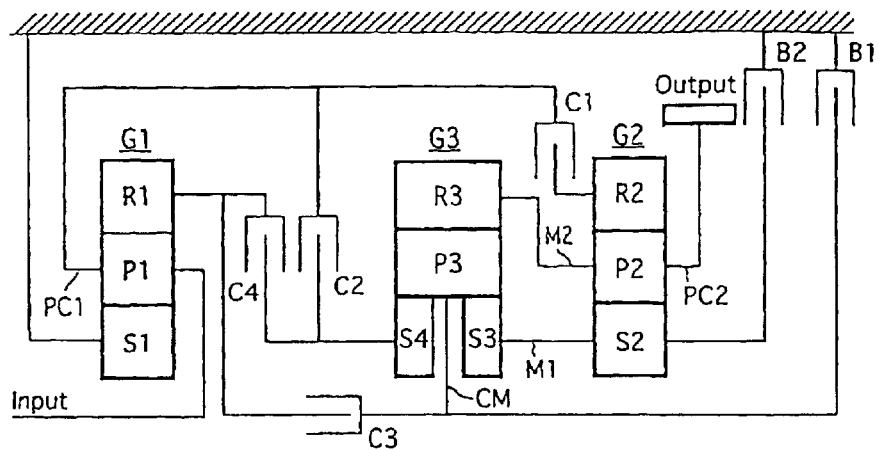
FIG. 30a 1st
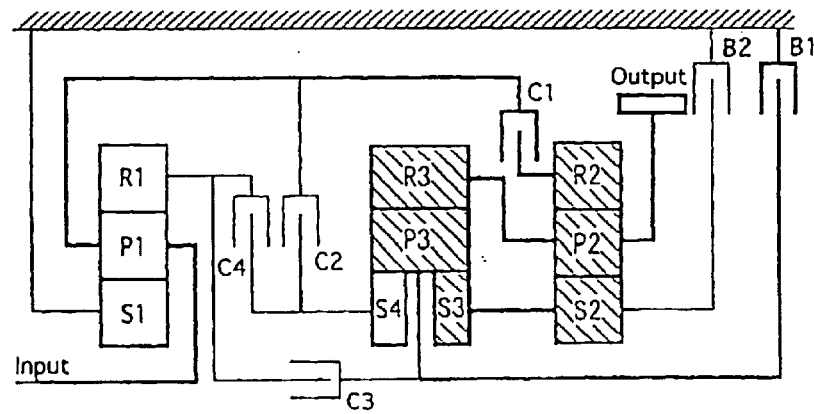
FIG. 30b 2nd
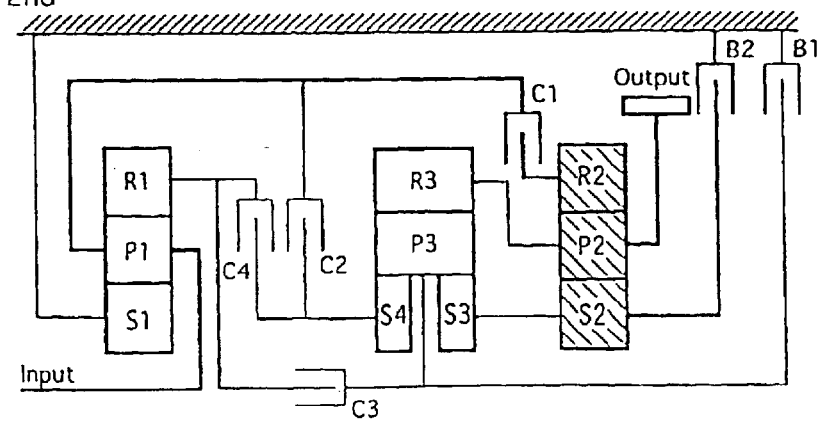

Rev1

Rev2

3rd

4th

5th

6th

7th

8th

1st

2nd

FIG. 53a 3rd
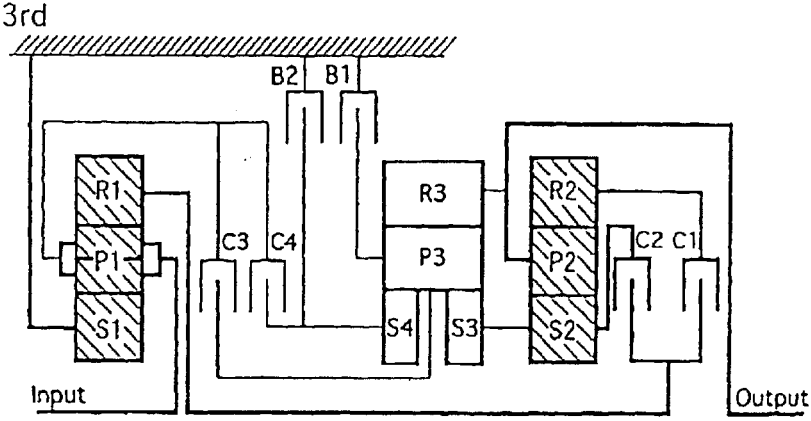
FIG. 53b 4th
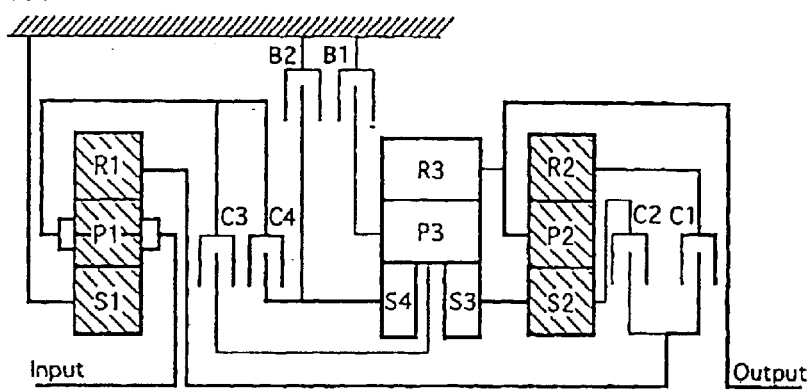
FIG. 53c 5th
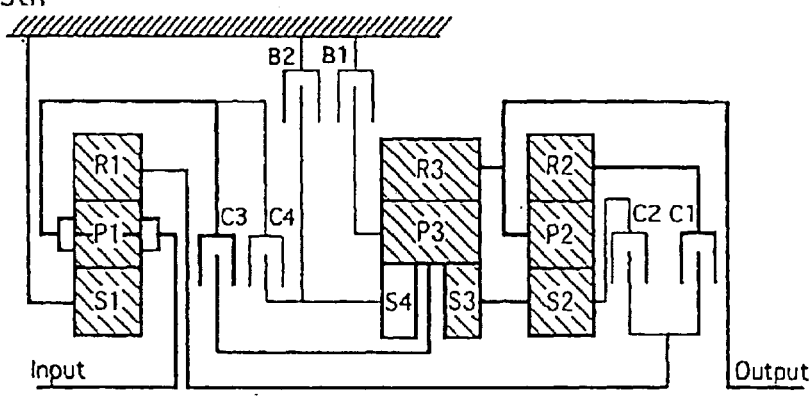

FIG. 54a 6th
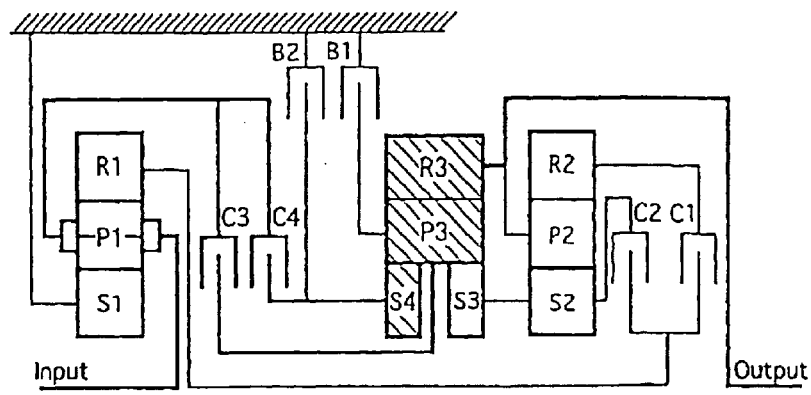
FIG. 54b 7th
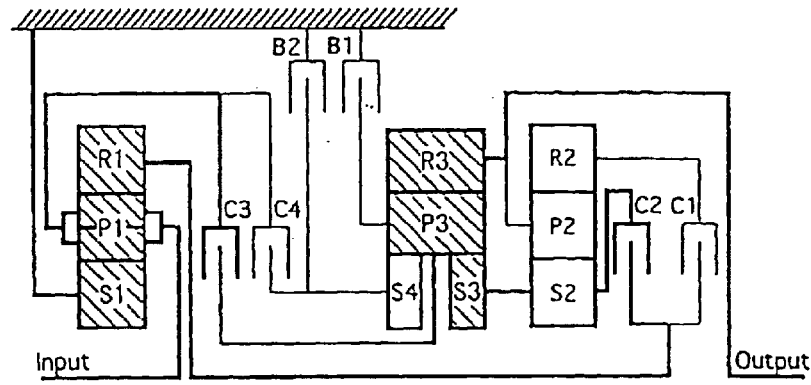
FIG. 54c 8th
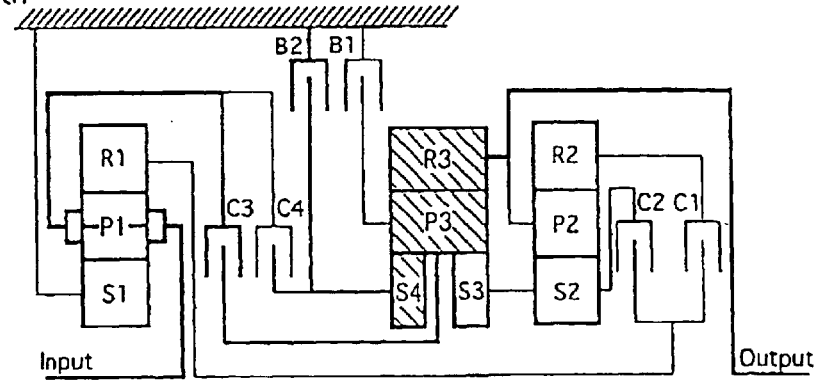

Rev1

Rev2

1st

2nd

1st

2nd

3rd

4th

5th

6th

7th

8th

GEAR-OPERATED SPEED CHANGE APPARATUS FOR AUTOMATIC TRANSMISSION

TECHNICAL FIELD

This invention relates to a gear-operated speed change apparatus for an automatic transmission, which is constructed to include an input portion, three sets of planetary gears, four clutches, two brakes and an output portion and which is enabled to achieve at least seven forward speeds and one reverse speed by engaging/releasing the four clutches and the two brakes properly as speed-changing elements.

BACKGROUND ART

A gear-operated speed change apparatus for an automatic transmission, which is constructed to include an input shaft, one set of double-pinion type planetary gear, a composite planetary gear train (as will be referred as the "Ravigneaux type composite planetary gear train") having a sun gear meshing individually with double pinions, four clutches, two brakes and an output shaft and which is enabled to achieve gear ranges of seven forward speeds and one reverse speed or more by engaging/releasing the four clutches and the two brakes properly as speed-changing elements, has been hitherto proposed as described in FIG. 2 and Table 2 (eight forward speeds and two reverse speeds) of JP-A-2001-182785.

However, the gear-operated speed change apparatus adopting this Ravigneaux type composite planetary gear train has the problems, as enumerated in the following.

① The strength is at a disadvantage because the maximum torque (for a 1st speed) of the gear train is borne by the double-pinion type planetary gear on one side of the Ravigneaux type composite planetary gear train.

② Another disadvantage resides in the gear strength, the gear lifetime or the carrier rigidity, because the torque augmented by one double-pinion type planetary gear acting as a speed-reducing device is inputted at 1st to 4th speeds from the sun gear of the Ravigneaux type composite planetary gear train so that the tangential force becomes higher than that of a ring gear input.

③ The Ravigneaux type composite planetary gear train has to be enlarged to enlarge the automatic transmission, because there are demanded both the securement of the strength (e.g., the gear strength or the gear lifetime) of the Ravigneaux type composite planetary gear train at the 1st speed and the improvement in the gear strength, the gear lifetime or the carrier rigidity of the Ravigneaux type composite planetary gear train.

④ At the 2nd speed, a torque circulation occurs in the Ravigneaux type composite planetary gear train so that the transmission efficiency drops to deteriorate the fuel economy at the 2nd speed where the torque circulation occurs.

The present invention has been conceived noting the above-specified problems and has an object to provide a gear-operated speed change apparatus for an automatic transmission, which can make the degree of freedom for selecting a gear ratio higher than that of the case using the Ravigneaux type composite planetary gear train, while achieving a strength advantage of the gear train, an improvement in the fuel economy, the coaxial positioning of the input portion and the output portion and the size reduction of the automatic transmission altogether.

DISCLOSURE OF THE INVENTION

According to the present invention, more specifically, in a gear-operated speed change apparatus for an automatic transmission, which has speed change control means using not the Ravigneaux type composite planetary gear train but basically a gear train having two sets of combined single-pinion type planetary gears as a gear train to be combined with one set of planetary gear, thereby to establish at least seven forward speeds and one reverse speed by engaging/releasing four clutches and two brakes properly, one of the aforementioned three planetary gear sets is a speed-reducing device for reducing the speed of the input rotation always or a speed-increasing device for increasing the speed of the input rotation always, and one of the remaining two planetary gear sets is a double sun gear type planetary gear set including: two sun gears; a pinion meshing individually with said two sun gears; a carrier having a center member positioned between the aforementioned two sun gears for inputting or outputting a rotation; and one ring gear meshing with the aforementioned pinion.

This double sun gear type planetary gear is similar in the basic gear performance to a single-pinion type planetary gear, but is characterized in that the member number is so larger than that of the single-pinion type planetary gear having three members as (two members from the sun gear)+(one member from the ring gear)+(two members in axial and radial direction from the carrier)=five members.

In order to discriminate the "Ravigneaux type composite planetary gear train", i.e., the-composite planetary gear train, in which the sun gears are individually combined with the double pinions, or the "Simpson type planetary gear train" in which two sets of single-pinion type planetary gears are combined, the gear train having a single-pinion type planetary gear and a double sun gear type planetary gear combined will be named the "Ishimaru type planetary gear train" by quoting the name of the inventor.

Thus, the arrangement is made by combining one set of planetary gear and the Ishimaru type planetary gear train having a fundamental performance similar to that of the Simpson type planetary gear train. It is, therefore, possible to achieve both the strength advantage of the planetary gear because of the possibility of the ring gear input and the advantage of the gear strength or the gear lifetime of the planetary gear because the torque flow at the 1st speed can be borne through all members.

The arrangement is also made such that the Ishimaru type planetary gear train is used as the remaining two planetary gear sets but not the Ravigneaux type composite planetary gear train. Therefore, the improvement in the fuel economy can be achieved by the high transmission efficiency having no torque circulation.

Of the remaining two sets of planetary gears (or Ishimaru type planetary gear train), moreover, one planetary gear set is exemplified by the double sun gear type planetary gear having the center member positioned between the two sun gears. Therefore, an input route to the carrier for achieving an overdrive gear range can be formed to accomplish such coaxial positioning the input portion and the output portion as is suited for the automatic transmission of an automobile.

At the time of setting a gear ratio (=sun gear tooth number/ring gear tooth number), moreover, considering the conditions of a generally applicable gear ratio range and the smaller step ratio between ranges for the higher gear ranges, the Ishimaru type planetary gear train can have a wider applicable gear ratio range and a higher degree of freedom for the gear ratio than those of the Ravigneaux type composite planetary gear train.

BRIEF DESCRIPTION OF THE DRAWINGS

FIGS. 2a–2c present engagement tables of the automatic transmission gear-operated speed change apparatus of the first embodiment.

FIGS. 4a–4c present torque flow diagrams of the automatic transmission gear-operated speed change apparatus of the first embodiment at 1st, 2nd and 3rd speeds.

FIGS. 5a–5c present torque flow diagrams of the automatic transmission gear-operated speed change apparatus of the first embodiment at 4th, 5th and 6th speeds.

FIGS. 6a–6b present torque flaw diagrams of the automatic transmission gear-operated speed change apparatus of the first embodiment at 7th, 8th and reverse 1st speeds.

FIG. 9 presents diagrams showing torque transmission routes at the 1st speed in the Simpson type planetary gear train and the Ravigneaux type composite planetary gear train.

FIG. 10 is a diagram for explaining that a ring gear input is more advantageous than a carrier input.

FIGS. 11a–11c present diagrams for explaining that a carrier input for achieving an overdrive gear range cannot be realized in the case of the Simpson type planetary gear train, and that a double sun gear type planetary gear set has five members.

FIG. 14 is a schematic diagram showing a gear-operated speed change apparatus for an automatic transmission of a second embodiment.

FIGS. 15a and 15b present torque flow diagrams of the automatic transmission gear-operated speed change apparatus of the second embodiment at 1st and 2nd speeds.

FIGS. 16a–16c present torque flow diagrams of the automatic transmission gear-operated speed change apparatus of the second embodiment at 3rd, 4th and 5th speeds.

FIGS. 17a–17c present torque flow diagrams of the automatic transmission gear-operated speed change apparatus of the second embodiment at 6th, 7th and 8th speeds.

FIGS. 23a–23c present torque flow diagrams of the automatic transmission gear-operated speed change apparatus of the third embodiment at 1st, 2nd and 3rd speeds.

FIGS. 24a–24c present torque flow diagrams of the automatic transmission gear-operated speed change apparatus of the third embodiment at 4th, 5th and 6th speeds.

FIG. 29 is a schematic diagram showing a gear-operated speed change apparatus for an automatic transmission of a fourth embodiment.

FIGS. 30a and 30b present torque flow diagrams of the automatic transmission gear-operated speed change apparatus of the fourth embodiment at 1st and 2nd speeds.

FIGS. 53a–53c present torque flow diagrams of the automatic transmission gear-operated speed change apparatus of the seventh embodiment at 3rd, 4th and 5th speeds.

FIGS. 54a–54c present torque flow diagrams of the automatic transmission gear-operated speed change apparatus of the seventh embodiment at 6th, 7th and 8th speeds.

BEST MODES FOR CARRYING OUT THE INVENTION

First to seventeenth embodiments for realizing the gear-operated speed change apparatus for the automatic transmission of the present invention will be described with reference to the accompanying drawings.

(First Embodiment)

First of all, the arrangement will be described in the following.

Figure 1:
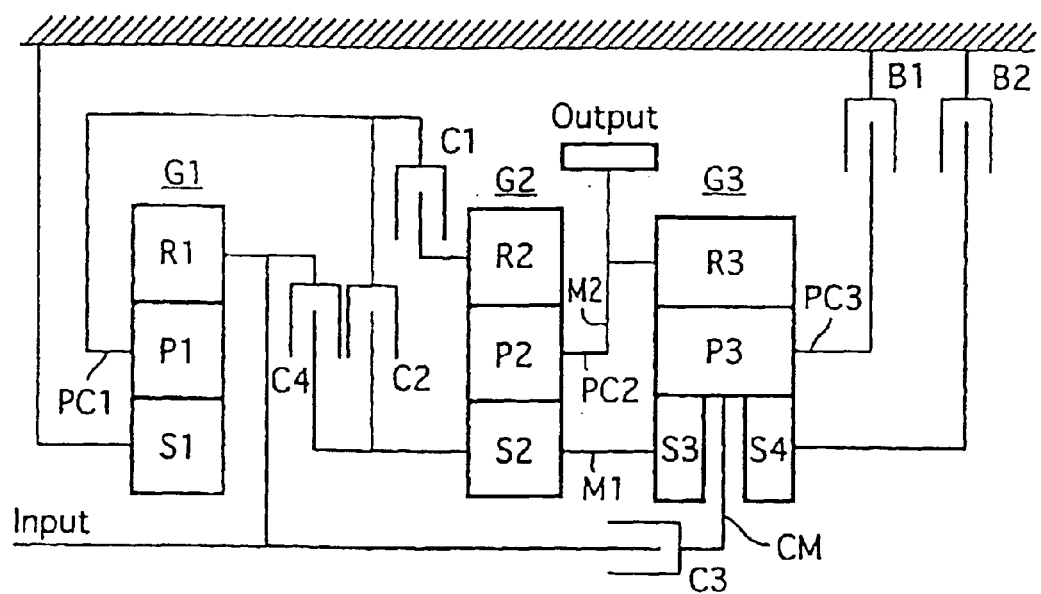
FIG. 1 is a schematic diagram showing a gear-operated speed change apparatus for an automatic transmission of a first embodiment.

The first embodiment is directed to automatic transmission gear-operated speed change apparatus corresponding to inventions defined in Claims 1, 3, 7, 8, 11, 19 and 22, and FIG. 1 is a schematic diagram showing the automatic transmission gear-operated speed change apparatus of the first embodiment.

In FIG. 1: G1 designates a first planetary gear set; G2 a second planetary gear set; G3 a third planetary gear set; M1 a first connection member; M2 a second connection member; C1 a first clutch; C2 a second clutch; C3 a third clutch; C4 a fourth clutch; B1 a first brake; B2 a second brake; Input an input shaft (or an input portion); and Output an output gear (or an output portion).

The automatic transmission gear-operated speed change apparatus (referred to as that of a speed-reducing single type 1) of the first embodiment is an example, in which the first planetary gear set G1 of a single-pinion type is positioned as a speed-reducing device at the left-hand end portion of FIG. 1, in which the second planetary gear set G2 of a single-pinion type is positioned at the central portion and in which the third planetary gear set G3 of a double sun gear type is positioned at the right-hand end portion. And, the aforementioned second planetary gear set G2 and third planetary gear set G3 construct the so-called "Ishimaru type planetary gear train".

The aforementioned first planetary gear set G1 is the single-pinion type planetary gear set acting as the speed-reducing device, which includes: a first sun gear S1; a first ring gear R1; and a first carrier PC1 for supporting a first pinion P1 meshing with the two gears S1 and R1.

The aforementioned second planetary gear set G2 is the single-pinion type planetary gear set, which includes: a second sun gear S2; a second ring gear R2; and a second carrier PC2 for supporting a second pinion P2 meshing with the two gears S2 and R2.

The aforementioned third planetary gear set G3 is the double sun gear type planetary gear set, which includes: two third sun gear S3 and fourth sun gear S4; a third pinion P3 meshing individually with the third and fourth sun gears S3 and S4; an axial third carrier PC3 for supporting the third pinion P3; a center member CM connected to said third carrier PC3 and positioned between the aforementioned two sun gears S3 and S4; and one third ring gear R3 meshing with the aforementioned third pinion P3. Here, the aforementioned center member CM is coupled to the third carrier PC3 at spatial positions of a plurality of the third pinion P3 adjoining on the circumference of the third carrier PC3.

The aforementioned input shaft Input is connected to the first ring gear R1 and receives a rotational driving force from the not-shown engine or driving source through a torque converter or the like.

The aforementioned output gear Output is connected to the second carrier PC2 and transmits the outputted rotational driving force to driven wheels through the not-shown final gear or the like.

The aforementioned first connection member M1 is the member for connecting the second sun gear S2 and the third sun gear S3 like a single unit.

The aforementioned second connection member M2 is the member for connecting the second carrier PC2 and the third ring gear R3 like a single unit.

The aforementioned first clutch C1 is the clutch for connecting/disconnecting the first carrier PC1 and the second ring gear R2 selectively.

The aforementioned second clutch C2 is the clutch for connecting/disconnecting the first carrier PC1 and the second sun gear S2 selectively.

The aforementioned third clutch C3 is the clutch for connecting/disconnecting the input shaft Input and the center member CM selectively.

The aforementioned fourth clutch C4 is the clutch for connecting/disconnecting the input shaft Input and the second sun gear S2 selectively and gives, when applied, the input rotation to the second, third and fourth sun gears S2, S3 and S4 and the first connection member M1.

The aforementioned first brake B1 is the brake for stopping the rotation of the third carrier PC3 selectively.

The aforementioned second brake B2 is the brake for stopping the rotation of the fourth sun gear S4 selectively.

To the aforementioned individual clutches C1, C2, C3 and C4 and individual brakes B1 and B2, there is connected the not-shown hydraulic speed change control device (or speed change control means defined in Claim 11) for establishing engagement pressures (with circle symbols) and release pressures (with no symbol) at individual speed ranges of seven forward speeds and one reverse speed, as shown in an engagement table of FIG. 2(a). To the aforementioned individual clutches C1, C2, C3 and C4 and individual brakes B1 and B2, alternatively, there is connected the not-shown hydraulic speed change control device (or speed change control means defined in Claim 19) for establishing engagement pressures (with circle symbols) and release pressures (with no symbol) at individual speed ranges of eight forward speeds and two reverse speeds, as shown in an engagement table of FIG. 2(b). As the hydraulic speed change control device, here is adopted the hydraulic control type, the electronic control type, the hydraulic+electronic control type or the like.

The actions will be described in the following.

[Shifting Actions]

Figure 3:
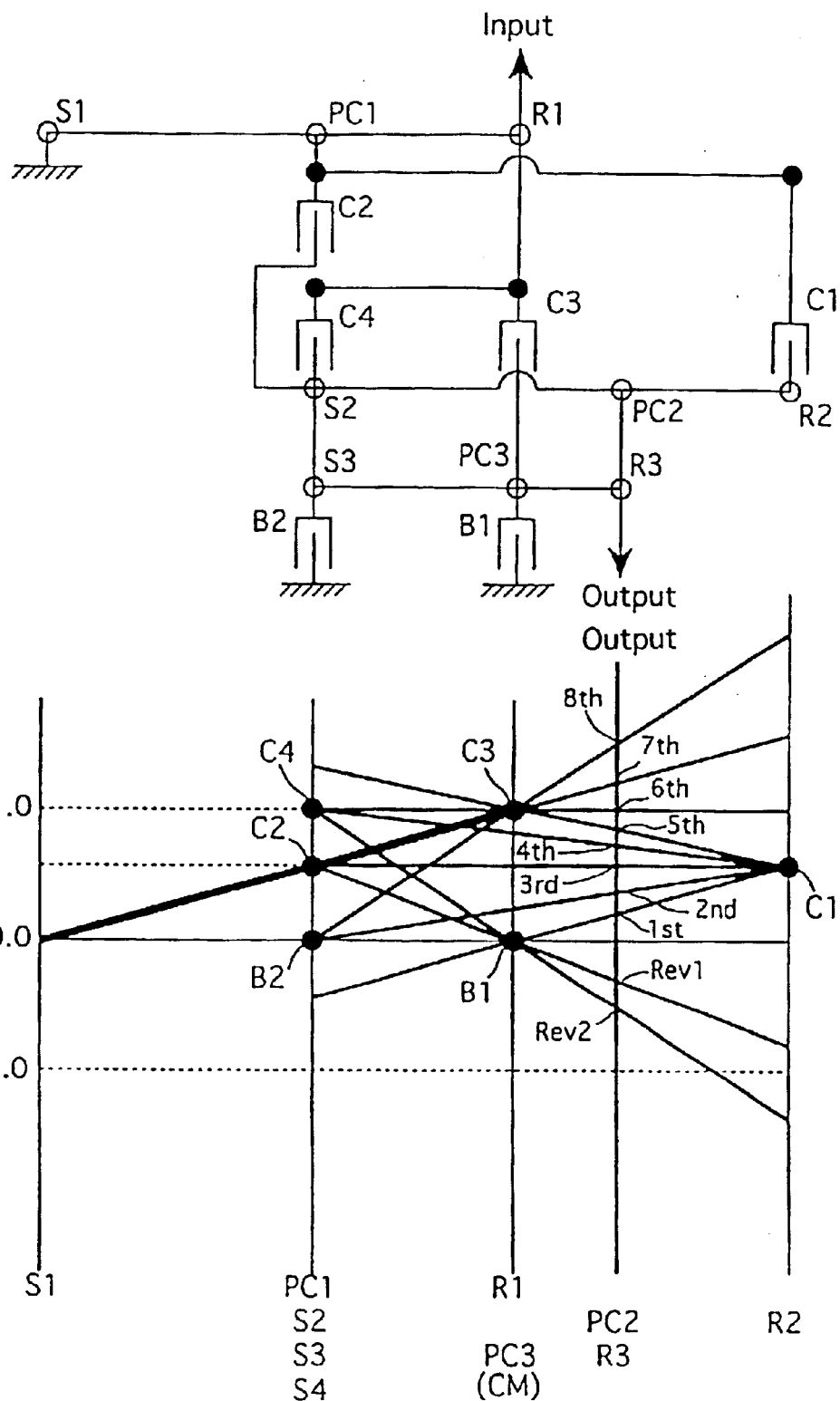
FIG. 3 is a collinear diagram in the automatic transmission gear-operated speed change apparatus of the first embodiment.

FIG. 2 presents diagrams showing the engagement tables of the seven forward speeds and one reverse speed and the eight forward speeds and two reverse speeds in the automatic transmission gear-operated speed change apparatus of the first embodiment; FIG. 3 is a collinear diagram showing the rotation stopping states of members at the eight forward speeds and two reverse speeds in the automatic transmission gear-operated speed change apparatus of the first embodiment; and FIG. 4 to FIG. 7 are diagrams showing the torque flows at the individual speed ranges of the eight forward speeds and two reverse speeds in the automatic transmission gear-operated speed change apparatus of the first embodiment. In FIG. 3, thick lines indicate the collinear diagram of the first planetary gear set G1, and intermediate lines indicate the collinear diagram of the Ishimaru planetary gear trains. In FIG. 4 to FIG. 7, the torque transmission routes of the clutches/brakes/members are indicated by thick lines, and the torque transmission routes of the gears are indicated by hatching them. Here will be described the shifting actions at the individual speed ranges of the eight forward speeds and two reverse speeds.

<1st Speed>

As shown in FIG. 2(b), the 1st speed is achieved by the engagements of the first clutch C1 and the first brake B1.

At this 1st speed, in the second planetary gear set G2, the speed-reduced rotation from the first planetary gear set G1 is inputted to the second ring gear R2 by the engagement of the first clutch C1.

In the third planetary gear set G3, on the other hand, the third carrier PC3 is fixed on the case by the engagement of the first brake B1 so that the rotation of the third sun gear S3 is the speed-reduced rotation reversed from the output rotation of the third ring gear R3. And, this rotation of the third sun gear S3 is transmitted through the first connection member M1 to the second sun gear S2 of the second planetary gear set G2.

In the second planetary gear set G2, therefore, the forward speed-reduced rotation is inputted from the second ring gear R2, and the reverse speed-reduced rotation is inputted from the second sun gear S2 to the second planetary gear set G2 so that the rotation further reduced in speed from the speed-reduced rotation of the second ring gear R2 is outputted from the second carrier PC2 through the second connection member M2 to the output gear Output.

As shown in the collinear diagram of FIG. 3, more specifically, the 1st speed is defined by the line which joins the engagement point of the first clutch C1 for inputting the speed-reduced rotation from the first planetary gear set G1 to the second ring gear R2 and the engagement point of the first brake B1 for stopping the rotation of the third carrier PC3, and the rotation inputted from the input shaft Input is reduced in speed and outputted from the output gear Output.

In the torque flow at this 1st speed, as shown in FIG. 4(a), the torque is applied to the first clutch C1, the first brake B1 and the individual members, as indicated by the thick lines, and to the first planetary gear set G1, the second planetary gear set G2 and the third planetary gear set G3 (excepting the fourth sun gear S4), as hatched. In short, at the 1st speed, the first planetary gear set G1, and the second planetary gear set G2 and the third planetary gear set G3, as constructing the Ishimaru type planetary gear train, participate in the torque transmission.

<2nd Speed>

As shown in FIG. 2(b), the 2nd speed is achieved by releasing the first brake B1 at the 1st speed and engaging the second brake B2, that is, by engaging the first clutch C1 and the second brake B2.

At this 2nd speed, in the second planetary gear set G2, the speed-reduced rotation from the first planetary gear set G1 is inputted to the second ring gear R2 by the engagement of the first clutch C1.

In the third planetary gear set G3, on the other hand, the fourth sun gear S4 is fixed on the case by the engagement of the second brake B2 so that the third sun gear S3 connected by the third pinion P3 is fixed. And, the second sun gear S2 connected to the third sun gear S3 through the first connection member M1 is fixed on the case.

In the second planetary gear set G2, therefore, the forward speed-reduced rotation is inputted from the second ring gear R2 to fix the second sun gear S2, and the rotation further reduced to a speed lower than that of the speed-reduced rotation from the second ring gear R2 is outputted from the second carrier PC2 through the second connection member M2 to the output gear Output.

As shown in the collinear diagram of FIG. 3, more specifically, the 2nd speed is defined by the line which joins the engagement point of the first clutch C1 for inputting the speed-reduced rotation from the first planetary gear set G1 to the second ring gear R2 and the engagement point of the second brake B2 for stopping the rotation of the fourth sun gear S4, and the rotation inputted from the input shaft Input is reduced to a speed (higher than that of the 1st speed) and outputted from the output gear Output.

In the torque flow at this 2nd speed, as shown in FIG. 4(b), the torque is applied to the first clutch C1, the second brake B2 and the individual members, as indicated by the thick lines, and to the first planetary gear set G1 and the second planetary gear set G2, as hatched. Here in the third planetary gear set G3, the unconstrained third pinion P3 revolves about the two fixed sun gears S3 and S4 in accordance with the output rotation of the third ring gear R3 so that it functions as a rotary member but does not participate in the torque transmission.

<3rd Speed>

As shown in FIG. 2(b), the 3rd speed is achieved by releasing the second brake B2 at the 2nd speed and engaging the second clutch C2, that is, by engaging the first clutch C1 and the second clutch C2.

At this 3rd speed, in the second planetary gear set G2, the speed-reduced rotation from the first planetary gear set G1 is inputted to the second ring gear R2 by the engagement of the first clutch C1. At the same time, this speed-reduced rotation is inputted to the second sun gear S2 of the second planetary gear set G2 by the engagement of the second clutch C2.

In the second planetary gear set G2, therefore, the same speed-reduced rotations are inputted from the second ring gear R2 and the second sun gear S2 so that the speed-reduced rotation (=the speed-reduced rotation of the first planetary gear set G1) is outputted from the second carrier PC2 rotating like a single unit with the two gears R2 and S2, through the second connection member M2 to the output gear Output.

As shown in the collinear diagram of FIG. 3, more specifically, the 3rd speed is defined by the line which joins the engagement point of the first clutch C1 for inputting the speed-reduced rotation from the first planetary gear set G1 to the second ring gear R2 and the engagement point of the second clutch C2 for inputting the speed-reduced rotation from the first planetary gear set G1 to the second sun gear S2, and the rotation inputted from the input shaft Input is reduced at a ratio (=the reduction ratio of the first planetary gear set G1) and outputted from the output gear Output.

In the torque flow at this 3rd speed, as shown in FIG. 4(c), the torque is applied to the first clutch C1, the second clutch C2 and the individual members, as indicated by the thick lines, and to the first planetary gear set G1 and the second planetary gear set G2, as hatched. In short, the third planetary gear set G3 does not participate in the torque transmission in the least.

<4th Speed>

As shown in FIG. 2(b), the 4th speed is achieved by releasing the second clutch C2 at the 3rd speed and engaging the fourth clutch C4, that is, by engaging the first clutch C1 and the fourth clutch C4.

At this 4th speed, in the second planetary gear set G2, the speed-reduced rotation from the first planetary gear set G1 is inputted to the second ring gear R2 by the engagement of the first clutch C1. At the same time, the input rotation of the input shaft Input is inputted to the second sun gear S2 in the second planetary gear set G2 by the engagement of the fourth clutch C4.

In the second planetary gear set G2, therefore, the speed-reduced rotation is inputted from the second ring gear R2, and the input rotation is inputted from the second sun gear S2, so that the rotation slightly increased in speed from the speed-reduced rotation of the second ring gear R2 is outputted from the second carrier PC2 through the second connection member M2 to the output gear Output.

As shown in the collinear diagram of FIG. 3, more specifically, the 4th speed is defined by the line which joins the engagement point of the first clutch C1 for inputting the speed-reduced rotation from the first planetary gear set G1 to the second ring gear R2 and the engagement point of the fourth clutch C4 for inputting the rotation of the second sun gear S2, and the rotation inputted from the input shaft Input is slightly reduced in speed and outputted from the output gear Output.

In the torque flow at this 4th speed, as shown in FIG. 5(a), the torque is applied to the first clutch C1, the fourth clutch C4 and the individual members, as indicated by the thick lines, and to the first planetary gear set G1 and the second planetary gear set G2, as hatched.

<5th Speed>

As shown in FIG. 2(b), the 5th speed is achieved by releasing the fourth clutch C4 at the 4th speed and engaging the third clutch C3, that is, by engaging the first clutch C1 and the third clutch C3.

At this 5th speed, in the secondary planetary gear set G2, the speed-reduced rotation from the first planetary gear set G1 is inputted to the second ring gear R2 by the engagement of the first clutch C1.

In the third planetary gear set G3, on the other hand, the input rotation of the input shaft Input is inputted through the center member CM to the third carrier PC3 by the engagement of the third clutch C3. Therefore, the rotation of the third sun gear S3 is increased to a speed higher than that of the output rotation of the third ring gear R3, and this speed-increased rotation of the third sun gear S3 is transmitted through the first connection member M1 to the second sun gear S2.

In the second planetary gear set G2, therefore, the speed-reduced rotation is inputted from the second ring gear R2, and the speed-increased rotation is inputted from the second sun gear S2, so that the rotation (slightly lower than the input rotation) increased in speed from the speed-reduced rotation of the second ring gear R2 is outputted from the second carrier PC2 through the second connection member M2 to the output gear Output.

As shown in the collinear diagram of FIG. 3, more specifically, the 5th speed is defined by the line which joins the engagement point of the first clutch C1 for inputting the speed-reduced rotation from the first planetary gear set G1 to the second ring gear R2 and the engagement point of the third clutch C3 for inputting the rotation of the third carrier PC3, and the rotation inputted from the input shaft Input is slightly reduced in speed and outputted from the output gear Output.

In the torque flow at this 5th speed, as shown in FIG. 5(b), the torque is applied to the first clutch C1, the third clutch C3 and the individual members, as indicated by the thick lines, and to the first planetary gear set G1, the second planetary gear set G2 and the third planetary gear set G3 (excepting the fourth sun gear S4), as hatched.

(6th Speed)

As shown in FIG. 2(b), the 6th speed is achieved by releasing the first clutch C1 at the 5th speed and engaging the second clutch C2, that is, by engaging the third clutch C3 and the fourth clutch C4.

At this 6th speed, the input rotation of the input shaft Input is inputted through the center member CM to the third carrier PC3 by the engagement of the third clutch C3. At the same time, the input rotation of the input shaft Input is inputted through the second sun gear S2 and the first connection member M1 to the third sun gear S3 by the engagement of the fourth clutch C4.

In the third planetary gear set G3, therefore, the input rotation is inputted to the third carrier PC3, and the input rotation is also inputted to the third sun gear S3, so that the third planetary gear set G3 rotates together to output the input rotation from the third ring gear R3 through the second connection member M2 to the output gear Output.

As shown in the collinear diagram of FIG. 3, more specifically, the 6th speed is defined by the line which joins the engagement point of the third clutch C3 for inputting the rotation of the third carrier PC3 and the engagement point of the fourth clutch C4 for inputting the rotation of the third sun gear S3, and the rotation inputted from the input shaft Input is outputted as it is from the output gear Output (in a direct-engagement gear range).

In the torque flow at this 6th speed, as shown in FIG. 5(c), the torque is applied to the third clutch C3, the fourth clutch C4 and the individual members, as indicated by the thick lines, and to the third planetary gear set G3 (excepting the fourth sun gear S4), as hatched.

(7th Speed)

As shown in FIG. 2(b), the 7th speed is achieved by releasing the fourth clutch C4 at the 6th speed and engaging the second clutch C2, that is, by engaging the second clutch C2 and the third clutch C3.

At this 7th speed, the speed-reduced rotation from the first planetary gear set G1 is inputted through the second sun gear S2 and the first connection member M1 to the third sun gear S3 by the engagement of the second clutch C2. At the same time, the input rotation of the input shaft Input is inputted through the center member CM to the third carrier PC3 by the engagement of the third clutch C3.

In the third planetary gear set G3, therefore, the input rotation is inputted to the third carrier PC3, and the speed-reduced rotation from the first planetary gear set G1 is inputted to the third sun gear S3, so that the rotation increased to a higher speed than that of the input rotation is outputted from the third ring gear R3 through the second connection member M2 to the output gear Output.

As shown in the collinear diagram of FIG. 3, more specifically, the 7th speed is defined by the line which joins the engagement point of the second clutch C2 for inputting the speed-reduced rotation from the first planetary gear set G1 to the third sun gear S3 and the engagement point of the third clutch C3 for inputting the rotation of the third carrier PC3, and the rotation inputted from the input shaft Input is slightly increased in speed and outputted from the output gear Output.

In the torque flow at this 7th speed, as shown in FIG. 6(a), the torque is applied to the second clutch C2, the third clutch C3 and the individual members, as indicated by the thick lines, and to the first planetary gear set G1 and the third planetary gear set G3 (excepting the fourth sun gear S4), as hatched.

(8th Speed)

As shown in FIG. 2(b), the 8th speed is achieved by releasing the second clutch C2 at the 7th speed and engaging the second brake B2, that is, by engaging the third clutch C3 and the second brake B2.

At this 8th speed, the input rotation of the input shaft Input is inputted through the center member CM of the third planetary gear set G3 to the third carrier PC3 by the engagement of the third clutch C3. By the engagement of the second brake B2, moreover, the fourth sun gear S4 of the third planetary gear set G3 is fixed on the case.

In the third planetary gear set G3, therefore, the input rotation is inputted to the third carrier PC3, and the fourth sun gear S4 is fixed on the case, so that the rotation increased to a higher speed than that of the input rotation is outputted from the third ring gear R3 through the second connection member M2 to the output gear Output.

As shown in the collinear diagram of FIG. 3, more specifically, the 8th speed is defined by the line which joins the engagement point of the third clutch C3 for inputting the rotation of the third carrier PC3 and the engagement point of the second brake B2 for fixing the fourth sun gear S4 on the case, and the rotation inputted from the input shaft Input is increased in speed and outputted from the output gear Output.

In the torque flow at this 8th speed, as shown in FIG. 6(b), the torque is applied to the third clutch C3, the second brake B2 and the individual members, as indicated by the thick lines, and to the third planetary gear set G3 (excepting the third sun gear S3), as hatched.

(Reverse 1st Speed)

As shown in FIG. 2(b), the reverse 1st speed is achieved by engaging the second clutch C2 and the first brake B1.

At this reverse 1st speed, the speed-reduced rotation from the first planetary gear set G1 is inputted through the second sun gear S2 and the first connection member M1 to the third sun gear S3 by the engagement of the second clutch C2. By the engagement of the first brake B1, on the other hand, the third carrier PC3 is fixed on the case.

In the third planetary gear set G3, therefore, the forward speed-reduced rotation is inputted to the third sun gear S3, and the third carrier PC3 is fixed on the case, so that the speed-reduced reverse rotation is outputted from the third ring gear R3 through the second connection member M2 to the output gear Output.

As shown in the collinear diagram of FIG. 3, more specifically, the reverse 1st speed is defined by the line which joins the engagement point of the second clutch C2 for inputting the speed-reduced rotation from the first planetary gear set G1 to the third sun gear S3 and the engagement point of the first brake B1 for stopping the rotation of the third carrier PC3, and the rotation inputted from the input shaft Input is reversed in direction and reduced in speed, and outputted from the output gear Output.

In the torque flow at this reverse 1st speed, as shown in FIG. 6(c), the torque is applied to the second clutch C2, the first brake B1 and the individual members, as indicated by the thick lines, and to the first planetary gear set G1 and the third planetary gear set G3 (excepting the fourth sun gear S4), as hatched.

(Reverse 2nd Speed)

As shown in FIG. 2(b), the reverse 2nd speed is achieved by releasing the second clutch C2 at the reverse 1st speed and engaging the fourth clutch C4, that is, by engaging the fourth clutch C4 and the first brake B1.

At this reverse 2nd speed, the input rotation of the input shaft Input is inputted through the second sun gear S2 and the first connection member M1 to the second sun gear S2 by the engagement of the fourth clutch C4. By the engagement of the first brake B1, on the other hand, the third carrier PC3 is fixed on the case.

In the third planetary gear set G3, therefore, the input rotation is inputted to the third sun gear S3, and the third carrier PC3 is fixed on the case, so that the reverse rotation reduced in speed to a speed lower than the reverse 1st speed is outputted from the third ring gear R3 through the second connection member M2 to the output gear Output.

As shown in the collinear diagram of FIG. 3, more specifically, the reverse 2nd speed is defined by the line which joins the engagement point of the fourth clutch C4 for inputting the input rotation to the second sun gear S2 and the engagement point of the first brake B1 for stopping the rotation of the third carrier PC3, and the rotation inputted from the input shaft Input is reversed in direction and highly reduced in speed, and outputted from the output gear Output.

Figure 7:
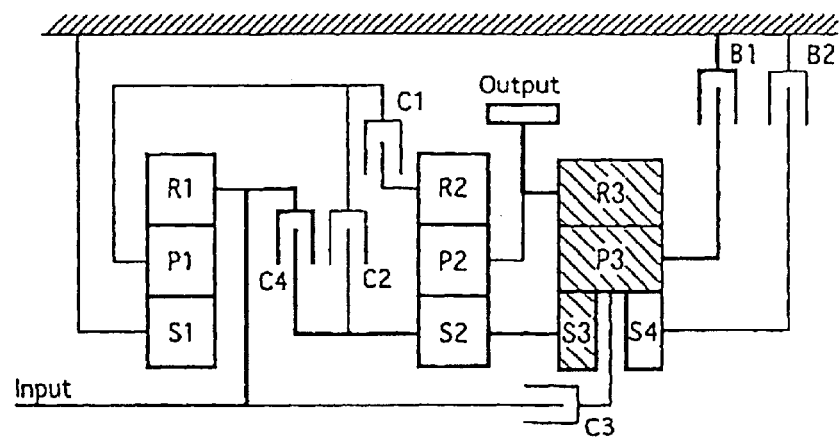
FIG. 7 presents a torque flow diagram of the automatic transmission gear-operated speed change apparatus of the first embodiment at a reverse 2nd speed.

In the torque flow at this reverse 2nd speed, as shown in FIG. 7, the torque is applied to the fourth clutch C4, the first brake B1 and the individual members, as indicated by the thick lines, and to the third planetary gear set G3 (excepting the fourth sun gear S4), as hatched.

Here, the shifting actions have been described on the case in which the schematic shown in FIG. 1 and the hydraulic speed change control device for the eight forward speeds and two reverse speeds are combined. In the case of a combination of the schematic shown in FIG. 1 and the hydraulic speed change control device for the seven forward speeds and one reverse speed, however, the seven forward speeds and one reverse speed are achieved by eliminating the 4th speed of the eight forward speeds to change 5th speed→4th speed, 6th speed→5th speed, 7th speed→6th speed and 8th speed→7th speed, and by eliminating the reverse 2nd speed to change the reverse 1st speed→the reverse 1st speed, as shown in the engagement table of FIG. 2(a).

[Advantages by Contrasts]

The basic concept of the automatic transmission gear-operated speed change apparatus of the present invention is to provide a gear-operated speed change apparatus which achieves at least seven forward speeds with four clutches and two brakes, which solves the problems of the Simpson type planetary gear train although based on the planetary gear set+the Simpson planetary gear train and which overcomes the gear-operated speed change apparatus according to the planetary gear set+the Ravigneaux type composite planetary gear train. The advantages will be described in contrast to the gear-operated speed change apparatus adopting the Simpson type planetary gear train and the Ravigneaux type composite planetary gear train.

* Features of Simpson Type Planetary Gear Train

① The Simpson type planetary gear train is advantageous in strength because the flow of the torque transmission at the 1st speed for the maximum torque is shared among all members, as shown in FIG. 9(a).

② The Simpson type planetary gear train is advantageous in gear strength, gear lifetime, carrier rigidity and so on, because it uses the ring gear input so that the tangential force is one half of the sun gear input. In case a torque is inputted to the planetary gear, as shown in FIG. 10, a ring gear input f is reduced in tangential force to ½ to ½.5 of a sun gear input F.

③ For achieving an overdrive gear range, there is needed the carrier input to the Simpson type planetary gear. If the input shaft and the output shaft are positioned on a common axis, the number of the rotary members in the single-pinion type planetary gear set is limited to three, as shown in FIG. 11(a), so that the input route to the carrier is not formed, as indicated by a dotted line in FIG. 11(b).

For this input route to the carrier, therefore, it is necessary to position the input shaft and the output shaft in parallel on different axes. As a result, the problem is to invite a large size of the automatic transmission.

* Problems of Ravigneaux Type Composite Planetary Gear Train

In order to solve the aforementioned problem ③, therefore, the gear-operated speed change apparatus adopts the Ravigneaux type composite planetary gear train in place of the Simpson type planetary gear train. This gear-operated speed change apparatus can achieve the coaxial positioning of the input shaft and the output shaft but has the problems, as enumerated in the following.

⑤ The gear-operated speed change apparatus is disadvantageous in strength because the maximum toque (at the 1st speed) of the gear train is borne by the double-pinion type planetary gear set on one side of the Ravigneaux type composite planetary gear train, as shown in FIG. 9(b).

Figure 8:
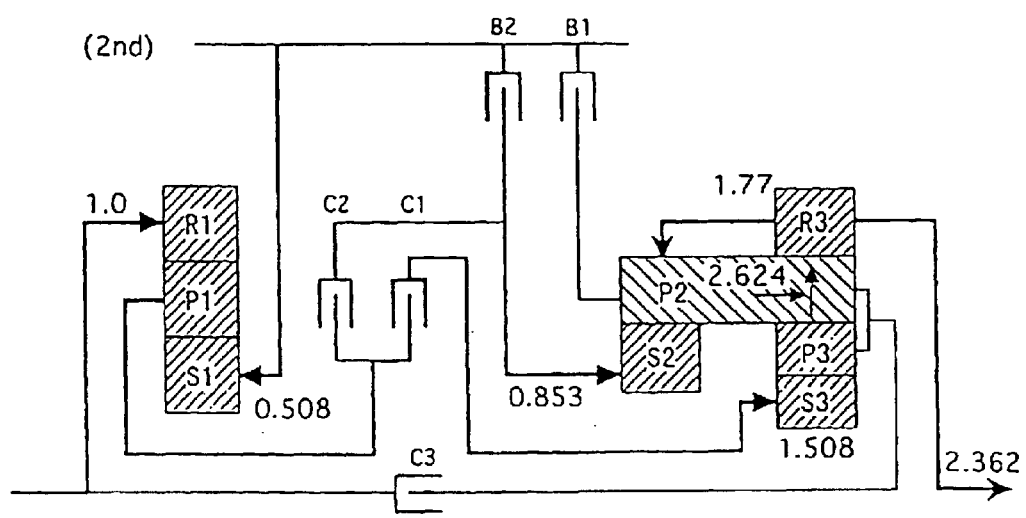
FIG. 8 is a torque circulation explaining diagram at the 2nd speed in a gear-operated speed change apparatus for an automatic transmission using the Ravigneaux type composite planetary gear train.

⑥ The torque, as raised by one set of single-pinion type planetary gear set as the speed-reducing device, is inputted from the sun gear of the Ravigneaux type composite planetary gear train, as shown in FIG. 8 and FIG. 9(b). For the aforementioned reason ②, therefore, the tangential force gets higher than the ring gear input so that disadvantages are involved in gear strength, gear lifetime, carrier rigidity and so on.

⑦ In demand for securement of the strength (i.e., the gear strength or the gear lifetime) or improvement in the carrier rigidity of the Ravigneaux type composite planetary gear train at the 1st speed, it is necessary to enlarge the dimensions of the Ravigneaux type composite planetary gear train. This invites a large size of the automatic transmission.

⑧ At the 2nd speed, as shown in FIG. 8, a torque circulation occurs in the Ravigneaux type composite planetary gear train so that the transmission efficiency drops to deteriorate the fuel economy at the 2nd speed where the torque circulation occurs. Here in the torque circulation, as shown in FIG. 8, there are branched from the third ring gear R3 an output torque (2,362) and a circulation torque (1.77), of which the circulation torque circulates inside of the third ring gear R3 and the second pinion P2 in the 2nd speed range.

* Features of Ishimaru Type Planetary Gear Train

Here will be described the features of the Ishimaru type planetary gear train which is adopted in the present invention in combination of the single-pinion type planetary gear set and the double sun gear type planetary gear set.

(a) For achieving the overdrive gear range, there is needed the carrier input. With this carrier input being achieved, the Ishimaru type planetary gear train can position the input portion and the output portion on a common line as in the Ravigneaux type composite planetary gear train. As shown in FIG. 11(c), more specifically, the double sun gear type planetary gear set constructing the Ishimaru type planetary gear train increases the member number to five=(two members from the sun gear)+(one member from the ring gear)+(two members in axial and radial directions from the carrier). The input can be extracted radially from between the two sun gears by the center member thereby to achieve the carrier input in which higher speed ranges (e.g., 5th to 8th speeds in the first embodiment) including the overdrive hold.

(b) The Ishimaru type planetary gear train is advantageous in strength, because the 1st speed at which the maximum torque acts on the gear train is borne by both the second planetary gear set G2 and the third planetary gear set G3 constructing the Ishimaru type planetary gear train, as shown in FIG. 4(a), so that the torque flow at the 1st speed can be shared among all members.

(c) The torque, as raised by one set of first planetary gear set G1 as the speed-reducing device, is inputted, as shown in FIG. 4(a) and FIG. 4(b), from the second ring gear R2 of the Ishimaru type planetary gear train at the 1st and 2nd speeds where the transmission torque is high. In comparison with the Ravigneaux type composite planetary gear train of the sun gear input, therefore, the tangential force is lowered to give an advantage (for the smaller size) in gear strength, gear lifetime, carrier rigidity and so on.

(d) As compared with the Ravigneaux type composite planetary gear train, the Ishimaru type planetary gear train is advantageous not only in strength but also in gear strength, gear lifetime, carrier rigidity and so on. Like the Ravigneaux type composite planetary gear train, moreover, the Ishimaru type planetary gear train can have the arrangement in which the input portion and the output portion are coaxially positioned. Therefore, the gear-operated speed change apparatus can be made compact to achieve the size reduction of the automatic transmission.

(e) At the 2nd speed of the Ishimaru type planetary gear train, as shown in FIG. 4(b), no torque circulation occurs to improve the transmission efficiency and the fuel economy better than those of the Ravigneaux type composite planetary gear train at the 2nd speed where the torque circulation occurs. Considering a generally applicable gear ratio range ($\alpha$=0.35 to 0.65) of a gear ratio $\alpha$ (=sun gear tooth number/ring gear tooth number) and a preferable condition under which the gear ratio is the smaller for the higher speed range, for example, the Ravigneaux type composite planetary gear train at the 2nd speed has a transmission efficiency of 0.950 or 0.952. On the contrary, the Ishimaru type planetary gear train at the 2nd speed has apparently high transmission efficiencies of 0.972, in case the first planetary gear set G1 is of the single-pinion type, and 0.968 in case the same is of the double-pinion type.

(f) The Ravigneaux type composite planetary gear train is regulated by a constant ring gear tooth number when the gear ratio $\alpha$ is to beset. Considering the condition of the generally applicable gear ratio range ($\alpha$=0.35 to 0.65) and the preferable condition of the smaller gear ratio for the higher speed range, therefore, there is limited the ratio coverage or the applicable gear ratio range (=1st speed gear ratio/7th speed gear ratio or 1st speed gear ratio/8th speed gear ratio).

As compared with the Ravigneaux type composite planetary gear train, on the contrary, the Ishimaru type planetary gear train can have the applicable ratio coverage enlarged to enhance the degree of freedom for selecting the gear ratio.

In FIG. 2(a) and FIG. 2(b), there are exemplified the gear ratios $\alpha$1, $\alpha$2 and $\alpha$3 of the individual planetary gear sets G1, G2 and G3, and the gear ratios at the individual speed ranges.

(g) The Ishimaru type planetary gear train is enabled to achieve six forward speeds having proper gear ratio ranges and ratios between ranges (step ratios), simply without any change in the basic design by eliminating the fourth clutch C4 from the schematic shown in FIG. 1 and by combining it with the hydraulic speed change control device for achieving the engagement table shown in FIG. 2(c). In other words, the schematic shown in FIG. 1 can be said a high-potential schematic having a wide degree of freedom for selecting the gear ratio (in which any of six forward speeds, seven forward speeds and eight forward speeds can be combined with either of reverse one speed and reverse two speeds).

The effects will be described in the following.

As has been described hereinbefore, the automatic transmission gear-operated speed change apparatus of the first embodiment can achieve the effects to be enumerated in the following.

(1) In a gear-operated speed change apparatus for an automatic transmission comprising speed change control means including: an input shaft Input for inputting a rotation from a drive source; an output gear Output for outputting a speed-changed rotation; three sets of planetary gear sets G1, G2 and G3; a plurality of members M1 and M2 for connecting a plurality of rotary elements like a single unit; and four selectively connecting/disconnecting clutches C1, C2, C3 and C4 and two selectively fixing brakes B1 and B2 positioned between the individual rotary elements of the input shaft Input, the output gear Output, the connection members M1 and M2 and the three planetary gear sets G1, G2 and G3, for achieving at least seven forward speeds and one reverse speed by engaging/releasing said four clutches C1, C2, C3 and C4 and two brakes B1 and B2 properly, one planetary gear set G1 of said three planetary gear sets G1, G2 and G3 is a speed-reducing device for reducing the speed of the input rotation always, and one planetary gear set G3 of the remaining two planetary gear sets G2 and G3 is a double sun gear type planetary gear set including: two sun gears S3 and S4; a pinion P3 meshing individually with said two sun gears S3 and S4; a third carrier PC3 having a center member CM positioned between said two sun gears S3 and S4 for inputting or outputting a rotation; and one ring gear R3 meshing with said pinion P3. Therefore, the automatic transmission gear-operated speed change apparatus can achieve additional effects, as enumerated in the following (corresponding to Claim 2).

①The Ishimaru type planetary gear train, as constructed of the two planetary gear sets G2 and G3, is advantageous in strength (e.g., in gear strength, gear lifetime and so on).

②The fuel economy can be improved by eliminating the torque circulation at the 2nd speed.

③The input shaft Input and the output gear Output can be coaxially positioned.

④The automatic transmission can be made compact by the coaxial positioning of the input shaft Input and the output gear Output and by the size reduction of the Ishimaru type planetary gear train of a low request strength.

⑤The degree of freedom for selecting the gear ratio can be enhanced to a higher level than that of the case using the Ravigneaux type composite planetary gear train.

⑥ One planetary gear set G1 is made to act as the speed-reducing device for reducing the speed of the input rotation always, so that the size reduction of the speed-reducing device can be achieved. The automatic transmission can be made more compact.

(2) The first planetary gear set G1 acting as the speed-reducing device is a single-pinion type planetary gear set. Therefore, the gear noise and the parts number can be reduced while improving the transmission efficiency and the fuel economy (corresponding to Claim 3).

(3) The automatic transmission gear-operated speed change apparatus further comprises a hydraulic speed change control device, in which when the planetary gear set as the speed-reducing device is the first planetary gear set G1, when the double sun gear type planetary gear set is the third planetary gear set G3 and when the remaining planetary gear set is the second planetary gear set G2, said second planetary gear set G2 and said third planetary gear set G3 are the planetary gear sets which are constructed of five rotary members including the connection members M1 and M2 for connecting the rotary members of the second planetary gear set G2 and the rotary members of the third planetary gear set G3 like a single unit, for achieving the seven forward speeds and one reverse speed in accordance with the engagement table shown in FIG. 2(a). Therefore, the automatic transmission gear-operated speed change apparatus can achieve additional effects, as enumerated in the following (corresponding to Claim 7).

① The fuel economy can be highly improved by eliminating the torque circulation at the 2nd speed.

② A direct-engagement gear range can be achieved as the 5th speed by engaging the fourth clutch C4 thereby to improve the torque transmission efficiency and contribute to the fuel economy.

(4) The automatic transmission gear-operated speed change apparatus further comprises a hydraulic speed change control device, in which when the planetary gear set as the speed-reducing device is the first planetary gear set G1, when the double sun gear type planetary gear set is the third planetary gear set G3 and when the remaining planetary gear set is the second planetary gear set G2, said second planetary gear set G2 and said third planetary gear set G3 are the planetary gear sets which are constructed of five rotary members including the connection members M1 and M2 for connecting the rotary members of the second planetary gear set G2 and the rotary members of the third planetary gear set G3 like a single unit, for achieving the eight forward speeds and one reverse speed in accordance with the engagement table shown in FIG. 2(b). Therefore, the automatic transmission gear-operated speed change apparatus can achieve additional effects, as enumerated in the following (corresponding to Claim 8).

① The fuel economy can be highly improved by eliminating the torque circulation at the 2nd speed.

② A direct-engagement gear range can be achieved as the 6th speed by engaging the fourth clutch C4 thereby to improve the torque transmission efficiency and contribute to the fuel economy.

(5) The automatic transmission gear-operated speed change apparatus further comprises a hydraulic speed change control device including: the single-pinion type first planetary gear set G1 acting as the speed-reducing device having the first sun gear S1, the first ring gear R1, and the first carrier PC1 for supporting the first pinion P1 meshing with the two gears S1 and R1; the single-pinion type second planetary gear set G2 having the second sun gear S2, the second ring gear R2, and the second carrier PC2 for supporting the second pinion P2 meshing with the two gears S2 and R2; the double sun gear type third planetary gear set G3 having the two third sun gear S3 and fourth sun gear S4, the third carrier PC3 and the center member CM for supporting the third pinion P3 meshing individually with the two sun gears S3 and S4; one third ring gear R3 meshing with said third pinion P3; the input shaft Input connected to the first ring gear R1; the output gear Output connected to the second carrier PC2; the first connection member M1 for connecting the second sun gear S2 and the third sun gear S3 like a single unit; the second connection member M2 for connecting the second carrier PC2 and the third ring gear R3 like a single unit; the first clutch C1 for connecting/disconnecting the first carrier PC1 and the second ring gear R2 selectively; the second clutch C2 for connecting/disconnecting the first carrier PC1 and the second sun gear S2 selectively; the third clutch C3 for connecting/disconnecting the input shaft Input and the center member CM selectively; the fourth clutch C4 for connecting/disconnecting the input shaft Input and the second sun gear S2 selectively; the first brake B1 for stopping the rotation of the third carrier PC3 selectively; and the second brake B2 for stopping the rotation of the fourth sun gear S4 selectively, for achieving the seven forward speeds and one reverse speed. Therefore, the automatic transmission gear-operated speed change apparatus can achieve additional effects, as enumerated in the following (corresponding to Claim 11).

① At the 1st speed and 2nd speed for the high torque inputs, the ring gear input can be achieved for the so-called "Ishimaru type planetary gear train", which is constructed of the second planetary gear set G2 and the third planetary gear set G3, and the automatic transmission can be made compact.

② At the 2nd speed, the torque circulation is eliminated to improve the transmission efficiency at the 2nd speed and the fuel economy.

③ At the 5th speed, the direct-engagement gear range can be achieved by connecting one side of the fourth clutch C4 to the input shaft Input so that the torque transmission efficiency is improved to contribute to the fuel economy.

(6) In the hydraulic speed change control device, the fourth clutch C4 is positioned between the input shaft Input and the second sun gear S2, and the second, third and fourth sun gears S2, S3 and S4 and the first connection member M1 are given the input rotation by the engagement of the fourth clutch C4, so that eight forward speeds and two reverse speeds are achieved according to the engagement table shown in FIG. 2(b). Without any double engagement change, therefore, the eight forward speeds of proper gear ratios and ratios between ranges can be achieved to improve the degree of freedom for setting the gear ratios better (corresponding to Claim 19).

(7) The third planetary gear set G3 or the double sun gear type planetary gear set is the planetary gear set including the two sun gears S3 and S4 having the same tooth number, and the pinion P3 meshing individually with said two sun gears S3 and S4. Therefore, it is easy to machine the pinion P3 and to achieve an effect of easy manufacture. Moreover, a remarkable advantage is obtained for noise and vibration (corresponding to Claim 22).

Although the first embodiment gear-operated speed change apparatus has been described hereinbefore, any of the five patterns shown in FIG. 12 and FIG. 13 may be selected as the positioning pattern of the fourth clutch C4 in addition to the position of the fourth clutch C4, as shown in the schematic of FIG. 1, in case the 5th speed is achieved as the direct-engagement gear range by combining the gear-operated speed change apparatus with the hydraulic speed change control device for achieving seven forward speeds and one reverse speed.

The five patterns shown in FIG. 12 and FIG. 13 are examples, in which the second, third and fourth sun gears S2, S3 and S4 and the first connection member M1 are given the input rotation by the engagement of the fourth clutch C4 when the center member CM and the third carrier PC3 are given the input rotation by the engagement of the third clutch C3 so as to change the 5th speed into the direct-engagement gear range.

Figure 12A:
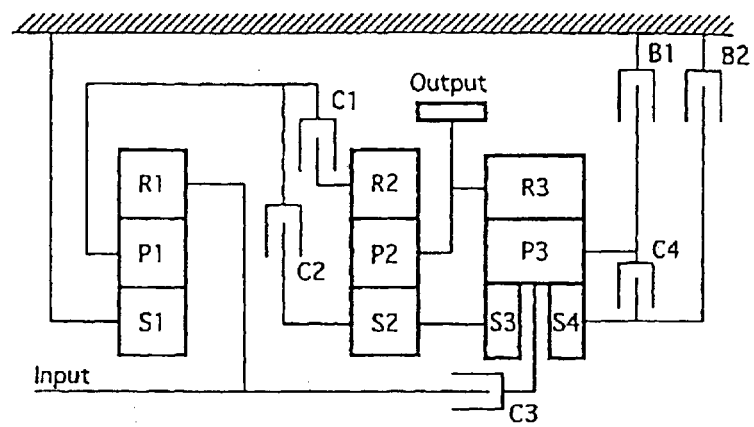
FIGS. 12a–12c present positioning pattern diagrams of a 4th clutch in the automatic transmission gear-operated speed change apparatus of the first embodiment.
Figure 12B:
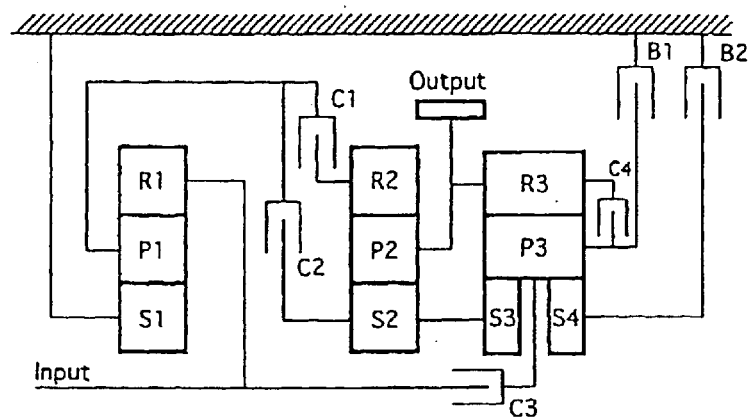
Figure 12C:
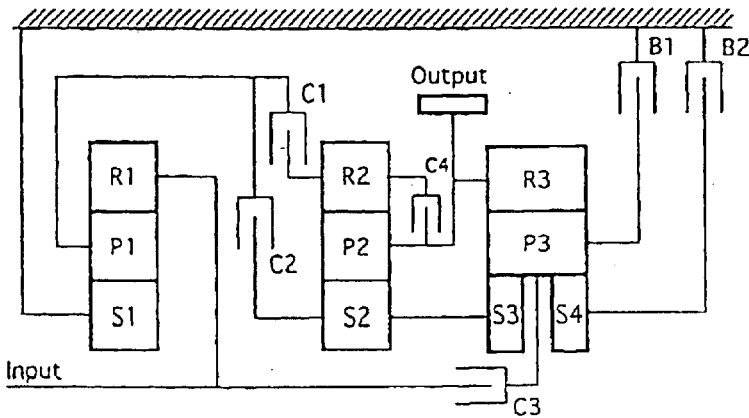
Figure 13A:
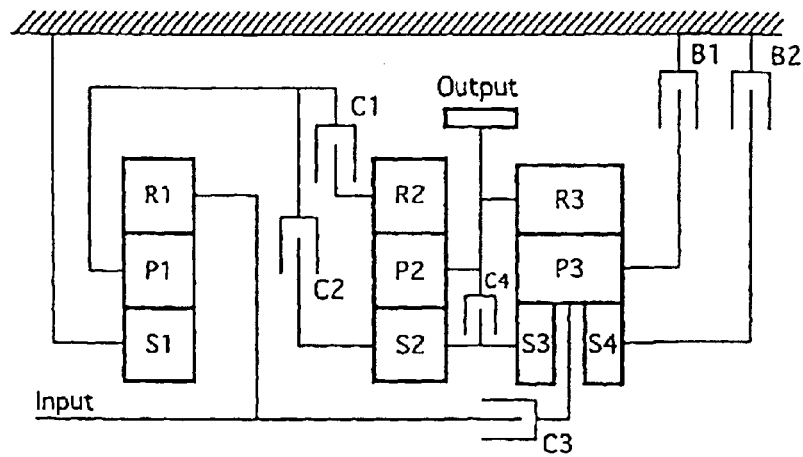
FIGS. 13a and 13b present positioning pattern diagrams of a 4th clutch in the automatic transmission gear-operated speed change apparatus of the first embodiment.
Figure 13B:
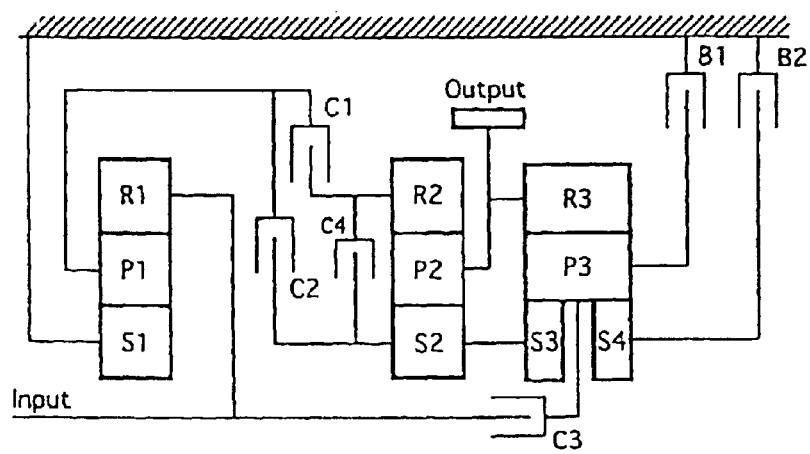

Specifically, the fourth clutch C4 is positioned:

① between the third carrier PC3 and the fourth sun gear S4 (FIG. 12(a));

② between the third ring gear R3 and the third carrier PC3 (FIG. 12(b));

③ between the second ring gear R2 and the second carrier PC2 (FIG. 12(c));

④ between the first connection member M1 and the second connection member M2 (FIG. 13(a)); or ⑤ between the second ring gear R2 and the second sun gear S2 (FIG. 13(b)).

(Second Embodiment)

First of all, the arrangement will be described in the following.

The second embodiment is directed to automatic transmission gear-operated speed change apparatus corresponding to inventions defined in Claims 1, 3, 7, 8, 12, 19 and 22, and FIG. 14 is a schematic diagram showing the automatic transmission gear-operated speed change apparatus of the second embodiment.

In FIG. 14: G1 designates a first planetary gear set; G2 a second planetary gear set; G3 a third planetary gear set; M1 a first connection member; M2 a second connection member; C1 a first clutch; C2 a second clutch; C3 a third clutch; C4 a fourth clutch; B1 a first brake; B2 a second brake; Input an input shaft (or an input portion); and Output an output gear (or an output portion).

The automatic transmission gear-operated speed change apparatus (referred to as that of a speed-reducing single type 2) of the second embodiment is an example, in which the first planetary gear set G1 of a single-pinion type is positioned as a speed-reducing device at the left-hand end portion of FIG. 14, in which the third planetary gear set G3 of a double sun gear type is positioned at the central portion and in which the second planetary gear set G2 of a single-pinion type is positioned at the right-hand end portion. And, the aforementioned second planetary gear set G2 and third planetary gear set G3 construct the so-called "Ishimaru type planetary gear train".

The aforementioned first planetary gear set G1 is the speed-reducing device, which includes: a first sun gear S1; a first ring gear R1; and a first carrier PC1 for supporting a first pinion P1 meshing with the two gears S1 and R1.

The aforementioned second planetary gear set G2 is the single-pinion type planetary gear set, which includes: a second sun gear S2; a second ring gear R2; and a second carrier PC2 for supporting a second pinion P2 meshing with the two gears S2 and R2.

The aforementioned third planetary gear set G3 is the double sun gear type planetary gear set, which includes: two third sun gear S3 and fourth sun gear S4; a center member CM for supporting a third pinion P3 meshing individually with said two sun gears S3 and S4; and one third ring gear R3 meshing with the aforementioned third pinion P3.

The aforementioned input shaft Input is connected to the first ring gear R1, and the aforementioned output gear Output is connected to the second carrier PC2.

The aforementioned first connection member M1 connects the second sun gear S2 and the third sun gear S3 like a single unit. The aforementioned second connection member M2 connects the second carrier PC2 and the third ring gear R3 like a single unit.

The aforementioned first clutch C1 connects/disconnects the first carrier PC1 and the second ring gear R2 selectively. The aforementioned second clutch C2 connects/disconnects the first carrier PC1 and the fourth sun gear S4 selectively. The aforementioned third clutch C3 connects/disconnects the input shaft Input and the center member CM selectively. The aforementioned fourth clutch C4 connects/disconnects the input shaft Input and the fourth sun gear S4 selectively.

The aforementioned first brake B1 stops the rotation of the center member CM selectively. The aforementioned second brake B2 stops the rotation of the second sun gear S2 selectively.

To the aforementioned individual clutches C1, C2, C3 and C4 and individual brakes B1 and B2, there is connected the not-shown hydraulic speed change control device (or speed change control means defined in Claim 12) for establishing engagement pressures (with circle symbols) and release pressures (with no symbol) at individual speed ranges of seven forward speeds and one reverse speed, as shown in an engagement table of FIG. 2(a). To the aforementioned individual clutches C1, C2, C3 and C4 and individual brakes B1 and B2, alternatively, there is connected the not-shown hydraulic speed change control device (or speed change control means defined in Claim 19) for establishing engagement pressures (with circle symbols) and release pressures (with no symbol) at individual speed ranges of eight forward speeds and two reverse speeds, as shown in an engagement table of FIG. 2(b).

The actions will be described in the following.

[Shifting Actions]

FIG. 15 to FIG. 18 are diagrams showing the torque flows at the individual gear ranges of the automatic transmission gear-operated speed change apparatus of the second embodiment. In FIG. 15 to FIG. 18, the torque transmission routes of clutches, brakes and members are indicated by thick lines, and the torque transmission routes of gears are indicated by hatching them.

Here, the engagement tables of the second embodiment gear-operated speed change apparatus are identical to those of the first embodiment gear-operated speed change apparatus shown in FIG. 2, and the collinear diagrams showing the rotation-stopped state of the members at the individual gear ranges in the second embodiment gear-operated speed change apparatus are identical to those of the first embodiment gear-operated speed change apparatus, as shown in FIG. 3, so that their illustrations and descriptions are omitted.

Here will be described the torque flows at the individual gear ranges of the eight forward speeds and the two reverse speeds.

<1st Speed>

As shown in FIG. 2(b), the 1st speed is achieved by the engagements of the first clutch C1 and the first brake B1.

In the torque flow at this 1st speed, as shown in FIG. 15(a), the torque is applied to the first clutch C1, the first brake B1 and the individual members, as indicated by the thick lines, and to the first planetary gear set G1, the second planetary gear set G2 and the third planetary gear set G3 (excepting the fourth sun gear S4), as hatched. In short, at the 1st speed, the second planetary gear set G2 and the third planetary gear set G3, as constructing the Ishimaru type planetary gear train, participate in the torque transmission.

<2nd Speed>

As shown in FIG. 2(b), the 2nd speed is achieved by releasing the first brake B1 at the 1st speed and engaging the second brake B2, that is, by engaging the first clutch C1 and the second brake B2.

In the torque flow at this 2nd speed, as shown in FIG. 15(b), the torque is applied to the first clutch C1, the second brake B2 and the individual members, as indicated by the thick lines, and to the first planetary gear set G1 and the second planetary gear set G2, as hatched. Here, the third planetary gear set G3 functions only as a rotary member but does not participate in the torque transmission in the least.

<3rd Speed>

As shown in FIG. 2(b), the 3rd speed is achieved by releasing the second brake B2 at the 2nd speed and engaging the second clutch C2, that is, by engaging the first clutch C1 and the second clutch C2.

In the torque flow at this 3rd speed, as shown in FIG. 16(a), the torque is applied to the first clutch C1, the second clutch C2 and the individual members, as indicated by the thick lines, and to the first planetary gear set G1 and the second planetary gear set G2, as hatched. Here in the third planetary gear set G3, the unconstrained third pinion P3 revolves only on its axis and about the two speed-reduced sun gears S3 and S4 in accordance with the output rotation of the third ring gear R3 so that it does not participate in the torque transmission.

<4th Speed>

As shown in FIG. 2(b), the 4th speed is achieved by releasing the second clutch C2 at the 3rd speed and engaging the fourth clutch C4, that is, by engaging the first clutch C1 and the fourth clutch C4.

In the torque flow at this 4th speed, as shown in FIG. 16(b), the torque is applied to the first clutch C1, the fourth clutch C4 and the individual members, as indicated by the thick lines, and to the first planetary gear set G1 and the second planetary gear set G2, as hatched.

<5th Speed>

As shown in FIG. 2(b), the 5th speed is achieved by releasing the fourth clutch C4 at the 4th speed and engaging the third clutch C3, that is, by engaging the first clutch C1 and the third clutch C3.

In the torque flow at this 5th speed, as shown in FIG. 16(c), the torque is applied to the first clutch C1, the third clutch C3 and the individual members, as indicated by the thick lines, and to the first planetary gear set G1, the second planetary gear set G2 and the third planetary gear set G3 (excepting the fourth sun gear S4), as hatched.

(6th Speed)

As shown in FIG. 2(b), the 6th speed is achieved by releasing the first clutch C1 at the 5th speed and engaging the fourth clutch C4, that is, by engaging the third clutch C3 and the fourth clutch C4.

In the torque flow at this 6th speed, as shown in FIG. 17(a), the torque is applied to the third clutch C3, the fourth clutch C4 and the individual members, as indicated by the thick lines, and to the third planetary gear set G3 (excepting the third sun gear S3), as hatched.

(7th Speed)

As shown in FIG. 2(b), the 7th speed is achieved by releasing the fourth clutch C4 at the 6th speed and engaging the second clutch C2, that is, by engaging the second clutch C2 and the third clutch C3.

In the torque flow at this 7th speed, as shown in FIG. 17(b), the torque is applied to the second clutch C2, the third clutch C3 and the individual members, as indicated by the thick lines, and to the first planetary gear set G1 and the third planetary gear set G3 (excepting the third sun gear S3), as hatched.

(8th Speed)

As shown in FIG. 2(b), the 8th speed is achieved by releasing the second clutch C2 at the 7th speed and engaging the second brake B2, that is, by engaging the third clutch C3 and the second brake B2.

In the torque flow at this 8th speed, as shown in FIG. 17(c), the torque is applied to the third clutch C3, the second brake B2 and the individual members, as indicated by the thick lines, and to the third planetary gear set G3 (excepting the fourth sun gear S4), as hatched.

(Reverse 1st Speed)

As shown in FIG. 2(b), the reverse 1st speed is achieved by engaging the second clutch C2 and the first brake B1.

Figure 18A:
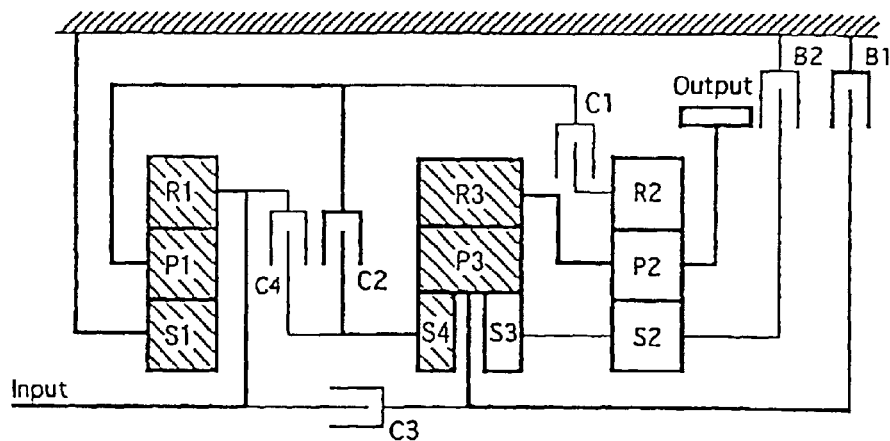
FIGS. 18a and 18b present torque flow diagrams of the automatic transmission gear-operated speed change apparatus of the second embodiment at reverse 1st and reverse 2nd speeds.

In the torque flow at this reverse speed, as shown in FIG. 18(a), the torque is applied to the second clutch C2, the first brake B1 and the individual members, as indicated by the thick lines, and to the first planetary gear set G1 and the third planetary gear set G3 (excepting the third sun gear S3), as hatched.

(Reverse 2nd Speed)

As shown in FIG. 2(b), the reverse 2nd speed is achieved by releasing the second clutch C2 at the reverse 1st speed and engaging the fourth clutch C4, that is, by engaging the fourth clutch C4 and the first brake B1.

Figure 18B:
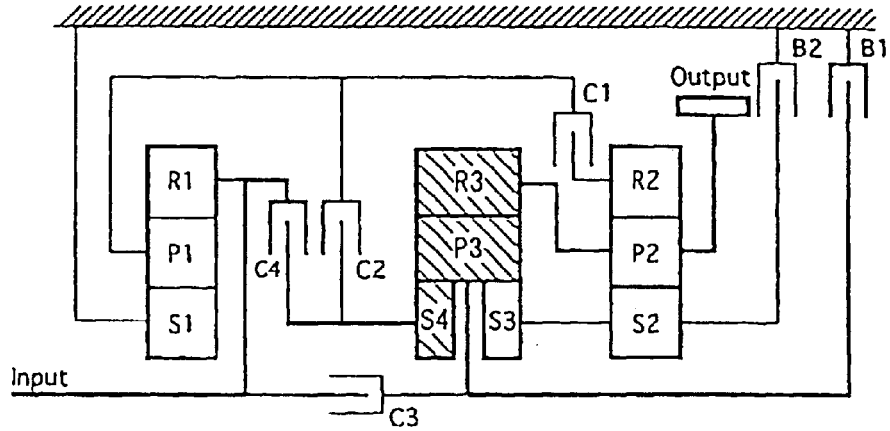

In the torque flow at this reverse 2nd speed, as shown in FIG. 18(b), the torque is applied to the fourth clutch C4, the first brake B1 and the individual members, as indicated by the thick lines, and to the third planetary gear set G3 (excepting the third sun gear S3), as hatched.

The effects will be described in the following.

As has been described hereinbefore, the automatic transmission gear-operated speed change apparatus of the second embodiment can obtain the following effects in addition to the effects (1), (2), (3), (4), (6) and (7) of the first embodiment gear-operated speed change apparatus.

(8) The automatic transmission gear-operated speed change apparatus further comprises a hydraulic speed change control device including: the single-pinion type first planetary gear set G1 acting as the speed-reducing device and having the first sun gear S1, the first ring gear R1, and the first carrier PC1 for supporting the first pinion P1 meshing with the two gears S1 and R1; the single-pinion type second planetary gear set G2 having the second sun gear S2, the second ring gear R2, and the second carrier PC2 for supporting the second pinion P2 meshing with the two gears S2 and R2; the double sun gear type third planetary gear set G3 having the two third sun gear S3 and fourth sun gear S4, the center member CM for supporting the third pinion P3 meshing individually with the two sun gears S3 and S4, and one third ring gear R3 meshing with said third pinion P3; the input shaft Input connected to the first ring gear R1; the output gear Output connected to the second carrier PC2; the first connection member M1 for connecting the second sun gear S2 and the third sun gear S3 like a single unit; the second connection member M2 for connecting the second carrier PC2 and the third ring gear R3 like a single unit; the first clutch C1 for connecting/disconnecting the first carrier PC1 and the second ring gear R2 selectively; the second clutch C2 for connecting/disconnecting the first carrier PC1 and the fourth sun gear S4 selectively; the third clutch C3 for connecting/disconnecting the input shaft Input and the center member CM selectively; the fourth clutch C4 for connecting/disconnecting the input shaft Input and the fourth sun gear S4 selectively; the first brake B1 for stopping the rotation of the center member CM selectively; and the second brake B2 for stopping the rotation of the second sun gear S2 selectively, for achieving the seven forward speeds and one reverse speed. Therefore, the automatic transmission gear-operated speed change apparatus can achieve additional effects, as enumerated in the following (corresponding to Claim 12).

① At the 1st speed and 2nd speed, the ring gear input can be achieved for the so-called "Ishimaru type planetary gear train", which is constructed of the second planetary gear set G2 and the third planetary gear set G3, and the automatic transmission can be made compact.

② At the 2nd speed, the torque circulation is eliminated to improve the transmission efficiency at the 2nd speed and the fuel economy.

③ At the 2nd speed, the second sun gear S2 of the third planetary gear set G2 is fixed not through the third and fourth sun gears S3 and S4 but directly by the second brake B2, so that the transmission efficiency of the gears is higher than that of the first embodiment gear-operated speed change apparatus thereby to contribute to an improvement in the fuel economy.

④ At the 5th speed, the direct-engagement gear range can be achieved by connecting one side of the fourth clutch C4 to the input shaft Input so that the torque transmission efficiency is improved to contribute to the fuel economy.

Although the second embodiment gear-operated speed change apparatus has been described hereinbefore, any of the five patterns shown in FIG. 19 and FIG. 20 may be selected as the positioning pattern of the fourth clutch C4 in addition to the position of the fourth clutch C4, as shown in the schematic of FIG. 14, in case the 5th speed is achieved as the direct-engagement gear range by combining the gear-operated speed change apparatus with the hydraulic speed change control device for achieving seven forward speeds and one reverse speed.

The five patterns shown in FIG. 19 and FIG. 20 are examples, in which the second, third and fourth sun gears S2, S3 and S4 and the first connection member M1 are given the input rotation by the engagement of the fourth clutch C4 when the center member CM and the third carrier PC3 are given the input rotation by the engagement of the third clutch C3 so as to change the 5th speed into the direct-engagement gear range.

Figure 19A:
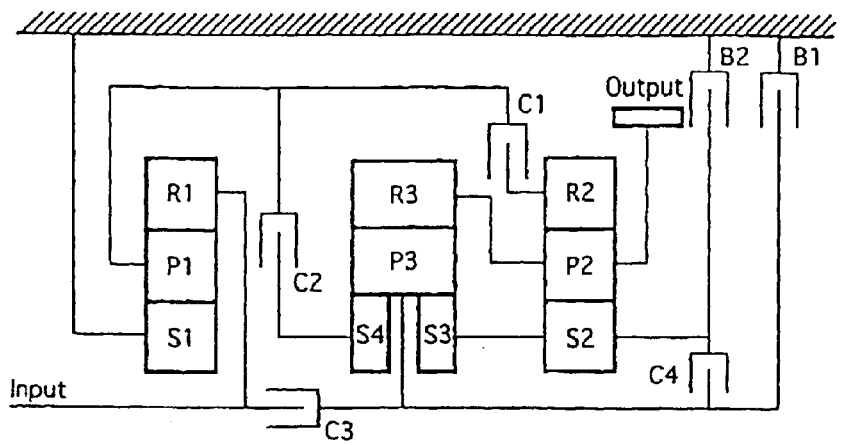
FIGS. 19a–19c present positioning pattern diagrams of a 4th clutch in the automatic transmission gear-operated speed change apparatus of the second embodiment.
Figure 19B:
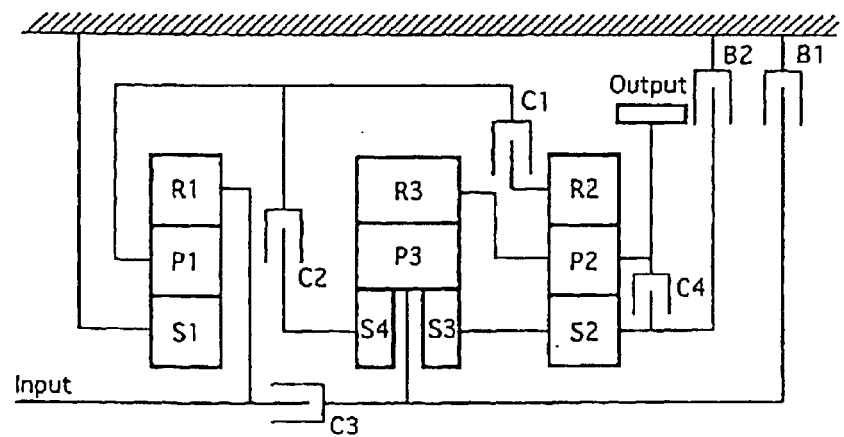
Figure 19C:
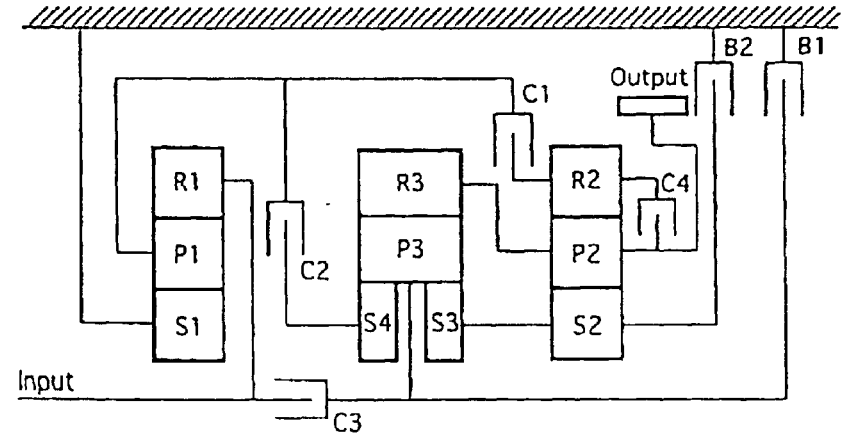
Figure 20A:
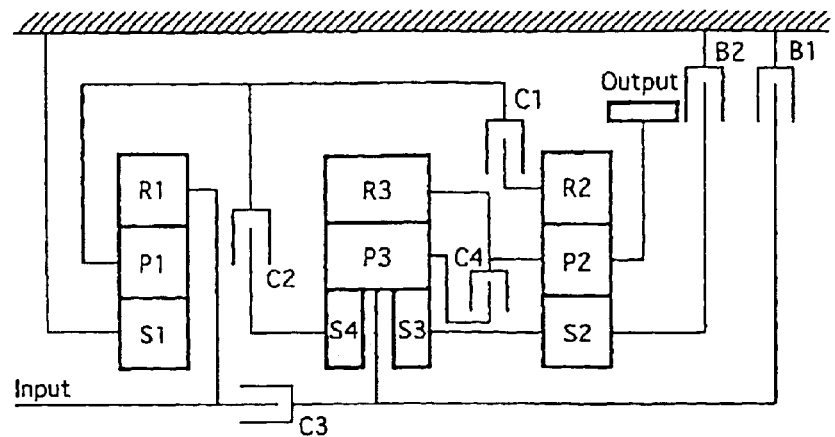
FIGS. 20a and 20b present positioning pattern diagrams of the 4th clutch in the automatic transmission gear-operated speed change apparatus of the second embodiment.
Figure 20B:
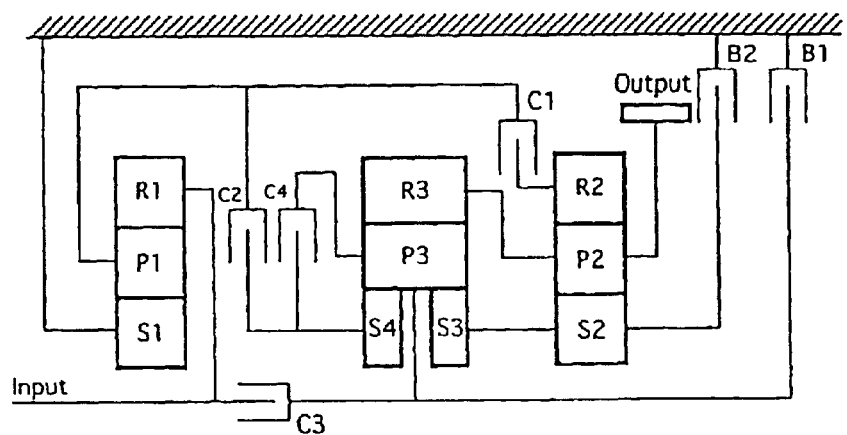

Specifically, the fourth clutch C4 is positioned:
① between the center member CM and the second sun gear S2 (FIG. 19(a));
② between the second carrier PC2 and the second sun gear S2 (FIG. 19(b));
③ between the second ring gear R3 and the second carrier PC2 (FIG. 19(c));
④ between the third ring gear R3 and the third carrier PC3 (FIG. 20(a)); or
⑤ between the third carrier PC3 and the fourth sun gear S4 (FIG. 20(b)).

(Third Embodiment)

First of all, the arrangement will be described in the following.

Figure 21:
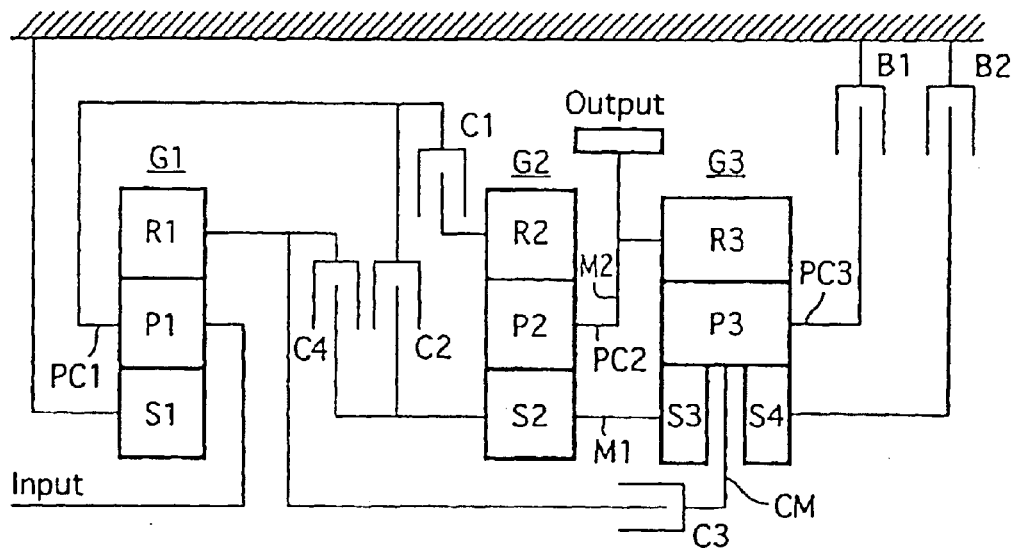
FIG. 21 is a schematic diagram showing a gear-operated speed change apparatus for an automatic transmission of a third embodiment.

The third embodiment is directed to automatic transmission gear-operated speed change apparatus corresponding to inventions defined in claims 2, 5, 9, 10, 13, 20 and 22, and FIG. 21 is a schematic diagram showing the automatic transmission gear-operated speed change apparatus of the third embodiment.

In FIG. 21: G1 designates a first planetary gear set; G2 a second planetary gear set; G3 a third planetary gear set; M1 a first connection member; M2 a second connection member; C1 a first clutch; C2 a second clutch; C3 a third clutch; C4 a fourth clutch; B1 a first brake; B2 a second brake; Input an input shaft (or an input portion); and Output an output gear (or an output portion).

The automatic transmission gear-operated speed change apparatus (referred to as that of a speed-increasing single type 1) of the third embodiment is an example, in which the first planetary gear set G1 of a single-pinion type is positioned as a speed-increasing device at the left-hand end portion of FIG. 21, in which the second planetary gear set G2 of a single-pinion type is positioned at the central portion and in which the third planetary gear set G3 of a double sun gear type is positioned at the right-hand end portion. And, the aforementioned second planetary gear set G2 and third planetary gear set G3 construct the so-called "Ishimaru type planetary gear train".

The aforementioned first planetary gear set G1 is the speed-increasing device, which includes: a first sun gear S1; a first ring gear R1; and a first carrier PC1 for supporting a first pinion P1 meshing with the two gears S1 and R1.

The aforementioned second planetary gear set G2 is the single-pinion type planetary gear set, which includes: a second sun gear S2; a second ring gear R2; and a second carrier PC2 for supporting a second pinion P2 meshing with the two gears S2 and R2.

The aforementioned third planetary gear set G3 is the double sun gear type planetary gear set, which includes: two third sun gear S3 and fourth gear sun S4; a third carrier PC3 and a center member CM for supporting a third pinion P3 meshing individually with the two sun gears S3 and S4; and one third ring gear R3 meshing with the aforementioned third pinion P3.

The aforementioned input shaft Input is connected to the first carrier PC1, and the aforementioned output gear Output is connected to the second carrier PC2.

The aforementioned first connection member M1 connects the second sun gear S2 and the third sun gear S3 like a single unit, and the aforementioned second connection member M2 connects the second carrier PC2 and the third ring gear R3 like a single unit.

The aforementioned first clutch C1 connects/disconnects the first carrier PC1 and the second ring gear R2 selectively. The aforementioned second clutch C2 connects/disconnects the first carrier PC1 and the second sun gear S2 selectively. The aforementioned third clutch C3 connects/disconnects the first ring gear R1 and the center member CM selectively. The aforementioned fourth clutch C4 connects/disconnects the first ring gear R1 and the second sun gear S2 selectively.

To the aforementioned individual clutches C1, C2, C3 and C4 and individual brakes B1 and B2, there is connected the not-shown hydraulic speed change control device (or speed change control means defined in Claim 13) for establishing engagement pressures (with circle symbols) and release pressures (with no symbol) at individual speed ranges of seven forward speeds and one reverse speed, as shown in an engagement table of FIG. 2(a). To the aforementioned individual clutches C1, C2, C3 and C4 and individual brakes B1 and B2, alternatively, there is connected the not-shown hydraulic speed change control device (or speed change control means defined in Claim 20) for establishing engagement pressures (with circle symbols) and release pressures (with no symbol) at individual speed ranges of eight forward speeds and two reverse speeds, as shown in an engagement table of FIG. 2(b).

The actions will be described in the following.

[Shifting Actions]

Figure 22:
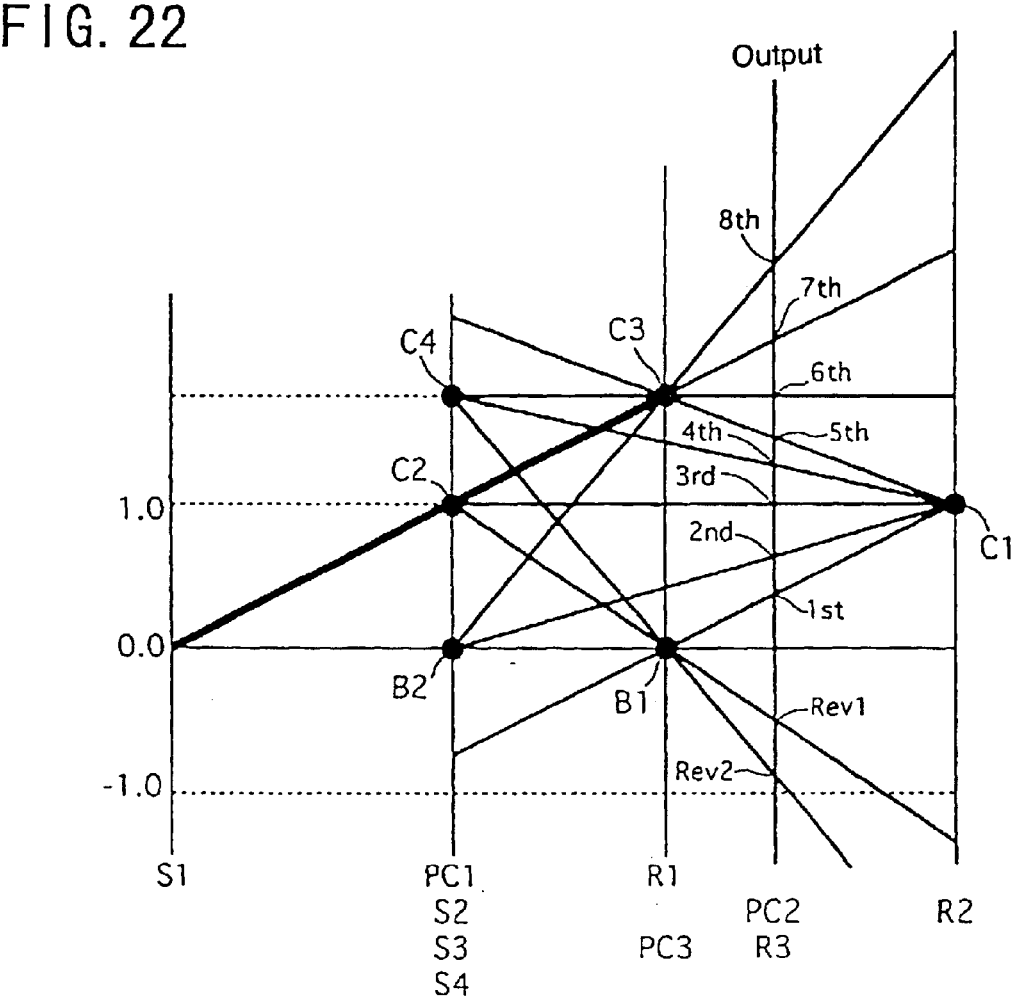
FIG. 22 is a collinear diagram in the automatic transmission gear-operated speed change apparatus of the third embodiment.

FIG. 22 is a collinear diagram showing the rotation-stopped states of members at the individual gear ranges in the automatic transmission gear-operated speed change apparatus of the third embodiment. FIG. 23 to FIG. 26 are diagrams showing the torque flows at the individual gear ranges of the automatic transmission gear-operated speed change apparatus of the third embodiment.

Here in FIG. 23 to FIG. 26, the torque transmission routes of clutches, brakes and members are indicated by thick lines, and the torque transmission routes of gears are indicated by hatching them. Here, the engagement tables of the third embodiment gear-operated speed change apparatus are identical to those of the first embodiment gear-operated speed change apparatus shown in FIG. 2, so that their illustrations are omitted.

Here will be described the shifting actions at the individual gear ranges of eight forward speeds and two reverse speeds.

<1st Speed>

As shown in FIG. 2(b), the 1st speed is achieved by the engagements of the first clutch C1 and the first brake B1.

At this 1st speed, in the second planetary gear set G2, the input rotation is inputted to the second ring gear R2 by the engagement of the first clutch C1.

In the third planetary gear set G3, on the other hand, the third carrier PC3 is fixed on the case by the engagement of the first brake B1. Therefore, the rotation of the third sun gear S3 is the speed-reduced rotation reversed from the output rotation of the third ring gear R3, and this rotation of the third sun gear S3 is transmitted through the first connection member M1 to the second sun gear S2.

Therefore, the input rotation is inputted from the second ring gear R2, and the reverse speed-reduced rotation is inputted from the second sun gear S2 to the second planetary gear set G2, so that the rotation reduced in speed from the input rotation of the second ring gear R2 is outputted from the second carrier PC2 through the second connection member M2 to the output gear Output.

As shown in the collinear diagram of FIG. 22, more specifically, the 1st speed is defined by the line which joins the engagement point of the first clutch C1 for inputting the input rotation from the input shaft Input to the second ring gear R2 and the engagement point of the first brake B1 for stopping the rotation of the third carrier PC3, and the input rotation of the input shaft Input is reduced in speed and outputted from the output gear Output.

In the torque flow at this 1st speed, as shown in FIG. 23(a), the torque is applied to the first clutch C1, the first brake B1 and the individual members, as indicated by the thick lines, and to the second planetary gear set G2 and the third planetary gear set G3 (excepting the fourth sun gear S4), as hatched. In short, at the 1st speed, the second planetary gear set G2 and the third planetary gear set G3, as constructing the Ishimaru type planetary gear train, participate in the torque transmission.

<2nd Speed>

As shown in FIG. 2(b), the 2nd speed is achieved by releasing the first brake B1 at the 1st speed and engaging the second brake B2, that is, by engaging the first clutch C1 and the second brake B2.

At this 2nd speed, in the second planetary gear set G2, the input rotation is inputted to the second ring gear R2 by the engagement of the first clutch C1.

In the third planetary gear set G3, on the other hand, the fourth sun gear S4 is fixed on the case by the engagement of the second brake B2. Therefore, the third sun gear S3 connected by the third pinion P3 is fixed. And, the second sun gear S2 connected to the third sun gear S3 through the first connection member M1 is fixed on the case.

In the second planetary gear set G2, therefore, the input rotation of the input shaft Input is inputted from the second ring gear R2 to fix the second sun gear S2, and the rotation reduced to a speed lower than that of the input rotation from the second ring gear R2 is outputted from the second carrier PC2 through the second connection member M2 to the output gear Output.

As shown in the collinear diagram of FIG. 22, more specifically, the 2nd speed is defined by the line which joins the engagement point of the first clutch C1 for inputting the input rotation from input shaft Input to the second ring gear R2 and the engagement point of the second brake B2 for stopping the rotation of the fourth sun gear S4, and the input rotation of the input shaft Input is reduced to a speed (higher than that of the 1st speed) and outputted from the output gear Output.

In the torque flow at this 2nd speed, as shown in FIG. 23(b), the torque is applied to the first clutch C1, the second brake B2 and the individual members, as indicated by the thick lines, and to the second planetary gear set G2, as hatched. Here in the third planetary gear set G3, the unconstrained third pinion P3 revolves about the two fixed sun gears S3 and S4 in accordance with the output rotation of the third ring gear R3 so that it functions as a rotary member but does not participate in the torque transmission.

<3rd Speed>

As shown in FIG. 2(b), the 3rd speed is achieved by releasing the second brake B2 at the 2nd speed and engaging the second clutch C2, that is, by engaging the first clutch C1 and the second clutch C2.

At this 3rd speed, the input rotation of the input shaft Input is inputted to the second ring gear R2 by the engagement of the first clutch C1. At the same time, the input rotation of the input shaft Input is inputted to the second sun gear S2 by the engagement of the second clutch C2.

In the second planetary gear set G2, therefore, the same input rotations are inputted from the second ring gear R2 and the second sun gear S2 so that the rotation resulting from the input rotation is outputted from the second carrier PC2 rotating like a single unit with the two gears R2 and S2, through the second connection member M2 to the output gear Output.

As shown in the collinear diagram of FIG. 22, more specifically, the 3rd speed is defined by the line which joins the engagement point of the first clutch C1 for inputting the input rotation from the input shaft Input to the second ring gear R2 and the engagement point of the second clutch C2 for inputting the input rotation from the input shaft Input to the second sun gear S2, and the same rotation (i.e., the direct-engagement rotation) as the input rotation of the input shaft Input is outputted from the output gear Output.

In the torque flow at this 3rd speed, as shown in FIG. 23(c), the torque is applied to the first clutch C1, the second clutch C2 and the individual members, as indicated by the thick lines, and to the second planetary gear set G2, as hatched. In short, the first planetary gear set G1 and the third planetary gear set G3 do not participate in the torque transmission in the least.

<4th Speed>

As shown in FIG. 2(b), the 4th speed is achieved by releasing the second clutch C2 at the 3rd speed and engaging the fourth clutch C4, that is, by engaging the first clutch C1 and the fourth clutch C4.

At this 4th speed, the input rotation of the input shaft Input is inputted to the second ring gear R2 by the engagement of the first clutch C1. By the engagement of the fourth clutch C4, on the other hand, the rotation increased in speed (by the speed-increasing ratio of the first planetary gear set G1) from the input rotation of the input shaft Input is transmitted to the second sun gear S2.

In the second planetary gear set G2, therefore, the input rotation is inputted from the second ring gear R2, and the speed-increased rotation is inputted from the second sun gear S2, so that the rotation increased in speed from the input rotation of the second ring gear R2 is outputted from the second carrier PC2 through the second connection member M2 to the output gear Output.

As shown in the collinear diagram of FIG. 22, more specifically, the 4th speed is defined by the line which joins the engagement point of the first clutch C1 for inputting the input rotation from the input shaft Input to the second ring gear R2 and the engagement point of the fourth clutch C4 for increasing the rotation of the second sun gear S2, and the rotation inputted from the input shaft Input is increased in speed and outputted from the output gear Output.

In the torque flow at this 4th speed, as shown in FIG. 24(a), the torque is applied to the first clutch C1, the fourth clutch C4 and the individual members, as indicated by the thick lines, and to the first planetary gear set G1 and the second planetary gear set G2, as hatched.

<5th Speed>

As shown in FIG. 2(b), the 5th speed is achieved by releasing the fourth clutch C4 at the 4th speed and engaging the third clutch C3, that is, by engaging the first clutch C1 and the third clutch C3.

At this 5th speed, the input rotation from of the input shaft Input is inputted to the second ring gear R2 by the engagement of the first clutch C1.

In the third planetary gear set G3, on the other hand, the rotation increased in speed from the input rotation of the input shaft Input is inputted through the center member CM to the third carrier PC3 by the engagement of the third clutch C3. Therefore, the rotation of the third sun gear S3 is increased to a speed higher than that of the rotation of the third carrier PC3, and this speed-increased rotation of the third sun gear S3 is transmitted through the first connection member M1 to the second sun gear S2.

In the second planetary gear set G2, therefore, the input rotation is inputted from the second ring gear R2, and the speed-increased rotation is inputted from the second sun gear S2, so that the rotation increased from the input rotation of the second ring gear R2 is outputted from the second carrier PC2 through the second connection member M2 to the output gear Output.

As shown in the collinear diagram of FIG. 22, more specifically, the 5th speed is defined by the line which joins the engagement point of the first clutch C1 for inputting the input rotation of the input shaft Input to the second ring gear R2 and the engagement point of the third clutch C3 for inputting the rotation of the third carrier PC3, and the rotation inputted from the input shaft Input is increased to a higher speed than that of the 4th speed and outputted from the output gear Output.

In the torque flow at this 5th speed, as shown in FIG. 24(b), the torque is applied to the first clutch C1, the third clutch C3 and the individual members, as indicated by the thick lines, and to the first planetary gear set G1, the second planetary gear set G2 and the third planetary gear set G3 (excepting the fourth sun gear S4), as hatched.

(6th Speed)

As shown in FIG. 2(b), the 6th speed is achieved by releasing the first clutch C1 at the 5th speed and engaging the fourth clutch C4, that is, by engaging the third clutch C3 and the fourth clutch C4.

At this 6th speed, the speed-increased rotation from the first planetary gear set G1 is inputted to the third carrier PC3 by the engagement of the third clutch C3. At the same time, the speed-increased rotation from the first planetary gear set G1 is inputted through the second sun gear S2→the first connection member M1 to the third sun gear S3 by the engagement of the fourth clutch C4.

In the third planetary gear set G3, therefore, the speed-increased rotation is inputted to the third carrier PC3, and the speed-increased rotation is also inputted to the third sun gear S3, so that it is outputted from the second carrier PC2 rotating together at the increased speed, through the second connection member M2 to the output gear Output.

As shown in the collinear diagram of FIG. 22, more specifically, the 6th speed is defined by the line which joins the engagement point of the third clutch C3 for increasing the speed of the rotation of the third carrier PC3 and the engagement point of the fourth clutch C4 for increasing the speed of the rotation of the third sun gear S3, and the rotation inputted from the input shaft Input is increased in speed and outputted from the output gear Output.

In the torque flow at this 6th speed, as shown in FIG. 24(c), the torque is applied to the third clutch C3, the fourth clutch C4 and the individual members, as indicated by the thick lines, and to the first planetary gear set G1 and the third planetary gear set G3 (excepting the fourth sun gear S4), as hatched.

(7th Speed)

As shown in FIG. 2(b), the 7th speed is achieved by releasing the fourth clutch C4 at the 6th speed and engaging the second clutch C2, that is, by engaging the second clutch C2 and the third clutch C3.

At this 7th speed, the input rotation from the input shaft Input is inputted through the second sun gear S2 and the first connection member M1 to the third sun gear S3 by the engagement of the second clutch C2. By the engagement of the third clutch C3, moreover, the speed-increased rotation from the first planetary gear set G1 is inputted to the third carrier PC3.

In the third planetary gear set G3, therefore, the speed-increased rotation is inputted to the third carrier PC3, and the input rotation is inputted to the third sun gear S3, so that the speed-increased rotation of the third carrier PC3 is further increased and outputted from the third ring gear R3 through the second connection member M2 to the output gear Output.

As shown in the collinear diagram of FIG. 22, more specifically, the 7th speed is defined by the line which joins the engagement point of the third clutch C3 for increasing the speed of the rotation of the third carrier PC3 and the engagement point of the second clutch C2 for inputting the rotation of the third sun gear S3, and the rotation inputted from the input shaft Input is increased in speed and outputted from the output gear Output.

Figure 25A:
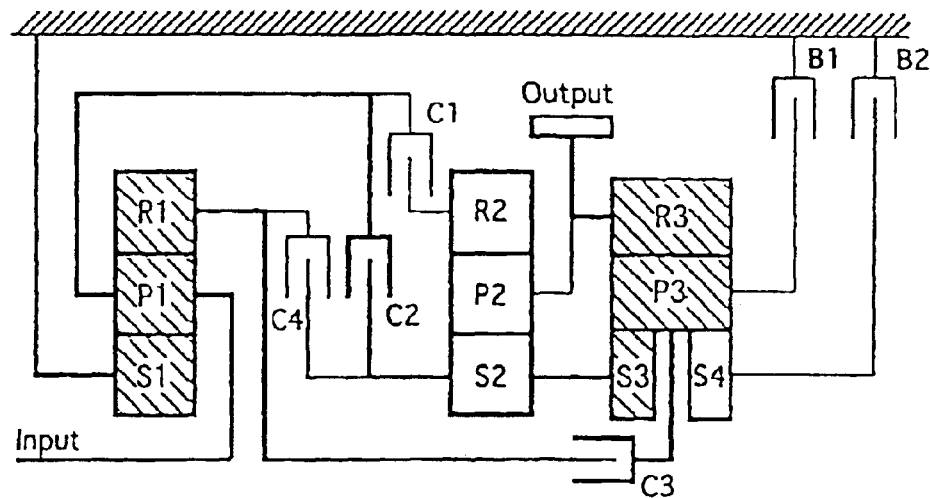
FIGS. 25a and 25b present torque flow diagrams of the automatic transmission gear-operated speed change apparatus of the third embodiment at 7th and 8th speeds.

In the torque flow at this 7th speed, as shown in FIG. 25(a), the torque is applied to the second clutch C2, the third clutch C3 and the individual members, as indicated by the thick lines, and to the first planetary gear set G1 and the third planetary gear set G3 (excepting the fourth sun gear S4), as hatched.

(8th Speed)

As shown in FIG. 2(b), the 8th speed is achieved by releasing the second clutch C2 at the 7th speed and engaging the second brake B2, that is, by engaging the third clutch C3 and the second brake B2.

At this 8th speed, the speed-increased rotation increased in speed at the first planetary gear set G1 from the input rotation of the input shaft Input is inputted to the third carrier PC3 by the engagement of the third clutch C3. By the engagement of the second brake B2, moreover, the fourth sun gear S4 of the third planetary gear set G3 is fixed on the case.

In the third planetary gear set G3, therefore, the speed-increased rotation is inputted to the third carrier PC3, and the fourth sun gear S4 is fixed on the case, so that the rotation increased to a higher speed than that of the input rotation is outputted from the second carrier PC2 through the second connection member M2 to the output gear Output.

As shown in the collinear diagram of FIG. 22, more specifically, the 8th speed is defined by the line which joins the engagement point of the third clutch C3 for increasing the speed of the rotation of the third carrier PC3 and the engagement point of the second brake B2 for fixing the fourth sun gear S4 on the case, and the rotation inputted from the input shaft Input is increased in speed and outputted from the output gear Output.

Figure 25B:
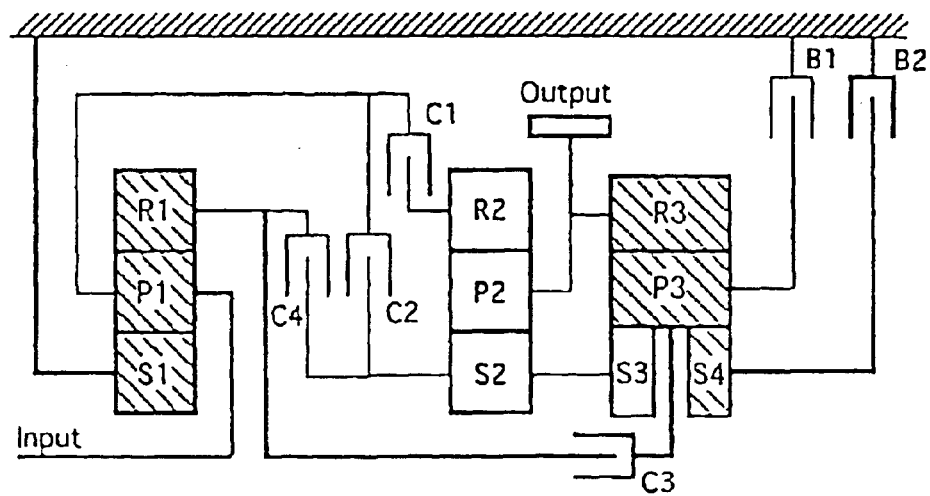

In the torque flow at this 8th speed, as shown in FIG. 25(b), the torque is applied to the third clutch C3, the second brake B2 and the individual members, as indicated by the thick lines, and to the first planetary gear set G1 and the third planetary gear set G3 (excepting the third sun gear S3), as hatched.

(Reverse 1st Speed)

As shown in FIG. 2(b), the reverse 1st speed is achieved by engaging the second clutch C2 and the first brake B1.

At this reverse 1st speed, the input rotation from the input shaft Input is inputted through the second sun gear S2 and the first connection member M1 to the third sun gear S3 by the engagement of the second clutch C2. By the engagement of the first brake B1, moreover, the third carrier PC3 is fixed on the case.

In the third planetary gear set G3, therefore, the input rotation is inputted to the third sun gear S3, and the third carrier PC3 is fixed on the case, so that the speed-reduced reverse rotation is outputted from the third ring gear R3 through the second connection member M2 to the output gear Output.

As shown in the collinear diagram of FIG. 22, more specifically, the reverse 1st speed is defined by the line which joins the engagement point of the second clutch C2 for inputting the input rotation from the input shaft Input to the third sun gear S3 and the engagement point of the first brake B1 for stopping the rotation of the third carrier PC3, and the rotation inputted from the input shaft Input is reversed in direction and reduced, and outputted from the output gear Output.

Figure 26A:
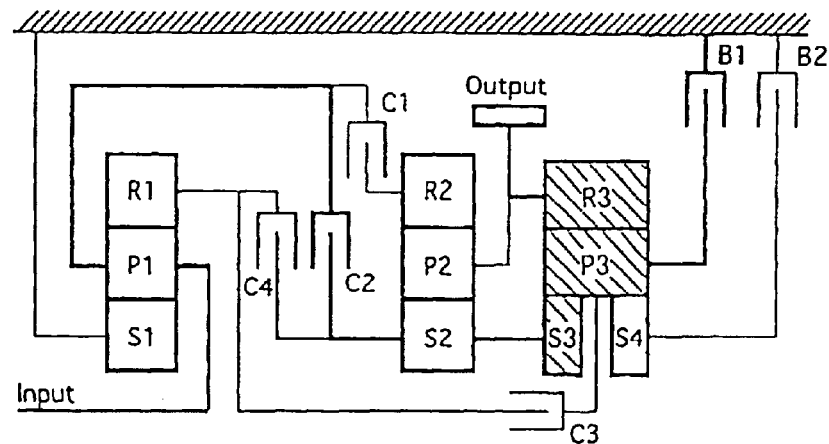
FIGS. 26a and 26b present torque flow diagrams of the automatic transmission gear-operated speed change apparatus of the third embodiment at reverse 1st and reverse 2nd speeds.

In the torque flow at this reverse 1st speed, as shown in FIG. 26(a), the torque is applied to the second clutch C2, the first brake B1 and the individual members, as indicated by the thick lines, and to the third planetary gear set G3 (excepting the fourth sun gear S4), as hatched.

(Reverse 2nd Speed)

As shown in FIG. 2(b), the reverse 2nd speed is achieved by releasing the second clutch C2 at the reverse 1st speed and engaging the fourth clutch C4, that is, by engaging the fourth clutch C4 and the first brake B1.

At this reverse 2nd speed, the rotation increased in speed in the first planetary gear set G1 is inputted through the second sun gear S2 and the first connection member M1 to the third sun gear S3 by the engagement of the fourth clutch C4. By the engagement of the first brake B1, moreover, the third carrier PC3 is fixed on the case.

In the third planetary gear set G3, therefore, the speed-increased rotation is inputted to the third sun gear S3, and the third carrier PC3 is fixed on the case, so that the reverse rotation reduced to a speed lower than the reverse 1st speed is outputted from the third ring gear R3 through the second connection member M2 to the output gear Output.

As shown in the collinear diagram of FIG. 22, more specifically, the reverse 2nd speed is defined by the line which joins the engagement point of the fourth clutch C4 for inputting the speed-increased rotation to the third sun gear S3 and the engagement point of the first brake B1 for stopping the rotation of the third carrier PC3, and the rotation inputted from the input shaft Input is reversed in direction and reduced in speed, and outputted from the output gear Output.

Figure 26B:
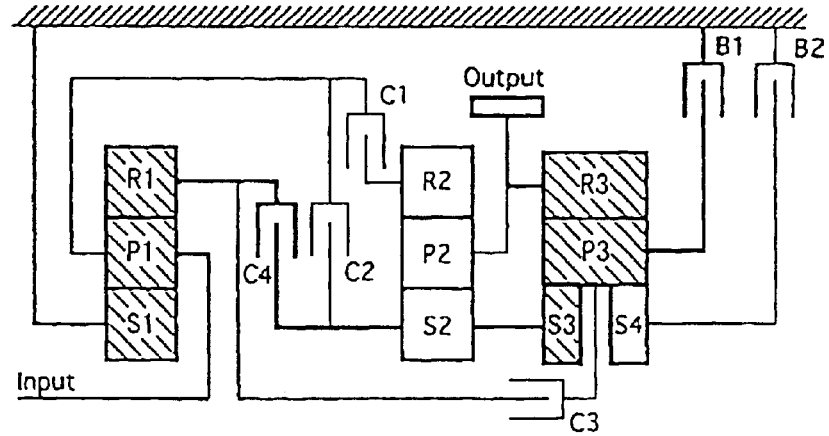

In the torque flow at this reverse 2nd speed, as shown in FIG. 26(b), the torque is applied to the fourth clutch C4, the first brake B1 and the individual members, as indicated by the thick lines, and to the first planetary gear set G1 and the third planetary gear set G3 (excepting the fourth sun gear S4), as hatched.

The effects will be described in the following.

As has been described hereinbefore, the automatic transmission gear-operated speed change apparatus of the third embodiment can obtain the effects to be enumerated in the following, in addition to the effect (7) of the first embodiment gear-operated speed change apparatus.

(9) In a gear-operated speed change apparatus for an automatic transmission comprising speed change control means including: an input shaft Input for inputting a rotation from a drive source; an output gear Output for outputting a speed-changed rotation; three sets of planetary gear sets G1, G2 and G3; a plurality of members M1 and M2 for connecting a plurality of rotary elements like a single unit; and four selectively connecting/disconnecting clutches C1, C2, C3 and C4 and two selectively fixing brakes B1 and B2 positioned between the individual rotary elements of the input shaft Input, the output gear Output, the connection members M1 and M2 and the three planetary gear sets G1, G2 and G3, for achieving at least seven forward speeds and one reverse speed by engaging/releasing said four clutches C1, C2, C3 and C4 and two brakes B1 and B2 properly, one planetary gear set G1 of said three planetary gear sets G1, G2 and G3 is a speed-increasing device for speed-increasing the input rotation always, and one planetary gear set G3 of the remaining two planetary gear sets G2 and G3 is a double sun gear type planetary gear set including: two sun gears S3 and S4; a pinion P3 meshing individually with said two sun gears S3 and S4; a third carrier PC3 having a center member CM positioned between said two sun gears S3 and S4 for inputting or outputting a rotation; and one ring gear R3 meshing with said pinion P3. Therefore, the automatic transmission gear-operated speed change apparatus can achieve additional effects, as enumerated in the following (corresponding to Claim 2).

① The Ishimaru type planetary gear train, as constructed of the two planetary gear sets G2 and G3, is advantageous in strength (e.g., in gear strength, gear lifetime and so on).

② The improvement in the fuel economy is intended by eliminating the torque circulation at the 2nd speed.

③ The input shaft Input and the output gear Output can be coaxially positioned.

④ The compactibility of the automatic transmission can be achieved by the size reduction of the Ishimaru type planetary gear train and by the coaxial positioning of the input shaft Input and the output gear Output.

⑤ The degree of freedom for selecting the gear ratio can be enhanced to a higher level than that of the case using the Ravigneaux type composite planetary gear train.

⑥ One planetary gear set G1 is made to act as the speed-increasing device for speed-increasing the input rotation always, so that more high-side gear ratios can be set than those of the first and second embodiments having the speed-reducing device, to improve the high-speed fuel economy.

(10) The first planetary gear set G1 acting as the speed-increasing device is a single-pinion type planetary gear set. Therefore, the gear noise and the parts number can be reduced while improving the transmission efficiency and the fuel economy (corresponding to Claim 5).

(11) The automatic transmission gear-operated speed change apparatus further comprises a hydraulic speed change control device, in which when the planetary gear set as the speed-increasing device is the first planetary gear set G1, when the double sun gear type planetary gear set is the third planetary gear set G3 and when the remaining planetary gear set is the second planetary gear set G2, said second planetary gear set G2 and said third planetary gear set G3 are the planetary gear sets which are constructed of five rotary members including the connection members M1 and M2 for connecting the rotary members of the second planetary gear set G2 and the rotary members of the third planetary gear set G3 like a single unit, for achieving the seven forward speeds and one reverse speed in accordance with the engagement table shown in FIG. 2(a). Therefore, the automatic transmission gear-operated speed change apparatus can achieve additional effects, as enumerated in the following (corresponding to Claim 9).

① The fuel economy can be highly improved by eliminating the torque circulation at the 2nd speed.

② Without any double engagement change, by positioning the fourth clutch C4 between the first ring gear R1 and the second sun gear S2, the seven forward speeds and one reverse speed can be achieved to improve the degree of freedom for setting the gear ratios better.

(12) The automatic transmission gear-operated speed change apparatus further comprises a hydraulic speed change control device, in which when the planetary gear set as the speed-increasing device is the first planetary gear set G1, when the double sun gear type planetary gear set is the third planetary gear set G3 and when the remaining planetary gear set is the second planetary gear set G2, said second planetary gear set G2 and said third planetary gear set G3 are the planetary gear sets which are constructed of five rotary members including the connection members M1 and M2 for connecting the rotary members of the second planetary gear set G2 and the rotary members of the third planetary gear set G3 like a single unit, for achieving the eight forward speeds and one reverse speed in accordance with the engagement table shown in FIG. 2(b). Therefore, the automatic transmission gear-operated speed change apparatus can achieve additional effects, as enumerated in the following (corresponding to Claim 10).

① The fuel economy can be highly improved by eliminating the torque circulation at the 2nd speed.

② Without any double engagement change, by positioning the fourth clutch C4 between the first ring gear R1 and the second sun gear S2, the seven forward speeds and one reverse speed can be achieved to improve the degree of freedom for setting the gear ratios better.

(13) The automatic transmission gear-operated speed change apparatus further comprises a hydraulic speed change control device including: the single-pinion type first planetary gear set G1 acting as the speed-increasing device and having the first sun gear S1, the first ring gear R1, and the first carrier PC1 for supporting the first pinion P1 meshing with the two gears S1 and R1; the single-pinion type second planetary gear set G2 having the second sun gear S2, the second ring gear R2, and the second carrier PC2 for supporting the second pinion P2 meshing with the two gears S2 and R2; the double sun gear type third planetary gear set G3 having the two third sun gear S3 and fourth sun gear S4, the third carrier PC3 and the center member CM for supporting the third pinion P3 meshing individually with the two sun gears S3 and S4, and one third ring gear R3 meshing with said third pinion P3; the input shaft Input connected to the first carrier PC1; the output gear Output connected to the second carrier PC2; the first connection member M1 for connecting the second sun gear S2 and the third sun gear S3 like a single unit; the second connection member M2 for connecting the second carrier PC2 and the third ring gear R3 like a single unit; the first clutch C1 for connecting/disconnecting the first carrier PC1 and the second ring gear R2 selectively; the second clutch C2 for connecting/disconnecting the first carrier PC1 and the second sun gear S2 selectively; the third clutch C3 for connecting/disconnecting the first ring gear R1 and the center member CM selectively; the fourth clutch C4 for connecting/disconnecting the first ring gear R1 and the second sun gear S2 selectively; the first brake B1 for stopping the rotation of the third carrier PC3 selectively; and the second brake B2 for stopping the rotation of the fourth sun gear S4 selectively, for achieving the seven forward speeds and one reverse speed. Therefore, the automatic transmission gear-operated speed change apparatus can achieve additional effects, as enumerated in the following (corresponding to Claim 13).

① At the 1st speed and 2nd speed for the high torque inputs, the ring gear input can be achieved for the so-called "Ishimaru type planetary gear train", which is constructed of the second planetary gear set G2 and the third planetary gear set G3, and the automatic transmission can be made compact.

② At the 2nd speed, the torque circulation is eliminated to improve the transmission efficiency at the 2nd speed and the fuel economy.

(14) In the hydraulic speed change control device, the fourth clutch C4 is positioned between the first ring gear R1 and the second sun gear S2, and the second, third and fourth sun gears S2, S3 and S4 and the first connection member M1 are given the speed-increased rotation at the speed-increasing ratio of the first planetary gear set G1 by the engagement of the fourth clutch C4, so that eight forward speeds and two reverse speeds are achieved according to the engagement table shown in FIG. 2(b). Without any double engagement change, therefore, the eight forward speeds of proper gear ratios and ratios between ranges can be achieved to improve the degree of freedom for setting the gear ratios better (corresponding to Claim 20).

Although the third embodiment gear-operated speed change apparatus has been described hereinbefore, any of the five patterns shown in FIG. 27 and FIG. 28 may be selected as the positioning pattern of the fourth clutch C4 in addition to the position of the fourth clutch C4, as shown in the schematic of FIG. 21, in case the 5th speed is achieved as the high gear range of the speed-increasing ratio of the first planetary gear set G1 by combining the gear-operated speed change apparatus with the hydraulic speed change control device for achieving seven forward speeds and one reverse speed.

The five patterns shown in FIG. 27 and FIG. 28 are examples, in which the second, third and fourth sun gears S2, S3 and S4 and the first connection member M1 can also be given the speed-increased rotation by the engagement of the fourth clutch C4 when the center member CM and the third carrier PC3 are given the speed-increased rotation by the engagement of the third clutch C3 so as to change the 5th speed into the high gear range of the speed-increasing ratio of the first planetary gear set G1.

Figure 27A:
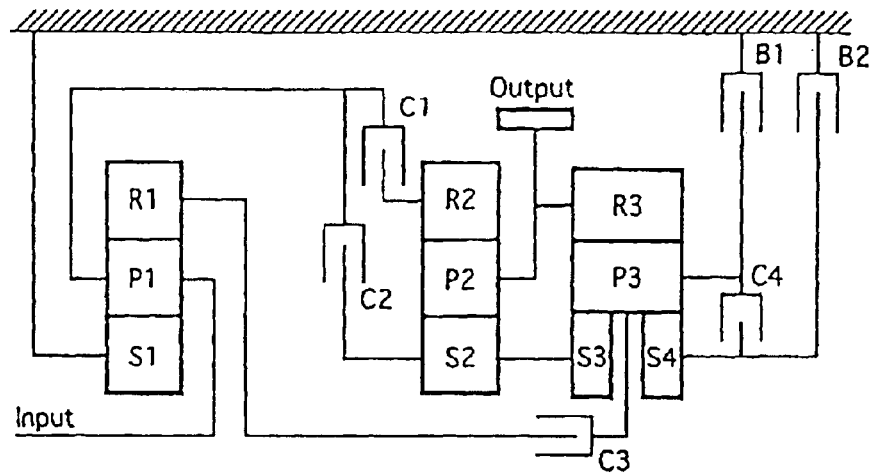
FIGS. 27a–27c present positioning pattern diagrams of a 4th clutch in the automatic transmission gear-operated speed change apparatus of the third embodiment.
Figure 27B:
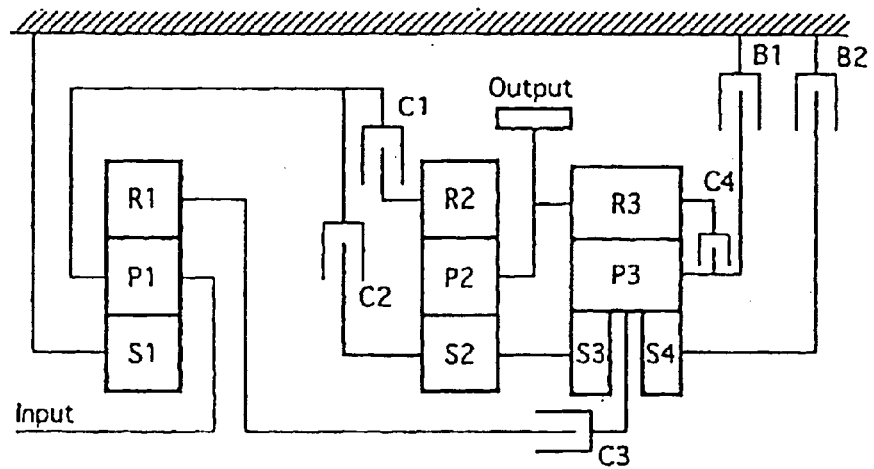
Figure 27C:
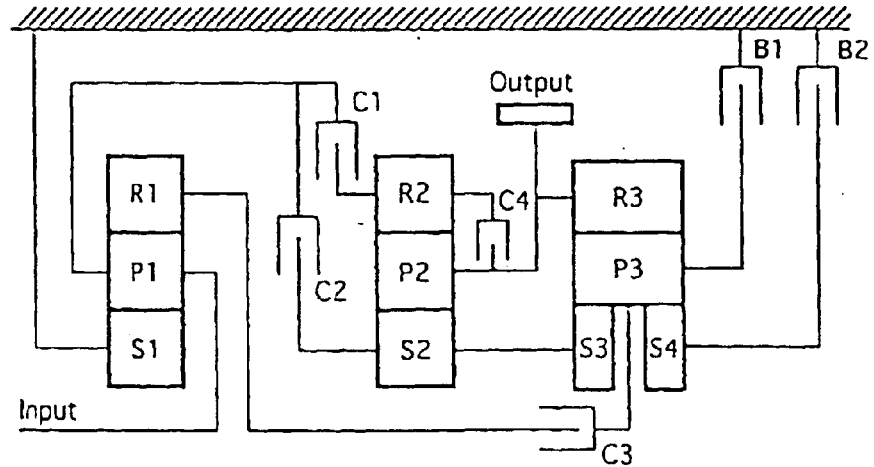
Figure 28A:
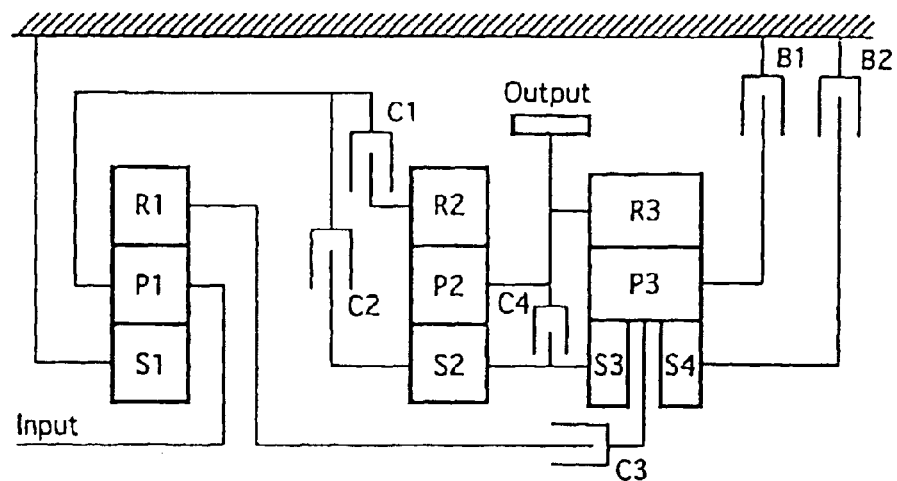
FIGS. 28a and 28b present positioning pattern diagrams of the 4th clutch in the automatic transmission gear-operated speed change apparatus of the third embodiment.
Figure 28B:
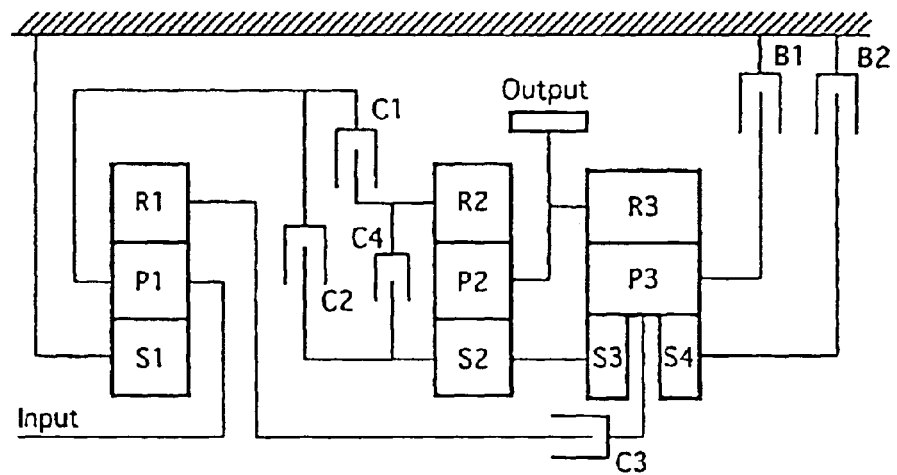

Specifically, the fourth clutch C4 is positioned:

① between the third carrier PC3 and the fourth sun gear S4 (FIG. 27(a));

② between the third ring gear R3 and the third carrier PC3 (FIG. 27(b));

③ between the second ring gear R3 and the second connection member M2 (FIG. 27(c));

④ between the first connection member M1 and the second connection member M2 (FIG. 28(a)); or ⑤ between the second ring gear R2 and the second sun gear S2 (FIG. 28(b)).

(Fourth Embodiment)

First of all, the arrangement will be described in the following.

The fourth embodiment is directed to automatic transmission gear-operated speed change apparatus corresponding to inventions defined in Claims 2, 5, 9, 10, 14, 20 and 22, and FIG. 29 is a schematic diagram showing the automatic transmission gear-operated speed change apparatus of the fourth embodiment.

In FIG. 29: G1 designates a first planetary gear set; G2 a second planetary gear set; G3 a third planetary gear set; M1 a first connection member; M2 a second connection member; C1 a first clutch; C2 a second clutch; C3 a third clutch; C4 a fourth clutch; B1 a first brake; B2 a second brake; Input an input shaft (or an input portion); and Output an output gear (or an output portion).

The automatic transmission gear-operated speed change apparatus (referred to as that of a speed-increasing single type 2) of the fourth embodiment is an example, in which the first planetary gear set G1 of a single-pinion type is positioned as a speed-reducing device at the left-hand end portion of FIG. 29, in which the third planetary gear set G3 of a double sun gear type is positioned at the central portion and in which the second planetary gear set G2 of a single-pinion type is positioned at the right-hand end portion. And, the aforementioned second planetary gear set G2 and third planetary gear set G3 construct the so-called "Ishimaru type planetary gear train".

The aforementioned first planetary gear set G1 is the speed-increasing device, which includes: a first sun gear S1; a first ring gear R1; and a first carrier PC1 for supporting a first pinion P1 meshing with the two gears S1 and R1.

The aforementioned second planetary gear set G2 is the single-pinion type planetary gear set, which includes: a second sun gear S2; a second ring gear R2; and a second carrier PC2 for supporting a second pinion P2 meshing with the two gears S2 and R2.

The aforementioned third planetary gear set G3 is the double sun gear type planetary gear set, which includes: two third sun gear S3 and fourth sun gear S4; a third carrier PC3 and a center member CM for supporting a third pinion P3 meshing individually with the two sun gears S3 and S4; and one third ring gear R3 meshing with the aforementioned third pinion P3.

The aforementioned input shaft Input is connected to the first carrier PC1, and the aforementioned output gear Output is connected to the second carrier PC2.

The aforementioned first connection member M1 connects the second sun gear S2 and the third sun gear S3 like a single unit, and the aforementioned second connection member M2 connects the second carrier PC2 and the third ring gear R3 like a single unit.

The aforementioned first clutch C1 connects/disconnects the first carrier PC1 and the second ring gear R2 selectively. The aforementioned second clutch C2 connects/disconnects the first carrier PC1 and the fourth sun gear S4 selectively. The aforementioned third clutch C3 connects/disconnects the first ring gear R1 and the center member CM selectively. The aforementioned fourth clutch C4 connects/disconnects the first ring gear R1 and the fourth sun gear S4 selectively.

To the aforementioned individual clutches C1, C2, C3 and C4 and individual brakes B1 and B2, there is connected the not-shown hydraulic speed change control device (or speed change control means defined in Claim 14) for establishing engagement pressures (with circle symbols) and release pressures (with no symbol) at individual speed ranges of seven forward speeds and one reverse speed, as shown in an engagement table of FIG. 2(a). To the aforementioned individual clutches C1, C2, C3 and C4 and individual brakes B1 and B2, alternatively, there is connected the not-shown hydraulic speed change control device (or speed change control means defined in Claim 20) for establishing engagement pressures (with circle symbols) and release pressures (with no symbol) at individual speed ranges of eight forward speeds and two reverse speeds, as shown in an engagement table of FIG. 2(b).

The actions will be described in the following.

[Shifting Actions]

FIG. 30 to FIG. 33 are diagrams showing the torque flows at the individual gear ranges of the automatic transmission gear-operated speed change apparatus of the fourth embodiment. In FIG. 30 to FIG. 33, the torque transmission routes of clutches, brakes and members are indicated by thick lines, and the torque transmission routes of gears are indicated by hatching them.

Here, the collinear diagrams showing the rotation-stopped state of the members at the individual gear ranges in the fourth embodiment gear-operated speed change apparatus are identical to those of the third embodiment gear-operated speed change apparatus, as shown in FIG. 22, so that their illustrations are omitted. The engagement tables of the fourth embodiment gear-operated speed change apparatus are identical to those of the first embodiment gear-operated speed change apparatus shown in FIG. 2, so that their illustrations are omitted.

Here will be described the torque flows at the individual gear ranges of the eight forward speeds and the two reverse speeds.

<1st Speed>

As shown in FIG. 2(b), the 1st speed is achieved by the engagements of the first clutch C1 and the first brake B1.

In the torque flow at this 1st speed, as shown in FIG. 30(a), the torque is applied to the first clutch C1, the first brake B1 and the individual members, as indicated by the thick lines, and to the second planetary gear set G2 and the third planetary gear set G3 (excepting the fourth sun gear S4), as hatched. In short, at the 1st speed, the second planetary gear set G2 and the third planetary gear set G3, as constructing the Ishimaru type planetary gear train, participate in the torque transmission.

<2nd Speed>

As shown in FIG. 2(b), the 2nd speed is achieved by releasing the first brake B1 at the 1st speed and engaging the second brake B2, that is, by engaging the first clutch C1 and the second brake B2.

In the torque flow at this 2nd speed, as shown in FIG. 30(b), the torque is applied to the first clutch C1, the second brake B2 and the individual members, as indicated by the thick lines, and to the second planetary gear set G2, as hatched. Here, the first planetary gear set G1 and the third planetary gear set G3 do not participate in the torque transmission in the least.

<3rd Speed>

As shown in FIG. 2(b), the 3rd speed is achieved by releasing the second brake B2 at the 2nd speed and engaging the second clutch C2, that is, by engaging the first clutch C1 and the second clutch C2.

Figure 31A:
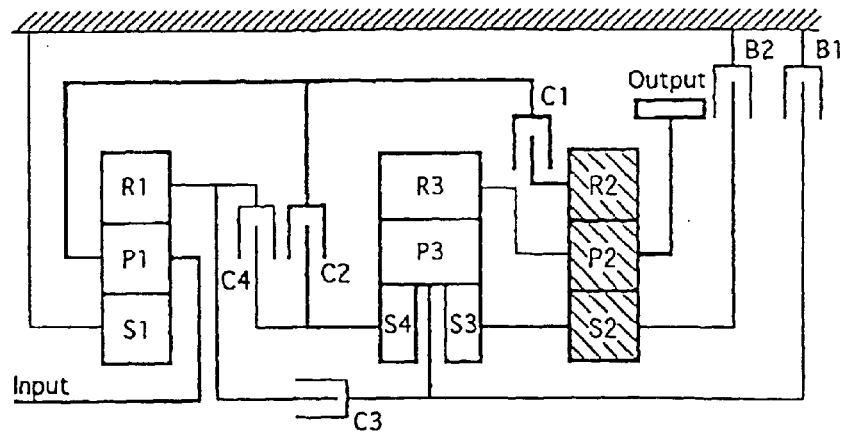
FIGS. 31a–31c present torque flow diagrams of the automatic transmission gear-operated speed change apparatus of the fourth embodiment at 3rd, 4th and 5th speeds.

In the torque flow at this 3rd speed, as shown in FIG. 31(a), the torque is applied to the first clutch C1, the second clutch C2 and the individual members, as indicated by the thick lines, and to the second planetary gear set G2, as hatched. Specifically, the first planetary gear set G1 and the third planetary gear set G3 do not participate in the torque transmission in the least.

<4th Speed>

As shown in FIG. 2(b), the 4th speed is achieved by releasing the second clutch C2 at the 3rd speed and engaging the fourth clutch C4, that is, by engaging the first clutch C1 and the fourth clutch C4.

Figure 31B:
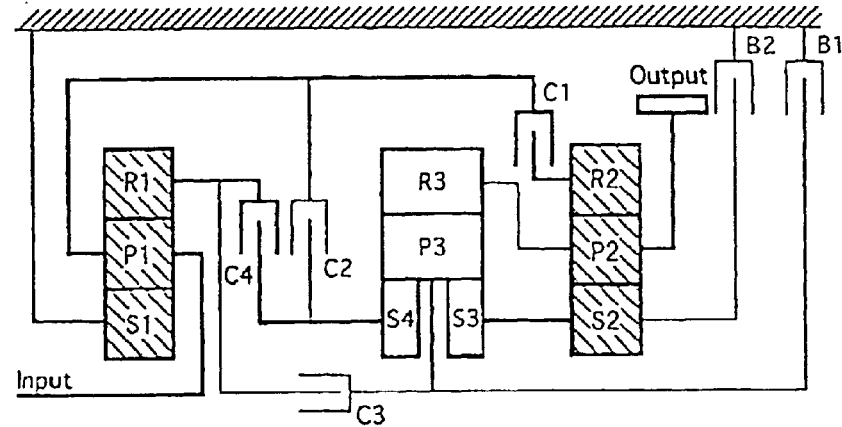

In the torque flow at this 4th speed, as shown in FIG. 31(b), the torque is applied to the first clutch C1, the fourth clutch C4 and the individual members, as indicated by the thick lines, and to the first planetary gear set G1 and the second planetary gear set G2, as hatched.

<5th Speed>

As shown in FIG. 2(b), the 5th speed is achieved by releasing the fourth clutch C4 at the 4th speed and engaging the third clutch C3, that is, by engaging the first clutch C1 and the third clutch C3.

Figure 31C:
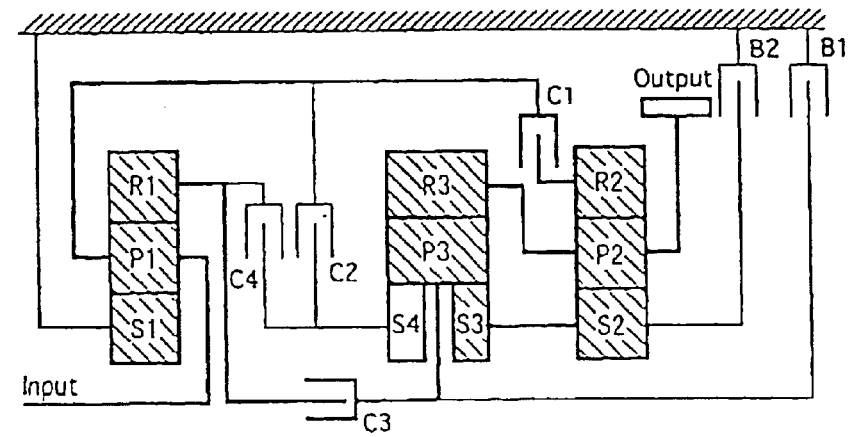

In the torque flow at this 5th speed, as shown in FIG. 31(c), the torque is applied to the first clutch C1, the third clutch C3 and the individual members, as indicated by the thick lines, and to the first planetary gear set G1, the second planetary gear set G2 and the third planetary gear set G3 (excepting the fourth sun gear S4), as hatched.

(6th Speed)

As shown in FIG. 2(b), the 6th speed is achieved by releasing the first clutch C1 at the 5th speed and engaging the fourth clutch C4, that is, by engaging the third clutch C3 and the fourth clutch C4.

Figure 32A:
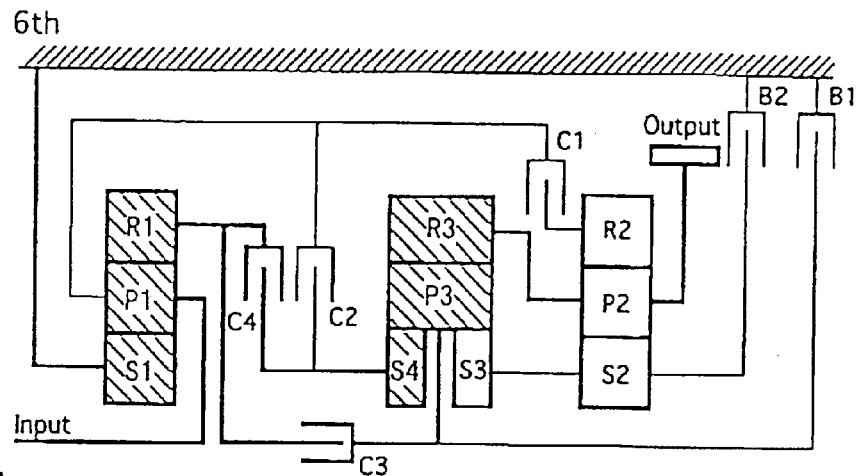
FIGS. 32a–32c present torque flow diagrams of the automatic transmission gear-operated speed change apparatus of the fourth embodiment at 6th, 7th and 8th speeds.

In the torque flow at this 6th speed, as shown in FIG. 32(a), the torque is applied to the third clutch C3, the fourth clutch C4 and the individual members, as indicated by the thick lines, and to the first planetary gear set G1 and the third planetary gear set G3 (excepting the third sun gear S3), as hatched.

(7th Speed)

As shown in FIG. 2(b), the 7th speed is achieved by releasing the fourth clutch C4 at the 6th speed and engaging the second clutch C2, that is, by engaging the second clutch C2 and the third clutch C3.

Figure 32B:
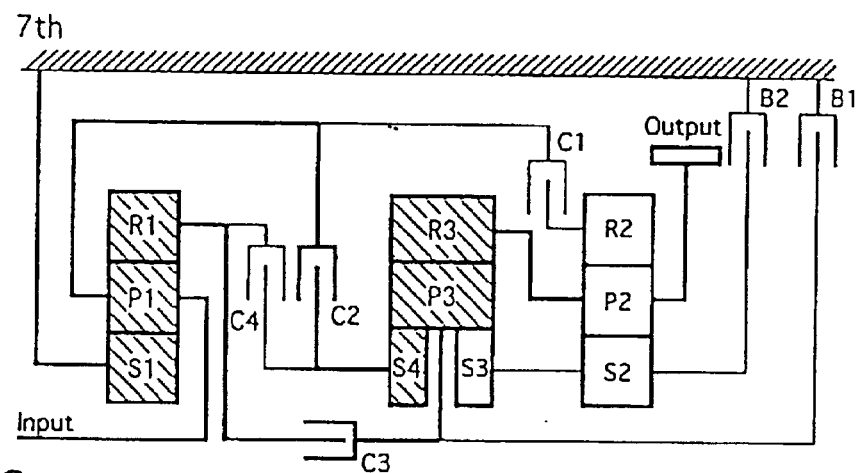

In the torque flow at this 7th speed, as shown in FIG. 32(b), the torque is applied to the second clutch C2, the third clutch C3 and the individual members, as indicated by the thick lines, and to the first planetary gear set G1 and the third planetary gear set G3 (excepting the third sun gear S3), as hatched.

(8th Speed)

As shown in FIG. 2(b), the 8th speed is achieved by releasing the second clutch C2 at the 7th speed and engaging the second brake B2, that is, by engaging the third clutch C3 and the second brake B2.

Figure 32C:
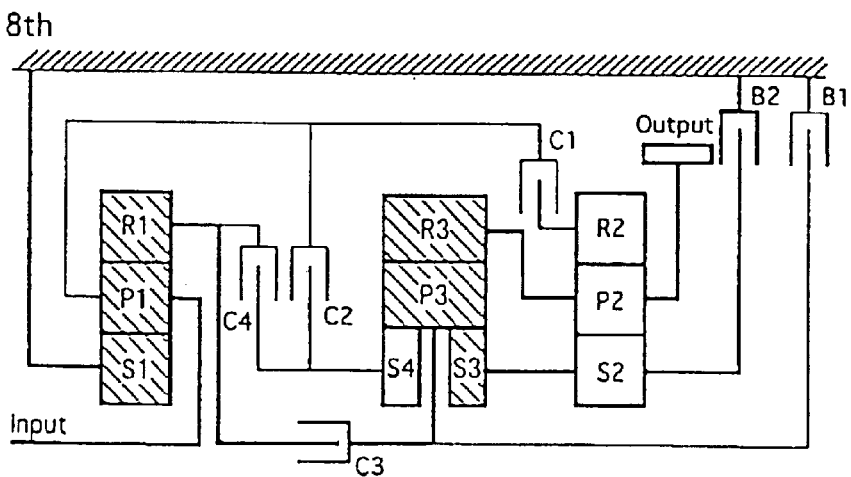

In the torque flow at this 8th speed, as shown in FIG. 32(c), the torque is applied to the third clutch C3, the second brake B2 and the individual members, as indicated by the thick lines, and to the first planetary gear set G1 and the third planetary gear set G3 (excepting the fourth sun gear S4), as hatched.

(Reverse 1st Speed)

As shown in FIG. 2(b), the reverse speed is achieved by engaging the second clutch C2 and the first brake B1.

Figure 33A:
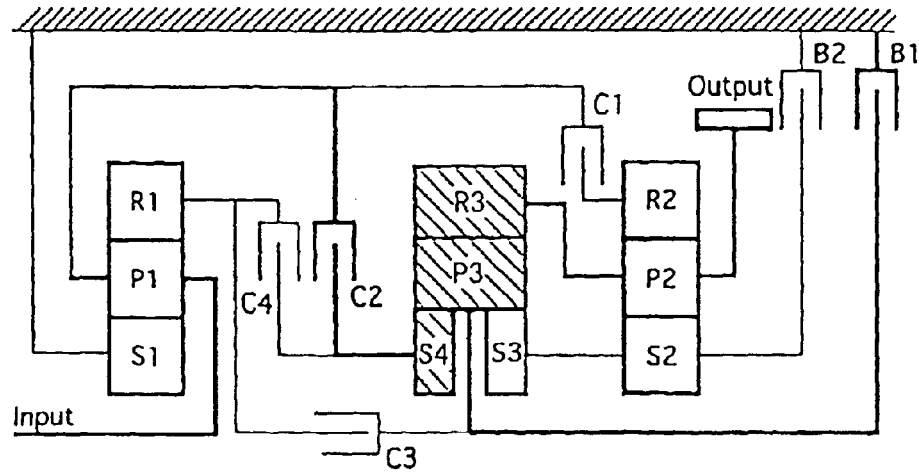
FIGS. 33a and 33b present torque flow diagrams of the automatic transmission gear-operated speed change apparatus of the fourth embodiment at reverse 1st and reverse 2nd speeds.

In the torque flow at this reverse 1st speed, as shown in FIG. 33(a), the torque is applied to the second clutch C2, the first brake B1 and the individual members, as indicated by the thick lines, and to the third planetary gear set G3 (excepting the third sun gear S3), as hatched.

(Reverse 2nd Speed)

As shown in FIG. 2(b), the reverse 2nd speed is achieved by releasing the second clutch C2 at the reverse 1st speed and engaging the fourth clutch C4, that is, by engaging the fourth clutch C4 and the first brake B1.

Figure 33B:
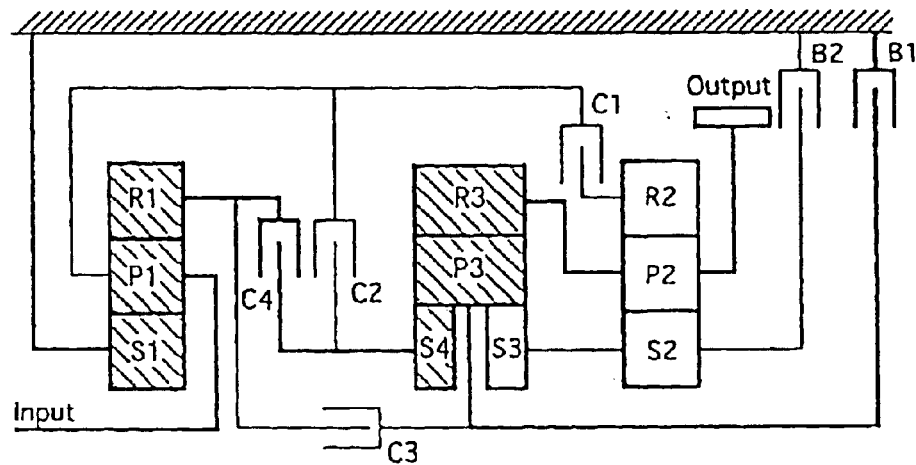

In the torque flow at this reverse 2nd speed, as shown in FIG. 33(b), the torque is applied to the fourth clutch C4, the first brake B1 and the individual members, as indicated by the thick lines, and to the first planetary gear set G1 and the third planetary gear set G3 (excepting the third sun gear S3), as hatched.

Next, effects will be explained.

As has been described hereinbefore, the automatic transmission gear-operated speed change apparatus of the fourth embodiment can obtain the following effects in addition to the effect (7) of the first embodiment and the effects (9), (10), (11), (12) and (14) of the third embodiment.

(15) The automatic transmission gear-operated speed change apparatus further comprises a hydraulic speed change control device including: the single-pinion type first planetary gear set G1 acting as the speed-increasing device having the first sun gear S1, the first ring gear R1, and the first carrier PC1 for supporting the first pinion P1 meshing with the two gears S1 and R1; the single-pinion type second planetary gear set G2 having the second sun gear S2, the second ring gear R2, and the second carrier PC2 for supporting the second pinion P2 meshing with the two gears S2 and R2; the double sun gear type third planetary gear set G3 having the two third sun gear S3 and fourth sun gear S4, the center member CM for supporting the third pinion P3 meshing individually with the two sun gears S3 and S4, and one third ring gear R3 meshing with said third pinion P3; the input shaft Input connected to the first carrier PC1; the output gear Output connected to the second carrier PC2; the first connection member M1 for connecting the second sun gear S2 and the third sun gear S3 like a single unit; the second connection member M2 for connecting the second carrier PC2 and the third ring gear R3 like a single unit; the first clutch C1 for connecting/disconnecting the first carrier PC1 and the second ring gear R2 selectively; the second clutch C2 for connecting/disconnecting the first carrier PC1 and the fourth sun gear S4 selectively; the third clutch C3 for connecting/disconnecting the first ring gear R1 and the center member CM selectively; the fourth clutch C4 for connecting/disconnecting the first ring gear R1 and the fourth sun gear S4 selectively; the first brake B1 for stopping the rotation of the center member CM selectively; and the second brake B2 for stopping the rotation of the second sun gear S2 selectively, for achieving at least seven forward speeds and one reverse speed. Therefore, the automatic transmission gear-operated speed change apparatus can achieve additional effects, as enumerated in the following (corresponding to Claim 14).

①At the 1st speed and 2nd speed for the high torque inputs, the ring gear input can be achieved for the Ishimaru type planetary gear train, which is constructed of the second planetary gear set G2 and the third planetary gear set G3, and the automatic transmission can be made compact.

②At the 2nd speed, the torque circulation is eliminated to improve the transmission efficiency at the 2nd speed and the fuel economy.

③The second sun gear S2 of the second planetary gear set G2 is fixed not through the third and fourth sun gears S3 and S4 but directly by the second brake B2, so that the transmission efficiency of the gears is higher than that of the speed-increasing single pinion type 1 of the third embodiment thereby to contribute to an improvement in the fuel economy.

Although the fourth embodiment gear-operated speed change apparatus has been described hereinbefore, any of the five patterns shown in FIG. 34 and FIG. 35 may be selected as the positioning pattern of the fourth clutch C4 in addition to the position of the fourth clutch C4, as shown in the schematic of FIG. 29, in case the 5th speed is achieved as the high gear range of the speed-increasing ratio of the first planetary gear set G1 by combining the gear-operated speed change apparatus with the hydraulic speed change control device for achieving seven forward speeds and one reverse speed.

The five patterns shown in FIG. 34 and FIG. 35 are examples, in which the second, third and fourth sun gears S2, S3 and S4 and the first connection member M1 can also be given the speed-increased rotation by the engagement of the fourth clutch C4 when the center member CM and the third carrier PC3 are given the speed-increased rotation by the engagement of the third clutch C3 so as to change the 5th speed into the high gear range of the speed-increasing ratio of the first planetary gear set G1.

Figure 34A:
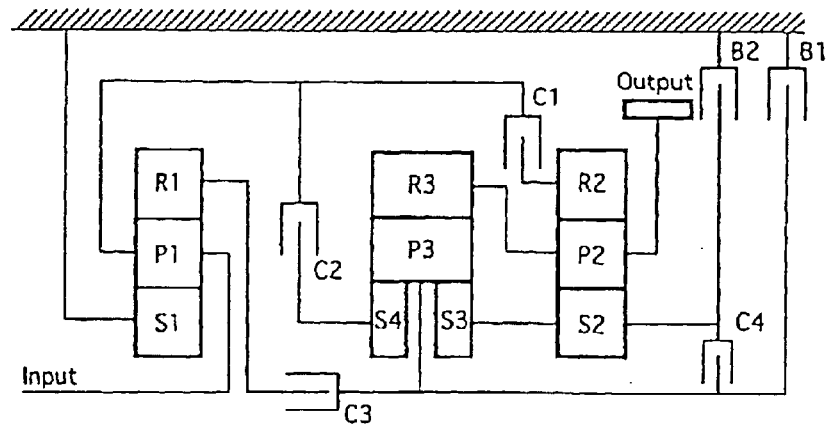
FIGS. 34a–34c present positioning pattern diagrams of a 4th clutch in the automatic transmission gear-operated speed change apparatus of the fourth embodiment.
Figure 34B:
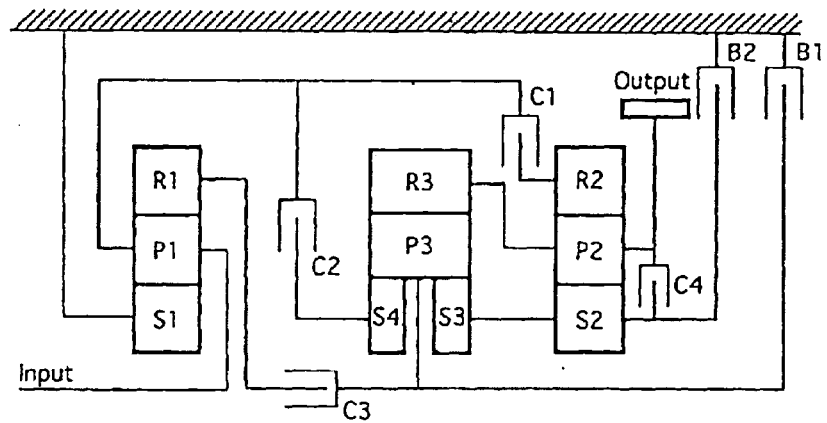
Figure 34C:
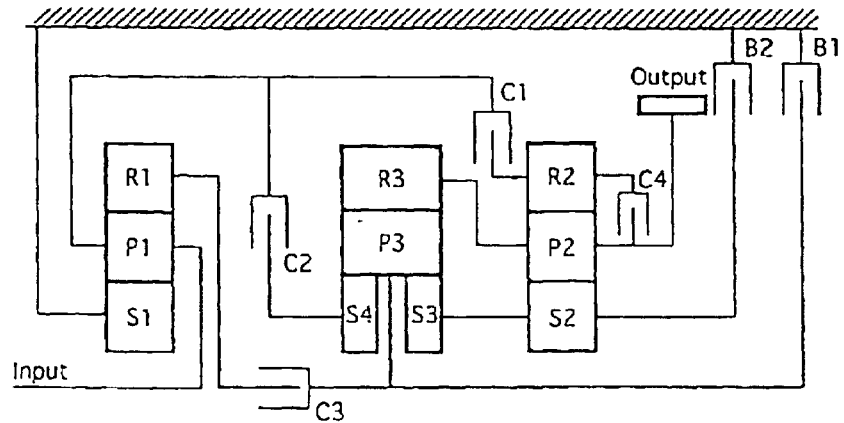
Figure 35A:
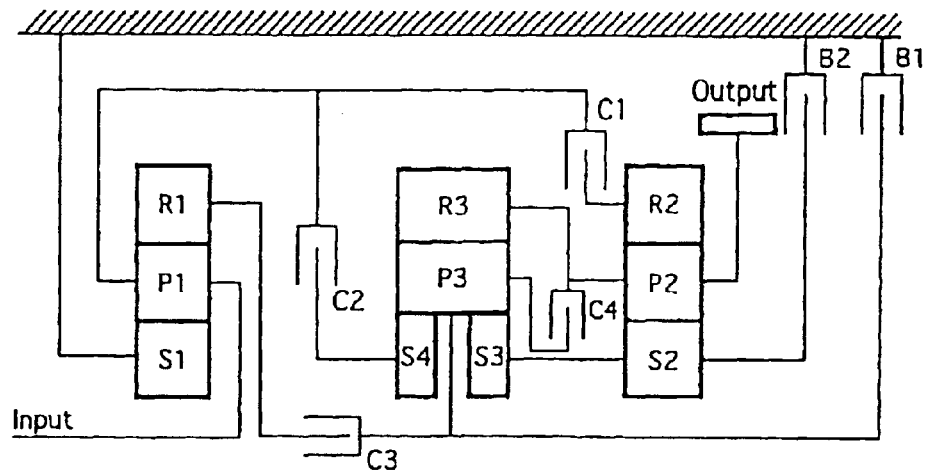
FIGS. 35a and 35b present positioning pattern diagrams of the 4th clutch in the automatic transmission gear-operated speed change apparatus of the fourth embodiment.
Figure 35B:
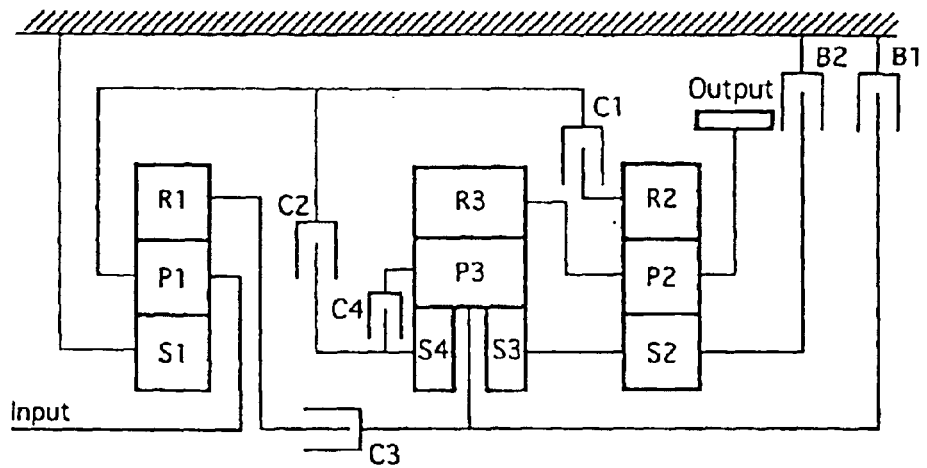

Specifically, the fourth clutch C4 is positioned:

①between the center member CM and the second sun gear S2 (FIG. 34(a));

②between the second carrier PC2 and the second sun gear S2 (FIG. 34(b));

③ between the second ring gear R3 and the second carrier PC2 (FIG. 34(c));

④ between the second connection member M2 and the third carrier PC3 (FIG. 35(a)); or ⑤ between the third carrier PC3 and the fourth sun gear S4 (FIG. 35(b)).

(Fifth Embodiment)

First of all, the arrangement will be described in the following.

Figure 36:
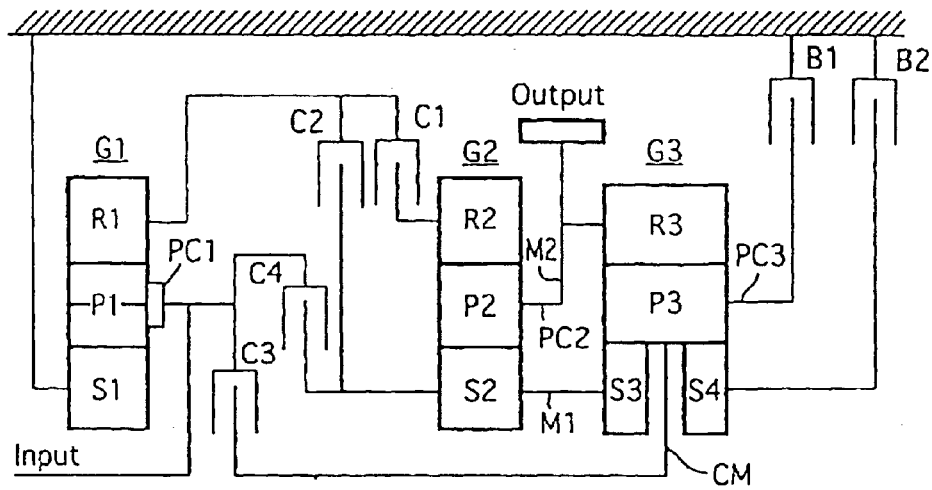
FIG. 36 is a schematic diagram showing a gear-operated speed change apparatus for an automatic transmission of a fifth embodiment.

The fifth embodiment is directed to automatic transmission gear-operated speed change apparatus corresponding to inventions defined in Claims 1, 4, 7, 8, 15, 19 and 22, and FIG. 36 is a schematic diagram showing the automatic transmission gear-operated speed change apparatus of the fifth embodiment.

In FIG. 36: G1 designates a first planetary gear set; G2 a second planetary gear set; G3 a third planetary gear set; M1 a first connection member; M2 a second connection member; C1 a first clutch; C2 a second clutch; C3 a third clutch; C4 a fourth clutch; B1 a first brake; B2 a second brake; Input an input shaft (or an input portion); and Output an output gear (or an output portion).

The automatic transmission gear-operated speed change apparatus (referred to as that of a speed-reducing double type 1) of the fifth embodiment is an example, in which the first planetary gear set G1 of a double-pinion type is positioned as a speed-reducing device at the left-hand end portion of FIG. 36, in which the second planetary gear set G2 of a single-pinion type is positioned at the central portion and in which the third planetary gear set G3 of a double sun gear type is positioned at the right-hand end portion. And, the aforementioned second planetary gear set G2 and third planetary gear set G3 construct the so-called "Ishimaru type planetary gear train".

The aforementioned first planetary gear set G1 is the double-pinion type planetary gear set acting as the speed-reducing device, which includes: a first sun gear S1; a first ring gear R1; and a first carrier PC1 for supporting double pinions P1 meshing with the two gears S1 and R1.

The aforementioned second planetary gear set G2 is the single-pinion type planetary gear set, which includes: a second sun gear S2; a second ring gear R2; and a second carrier PC2 for supporting a second pinion P2 meshing with the two gears S2 and R2.

The aforementioned third planetary gear set G3 is the double sun gear type planetary gear set, which includes: two third sun gear S3 and fourth sun gear S4; a third pinion P3 meshing individually with the third and fourth sun gears S3 and S4; an axial third carrier PC3 for supporting the third pinion P3; a center member CM connected to said third carrier PC3 and positioned between the aforementioned two sun gears S3 and S4; and one third ring gear R3 meshing with the aforementioned third pinion P3.

The aforementioned input shaft Input is connected to the first carrier PC1 and receives a rotational driving force from the not-shown engine or driving source through a torque converter or the like.

The aforementioned output gear Output is connected to the second carrier PC2 and transmits the outputted rotational driving force to driven wheels through the not-shown final gear or the like.

The aforementioned first connection member M1 connects the second sun gear S2 and the third sun gear S3 like a single unit. The aforementioned second connection member M2 connects the second carrier PC2 and the third ring gear R3 like a single unit.

The aforementioned first clutch C1 is the clutch for connecting/disconnecting the first ring gear R1 and the second ring gear R2 selectively. The aforementioned second clutch C2 is the clutch for connecting/disconnecting the first ring gear R1 and the second sun gear S2 selectively. The aforementioned third clutch C3 is the clutch for connecting/disconnecting the input shaft Input and the center member CM selectively. The aforementioned fourth clutch C4 is the clutch for connecting/disconnecting the input shaft Input and the second sun gear S2 selectively.

The aforementioned first brake B1 is the brake for stopping the rotation of the third carrier PC3 selectively. The aforementioned second brake B2 is the brake for stopping the rotation of the fourth sun gear S4 selectively.

To the aforementioned individual clutches C1, C2, C3 and C4 and individual brakes B1 and B2, there is connected the not-shown hydraulic speed change control device (or speed change control means defined in Claim 15) for establishing engagement pressures (with circle symbols) and release pressures (with no symbol) at individual speed ranges of seven forward speeds and one reverse speed, as shown in an engagement table of FIG. 2(a). To the aforementioned individual clutches C1, C2, C3 and C4 and individual brakes B1 and B2, alternatively, there is connected the not-shown hydraulic speed change control device (or speed change control means defined in Claim 19) for establishing engagement pressures (with circle symbols) and release pressures (with no symbol) at individual speed ranges of eight forward speeds and two reverse speeds, as shown in an engagement table of FIG. 2(b).

The actions will be described in the following.

[Shifting Actions]

Figure 37:
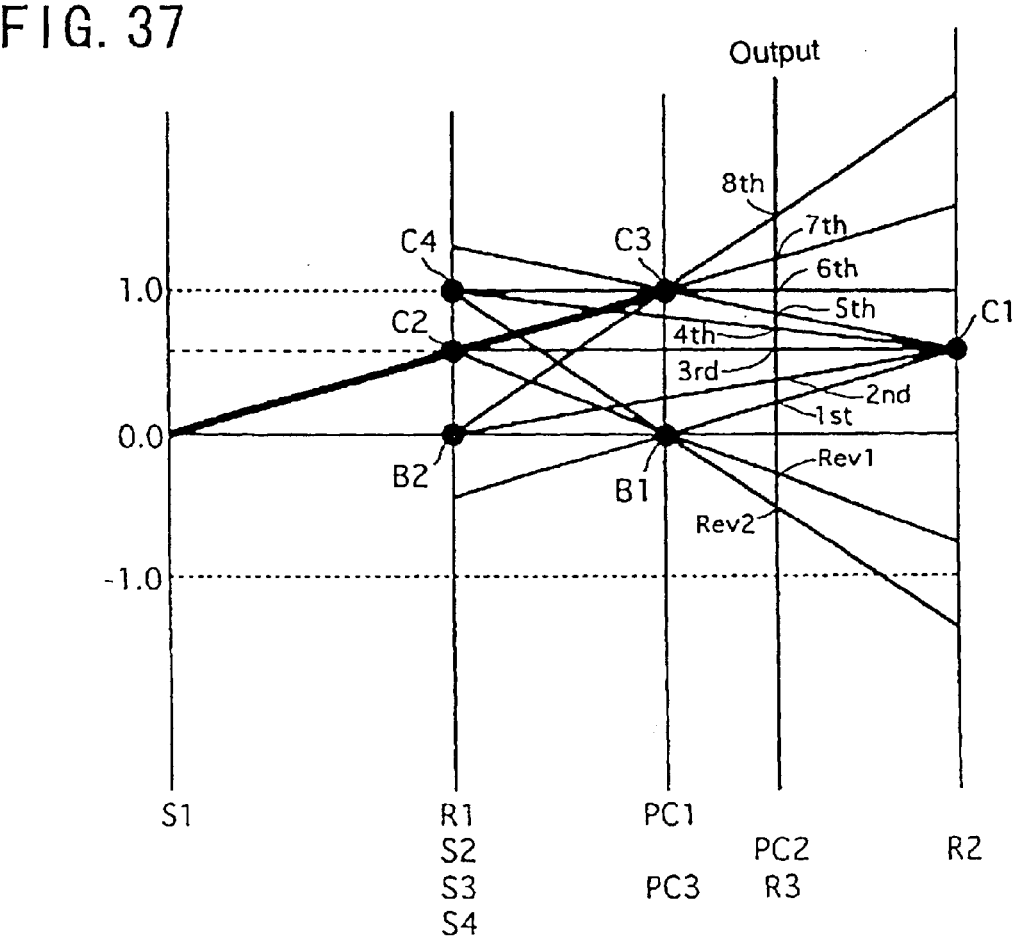
FIG. 37 is a collinear diagram in the automatic transmission gear-operated speed change apparatus of the fifth embodiment.

FIG. 37 is a collinear diagram showing the rotation-stopped states of members at the individual gear ranges in the automatic transmission gear-operated speed change apparatus of the fifth embodiment. FIG. 38 to FIG. 41 are diagrams showing the torque flows at the individual gear ranges of the automatic transmission gear-operated speed change apparatus of the fifth embodiment.

Here in FIG. 38 to FIG. 41, the torque transmission routes of clutches, brakes and members are indicated by thick lines, and the torque transmission routes of gears are indicated by hatching them.

Here will be described the shifting actions at the individual gear ranges of eight forward speeds and two reverse speeds.

<1st Speed>

As shown in FIG. 2(b), the 1st speed is achieved by the engagements of the first clutch C1 and the first brake B1.

At this 1st speed, in the second planetary gear set G2, the speed-reduced rotation from the first planetary gear set G1 is inputted to the second ring gear R2 by the engagement of the first clutch C1.

In the third planetary gear set G3, on the other hand, the third carrier PC3 is fixed on the case by the engagement of the first brake B1 so that the rotation of the third sun gear S3 is the speed-reduced rotation reversed from the output rotation of the third ring gear R3. And, this rotation of the third sun gear S3 is transmitted through the first connection member M1 to the second sun gear S2 of the second planetary gear set G2.

Therefore, the forward speed-reduced rotation is inputted from the second ring gear R2, and the reverse speed-reduced rotation is inputted from the second sun gear S2 to the second planetary gear set G2, so that the rotation further reduced in speed from the speed-reduced rotation of the second ring gear R2 is outputted from the second carrier PC2 through the second connection member M2 to the output gear Output.

As shown in the collinear diagram of FIG. 37, more specifically, the 1st speed is defined by the line which joins the engagement point of the first clutch C1 for inputting the speed-reduced rotation from the first planetary gear set G1 to the second ring gear R2 and the engagement point of the first brake B1 for stopping the rotation of the third carrier PC3, and the rotation inputted from the input shaft Input is reduced in speed and outputted from the output gear Output.

Figure 38A:
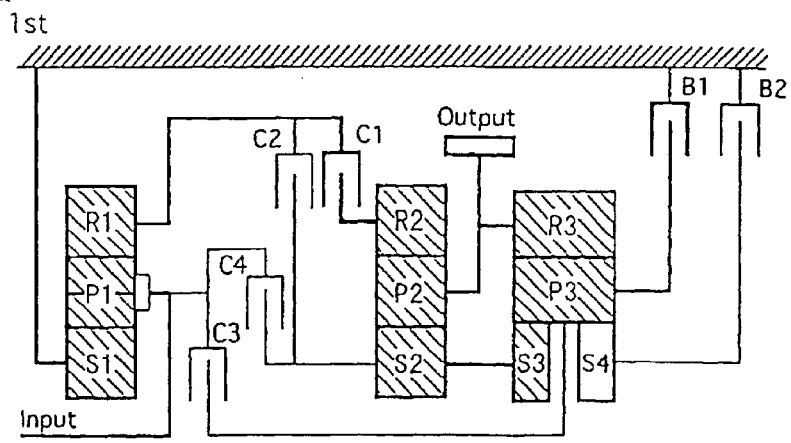
FIGS. 38a–38c present torque flow diagrams of the automatic transmission gear-operated speed change apparatus of the fifth embodiment at 1st, 2nd and 3rd speeds.

In the torque flow at this 1st speed, as shown in FIG. 38(a), the torque is applied to the first clutch C1, the first brake B1 and the individual members, as indicated by the thick lines, and to the first planetary gear set G1, the second planetary gear set G2 and the third planetary gear set G3 (excepting the fourth sun gear S4), as hatched. In short, at the 1st speed, the first planetary gear set G1, and the second planetary gear set G2 and the third planetary gear set G3, as constructing the Ishimaru type planetary gear train, participate in the torque transmission.

<2nd Speed>

As shown in FIG. 2(b), the 2nd speed is achieved by releasing the first brake B1 at the 1st speed and engaging the second brake B2, that is, by engaging the first clutch C1 and the second brake B2.

At this 2nd speed, in the second planetary gear set G2, the speed-reduced rotation from the first planetary gear set G1 is inputted to the second ring gear R2 by the engagement of the first clutch C1.

In the third planetary gear set G3, on the other hand, the fourth sun gear S4 is fixed on the case by the engagement of the second brake B2 so that the third sun gear S3 connected by the third pinion P3 is fixed. And, the second sun gear S2 connected to the third sun gear S3 through the first connection member M1 is fixed on the case.

In the second planetary gear set G2, therefore, the forward speed-reduced rotation is inputted from the second ring gear R2 to fix the second sun gear S2, and the rotation further reduced to a speed lower than that of the speed-reduced rotation from the second ring gear R2 is outputted from the second carrier PC2 through the second connection member M2 to the output gear Output.

As shown in the collinear diagram of FIG. 37, more specifically, the 2nd speed is defined by the line which joins the engagement point of the first clutch C1 for inputting the speed-reduced rotation from the first planetary gear set G1 to the second ring gear R2 and the engagement point of the second brake B2 for stopping the rotation of the fourth sun gear S4, and the rotation inputted from the input shaft Input is reduced to a speed (higher than that of the 1st speed) and outputted from the output gear Output.

Figure 38B:
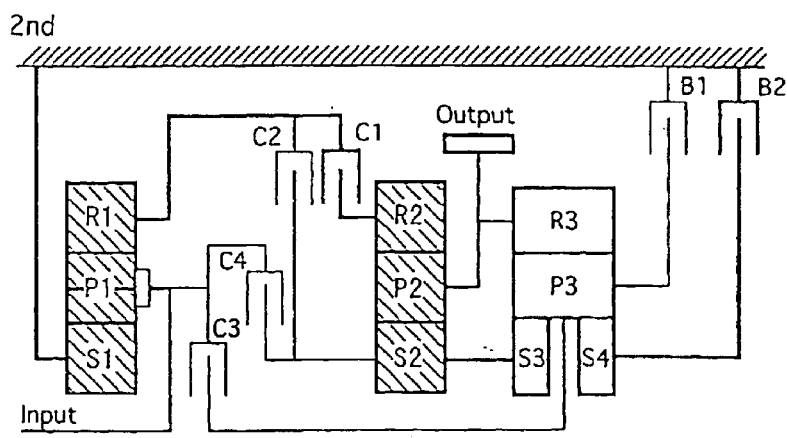

In the torque flow at this 2nd speed, as shown in FIG. 38(b), the torque is applied to the first clutch C1, the second brake B2 and the individual members, as indicated by the thick lines, and to the first planetary gear set G1 and the second planetary gear set G2, as hatched. Here in the third planetary gear set G3, the unconstrained third pinion P3 revolves about the two fixed sun gears S3 and S4 in accordance with the output rotation of the third ring gear R3 so that it functions as a rotary member but does not participate in the torque transmission.

<3rd Speed>

As shown in FIG. 2(b), the 3rd speed is achieved by releasing the second brake B2 at the 2nd speed and engaging the second clutch C2, that is, by engaging the first clutch C1 and the second clutch C2.

At this 3rd speed, in the second planetary gear set G2, the speed-reduced rotation from the first planetary gear set G1 is inputted to the second ring gear R2 by the engagement of the first clutch C1. At the same time, this speed-reduced rotation is inputted to the second sun gear S2 of the second planetary gear set G2 by the engagement of the second clutch C2.

In the second planetary gear set G2, therefore, the same speed-reduced rotations are inputted from the second ring gear R2 and the second sun gear S2 so that the speed-reduced rotation (=the speed-reduced rotation of the first planetary gear set G1) is outputted from the second carrier PC2 rotating like a single unit with the two gears R2 and S2, through the second connection member M2 to the output gear Output.

As shown in the collinear diagram of FIG. 37, more specifically, the 3rd speed is defined by the line which joins the engagement point of the first clutch C1 for inputting the speed-reduced rotation from the first planetary gear set G1 to the second ring gear R2 and the engagement point of the second clutch C2 for inputting the speed-reduced rotation from the first planetary gear set G1 to the second sun gear S2, and the rotation inputted from the input shaft Input is reduced at a ratio (=the reduction ratio of the first planetary gear set G1) and outputted from the output gear Output.

Figure 38C:
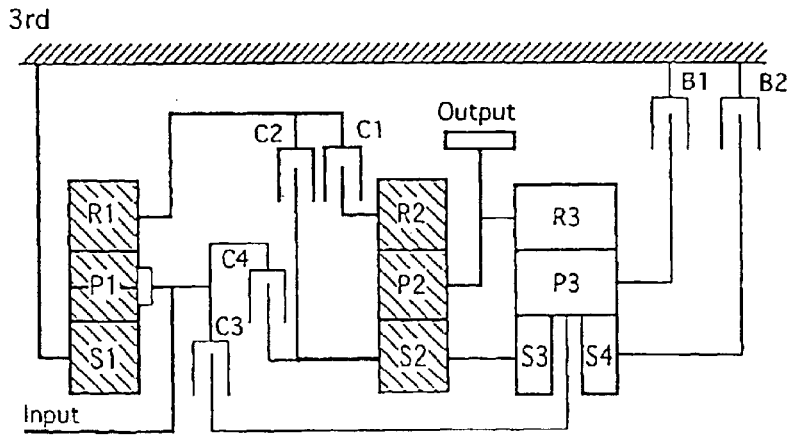

In the torque flow at this 3rd speed, as shown in FIG. 38(c), the torque is applied to the first clutch C1, the second clutch C2 and the individual members, as indicated by the thick lines, and to the first planetary gear set G1 and the second planetary gear set G2, as hatched. In short, the third planetary gear set G3 does not participate in the torque transmission in the least.

<4th Speed>

As shown in FIG. 2(b), the 4th speed is achieved by releasing the second clutch C2 at the 3rd speed and engaging the fourth clutch C4, that is, by engaging the first clutch C1 and the fourth clutch C4.

At this 4th speed, in the second planetary gear set G2, the speed-reduced rotation from the first planetary gear set G1 is inputted to the second ring gear R2 by the engagement of the first clutch C1. At the same time, the input rotation of the input shaft Input is inputted to the second sun gear S2 in the second planetary gear set G2 by the engagement of the fourth clutch C4.

In the second planetary gear set G2, therefore, the speed-reduced rotation is inputted from the second ring gear R2, and the input rotation is inputted from the second sun gear S2, so that the rotation slightly increased in speed from the speed-reduced rotation of the second ring gear R2 is outputted from the second carrier PC2 through the second connection member M2 to the output gear Output.

As shown in the collinear diagram of FIG. 37, more specifically, the 4th speed is defined by the line which joins the engagement point of the first clutch C1 for inputting the speed-reduced rotation from the first planetary gear set G1 to the second ring gear R2 and the engagement point of the fourth clutch C4 for inputting the rotation of the second sun gear S2, and the rotation inputted from the input shaft Input is slightly reduced in speed and outputted from the output gear Output.

Figure 39A:
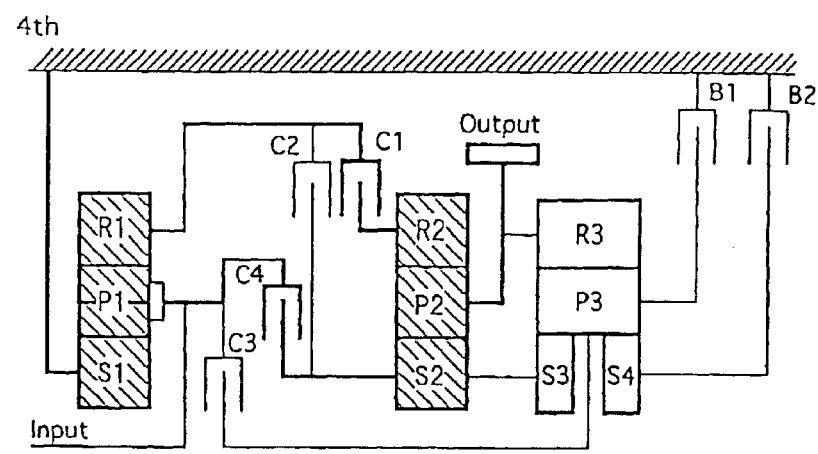
FIGS. 39a–39c present torque flow diagrams of the automatic transmission gear-operated speed change apparatus of the fifth embodiment at 4th, 5th and 6th speeds.

In the torque flow at this 4th speed, as shown in FIG. 39(a), the torque is applied to the first clutch C1, the fourth clutch C4 and the individual members, as indicated by the thick lines, and to the first planetary gear set G1 and the second planetary gear set G2, as hatched.

<5th Speed>

As shown in FIG. 2(b), the 5th speed is achieved by releasing the fourth clutch C4 at the 4th speed and engaging the third clutch C3, that is, by engaging the first clutch C1 and the third clutch C3.

At this 5th speed, in the secondary planetary gear set G2, the speed-reduced rotation from the first planetary gear set G1 is inputted to the second ring gear R2 by the engagement of the first clutch C1.

In the third planetary gear set G3, on the other hand, the input rotation of the input shaft Input is inputted through the center member CM to the third carrier PC3 by the engagement of the third clutch C3. Therefore, the rotation of the third sun gear S3 is increased to a speed higher than that of the output rotation of the third ring gear R3, and this speed-increased rotation of the third sun gear S3 is transmitted through the first connection member M1 to the second sun gear S2.

In the second planetary gear set G2, therefore, the speed-reduced rotation is inputted from the second ring gear R2, and the speed-increased rotation is inputted from the second sun gear S2, so that the rotation (slightly lower than the input rotation) increased from the speed-reduced rotation of the second ring gear R2 is outputted from the second carrier PC2 through the second connection member M2 to the output gear Output.

As shown in the collinear diagram of FIG. 37, more specifically, the 5th speed is defined by the line which joins the engagement point of the first clutch C1 for inputting the speed-reduced rotation from the first planetary gear set G1 to the second ring gear R2 and the engagement point of the third clutch C3 for inputting the rotation of the third carrier PC3, and the rotation inputted from the input shaft Input is slightly reduced in speed and outputted from the output gear Output.

Figure 39B:
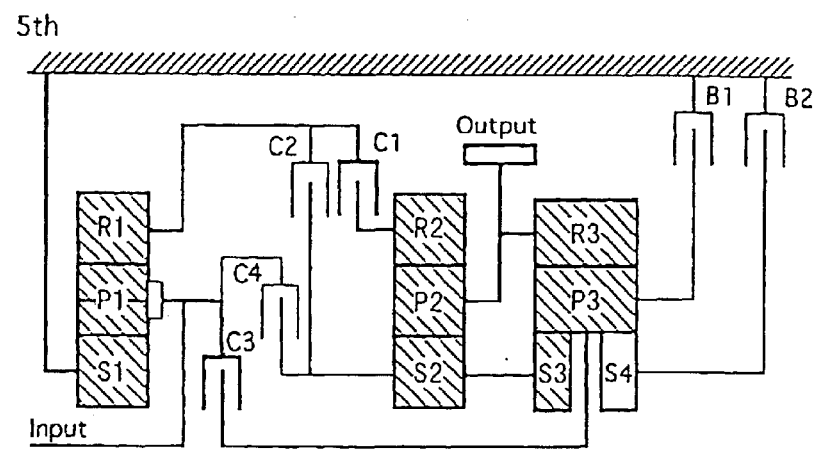

In the torque flow at this 5th speed, as shown in FIG. 39(b), the torque is applied to the first clutch C1, the third clutch C3 and the individual members, as indicated by the thick lines, and to the first planetary gear set G1, the second planetary gear set G2 and the third planetary gear set G3 (excepting the fourth sun gear S4), as hatched.

(6th Speed)

As shown in FIG. 2(b), the 6th speed is achieved by releasing the first clutch C1 at the 5th speed and engaging the second clutch C2, that is, by engaging the third clutch C3 and the fourth clutch C4.

At this 6th speed, the input rotation of the input shaft Input is inputted through the center member CM to the third carrier PC3 by the engagement of the third clutch C3. At the same time, the input rotation of the input shaft Input is inputted through the second sun gear S2 and the first connection member M1 to the third sun gear S3 by the engagement of the fourth clutch C4.

In the third planetary gear set G3, therefore, the input rotation is inputted to the third carrier PC3, and the input rotation is also inputted to the third sun gear S3, so that the third planetary gear set G3 rotates together to output the input rotation from the third ring gear R3 through the second connection member M2 to the output gear Output.

As shown in the collinear diagram of FIG. 37, more specifically, the 6th speed is defined by the line which joins the engagement point of the third clutch C3 for inputting the rotation of the third carrier PC3 and the engagement point of the fourth clutch C4 for inputting the rotation of the third sun gear S3, and the rotation inputted from the input shaft Input is outputted as it is from the output gear Output (in a direct-engagement gear range).

Figure 39C:
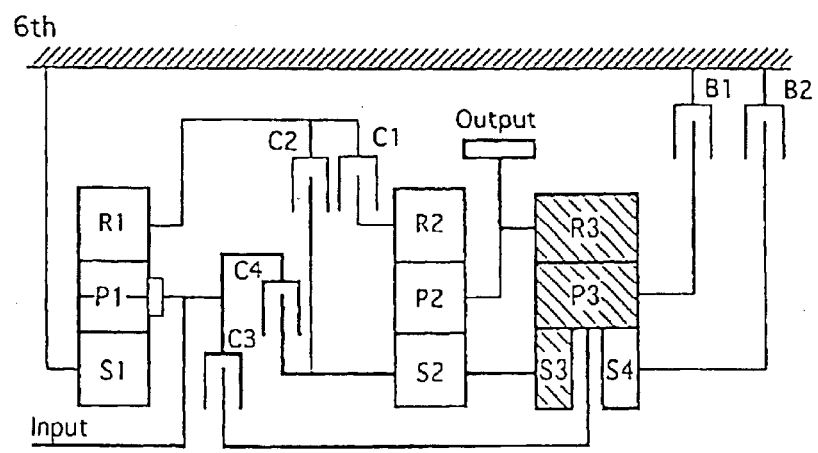

In the torque flow at this 6th speed, as shown in FIG. 39(c), the torque is applied to the third clutch C3, the fourth clutch C4 and the individual members, as indicated by the thick lines, and to the third planetary gear set G3 (excepting the fourth sun gear S4), as hatched.

(7th Speed)

As shown in FIG. 2(b), the 7th speed is achieved by releasing the fourth clutch C4 at the 6th speed and engaging the second clutch C2, that is, by engaging the second clutch C2 and the third clutch C3.

At this 7th speed, the speed-reduced rotation from the first planetary gear set G1 is inputted through the second sun gear S2 and the first connection member M1 to the third sun gear S3 by the engagement of the second clutch C2. At the same time, the input rotation of the input shaft Input is inputted through the center member CM to the third carrier PC3 by the engagement of the third clutch C3.

In the third planetary gear set G3, therefore, the input rotation is inputted to the third carrier PC3, and the speed-reduced rotation from the first planetary gear set G1 is inputted to the third sun gear S3, so that the rotation increased to a higher speed than that of the input rotation is outputted from the third ring gear R3 through the second connection member M2 to the output gear Output.

As shown in the collinear diagram of FIG. 37, more specifically, the 7th speed is defined by the line which joins the engagement point of the second clutch C2 for inputting the speed-reduced rotation from the first planetary gear set G1 to the third sun gear S3 and the engagement point of the third clutch C3 for inputting the rotation of the third carrier PC3, and the rotation inputted from the input shaft Input is slightly increased in speed and outputted from the output gear Output.

Figure 40A:
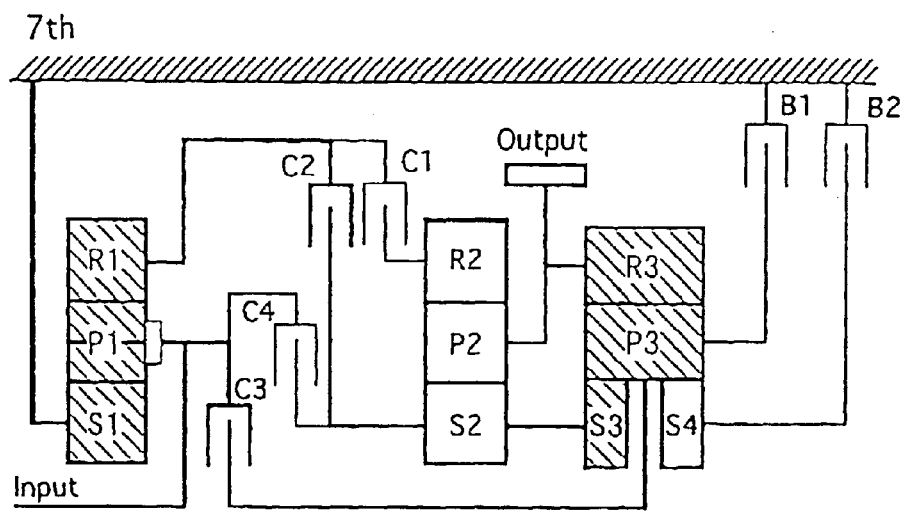
FIGS. 40a and 40b present torque flow diagrams of the automatic transmission gear-operated speed change apparatus of the fifth embodiment at 7th and 8th speeds.

In the torque flow at this 7th speed, as shown in FIG. 40(a), the torque is applied to the second clutch C2, the third clutch C3 and the individual members, as indicated by the thick lines, and to the first planetary gear set G1 and the third planetary gear set G3 (excepting the fourth sun gear S4), as hatched.

(8th Speed)

As shown in FIG. 2(b), the 8th speed is achieved by releasing the second clutch C2 at the 7th speed and engaging the second brake B2, that is, by engaging the third clutch C3 and the second brake B2.

At this 8th speed, the input rotation of the input shaft Input is inputted through the center member CM of the third planetary gear set G3 to the third carrier PC3 by the engagement of the third clutch C3. By the engagement of the second brake B2, moreover, the fourth sun gear S4 of the third planetary gear set G3 is fixed on the case.

In the third planetary gear set G3, therefore, the input rotation is inputted to the third carrier PC3, and the fourth sun gear S4 is fixed on the case, so that the rotation increased to a higher speed than that of the input rotation is outputted from the third ring gear R3 through the second connection member M2 to the output gear Output.

As shown in the collinear diagram of FIG. 37, more specifically, the 8th speed is defined by the line which joins the engagement point of the third clutch C3 for inputting the rotation of the third carrier PC3 and the engagement point of the second brake B2 for fixing the fourth sun gear S4 on the case, and the rotation inputted from the input shaft Input is increased in speed and outputted from the output gear Output.

Figure 40B:
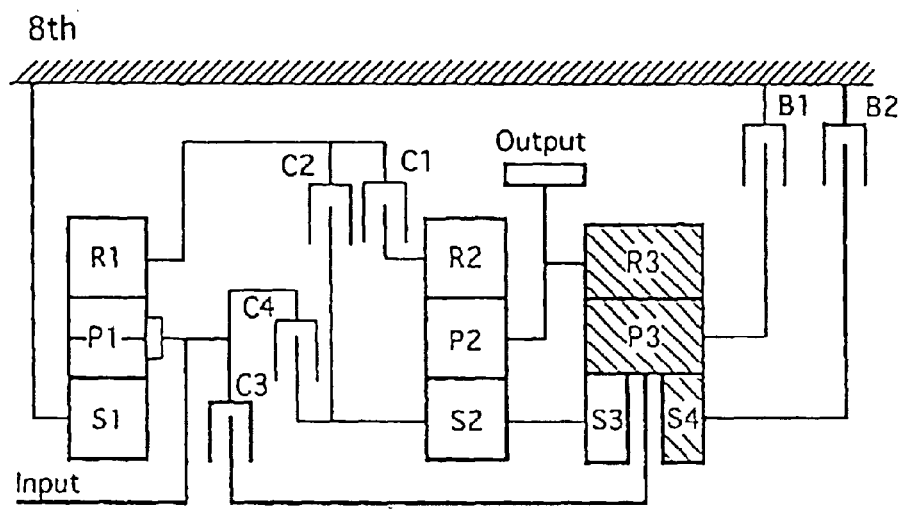

In the torque flow at this 8th speed, as shown in FIG. 40(b), the torque is applied to the third clutch C3, the second brake B2 and the individual members, as indicated by the thick lines, and to the third planetary gear set G3 (excepting the third sun gear S3), as hatched.

(Reverse 1st Speed)

As shown in FIG. 2(b), the reverse 1st speed is achieved by engaging the second clutch C2 and the first brake B1.

At this reverse 1st speed, the speed-reduced rotation from the first planetary gear set G1 is inputted through the second sun gear S2 and the first connection member M1 to the third sun gear S3 by the engagement of the second clutch C2. By the engagement of the first brake B1, on the other hand, the third carrier PC3 is fixed on the case.

In the third planetary gear set G3, therefore, the forward speed-reduced rotation is inputted to the third sun gear S3, and the third carrier PC3 is fixed on the case, so that the reverse speed-reduced rotation is outputted from the third ring gear R3 through the second connection member M2 to the output gear Output.

As shown in the collinear diagram of FIG. 37, more specifically, the reverse 1st speed is defined by the line which joins the engagement point of the second clutch C2 for inputting the speed-reduced rotation from the first planetary gear set G1 to the third sun gear S3 and the engagement point of the first brake B1 for stopping the rotation of the third carrier PC3, and the rotation inputted from the input shaft Input is reversed in direction and reduced in speed, and outputted from the output gear Output.

Figure 41A:
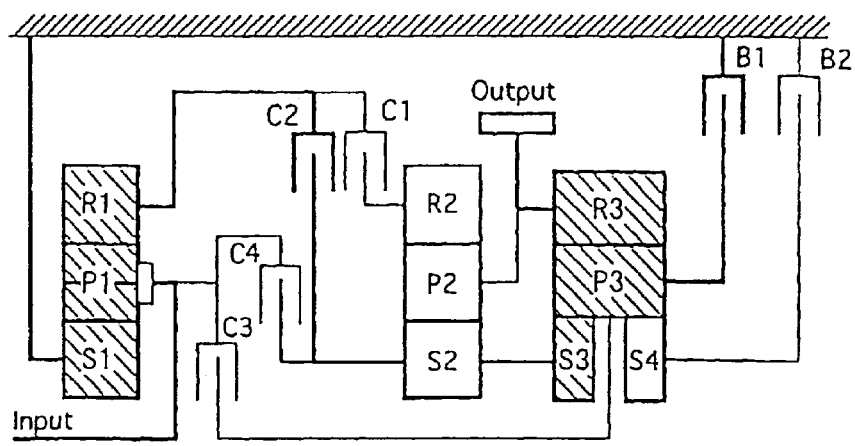
FIGS. 41a and 41b present torque flow diagrams of the automatic transmission gear-operated speed change apparatus of the fifth embodiment at reverse 1st and reverse 2nd speeds.

In the torque flow at this reverse 1st speed, as shown in FIG. 41(c), the torque is applied to the second clutch C2, the first brake B1 and the individual members, as indicated by the thick lines, and to the first planetary gear set G1 and the third planetary gear set G3 (excepting the fourth sun gear S4), as hatched.

(Reverse 2nd Speed)

As shown in FIG. 2(b), the reverse 2nd speed is achieved by releasing the second clutch C2 at the reverse 1st speed and engaging the fourth clutch C4, that is, by engaging the fourth clutch C4 and the first brake B1.

At this reverse 2nd speed, the input rotation of the input shaft Input is inputted through the second sun gear S2 and the first connection member M1 to the second sun gear S2 by the engagement of the fourth clutch C4. By the engagement of the first brake B1, on the other hand, the third carrier PC3 is fixed on the case.

In the third planetary gear set G3, therefore, the input rotation is inputted to the third sun gear S3, and the third carrier PC3 is fixed on the case, so that the reverse rotation reduced to a speed lower than the reverse 1st speed is outputted from the third ring gear R3 through the second connection member M2 to the output gear Output.

As shown in the collinear diagram of FIG. 37, more specifically, the reverse 2nd speed is defined by the line which joins the engagement point of the fourth clutch C4 for inputting the input rotation to the second sun gear S2 and the engagement point of the first brake B1 for stopping the rotation of the third carrier PC3, and the rotation inputted from the input shaft Input is highly reduced in speed upon being reversed in direction and outputted from the output gear Output.

Figure 41B:
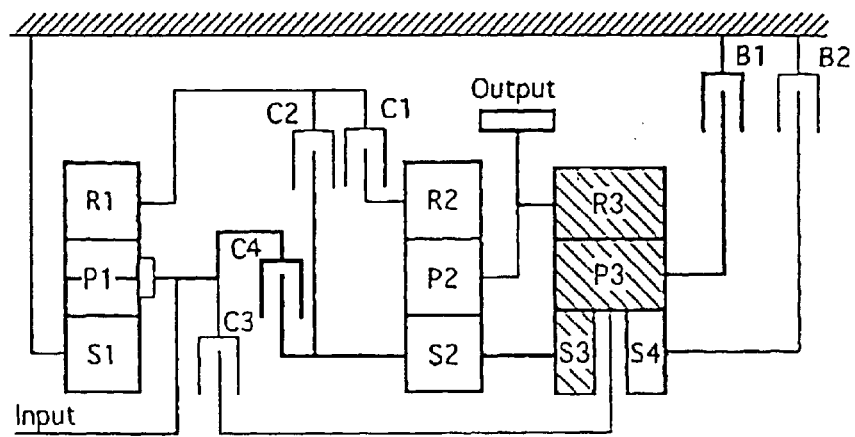

In the torque flow at this reverse 2nd speed, as shown in FIG. 41(b), the torque is applied to the fourth clutch C4, the first brake B1 and the individual members, as indicated by the thick lines, and to the third planetary gear set G3 (excepting the fourth sun gear S4), as hatched.

Here, the shifting actions have been described on the case in which the schematic shown in FIG. 36 and the hydraulic speed change control device for the eight forward speeds and two reverse speeds are combined. In the case of a combination of the schematic shown in FIG. 36 and the hydraulic speed change control device for the seven forward speeds and one reverse speed, however, the seven forward speeds and one reverse speed are achieved by eliminating the 4th speed of the eight forward speeds to change→5th speed 4th speed, 6th speed→5th speed, 7th speed→6th speed and 8th speed→7th speed, and by eliminating the reverse 2nd speed to change the reverse 1st speed→the reverse 1st speed, as shown in the engagement table of FIG. 2(a).

The effects will be described in the following.

As has been described hereinbefore, the automatic transmission gear-operated speed change apparatus of the fifth embodiment can obtain the effects to be enumerated in the following, in addition to the effects (1), (3), (4), (6) and (7) of the first embodiment.

(16) The first planetary gear set G1 of the speed-reducing device is the double-pinion type planetary gear set so that the degree of freedom for the layout can be enhanced (corresponding to Claim 4).

Specifically, the output portion can be constructed of not only the output gear Output as exemplified in the speed-reducing double type 1 of the fifth embodiment, but also the output shaft Output arranged coaxially with but on the opposite side of the input shaft Input, as exemplified in the speed-reducing double types 2 and 3 of sixth and seventh embodiments. Thus, the layout to be obtained is suited not only for the automatic transmission of a front-engine/front-drive car (or an FF car) but also for the automatic transmission of a front engine/rear drive car (or an FR car).

(17) The automatic transmission gear-operated speed change apparatus further comprises a hydraulic speed change control device including: the double-pinion type first planetary gear set G1 acting as the speed-reducing device having the first sun gear S1, the first ring gear R1, and the first carrier PC1 for supporting the first double pinions P1 meshing with the two gears S1 and R1; the single-pinion type second planetary gear set G2 having the second sun gear S2, the second ring gear R2, and the second carrier PC2 for supporting the second pinion P2 meshing with the two gears S2 and R2; the double sun gear type third planetary gear set G3 having the two third sun gear S3 and fourth sun gear S4, the third carrier PC3 and the center member CM for supporting the third pinion P3 meshing individually with the two sun gears S3 and S4, and one third ring gear R3 meshing with said third pinion P3; the input shaft Input connected to the first carrier PC1; the output gear Output connected to the second carrier PC2; the first connection member M1 for connecting the second sun gear S2 and the third sun gear S3 like a single unit; the second connection member M2 for connecting the second carrier PC3 and the third ring gear R3 like a single unit; the first clutch C1 for connecting/disconnecting the first ring gear R1 and the second ring gear R2 selectively; the second clutch C2 for connecting/disconnecting the first ring gear R1 and the second sun gear S2 selectively; the third clutch C3 for connecting/disconnecting the input shaft Input and the center member CM selectively; the fourth clutch C4 for connecting/disconnecting the input shaft Input and the second sun gear S2 selectively; the first brake B1 for stopping the rotation of the third carrier PC3 selectively; and the second brake B2 for stopping the rotation of the fourth sun gear S4 selectively, for achieving at least seven forward speeds and one reverse speed. Therefore, the automatic transmission gear-operated speed change apparatus can achieve additional effects, as enumerated in the following (corresponding to Claim 15).

① At the 1st speed and 2nd speed for applying the high torques, the ring gear input can be achieved for the Ishimaru type planetary gear train, which is constructed of the second planetary gear set G2 and the third planetary gear set G3, and the automatic transmission can be made compact.

② At the 2nd speed, the torque circulation is eliminated to improve the transmission efficiency at the 2nd speed and the fuel economy.

③ By providing the fourth clutch C4 for connecting/disconnecting the input shaft Input and the second sun gear S2 selectively, the 5th speed (of the seven forward speed type) or the 6th speed (of the eight forward speed type) can be made as the direct-engagement gear range thereby to improve the torque transmission efficiency and to contribute to the improvement in the fuel economy.

Although the fifth embodiment gear-operated speed change apparatus has been described hereinbefore, any of the five patterns shown in FIG. 42 and FIG. 43 may be selected as the positioning pattern of the fourth clutch C4 in addition to the position of the fourth clutch C4, as shown in the schematic of FIG. 36, in case the 5th speed is achieved as the direct-engagement gear range by combining the gear-operated speed change apparatus with the hydraulic speed change control device for achieving seven forward speeds and one reverse speed.

The five patterns shown in FIG. 42 and FIG. 43 are examples, in which the second, third and fourth sun gears S2, S3 and S4 and the first connection member M1 are likewise given the input rotation by the engagement of the fourth clutch C4 when the third carrier PC3 are given the input rotation by the engagement of the third clutch C3 so as to change the 5th speed into the direct-engagement gear range.

Figure 42A:
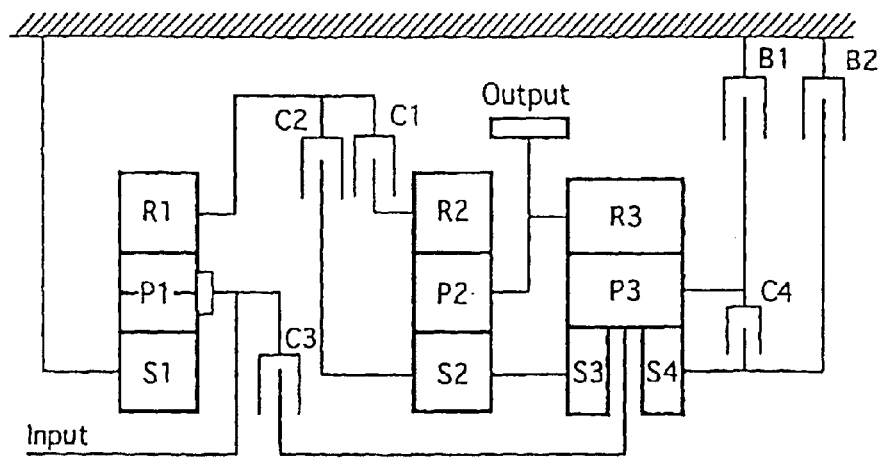
FIGS. 42a–42c present positioning pattern diagrams of a 4th clutch in the automatic transmission gear-operated speed change apparatus of the fifth embodiment.
Figure 42B:
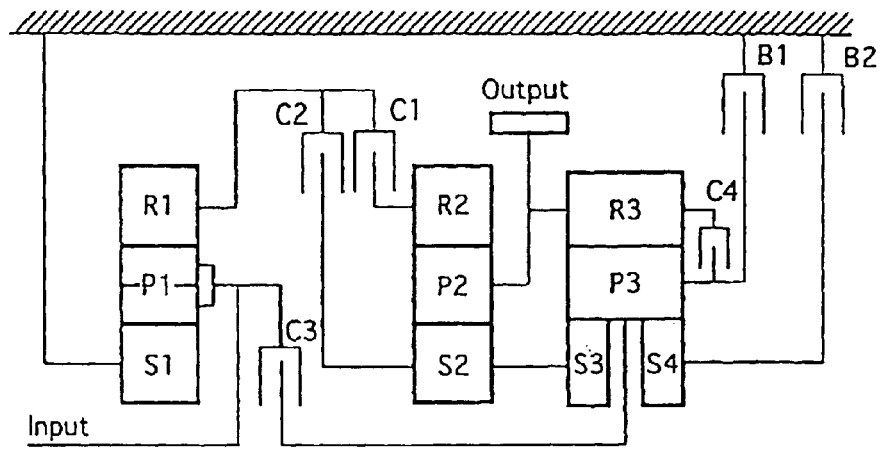
Figure 42C:
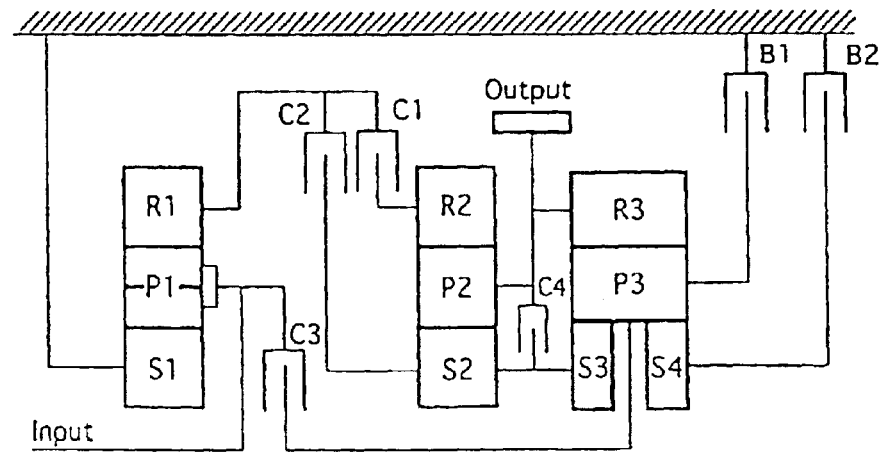
Figure 43A:
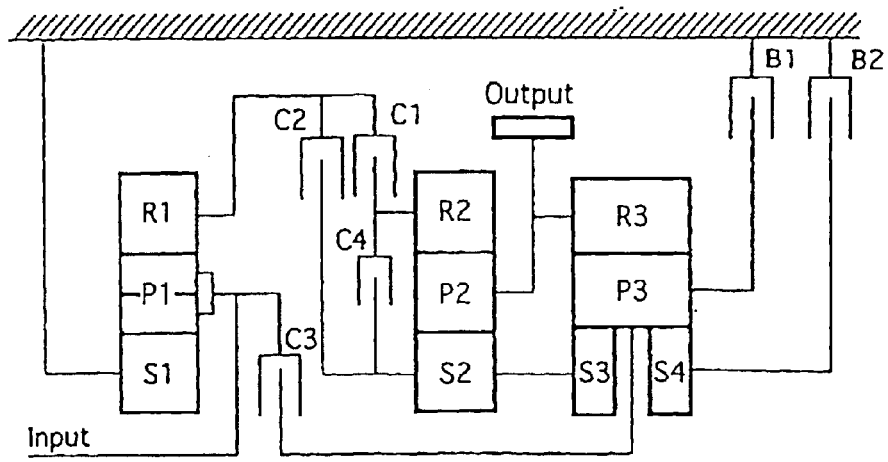
FIGS. 43a and 43b present positioning pattern diagrams of the 4th clutch in the automatic transmission gear-operated speed change apparatus of the fourth embodiment.

Specifically, the fourth clutch C4 is positioned:

① between the third carrier PC3 and the fourth sun gear S4 (FIG. 42(a));

② between the third ring gear R3 and the third carrier PC3 (FIG. 42(b));

③ between the first connection member M1 and the second connection member M2 (FIG. 42(c));

④ between the second ring gear R2 and the second sun gear S2 (FIG. 43(a)); or

Figure 43B:
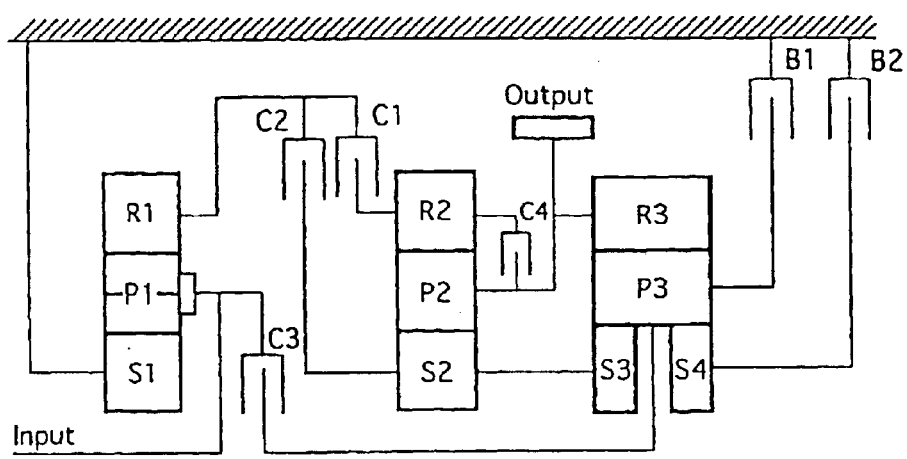

⑤ between the second ring gear R2 and the second carrier PC2 (FIG. 43(b)).

(Sixth Embodiment)

First of all, the arrangement will be described in the following.

Figure 44:
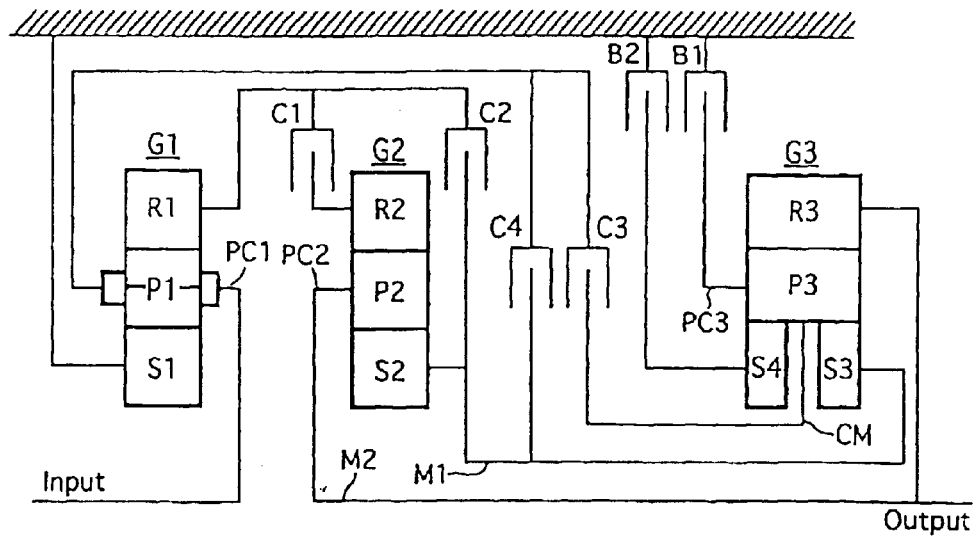
FIG. 44 is a schematic diagram showing a gear-operated speed change apparatus for an automatic transmission of a sixth embodiment.
Figure 45A:
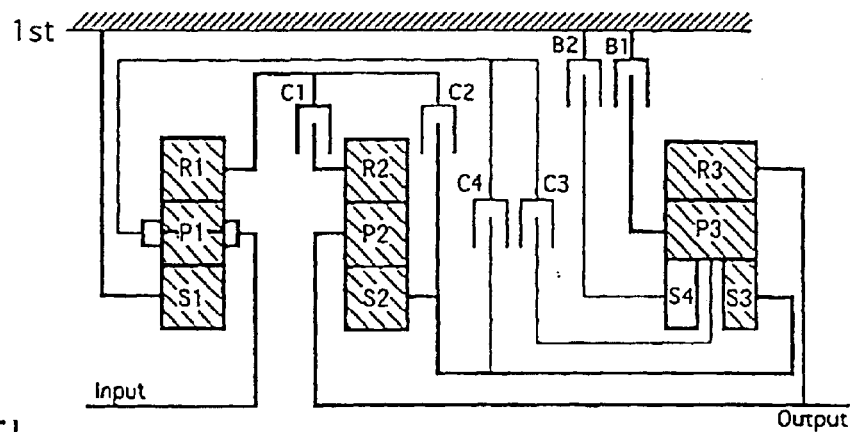
FIGS. 45a and 45b present torque flow diagrams of the automatic transmission gear-operated speed change apparatus of the sixth embodiment at 1st and 2nd speeds.
Figure 45B:
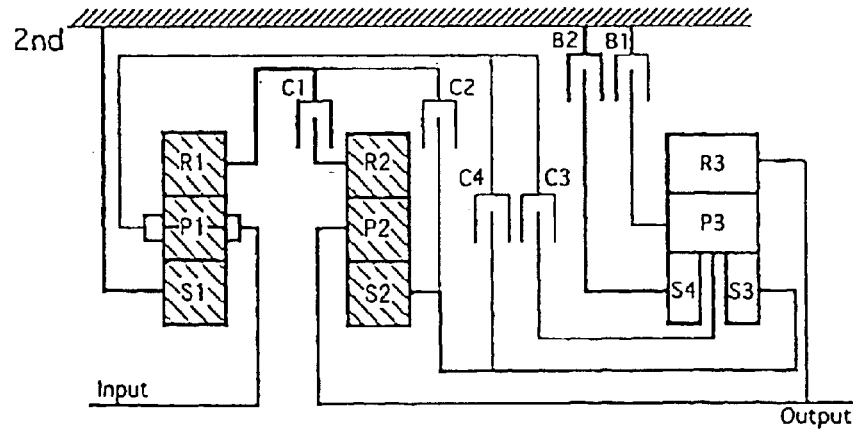
Figure 46A:
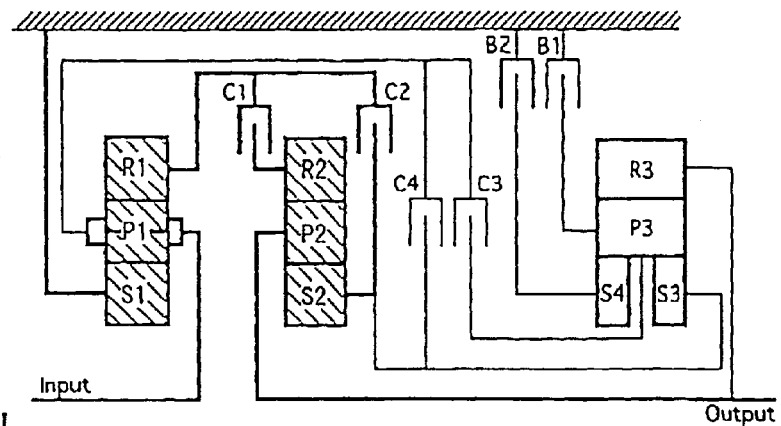
FIGS. 46a–46c present torque flow diagrams of the automatic transmission gear-operated speed change apparatus of the sixth embodiment at 3rd, 4th and 5th speeds.
Figure 46B:
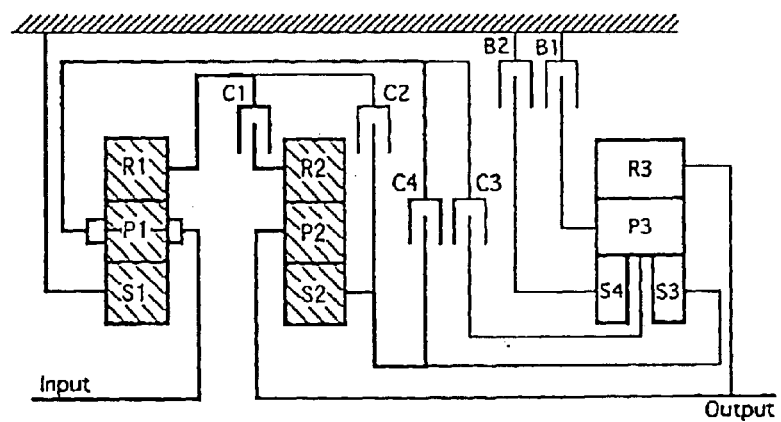
Figure 46C:
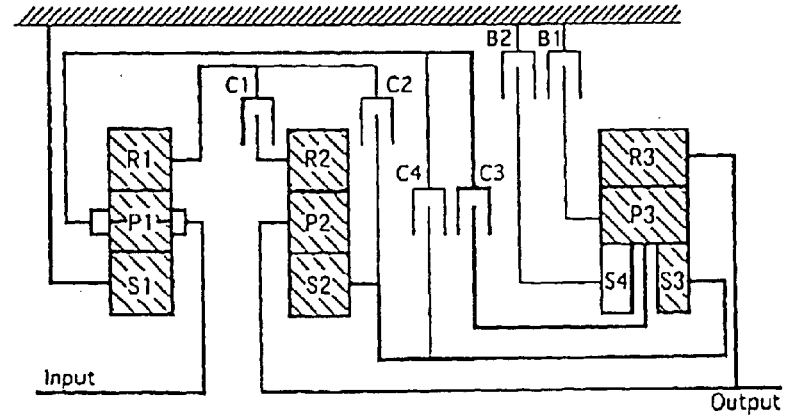
Figure 47A:
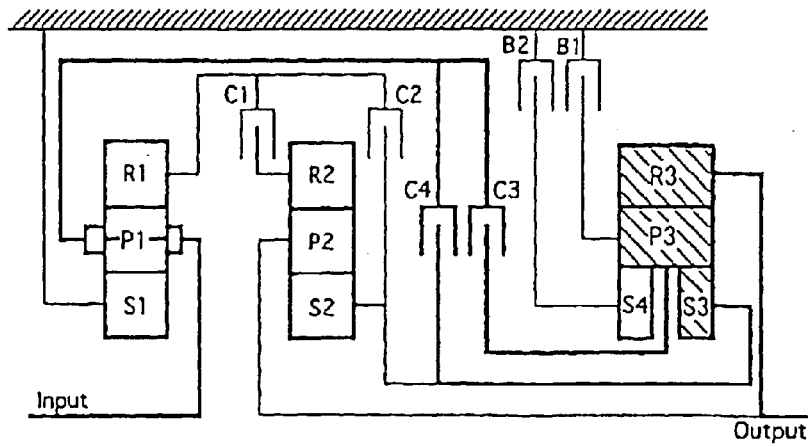
FIGS. 47a–47b present torque flow diagrams of the automatic transmission gear-operated speed change apparatus of the sixth embodiment at 6th, 7th and 8th speeds.
Figure 47B:
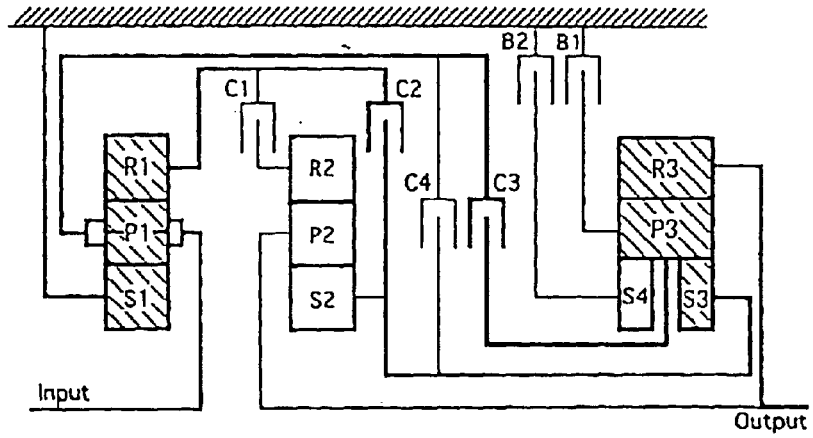
Figure 47C:
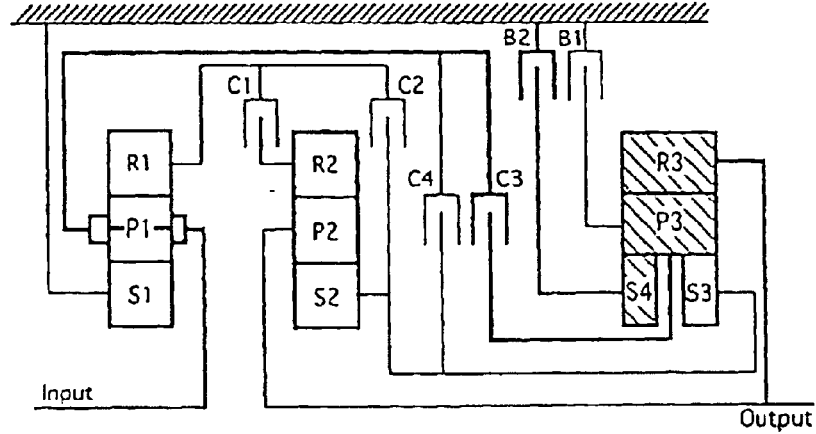
Figure 48A:
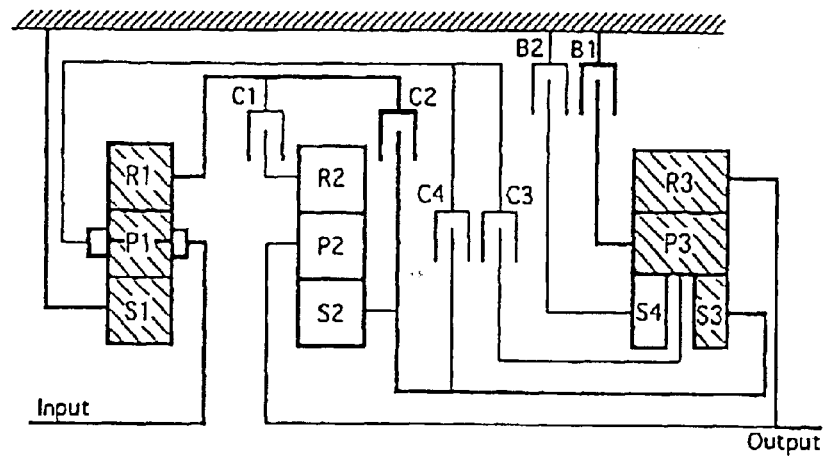
FIGS. 48a and 48b present torque flow diagrams of the automatic transmission gear-operated speed change apparatus of the sixth embodiment at reverse 1st and reverse 2nd speeds.
Figure 48B:
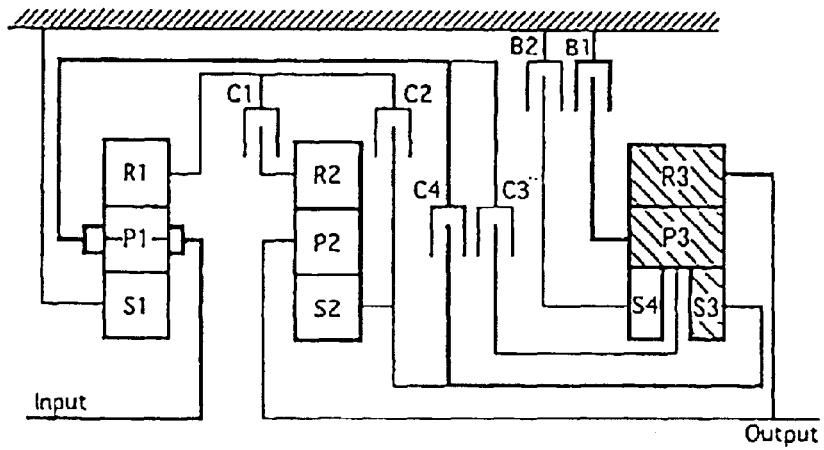

The sixth embodiment is directed to automatic transmission gear-operated speed change apparatus corresponding to inventions defined in Claims 1, 4, 7, 8, 15, 19 and 22, and FIG. 44 is a schematic diagram showing the automatic transmission gear-operated speed change apparatus of the sixth embodiment.

In FIG. 44: G1 designates a first planetary gear set; G2 a second planetary gear set; G3 a third planetary gear set; M1 a first connection member; M2 a second connection member; C1 a first clutch; C2 a second clutch; C3 a third clutch; C4 a fourth clutch; B1 a first brake; B2 a second brake; Input an input shaft (or an input portion); and Output an output shaft (or an output portion).

The automatic transmission gear-operated speed change apparatus (referred to as that of a speed-reducing double type 2) of the sixth embodiment is an example, in which the first planetary gear set G1 of a double-pinion type is positioned as a speed-reducing device at the left-hand end portion of FIG. 44, in which the second planetary gear set G2 of a single-pinion type is positioned at the central portion and in which the third planetary gear set G3 of a double sun gear type is positioned at the right-hand end portion. And, the aforementioned second planetary gear set G2 and third planetary gear set G3 construct the so-called "Ishimaru type planetary gear train".

The positioning relations among the first planetary gear set G1, the second planetary gear set G2 and the third planetary gear set G3 of the automatic transmission gear-operated speed change apparatus (of the speed-reducing double type 2) are identical to those of the speed-reducing double type 1. Moreover: the first clutch C1 is positioned between the first planetary gear set G1 and the second planetary gear set G2; the second clutch C2, the third clutch C3, the fourth clutch C4, the first brake B1 and the second brake B2 are positioned between the second planetary gear set G2 and the third planetary gear set G3, but no clutch/brake is positioned on the outer side of the third planetary gear set G3. Thus, the output portion is exemplified not by the output gear Output but by an output shaft Output made coaxial with the input shaft Input. The remaining arrangement is similar to that of the speed-reducing double type 1 of the fifth embodiment so that its description is omitted.

FIG. 45 to FIG. 48 are diagrams showing the torque flows at the individual gear ranges of the automatic transmission gear-operated speed change apparatus of the sixth embodiment. In FIG. 45 to FIG. 48, the torque transmission routes of clutches, brakes and members are indicated by thick lines, and the torque transmission routes of gears are indicated by hatching them. The torque flows at the individual gear ranges are similar to those of the speed-reducing double type 1 of the fifth embodiment so that their descriptions are omitted.

Moreover, the effects of the automatic transmission gear-operated speed change apparatus of the sixth embodiment are similar to those of the automatic transmission gear-operated speed change apparatus of the fifth embodiment so that their descriptions are omitted.

Although the sixth embodiment gear-operated speed change apparatus has been described hereinbefore, any of the five patterns shown in FIG. 49 and FIG. 50 may be selected as the positioning pattern of the fourth clutch C4 in addition to the position of the fourth clutch C4, as shown in the schematic of FIG. 44, in case the 5th speed is achieved as the direct-engagement gear range by combining the gear-operated speed change apparatus with the hydraulic speed change control device for achieving seven forward speeds and one reverse speed.

The five patterns shown in FIG. 49 and FIG. 50 are examples, in which the second, third and fourth sun gears S2, S3 and S4 and the first connection member M1 are given the input rotation by the engagement of the fourth clutch C4 when the center member CM and the third carrier PC3 are also given the input rotation by the engagement of the third clutch C3 so as to change the 5th speed into the direct-engagement gear range.

Figure 49A:
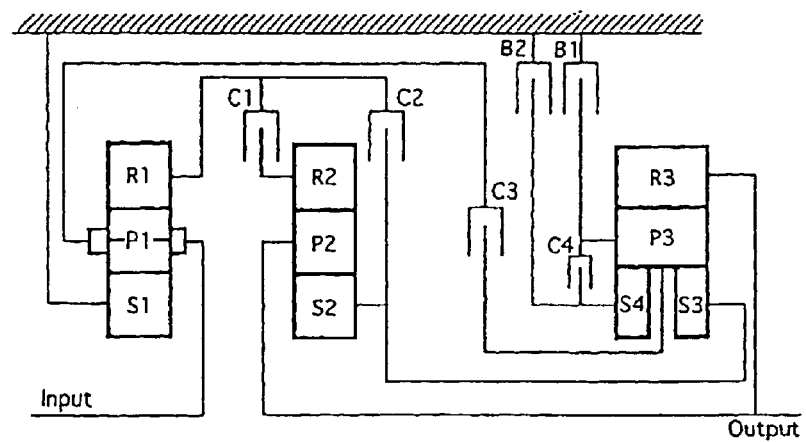
FIGS. 49a–49c present positioning pattern diagrams of a 4th clutch in the automatic transmission gear-operated speed change apparatus of the sixth embodiment.
Figure 49B:
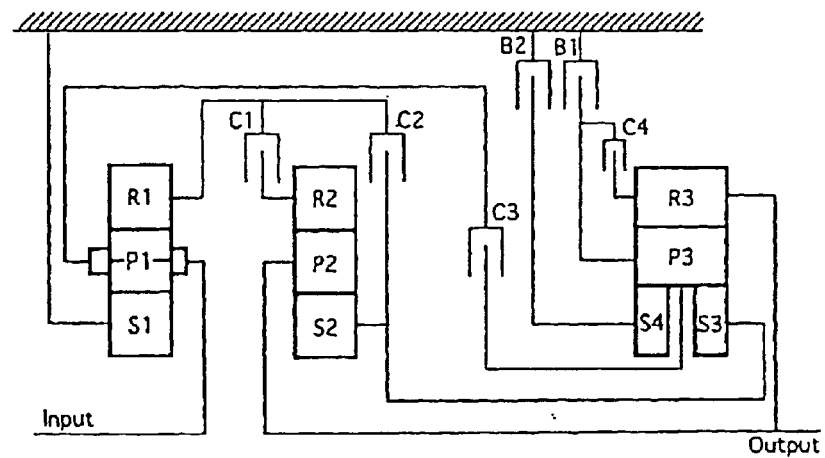
Figure 49C:
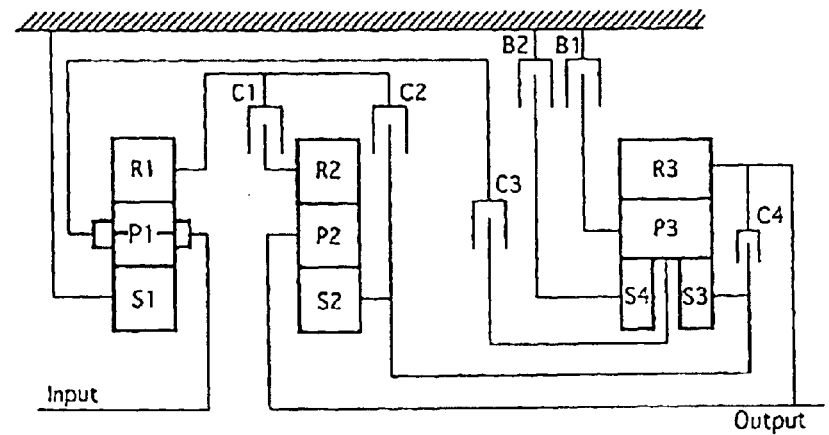
Figure 50A:
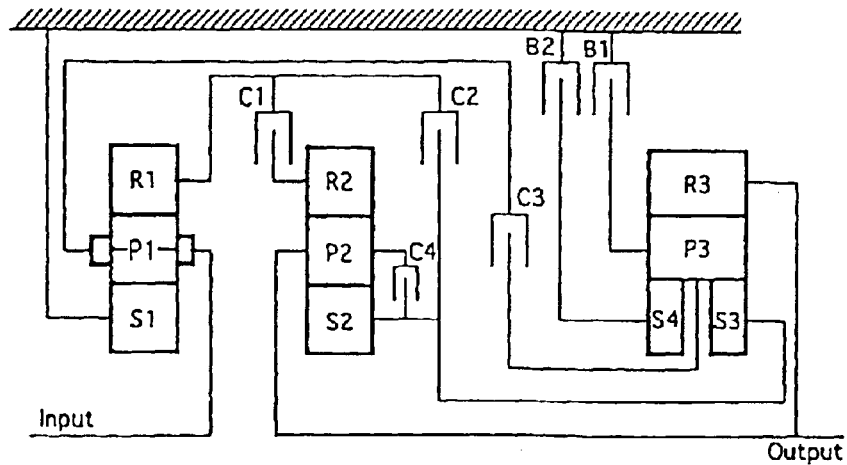
FIGS. 50a and 50b present positioning pattern diagrams of the 4th clutch in the automatic transmission gear-operated speed change apparatus of the sixth embodiment.

Specifically, the fourth clutch C4 is positioned:

① between the third carrier PC3 and the fourth sun gear S4 (FIG. 49(a));

② between the third ring gear R3 and the third carrier PC3 (FIG. 49(b));

③ between the first connection member M1 and the second connection member M2 (FIG. 49(c));

④ between the second sun gear S2 and the second carrier PC2 (FIG. 50(a)); or

Figure 50B:
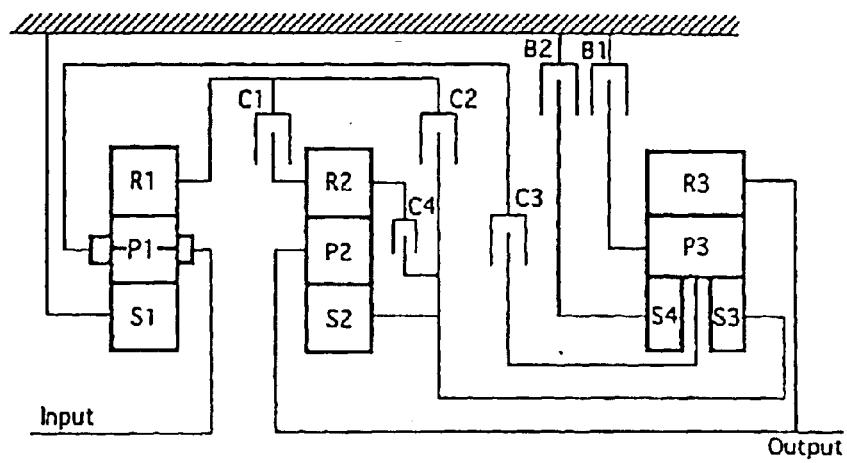

⑤ between the second ring gear R2 and the second sun gear S2 (FIG. 50(b)).

(Seventh Embodiment)

First of all, the arrangement will be described in the following.

Figure 51:
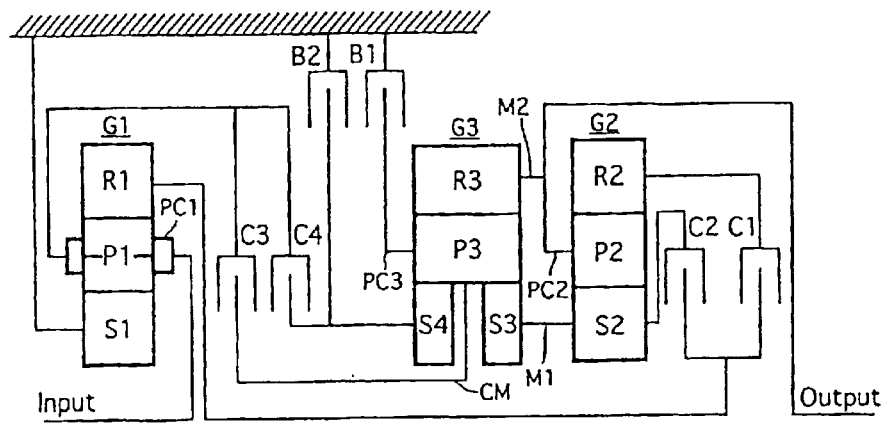
FIG. 51 is a schematic diagram showing a gear-operated speed change apparatus for an automatic transmission of a seventh embodiment.
Figure 52A:
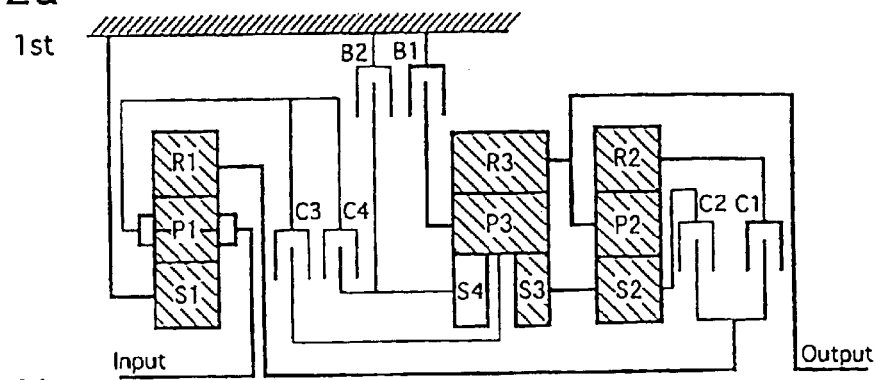
FIGS. 52a and 52b present torque flow diagrams of the automatic transmission gear-operated speed change apparatus of the seventh embodiment at 1st and 2nd speeds.
Figure 52B:
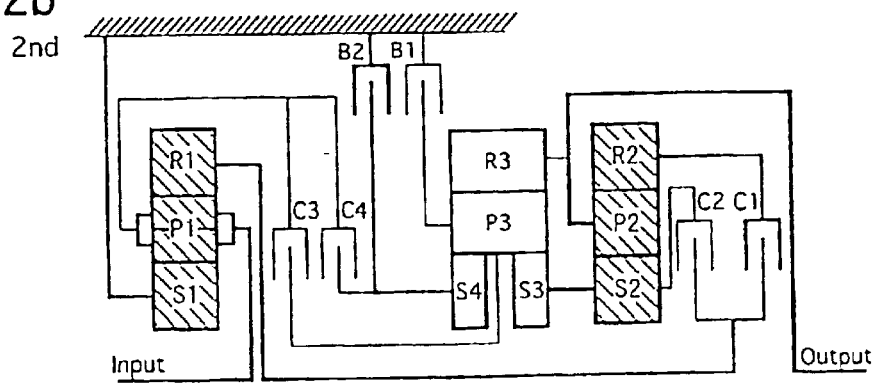
Figure 55A:
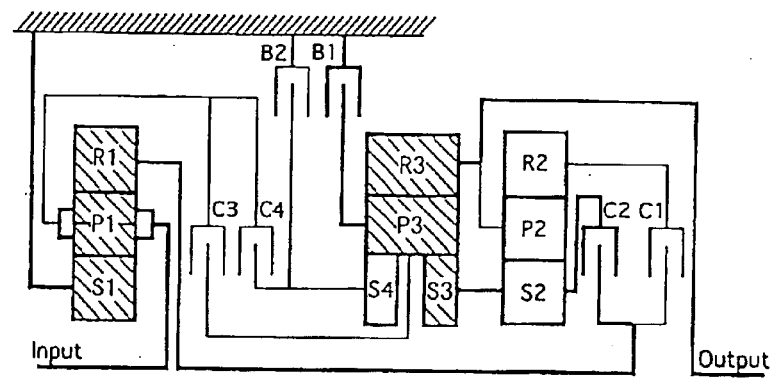
FIGS. 55a and 55b present torque flow diagrams of the automatic transmission gear-operated speed change apparatus of the seventh embodiment at reverse 1st and reverse 2nd speeds.
Figure 55B:
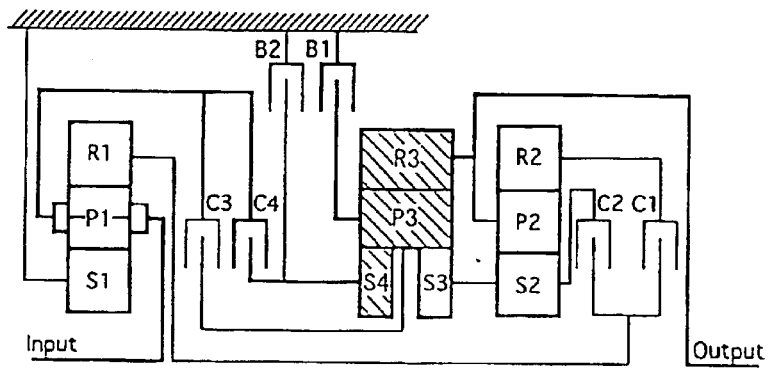

The seventh embodiment is directed to automatic transmission gear-operated speed change apparatus corresponding to inventions defined in Claims 1, 4, 7, 8, 15, 19 and 22, and FIG. 51 is a schematic diagram showing the automatic transmission gear-operated speed change apparatus of the seventh embodiment.

In FIG. 51: G1 designates a first planetary gear set; G2 a second planetary gear set; G3 a third planetary gear set; M1 a first connection member; M2 a second connection member; C1 a first clutch; C2 a second clutch; C3 a third clutch; C4 a fourth clutch; B1 a first brake; B2 a second brake; Input an input shaft (or an input portion); and Output an output shaft (or an output portion).

The automatic transmission gear-operated speed change apparatus (referred to as that of a speed-reducing double type 3) of the seventh embodiment is an example, in which the first planetary gear set G1 of a double-pinion type is positioned as a speed-reducing device at the left-hand end portion of FIG. 51, in which the third planetary gear set G3 of a double sun gear type is positioned at the central portion and in which the second planetary gear set G2 of a single pinion type is positioned at the right-hand end portion. And, the aforementioned second planetary gear set G2 and third planetary gear set G3 construct the so-called "Ishimaru type planetary gear train".

The positioning relations among the first planetary gear set G1, the second planetary gear set G2 and the third planetary gear set G3 of the automatic transmission gear-operated speed change apparatus (of the speed-reducing double type 3) are different from those of the speed-reducing double type 1 in that the second planetary gear set G2 and the third planetary gear set G3 are replaced by each other. Moreover: the third clutch C3, the fourth clutch C4, the first brake B1 and the second brake B2 are positioned between the first planetary gear set G1 and the third planetary gear set G3; no clutch/brake is positioned between the third planetary gear set G3 and the second planetary gear set G2; and the first clutch C1 and the second clutch C2 are positioned on the outer side of the second planetary gear set G2. Thus, the output portion is exemplified not by the output shaft Output made coaxial with the input shaft Input. The remaining arrangement is similar to that of the speed-reducing double type 1 so that its description is omitted.

FIG. 52 to FIG. 55 are diagrams showing the torque flows at the individual gear ranges of the automatic transmission gear-operated speed change apparatus of the seventh embodiment. In FIG. 52 to FIG. 55, the torque transmission routes of clutches, brakes and members are indicated by thick lines, and the torque transmission routes of gears are indicated by hatching them. The torque flows of the individual gear ranges are similar to those of the speed-reducing double type 1 so that their descriptions are omitted.

Moreover, the effects of the automatic transmission gear-operated speed change apparatus of the seventh embodiment are similar to those of the automatic transmission gear-operated speed change apparatus of the fifth embodiment so that their descriptions are omitted.

Although the seventh embodiment gear-operated speed change apparatus has been described hereinbefore, any of the five patterns shown in FIG. 56 and FIG. 57 may be selected as the positioning pattern of the fourth clutch C4 in addition to the position of the fourth clutch C4, as shown in the schematic of FIG. 51, in case the 5th speed is achieved as the direct-engagement gear range by combining the gear-operated speed change apparatus with the hydraulic speed change control device for achieving seven forward speeds and one reverse speed.

The five patterns shown in FIG. 56 and FIG. 57 are examples, in which the second, third and fourth sun gears S2, S3 and S4 and the first connection member M1 are given the input rotation by the engagement of the fourth clutch C4 when the center member CM and the third carrier PC3 are also given the input rotation by the engagement of the third clutch C3 so as to change the 5th speed into the direct-engagement gear range.

Figure 56A:
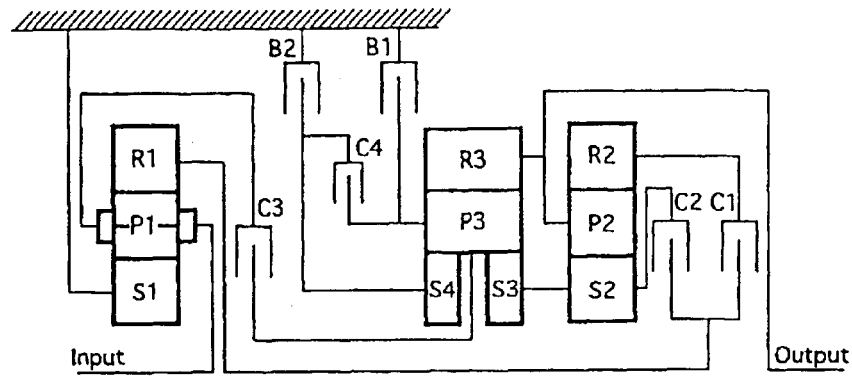
FIGS. 56a–56c present positioning pattern diagrams of a 4th clutch in the automatic transmission gear-operated speed change apparatus of the seventh embodiment.
Figure 56B:
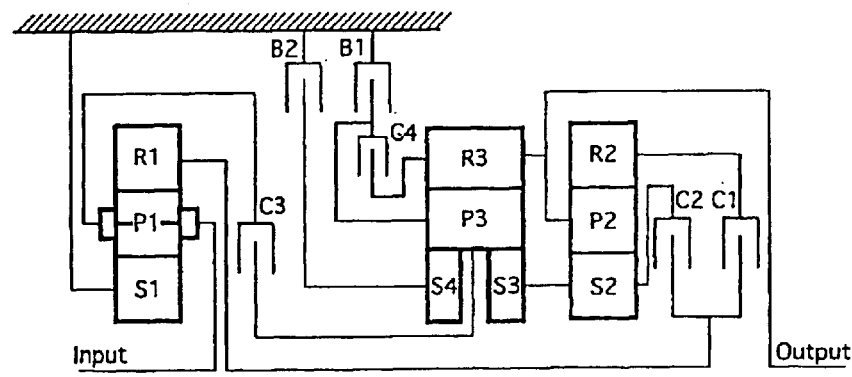
Figure 56C:
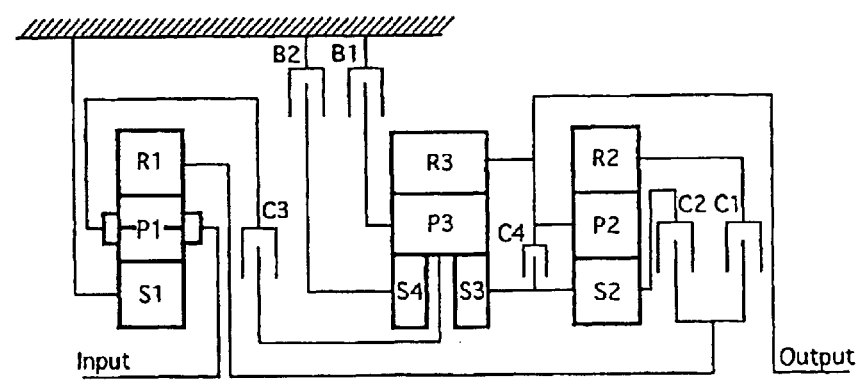
Figure 57A:
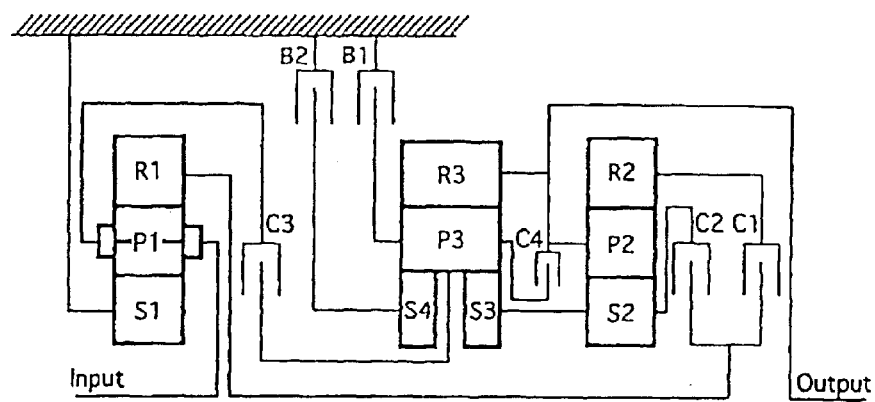
FIGS. 57a and 57b present positioning pattern diagrams of the 4th clutch in the automatic transmission gear-operated speed change apparatus of the seventh embodiment.
Figure 57B:
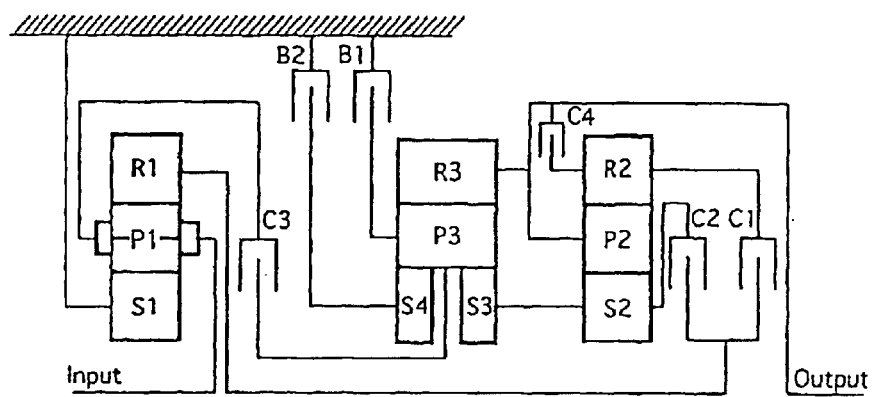

Specifically, the fourth clutch C4 is positioned:

① between the third carrier PC3 and the fourth sun gear S4 (FIG. 56(a));

② between the third ring gear R3 and the third carrier PC3 (FIG. 56(b));

③ between the first connection member M1 and the second connection member M2 (FIG. 56(c));

④ between the third carrier PC2 and the second connection member M2 (FIG. 57(a)); or ⑤ between the second ring gear R2 and the second connection member M2 (FIG. 57(b)).

(Eighth Embodiment)

First of all, the arrangement will be described in the following.

Figure 58:
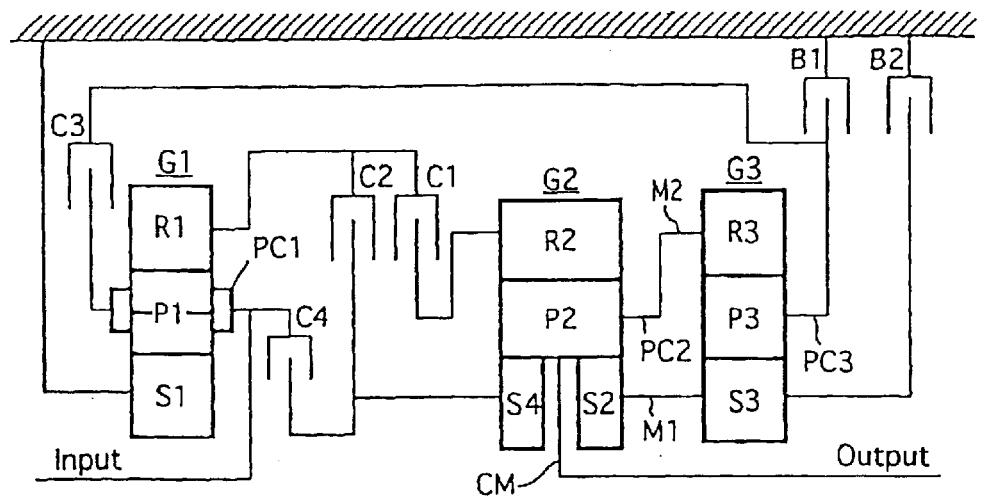
FIG. 58 is a schematic diagram showing a gear-operated speed change apparatus for an automatic transmission of an eighth embodiment.

The eighth embodiment is directed to automatic transmission gear-operated speed change apparatus corresponding to inventions defined in Claims 1, 4, 7, 8, 16, 19 and 22, and FIG. 58 is a schematic diagram showing the automatic transmission gear-operated speed change apparatus of the eighth embodiment.

In FIG. 58: G1 designates a first planetary gear set; G2 a second planetary gear set; G3 a third planetary gear set; M1 a first connection member; M2 a second connection member; C1 a first clutch; C2 a second clutch; C3 a third clutch; C4 a fourth clutch; B1 a first brake; B2 a second brake; Input an input shaft (or an input portion); and Output an output shaft (or an output portion).

The automatic transmission gear-operated speed change apparatus (referred to as that of a speed-reducing double type 4) of the eighth embodiment is an example, in which the first planetary gear set G1 of a double-pinion type is positioned as a speed-reducing device at the left-hand end portion of FIG. 58, in which the second planetary gear set G2 of a double sun gear type is positioned at the central portion and in which the third planetary gear set G3 of a single-pinion type is positioned at the right-hand end portion. And, the aforementioned second planetary gear set G2 and third planetary gear set G3 construct the so-called "Ishimaru type planetary gear train".

The aforementioned first planetary gear set G1 is a double-pinion type planetary gear set acting as the speed-reducing device, which includes: a first sun gear S1; a first ring gear R1; and a first carrier PC1 for supporting first double pinions P1 meshing with the two gears S1 and R1.

The aforementioned second planetary gear set G2 is the double sun gear type planetary gear set, which includes: two second sun gear S2 and fourth sun gear S4; a second carrier PC2 and a center member CM for supporting second pinion P2 meshing individually with the two sun gears S2 and S4; and one second ring gear R2 meshing with the aforementioned second pinion P2.

The aforementioned third planetary gear set G3 is the single pinion type planetary gear set, which includes: a third sun gear S3; a third ring gear R3; and a third carrier PC3 for supporting a third pinion P3 meshing with the two gears S3 and R3.

The aforementioned input shaft Input is connected to the first carrier PC1, and the aforementioned output shaft Output is connected to the center member CM.

The aforementioned first connection member M1 connects the second sun gear S2 and the third sun gear S3 like a single unit. The aforementioned second connection member M2 connects the second carrier PC2 and the third ring gear R2 like a single unit.

The aforementioned first clutch C1 connects/disconnects the first ring gear R1 and the second ring gear R2 selectively. The aforementioned second clutch C2 connects/disconnects the first ring gear R1 and the fourth sun gear S4 selectively. The aforementioned third clutch C3 connects/disconnects the input shaft Input and the third carrier PC3 selectively. The aforementioned fourth clutch C4 connects/disconnects the input shaft Input and the fourth sun-gear S4 selectively.

The aforementioned first brake B1 stops the rotation of the third carrier PC3 selectively. The aforementioned second brake B2 stops the rotation of the third sun gear S3 selectively.

To the aforementioned individual clutches C1, C2, C3 and C4 and individual brakes B1 and B2, there is connected the not-shown hydraulic speed change control device (or speed change control means defined in Claim 16) for establishing engagement pressures (with circle symbols) and release pressures (with no symbol) at individual speed ranges of seven forward speeds and one reverse speed, as shown in an engagement table of FIG. 2(a). To the aforementioned individual clutches C1, C2, C3 and C4 and individual brakes B1 and B2, alternatively, there is connected the not-shown hydraulic speed change control device (or speed change control means defined in Claim 19) for establishing engagement pressures (with circle symbols) and release pressures (with no symbol) at individual speed ranges of eight forward speeds and two reverse speeds, as shown in an engagement table of FIG. 2(b).

The actions will be described in the following.

[Shifting Actions]

FIG. 59 to FIG. 62 are diagrams showing the torque flows at the individual gear ranges of the automatic transmission gear-operated speed change apparatus of the eighth embodiment. In FIG. 59 to FIG. 62, the torque transmission routes of clutches, brakes and members are indicated by thick lines, and the torque transmission routes of gears are indicated by hatching them.

Here, the collinear diagrams showing the rotation-stopped state of the members at the individual gear ranges in the eighth embodiment gear-operated speed change apparatus are identical to those of the fifth embodiment gear-operated speed change apparatus, as shown in FIG. 37, so that their illustrations are omitted. The engagement tables of the eighth embodiment gear-operated speed change apparatus are identical to those of the first embodiment gear-operated speed change apparatus shown in FIG. 2, so that their illustrations are omitted.

Here will be described the torque flows at the individual gear ranges of the eight forward speeds and the two reverse speeds.

<1st Speed>

As shown in FIG. 2(b), the 1st speed is achieved by the engagements of the first clutch C1 and the first brake B1.

Figure 59A:
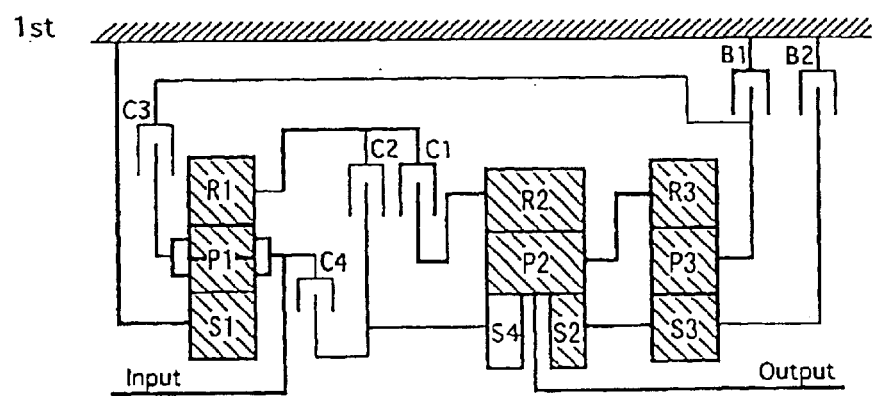
FIGS. 59a and 59b present torque flow diagrams of the automatic transmission gear-operated speed change apparatus of the eighth embodiment at 1st and 2nd speeds.

In the torque flow at this 1st speed, as shown in FIG. 59(a), the torque is applied to the first clutch C1, the first brake B1 and the individual members, as indicated by the thick lines, and to the second planetary gear set G2 (excepting the fourth sun gear S4) and the third planetary gear set G3, as hatched. In short, at the 1st speed, the second planetary gear set G2 and the third planetary gear set G3, as constructing the Ishimaru type planetary gear train, participate in the torque transmission.

<2nd Speed>

As shown in FIG. 2(b), the 2nd speed is achieved by releasing the first brake B1 at the 1st speed and engaging the second brake B2, that is, by engaging the first clutch C1 and the second brake B2.

Figure 59B:
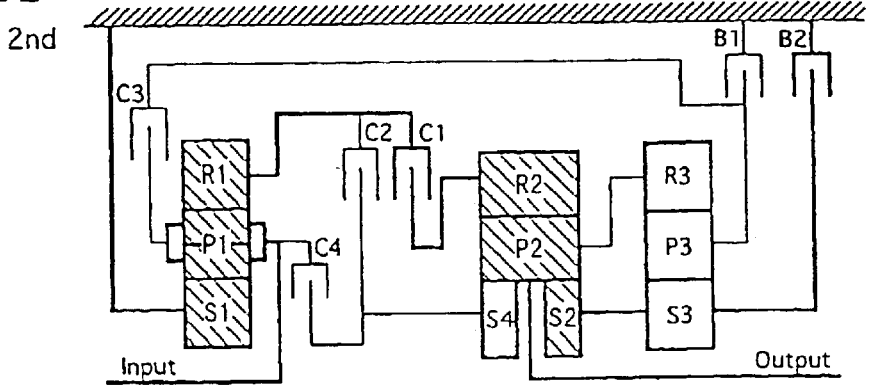

In the torque flow at this 2nd speed, as shown in FIG. 59(b), the torque is applied to the first clutch C1, the second brake B2 and the individual members, as indicated by the thick lines, and to the first planetary gear set G1 and the second planetary gear set G2 (excepting the fourth sun gear S4), as hatched.

<3rd Speed>

As shown in FIG. 2(b), the 3rd speed is achieved by releasing the second brake B2 at the 2nd speed and engaging the second clutch C2, that is, by engaging the first clutch C1 and the second clutch C2.

Figure 60A:
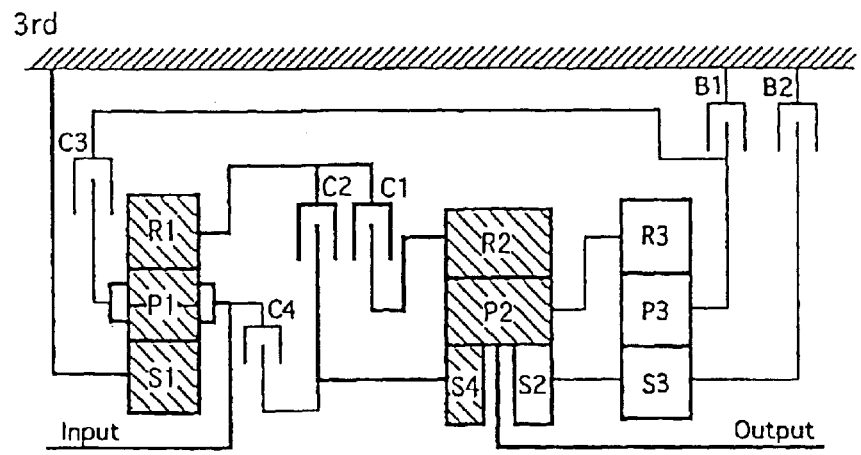
FIGS. 60a–60c present torque flow diagrams of the automatic transmission gear-operated speed change apparatus of the eighth embodiment at 3rd, 4th and 5th speeds.

In the torque flow at this 3rd speed, as shown in FIG. 60(a), the torque is applied to the first clutch C1, the second clutch C2 and the individual members, as indicated by the thick lines, and to the first planetary gear set G1 and the second planetary gear set G2 (excepting the second sun gear S2), as hatched.

<4th Speed>

As shown in FIG. 2(b), the 4th speed is achieved by releasing the second clutch C2 at the 3rd speed and engaging the fourth clutch C4, that is, by engaging the first clutch C1 and the fourth clutch C4.

Figure 60B:
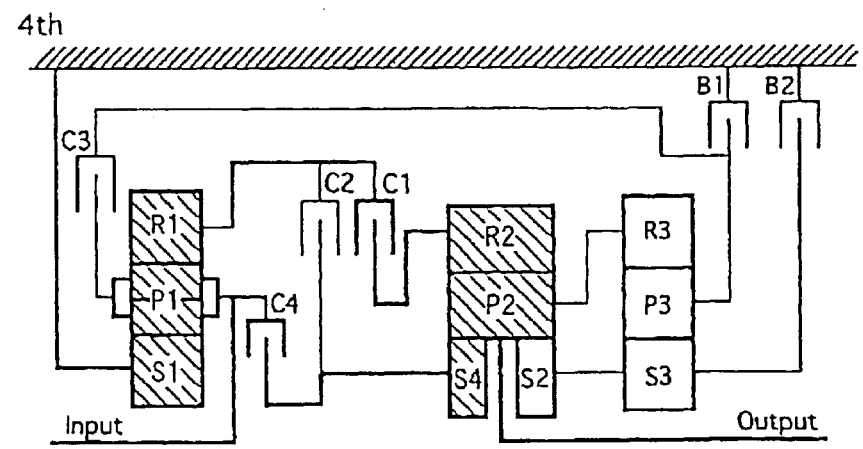

In the torque flow at this 4th speed, as shown in FIG. 60(b), the torque is applied to the first clutch C1, the fourth clutch C4 and the individual members, as indicated by the thick lines, and to the first planetary gear set G1 and the second planetary gear set G2 (excepting the second sun gear S2), as hatched.

<5th Speed>

As shown in FIG. 2(b), the 5th speed is achieved by releasing the fourth clutch C4 at the 4th speed and engaging the third clutch C3, that is, by engaging the first clutch C1 and the third clutch C3.

Figure 60C:
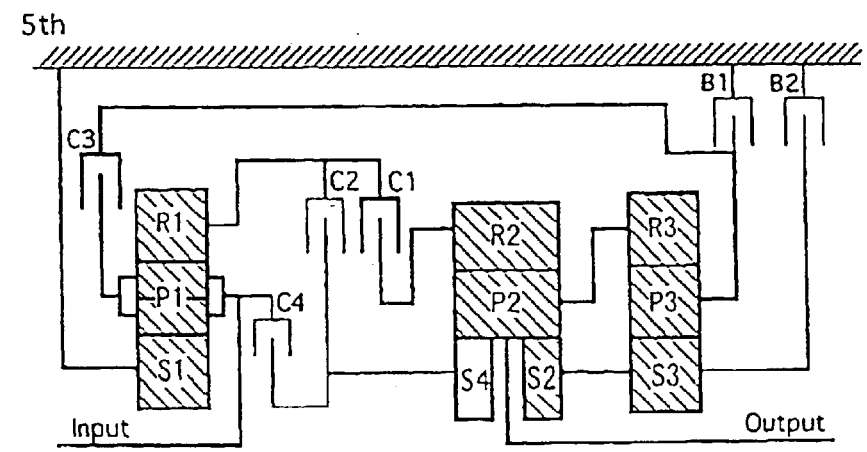

In the torque flow at this 5th speed, as shown in FIG. 60(c), the torque is applied to the first clutch C1, the third clutch C3 and the individual members, as indicated by the thick lines, and to the first planetary gear set G1, the second planetary gear set G2 (excepting the fourth sun gear S4) and the third planetary gear set G3, as hatched.

(6th Speed)

As shown in FIG. 2(b), the 6th speed is achieved by releasing the first clutch C1 at the 5th speed and engaging the fourth clutch C4, that is, by engaging the third clutch C3 and the fourth clutch C4.

Figure 61A:
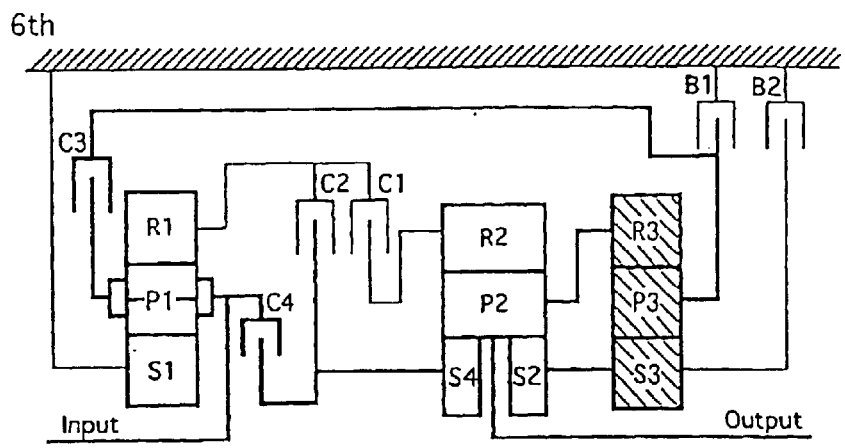
FIGS. 61a–61c present torque flow diagrams of the automatic transmission gear-operated speed change apparatus of the eighth embodiment at 6th, 7th and 8th speeds.

In the torque flow at this 6th speed, as shown in FIG. 61(a), the torque is applied to the third clutch C3, the fourth clutch C4 and the individual members, as indicated by the thick lines, and to the third planetary gear set G3, as hatched.

(7th Speed)

As shown in FIG. 2(b), the 7th speed is achieved by releasing the fourth clutch C4 at the 6th speed and engaging the second clutch C2, that is, by engaging the second clutch C2 and the third clutch C3.

Figure 61B:
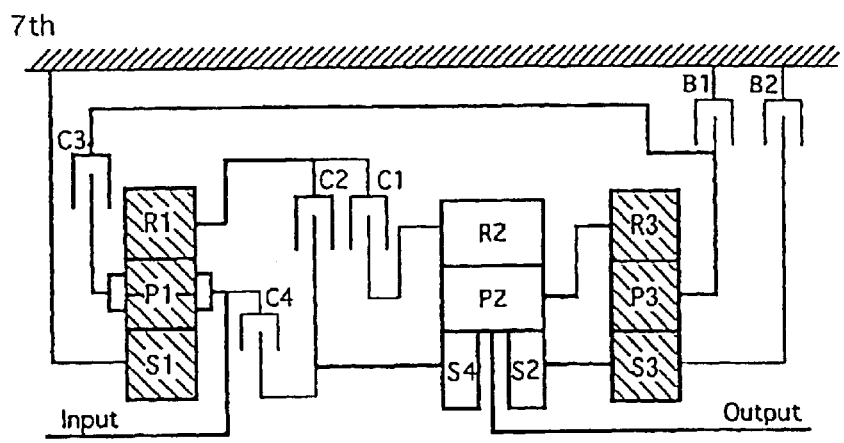

In the torque flow at this 7th speed, as shown in FIG. 61(b), the torque is applied to the second clutch C2, the third clutch C3 and the individual members, as indicated by the thick lines, and to the first planetary gear set G1 and the third planetary gear set G3, as hatched.

(8th Speed)

As shown in FIG. 2(b), the 8th speed is achieved by releasing the second clutch C2 at the 7th speed and engaging the second brake B2, that is, by engaging the third clutch C3 and the second brake B2.

Figure 61C:
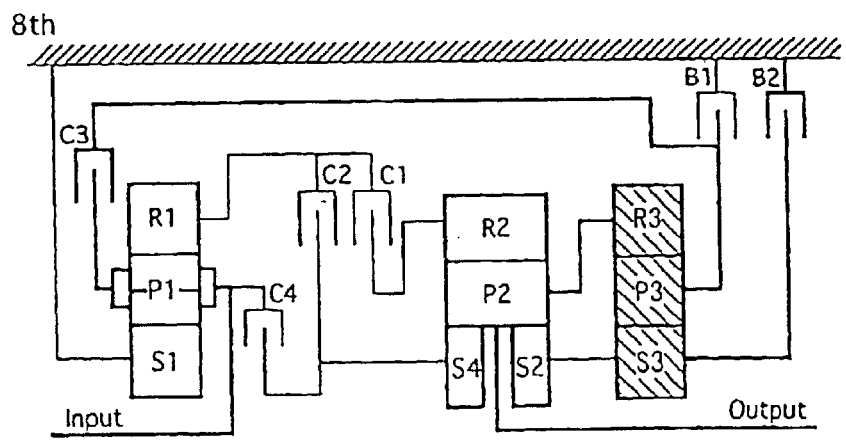

In the torque flow at this 8th speed, as shown in FIG. 61(c), the torque is applied to the third clutch C3, the second brake B2 and the individual members, as indicated by the thick lines, and to the third planetary gear set G3, as hatched.

(Reverse 1st Speed)

As shown in FIG. 2(b), the reverse speed is achieved by engaging the second clutch C2 and the first brake B1.

Figure 62A:
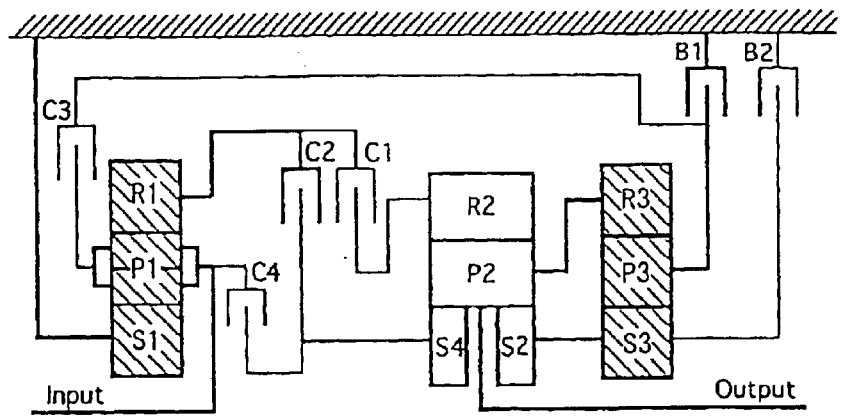
FIGS. 62a and 62b present torque flow diagrams of the automatic transmission gear-operated speed change apparatus of the eighth embodiment at reverse 1st and reverse 2nd speeds.

In the torque flow at this reverse 1st speed, as shown in FIG. 62(a), the torque is applied to the second clutch C2, the first brake B1 and the individual members, as indicated by the thick lines, and to the first planetary gear set G1 and the third planetary gear set G3, as hatched.

(Reverse 2nd Speed)

As shown in FIG. 2(b), the reverse 2nd speed is achieved by releasing the second clutch C2 at the reverse 1st speed and engaging the fourth clutch C4, that is, by engaging the fourth clutch C4 and the first brake B1.

Figure 62B:
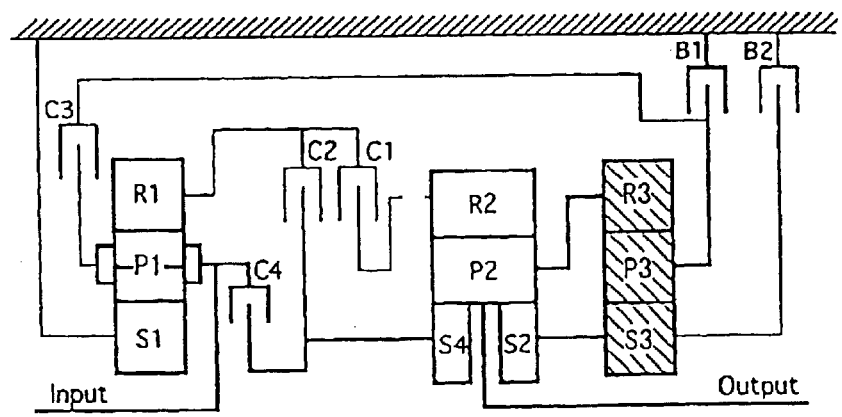

In the torque flow at this reverse 2nd speed, as shown in FIG. 62(b), the torque is applied to the fourth clutch C4, the first brake B1 and the individual members, as indicated by the thick lines, and to the third planetary gear set G3, as hatched.

The effects will be described in the following.

As has been described hereinbefore, the automatic transmission gear-operated speed change apparatus of the eighth embodiment can obtain the following effects in addition to the effects (1), (3), (4), (6) and (7) of the first embodiment and the effects (16) of the fifth embodiment.

(18) The automatic transmission gear-operated speed change apparatus further comprises a hydraulic speed change control device including: the double-pinion type first planetary gear set G1 acting as the speed-reducing device and having the first sun gear S1, the first ring gear R1, and the first carrier PC1 for supporting the first double pinions P1 meshing with the two gears S1 and R1; the double sun gear type second planetary gear set G2 having the two second sun gear S2 and fourth sun gear S4, the second carrier PC2 and the center member CM for supporting the second pinion P2 meshing individually with the two sun gears S2 and S4, and one second ring gear R2 meshing with the aforementioned second pinion P2; the single-pinion type third planetary gear set G3 having the third sun gear S3, the third ring gear R3, and the third carrier PC3 for supporting the third pinion P3 meshing with the two gears S3 and R3; the input shaft Input connected to the first carrier PC1; the output shaft Output connected to the center member CM; the first connection member M1 for connecting the second sun gear S2 and the third sun gear S3 like a single unit; the second connection member M2 for connecting the second carrier PC2 and the third ring gear R2 like a single unit; the first clutch C1 for connecting/disconnecting the first ring gear R1 and the second ring gear R2 selectively; the second clutch C2 for connecting/disconnecting the first ring gear R1 and the fourth sun gear S4 selectively; the third clutch C3 for connecting/disconnecting the input shaft Input and the third carrier PC3 selectively; the fourth clutch C4 for connecting/disconnecting the input shaft Input and the fourth sun gear S4 selectively; the first brake B1 for stopping the rotation of the third carrier PC3 selectively; and the second brake B2 for stopping the rotation of the third sun gear S3 selectively, for achieving at least seven forward speeds and one reverse speed. Therefore, the automatic transmission gear-operated speed change apparatus can achieve particular effects, as enumerated in the following (corresponding to Claim 16).

① At the 1st speed and 2nd speed for applying the high torques, the ring gear input can be achieved for the Ishimaru type planetary gear train, which is constructed of the second planetary gear set G2 and the third planetary gear set G3, and the automatic transmission can be made compact.

② At the 2nd speed, the torque circulation is eliminated to improve the transmission efficiency at the 2nd speed and the fuel economy.

③ When the gear-operated speed change apparatus is to be applied to the automatic transmission of the FR car, the layout can be set such that the number of members passing on the inner side of the second planetary gear set G2 of the double sun gear type is reduced to one, thereby to reduce the size of the Ishimaru type planetary gear train to make the gear-operated speed change apparatus compact.

④ At the 8th speed or the highest gear range, the torque is transmitted to the single-pinion type third planetary gear set G3 so that the gear meshing ratio is improved to provide an advantage in vibration and noise.

⑤ At the 5th speed (of the seven forward speed type) or the 6th speed (of the eight forward speed type), the direct-engagement gear range can be achieved by providing the fourth clutch C4 for connecting/disconnecting the input shaft Input and the fourth sun gear S4 selectively, so that the torque transmission efficiency can be improved to contribute to the fuel economy.

Although the eighth embodiment gear-operated speed change apparatus has been described hereinbefore, any of the five patterns shown in FIG. 63 and FIG. 64 may be selected as the positioning pattern of the fourth clutch C4 in addition to the position of the fourth clutch C4, as shown in the schematic of FIG. 58, in case the 5th speed is achieved as the direct-engagement gear range by combining the gear-operated speed change apparatus with the hydraulic speed change control device for achieving seven forward speeds and one reverse speed.

The five patterns shown in FIG. 63 and FIG. 64 are examples, in which the second, third and fourth sun gears S2, S3 and S4 and the first connection member M1 are likewise given the input rotation by the engagement of the fourth clutch C4 when the third carrier PC3 is given the input rotation by the engagement of the third clutch C3 so as to change the 5th speed into the direct-engagement gear range.

Figure 63A:
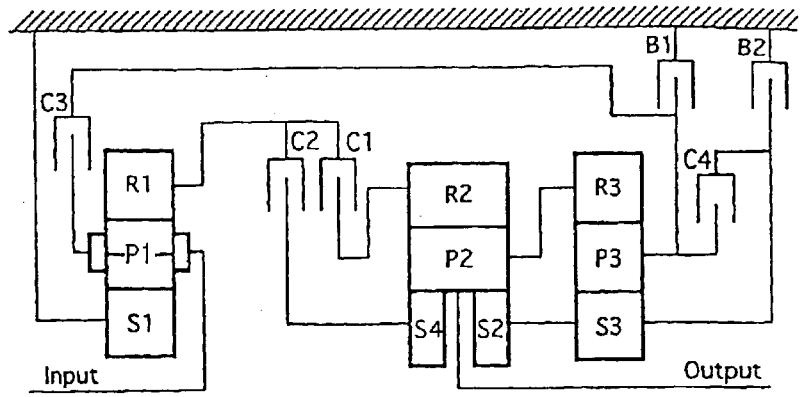
FIGS. 63a–63c present positioning pattern diagrams of a 4th clutch in the automatic transmission gear-operated speed change apparatus of the eighth embodiment.
Figure 63B:
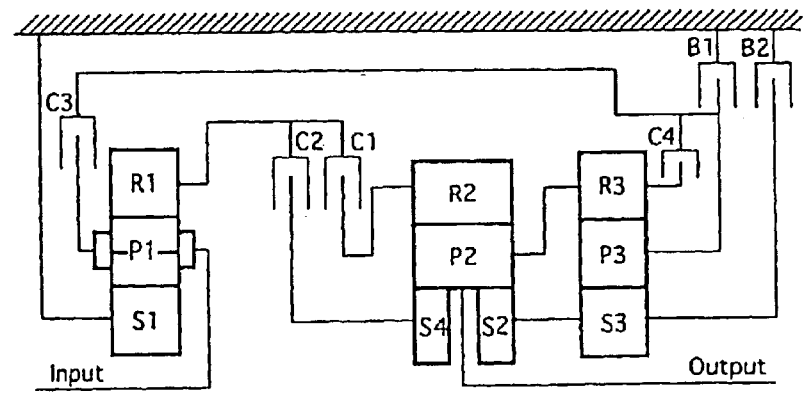
Figure 63C:
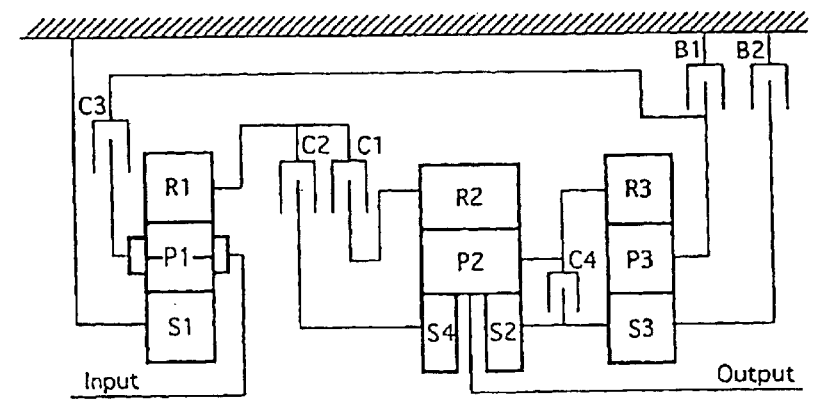
Figure 64A:
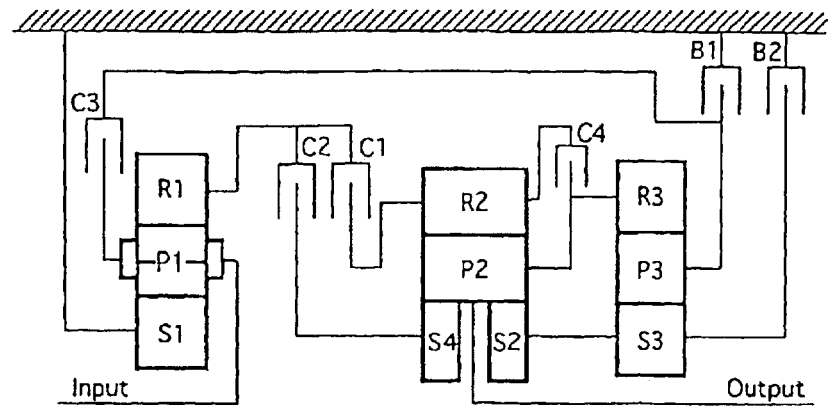
FIGS. 64a and 64b present positioning pattern diagrams of the 4th clutch in the automatic transmission gear-operated speed change apparatus of the eighth embodiment.
Figure 64B:
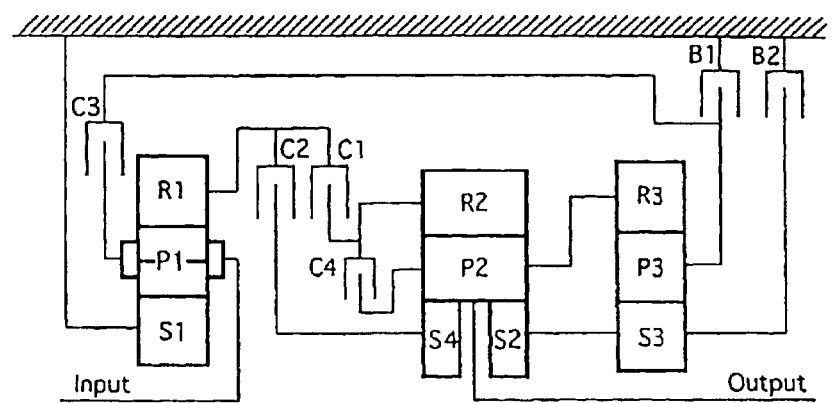

Specifically, the fourth clutch C4 is positioned:

① between the third carrier PC3 and the third sun gear S3 (FIG. 63(a));
② between the third ring gear R3 and the third carrier PC3 (FIG. 63(b));
③ between the first connection member M1 and the second connection member M2 (FIG. 63(c));
④ between the second ring gear R2 and the second connection member M2 (FIG. 64(a)); or
⑤ between the second ring gear R2 and the second carrier PC2 (FIG. 64(b)).

(Ninth Embodiment)

First of all, the arrangement will be described in the following.

Figure 65:
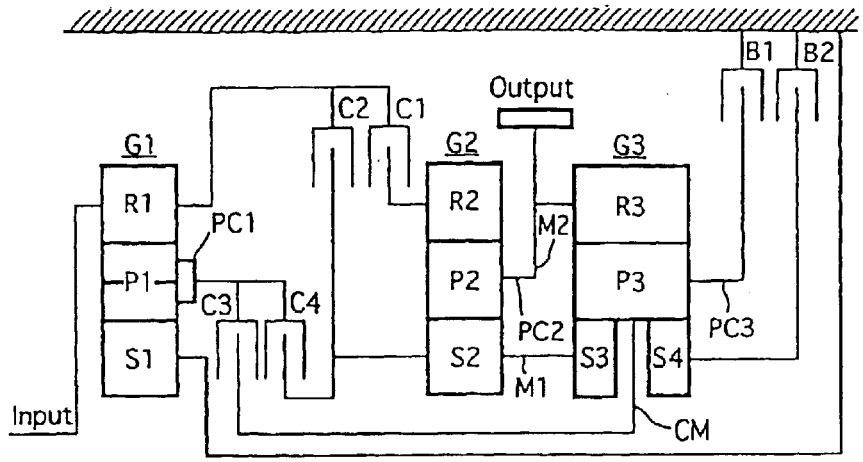
FIG. 65 is a schematic diagram showing a gear-operated speed change apparatus for an automatic transmission of a ninth embodiment.

The ninth embodiment is directed to automatic transmission gear-operated speed change apparatus corresponding to inventions defined in Claims 2, 6, 9, 10, 17, 20 and 22, and FIG. 65 is a schematic diagram showing the automatic transmission gear-operated speed change apparatus of the ninth embodiment.

In FIG. 65: G1 designates a first planetary gear set; G2 a second planetary gear set; G3 a third planetary gear set; M1 a first connection member; M2 a second connection member; C1 a first clutch; C2 a second clutch; C3 a third clutch; C4 a fourth clutch; B1 a first brake; B2 a second brake; Input an input shaft (or an input portion); and Output an output gear (or an output portion).

The automatic transmission gear-operated speed change apparatus (referred to as that of a speed-increasing double type 1) of the ninth embodiment is an example, in which the first planetary gear set G1 of a double-pinion type is positioned as a speed-increasing device at the left-hand end portion of FIG. 65, in which the second planetary gear set G2 of a single-pinion type is positioned at the central portion and in which the third planetary gear set G3 of a double sun gear type is positioned at the right-hand end portion. And, the aforementioned second planetary gear set G2 and third planetary gear set G3 construct the so-called "Ishimaru type planetary gear train".

The aforementioned first planetary gear set G1 is a double-pinion type planetary gear set or the speed-increasing device, which includes: a first sun gear S1; a first ring gear R1; and a first carrier PC1 for supporting a first double pinion P1 meshing with the two gears S1 and R1.

The aforementioned second planetary gear set G2 is the single-pinion type planetary gear set, which includes: a second sun gear S2; a second ring gear R2; and a second carrier PC2 for supporting a second pinion P2 meshing with the two gears S2 and R2.

The aforementioned third planetary gear set G3 is the double sun gear type planetary gear set, which includes: two third sun gear S3 and fourth sun gear S4; a third carrier PC3 and a center member CM for supporting third pinion P3 meshing individually with the two sun gears S3 and S4; and one third ring gear R3 meshing with the aforementioned third pinion P3.

The aforementioned input shaft Input is connected to the first ring gear R1, and the aforementioned output gear Output is connected to the second carrier PC2.

The aforementioned first connection member M1 connects the second sun gear S2 and the third sun gear S3 like a single unit, and the aforementioned second connection member M2 connects the second carrier PC2 and the third ring gear R3 like a single unit.

The aforementioned first clutch C1 connects/disconnects the first ring gear R1 and the second ring gear R2 selectively. The aforementioned second clutch C2 connects/disconnects the first ring gear R1 and the second sun gear S2 selectively. The aforementioned third clutch C3 connects/disconnects the first carrier PC1 and the center member CM selectively. The aforementioned fourth clutch C4 connects/disconnects the first carrier PC1 and the second sun gear S2 selectively.

The aforementioned first brake B1 stops the rotation of the third carrier PC3 selectively. The aforementioned second brake B2 stops the rotation of the fourth sun gear S4 selectively.

To the aforementioned individual clutches C1, C2, C3 and C4 and individual brakes B1 and B2, there is connected the not-shown hydraulic speed change control device (or speed change control means defined in Claim 17) for establishing engagement pressures (with circle symbols) and release pressures (with no symbol) at individual speed ranges of seven forward speeds and one reverse speed, as shown in an engagement table of FIG. 2(a). To the aforementioned individual clutches C1, C2, C3 and C4 and individual brakes B1 and B2, alternatively, there is connected the not-shown hydraulic speed change control device (or speed change control means defined in Claim 20) for establishing engagement pressures (with circle symbols) and release pressures (with no symbol) at individual speed ranges of eight forward speeds and two reverse speeds, as shown in an engagement table of FIG. 2(b).

The actions will be described in the following.

[Shifting Actions]

Figure 66:
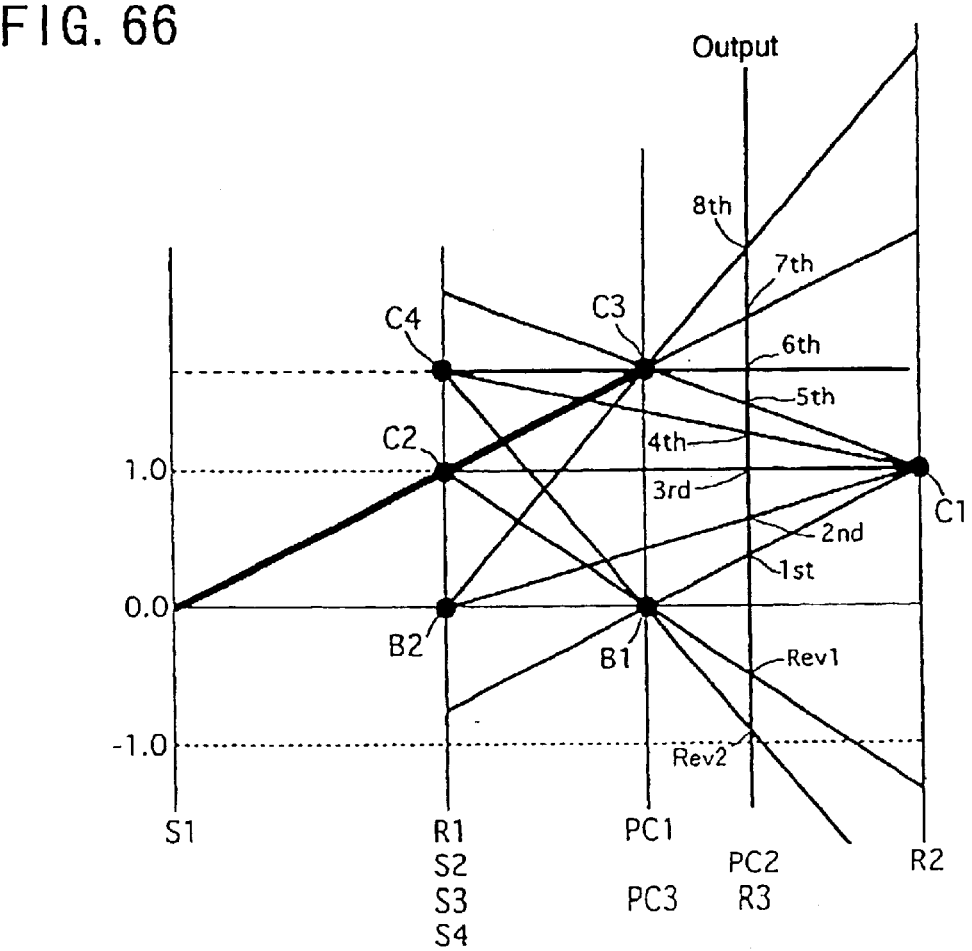
FIG. 66 is a collinear diagram in the automatic transmission gear-operated speed change apparatus of the ninth embodiment.

FIG. 66 is a collinear diagram showing the rotation-stopped state of the members at the individual gear ranges in the ninth embodiment and showing the torque flows at the individual gear ranges of the automatic transmission gear-operated speed change apparatus of the ninth embodiment. In FIG. 67 to FIG. 70, the torque transmission routes of clutches, brakes and members are indicated by thick lines, and the torque transmission routes of gears are indicated by hatching them. Here, the engagement tables of the ninth embodiment gear-operated speed change apparatus are identical to those of the first embodiment gear-operated speed change apparatus shown in FIG. 2, so that their illustrations are omitted.

Here will be described the torque flows at the individual gear ranges of the eight forward speeds and the two reverse speeds.

<1st Speed>

As shown in FIG. 2(b), the 1st speed is achieved by the engagements of the first clutch C1 and the first brake B1.

Figure 67A:
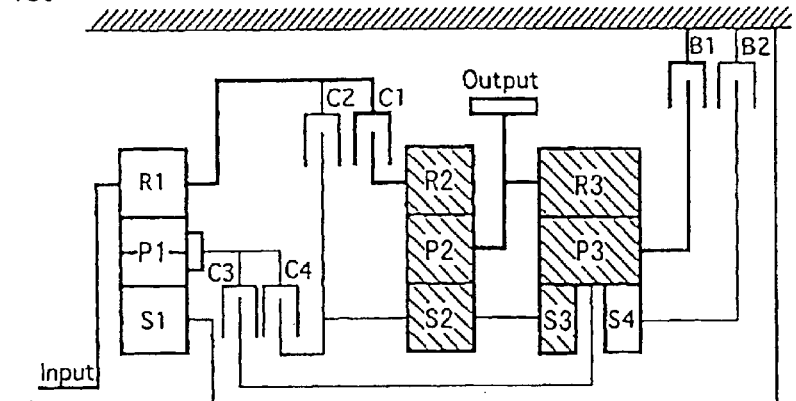
FIGS. 67a–67c present torque flow diagrams of the automatic transmission gear-operated speed change apparatus of the ninth embodiment at 1st, 2nd and 3rd speeds.

In the torque flow at this 1st speed, as shown in FIG. 67(a), the torque is applied to the first clutch C1, the first brake B1 and the individual members, as indicated by the thick lines, and to the second planetary gear set G2 and the third planetary gear set G3 (excepting the fourth sun gear S4), as hatched. In short, at the 1st speed, the second planetary gear set G2 and the third planetary gear set G3, as constructing the Ishimaru type planetary gear train, participate in the torque transmission.

<2nd Speed>

As shown in FIG. 2(b), the 2nd speed is achieved by releasing the first brake B1 at the 1st speed and engaging the second brake B2, that is, by engaging the first clutch C1 and the second brake B2.

Figure 67B:
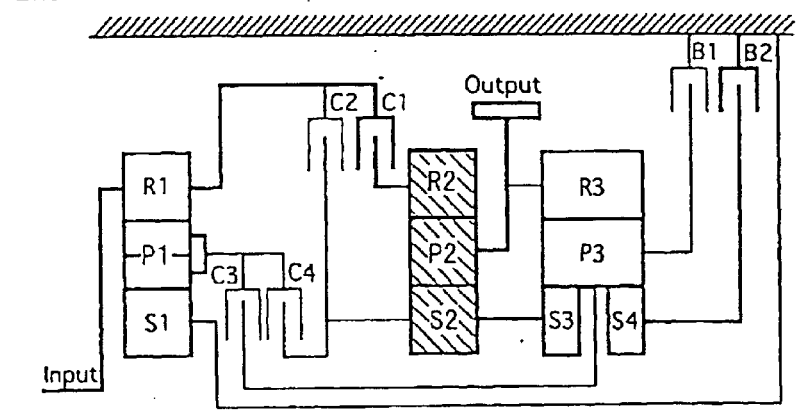

In the torque flow at this 2nd speed, as shown in FIG. 67(b), the torque is applied to the first clutch C1, the second brake B2 and the individual members, as indicated by the thick lines, and to the second planetary gear set G2, as hatched.

<3rd Speed>

As shown in FIG. 2(b), the 3rd speed is achieved by releasing the second brake B2 at the 2nd speed and engaging the second clutch C2, that is, by engaging the first clutch C1 and the second clutch C2.

Figure 67C:
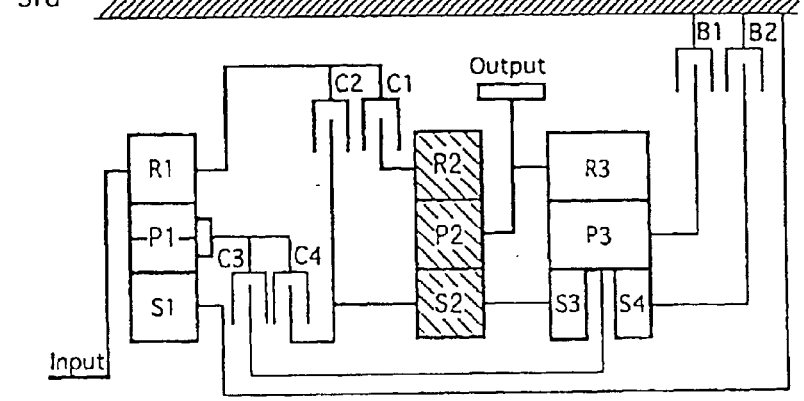

In the torque flow at this 3rd speed, as shown in FIG. 67(c), the torque is applied to the first clutch C1, the second clutch C2 and the individual members, as indicated by the thick lines, and to the second planetary gear set G2, as hatched.

<4th Speed>

As shown in FIG. 2(b), the 4th speed is achieved by releasing the second clutch C2 at the 3rd speed and engaging the fourth clutch C4, that is, by engaging the first clutch C1 and the fourth clutch C4.

Figure 68A:
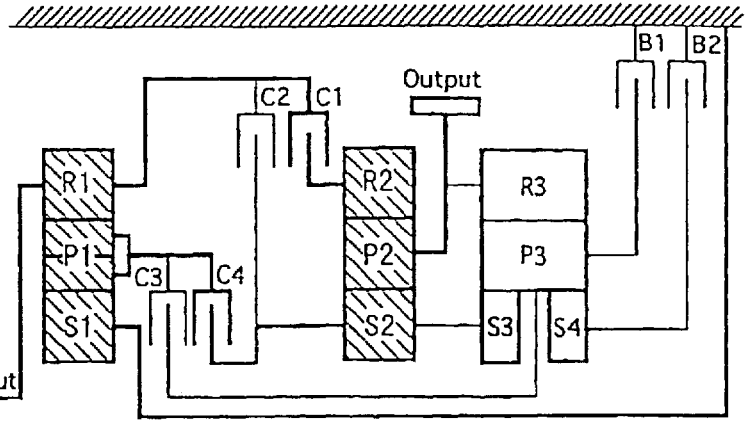
FIGS. 68a–68c present torque flow diagrams of the automatic transmission gear-operated speed change apparatus of the ninth embodiment at 4th, 5th and 6th speeds.

In the torque flow at this 4th speed, as shown in FIG. 68(a), the torque is applied to the first clutch C1, the fourth clutch C4 and the individual members, as indicated by the thick lines, and to the first planetary gear set G1 and the second planetary gear set G2, as hatched.

<5th Speed>

As shown in FIG. 2(b), the 5th speed is achieved by releasing the fourth clutch C4 at the 4th speed and engaging the third clutch C3, that is, by engaging the first clutch C1 and the third clutch C3.

Figure 68B:
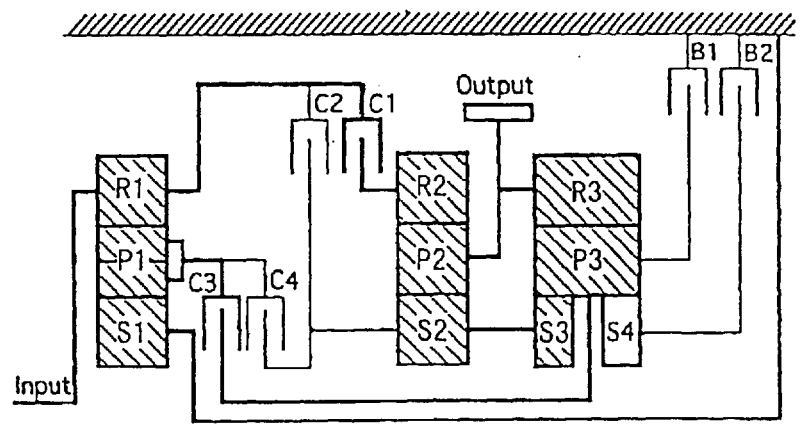

In the torque flow at this 5th speed, as shown in FIG. 68(b), the torque is applied to the first clutch C1, the third clutch C3 and the individual members, as indicated by the thick lines, and to the first planetary gear set G1, the second planetary gear set G2 and the third planetary gear set G3 (excepting the fourth sun gear S4), as hatched.

(6th Speed)

As shown in FIG. 2(b), the 6th speed is achieved by releasing the first clutch C1 at the 5th speed and engaging the fourth clutch C4, that is, by engaging the third clutch C3 and the fourth clutch C4.

Figure 68C:
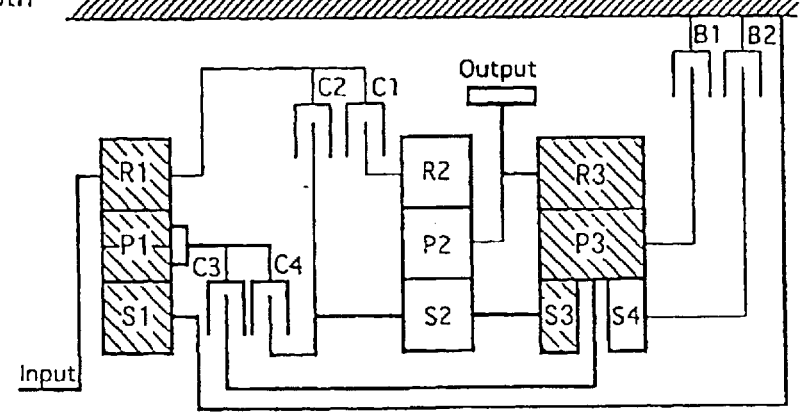

In the torque flow at this 6th speed, as shown in FIG. 68(c), the torque is applied to the third clutch C3, the fourth clutch C4 and the individual members, as indicated by the thick lines, and to first planetary gear set G1 and the third planetary gear set G3 (excepting the fourth sun gear S4), as hatched.

(7th Speed)

As shown in FIG. 2(b), the 7th speed is achieved by releasing the fourth clutch C4 at the 6th speed and engaging the second clutch C2, that is, by engaging the second clutch C2 and the third clutch C3.

Figure 69A:
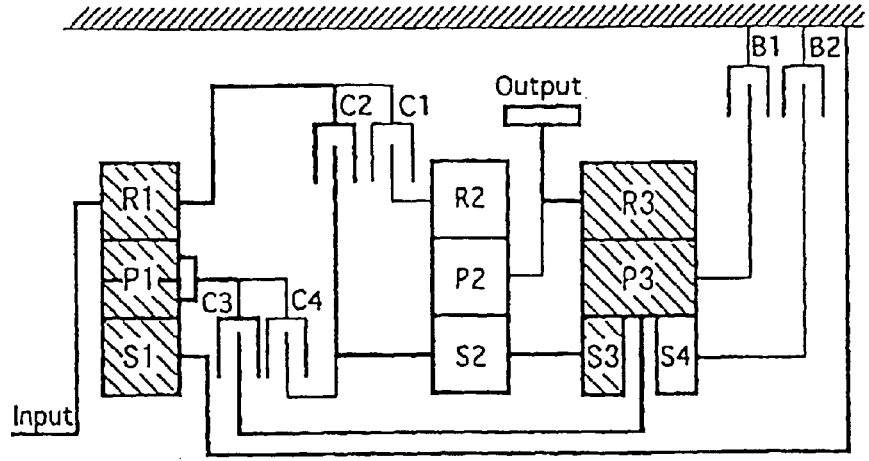
FIGS. 69a and 69b present torque flow diagrams of the automatic transmission gear-operated speed change apparatus of the ninth embodiment at 7th and 8th speeds.

In the torque flow at this 7th speed, as shown in FIG. 69(a), the torque is applied to the second clutch C2, the third clutch C3 and the individual members, as indicated by the thick lines, and to the first planetary gear set G1 and the third planetary gear set G3 (excepting the fourth sun gear S4), as hatched.

(8th Speed)

As shown in FIG. 2(b), the 8th speed is achieved by releasing the second clutch C2 at the 7th speed and engaging the second brake B2, that is, by engaging the third clutch C3 and the second brake B2.

Figure 69B:
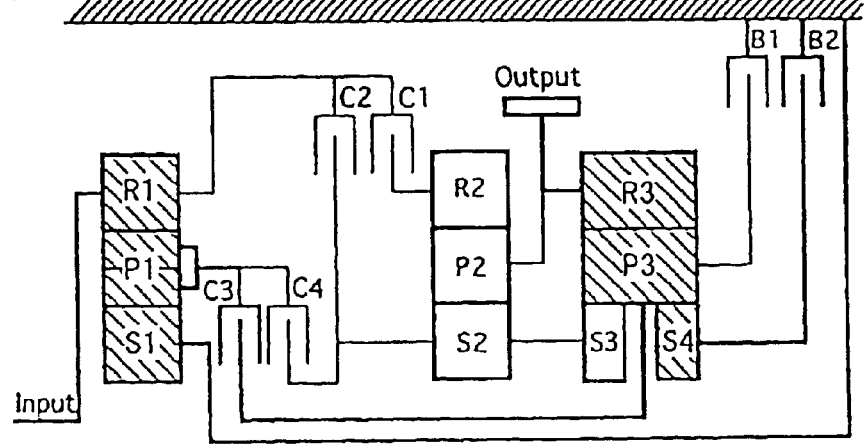

In the torque flow at this 8th speed, as shown in FIG. 69(b), the torque is applied to the third clutch C3, the second brake B2 and the individual members, as indicated by the thick lines, and to the first planetary gear set G1 and the third planetary gear set G3 (excepting the third sun gear S3), as hatched.

(Reverse 1st Speed)

As shown in FIG. 2(b), the reverse speed is achieved by engaging the second clutch C2 and the first brake B1.

Figure 70A:
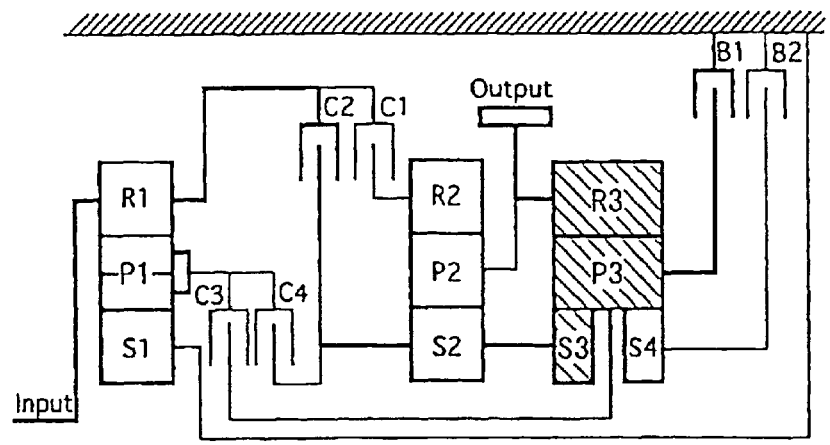
FIGS. 70a and 70b present torque flow diagrams of the automatic transmission gear-operated speed change apparatus of the ninth embodiment at reverse 1st and reverse 2nd speeds.

In the torque flow at this reverse 1st speed, as shown in FIG. 70(a), the torque is applied to the second clutch C2, the first brake B1 and the individual members, as indicated by the thick lines, and to the third planetary gear set G3 (excepting the fourth sun gear S4), as hatched.

(Reverse 2nd Speed)

As shown in FIG. 2(b), the reverse 2nd speed is achieved by releasing the second clutch C2 at the reverse 1st speed and engaging the fourth clutch C4, that is, by engaging the fourth clutch C4 and the first brake B1.

Figure 70B:
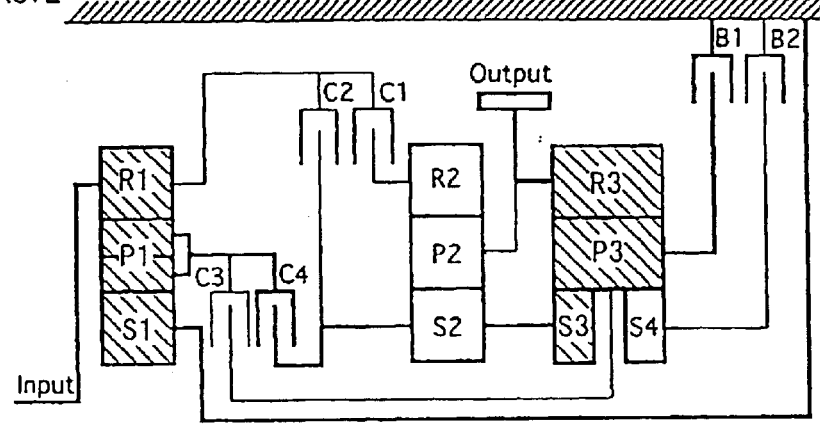

In the torque flow at this reverse 2nd speed, as shown in FIG. 70(b), the torque is applied to the fourth clutch C4, the first brake B1 and the individual members, as indicated by the thick lines, and to the first planetary gear set G1 and the third planetary gear set G3 (excepting the fourth sun gear S4), as hatched.

The effects will be described in the following.

As has been described hereinbefore, the automatic transmission gear-operated speed change apparatus of the ninth embodiment can obtain the following effects in addition to effect (7) of the first embodiment and the effects (9), (11), (12) and (14) of the third embodiment gear-operated speed change apparatus.

(19) The first planetary gear set G1 acting as the speed-increasing device is made of the double-pinion type planetary gear set so that the layout suited for the FR car, i.e., the layout having the output portion on the opposite side of the input portion can be made (corresponding to Claim 6).

(20) The automatic transmission gear-operated speed change apparatus further comprises a hydraulic speed change control device including: the double-pinion type first planetary gear set G1 acting as the speed-increasing device and having the first sun gear S1, the first ring gear R1, and the first carrier PC1 for supporting the first double pinions P1 meshing with the two gears S1 and R1; the single-pinion type second planetary gear set G2 having the second sun gear S2, the second ring gear R2, and the second carrier PC2 for supporting the second pinion P2 meshing with the two gears S2 and R2; the double sun gear type third planetary gear set G3 having the two third sun gear S3 and fourth sun gear S4, the third carrier PC3 and the center member CM for supporting the third pinion P3 meshing with the two sun gears S3 and S4, and one third ring gear R3 meshing with the aforementioned third pinion P3; the input shaft Input connected to the first ring gear R1; the output shaft Output connected to the second carrier PC2; the first connection member M1 for connecting the second sun gear S2 and the third sun gear S3 like a single unit; the second connection member M3 for connecting the second carrier PC2 and the third ring gear R3 like a single unit; the first clutch C1 for connecting/disconnecting the first ring gear R1 and the second ring gear R2 selectively; the second clutch C2 for connecting/disconnecting the first ring gear R1 and the second sun gear S2 selectively; the third clutch C3 for connecting/disconnecting the first carrier PC1 and the center member CM selectively; the fourth clutch C4 for connecting/disconnecting the first carrier PC1 and the second sun gear S2 selectively; the first brake B1 for stopping the rotation of the third carrier PC3 selectively; and the second brake B2 for stopping the rotation of the fourth sun gear S4 selectively, for achieving at least seven forward speeds and one reverse speed. Therefore, the automatic transmission gear-operated speed change apparatus can achieve additional effects, as enumerated in the following (corresponding to Claim 17).

① At the 1st speed and 2nd speed for applying the high torques, the ring gear input can be achieved for the Ishimaru type planetary gear train, which is constructed of the second planetary gear set G2 and the third planetary gear set G3, and the automatic transmission can be made compact.

② At the 2nd speed, the torque circulation is eliminated to improve the transmission efficiency at the 2nd speed and the fuel economy.

Although the ninth embodiment gear-operated speed change apparatus has been described hereinbefore, any of the five patterns shown in FIG. 71 and FIG. 72 may be selected as the positioning pattern of the fourth clutch C4 in addition to the position of the fourth clutch C4, as shown in the schematic of FIG. 65, in case the 5th speed is achieved as the high gear range of the speed-increasing ratio of the first planetary gear set G1 by combining the gear-operated speed change apparatus with the hydraulic speed change control device for achieving seven forward speeds and one reverse speed.

The five patterns shown in FIG. 71 and FIG. 72 are examples, in which the second, third and fourth sun gears S2, S3 and S4 and the first connection member M1 are likewise given the speed-increased rotation by the engagement of the fourth clutch C4 when the center member CM and the third carrier PC3 are given the speed-increased rotation by the engagement of the third clutch C3 so as to change the 5th speed into the high gear range of the speed-increasing ratio of the first planetary gear set G1.

Figure 71A:
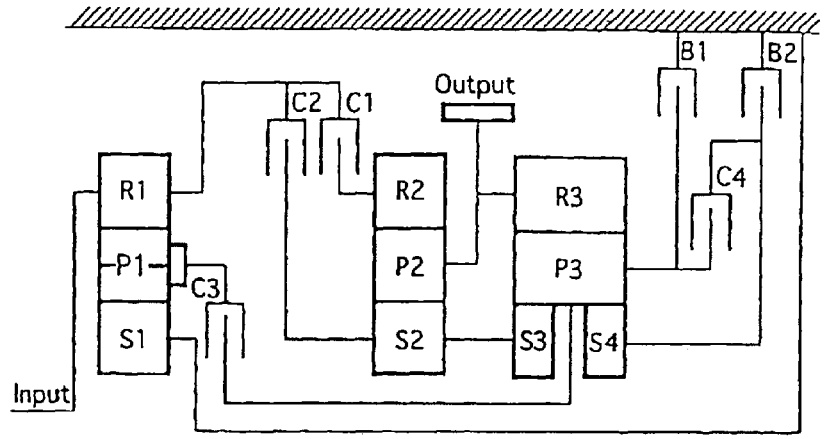
FIGS. 71a–71c present positioning pattern diagrams of a 4th clutch in the automatic transmission gear-operated speed change apparatus of the ninth embodiment.
Figure 71B:
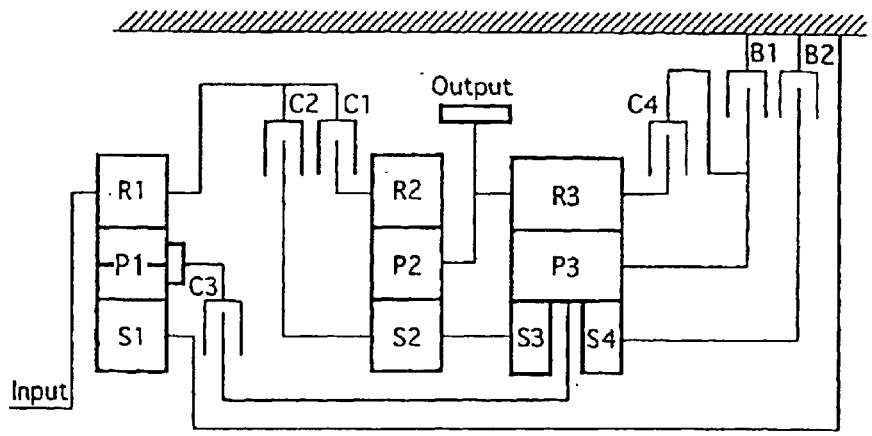
Figure 71C:
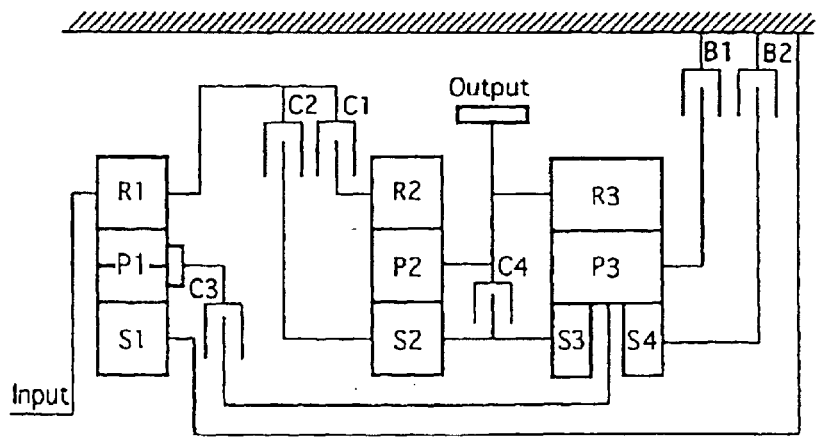
Figure 72A:
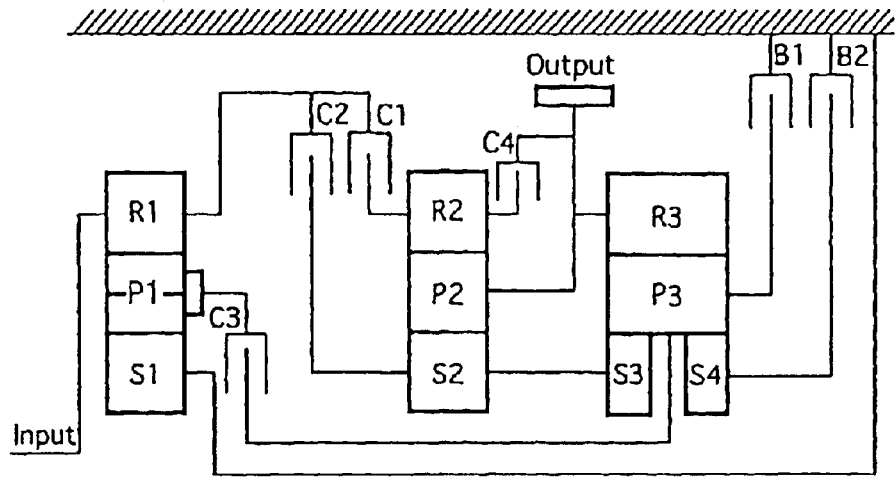
FIGS. 72a and 72b present positioning pattern diagrams of the 4th clutch in the automatic transmission gear-operated speed change apparatus of the ninth embodiment.

Specifically, the fourth clutch C4 is positioned:

①  between the third carrier PC3 and the fourth sun gear S4 (FIG. 71(a));

②  between the third ring gear R3 and the third carrier PC3 (FIG. 71(b));

③  between the first connection member M1 and the second connection member M2 (FIG. 71(c));

④  between the second ring gear R2 and the second carrier PC2 (FIG. 72(a)); or

Figure 72B:
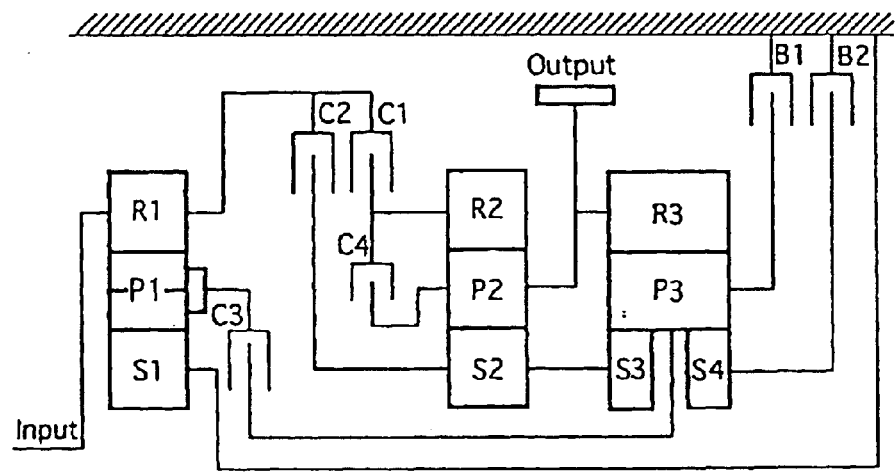

⑤  between the second ring gear R2 and the second carrier PC2 (FIG. 72(b)).

(Tenth Embodiment)

First of all, the arrangement will be described in the following.

The tenth embodiment is directed to automatic transmission gear-operated speed change apparatus corresponding to inventions defined in Claims 2, 6, 9, 10, 18, 20 and 22, and FIG. 73 and FIG. 74 are schematic diagrams showing the automatic transmission gear-operated speed change apparatus of the tenth embodiment.

In FIG. 73 and FIG. 74: G1 designates a first planetary gear set; G2 a second planetary gear set; G3 a third planetary gear set; M1 a first connection member; M2 a second connection member; C1 a first clutch; C2 a second clutch; C3 a third clutch; C4 a fourth clutch; B1 a first brake; B2 a second brake; Input an input shaft (or an input portion); and Output an output shaft (or an output portion).

The automatic transmission gear-operated speed change apparatus (referred to as that of a speed-increasing double type 2) of the tenth embodiment is an example, in which the first planetary gear set G1 of a double-pinion type is positioned as a speed-increasing device at the left-hand end portion of FIG. 73 and FIG. 74, in which the second planetary gear set G2 of a double sun gear type is positioned at the central portion and in which the third planetary gear set G3 of a single-pinion type is positioned at the right-hand end portion. And, the aforementioned second planetary gear set G2 and third planetary gear set G3 construct the so-called "Ishimaru type planetary gear train".

The aforementioned first planetary gear set G1 is a double-pinion type planetary gear set acting as the speed-increasing device, which includes: a first sun gear S1; a first ring gear R1; and a first carrier PC1 for supporting first double pinions P1 meshing with the two gears S1 and R1.

The aforementioned second planetary gear set G2 is the double sun gear type planetary gear set, which includes: two second sun gear S2 and fourth sun gear S4; a second carrier PC2 and a center member CM for supporting a second pinion P2 meshing individually with the two sun gears S2 and S4; and one second ring gear R2 meshing with the aforementioned second pinion P2.

The aforementioned third planetary gear set G3 is the single-pinion type planetary gear set, which includes: a third sun gear S3; a third ring gear R3; and a third carrier PC3 for supporting the third pinion P3 meshing with the two gears S3 and R3.

The aforementioned input shaft Input is connected to the first ring gear R1, and the aforementioned output shaft Output is connected to the center member CM.

The aforementioned first connection member M1 connects the second sun gear S2 and the third sun gear S3 like a single unit, and the aforementioned second connection member M2 connects the second carrier PC2 and the third ring gear R3 like a single unit.

The aforementioned first clutch C1 connects/disconnects the first ring gear R1 and the second ring gear R2 selectively. The aforementioned second clutch C2 connects/disconnects the first ring gear R1 and the fourth sun gear S4 selectively. The aforementioned third clutch C3 connects/disconnects the first carrier PC1 and the third carrier PC3 selectively.

Any of the five patterns shown in FIG. 73 and FIG. 74 is selected as the positioning pattern of the fourth clutch C4, in case the 5th speed is achieved as the high gear range of the speed-increasing ratio of the first planetary gear set G1 by combining the gear-operated speed change apparatus with the hydraulic speed change control device for achieving seven forward speeds and one reverse speed.

The five patterns shown in FIG. 73 and FIG. 74 are examples, in which the second, third and fourth sun gears S2, S3 and S4 and the first connection member M1 are likewise given the speed-increased rotation by the engagement of the fourth clutch C4 when the center member CM and the third carrier PC3 are given the speed-increased rotation by the engagement of the third clutch C3 so as to change the 5th speed into the high gear range of the speed-increasing ratio of the first planetary gear set G1.

Figure 73A:
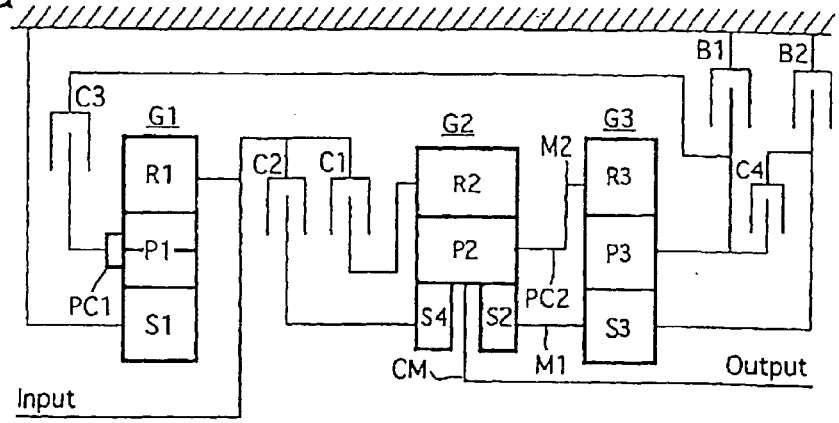
FIGS. 73a–73c show a gear-operated speed change apparatus for an automatic transmission of a tenth embodiment and presents schematic diagrams of different positioning patterns of a fourth clutch.
Figure 73B:
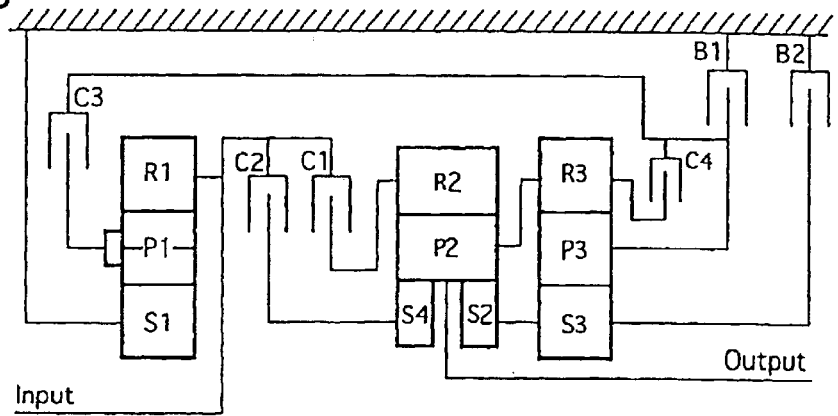
Figure 73C:
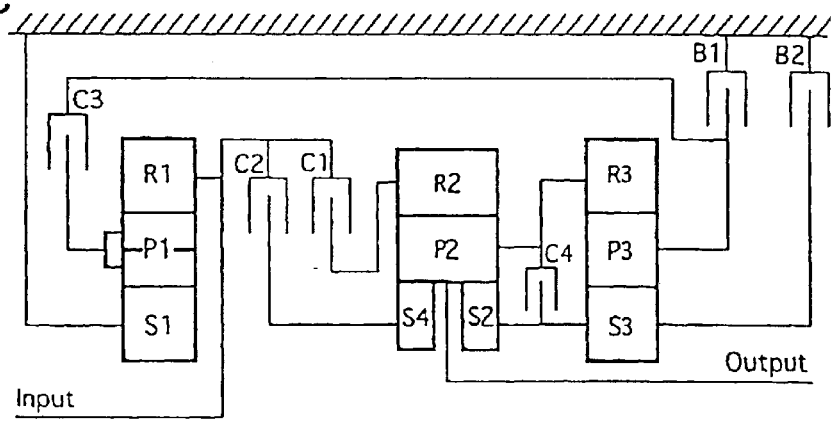
Figure 74A:
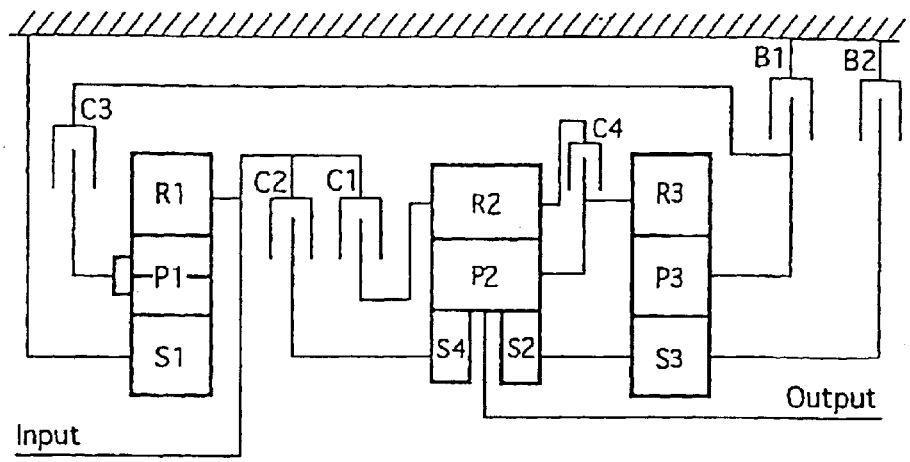
FIGS. 74a and 74b show the automatic transmission gear-operated speed change apparatus of the tenth embodiment and presents schematic diagrams of different positioning patterns of the fourth clutch.

Specifically, the fourth clutch C4 is positioned:

①  between the third carrier PC3 and the third sun gear S3 (FIG. 73(a));

②  between the third ring gear R3 and the third carrier PC3 (FIG. 73(b));

③  between the first connection member M1 and the second connection member M2 (FIG. 73(c));

④  between the second ring gear R2 and the second carrier PC2 (FIG. 74(a)); or

Figure 74B:
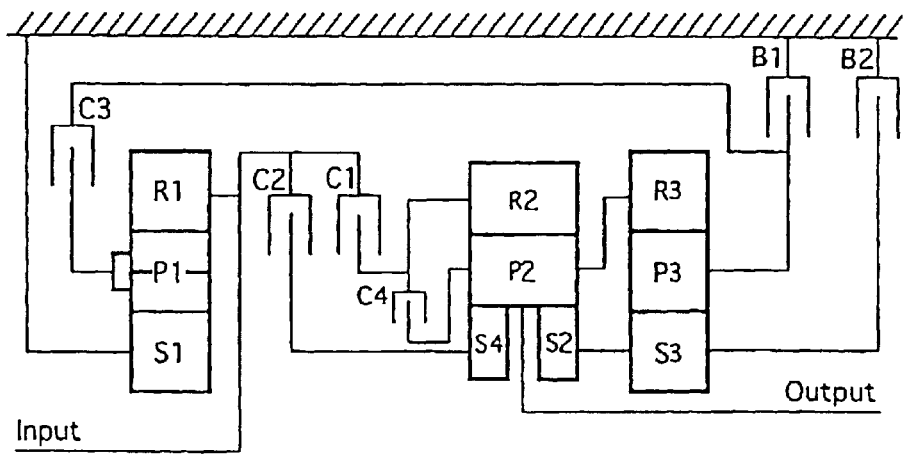

⑤  between the second ring gear R2 and the second carrier PC2 (FIG. 74(b)).

The aforementioned first brake B1 stops the rotation of the third carrier PC3 selectively. The aforementioned second brake B2 stops the rotation of the third sun gear S3 selectively.

To the aforementioned individual clutches C1, C2, C3 and C4 and individual brakes B1 and B2, there is connected the not-shown hydraulic speed change control device (or speed change control means defined in Claim 18) for establishing engagement pressures (with circle symbols) and release pressures (with no symbol) at individual speed ranges of seven forward speeds and one reverse speed, as shown in an engagement table of FIG. 2(a).

The shifting actions of this tenth embodiment are similar to those of the ninth embodiment, so that their illustrations and descriptions are omitted.

The effects will be described in the following.

As has been described hereinbefore, the automatic transmission gear-operated speed change apparatus of the tenth embodiment can obtain the following effects in addition to the effect (7) of the first embodiment, the effects (9), (11), (12) and (14) of the third embodiment and the effect (19) of the ninth embodiment.

(21) The automatic transmission gear-operated speed change apparatus further comprises a hydraulic speed change control device including: the double-pinion type first planetary gear set G1 acting as the speed-increasing device and having the first sun gear S1, the first ring gear R1, and the first carrier PC1 for supporting the first double pinions P1 meshing with the two gears S1 and R1; the double sun gear type second planetary gear set G2 having the two second sun gear S2 and fourth sun gear S4, the second carrier PC2 and the center member CM for supporting the second pinion P2 meshing individually with the two sun gears S2 and S4, and one second ring gear R2 meshing with the aforementioned second pinion P2; the single-pinion type third planetary gear set G3 having the third sun gear S3, the third ring gear R3, and the third carrier PC3 for supporting the third pinion P3 meshing with the two gears S3 and R3; the input shaft Input connected to the first ring gear R1; the output shaft Output connected to the center member CM; the first connection member M1 for connecting the second sun gear S2 and the third sun gear S3 like a single unit; the second connection member M3 for connecting the second carrier PC2 and the third ring gear R3 like a single unit; the first clutch C1 for connecting/disconnecting the first ring gear R1 and the second ring gear R2 selectively; the second clutch C2 for connecting/disconnecting the first ring gear R1 and the fourth sun gear S4 selectively; the third clutch C3 for connecting/disconnecting the first carrier PC1 and the third carrier PC3 selectively; the fourth clutch C4 for giving the speed-increased rotation to the second, third and fourth sun gears S2, S3 and S4 and the first connection member M1 by the engagement of the fourth clutch C4, when the center member CM and the third carrier PC3 are given the speed-increased rotation by the engagement of the third clutch C3; the first brake B1 for stopping the rotation of the third carrier PC3 selectively; and the second brake B2 for stopping the rotation of the third sun gear S3 selectively, for achieving seven forward speeds and one reverse speed. Therefore, the automatic transmission gear-operated speed change apparatus can achieve additional effects, as enumerated in the following (corresponding to Claim 18).

① At the 1st speed and 2nd speed for applying the high torques, the ring gear input can be achieved for the Ishimaru type planetary gear train, which is constructed of the second planetary gear set G2 and the third planetary gear set G3, and the automatic transmission can be made compact.

② At the 2nd speed, the torque circulation is eliminated to improve the transmission efficiency at the 2nd speed and the fuel economy.

③ When the gear-operated speed change apparatus is to be applied to the automatic transmission of the FR car, the layout can be set such that the number of members passing on the inner side of the second planetary gear set G2 of the double sun gear type is reduced to one, thereby to reduce the size of the Ishimaru type planetary gear train to make the gear-operated speed change apparatus compact.

(Eleventh Embodiment)

First of all, the arrangement will be described in the following.

The eleventh embodiment is an example (of a speed-reducing single type 1+a stepped pinion type), in which the third planetary gear set G3 of the first embodiment gear-operated speed change apparatus (or the speed-reducing single type 1) is exemplified by the stepped pinion.

Figure 75A:
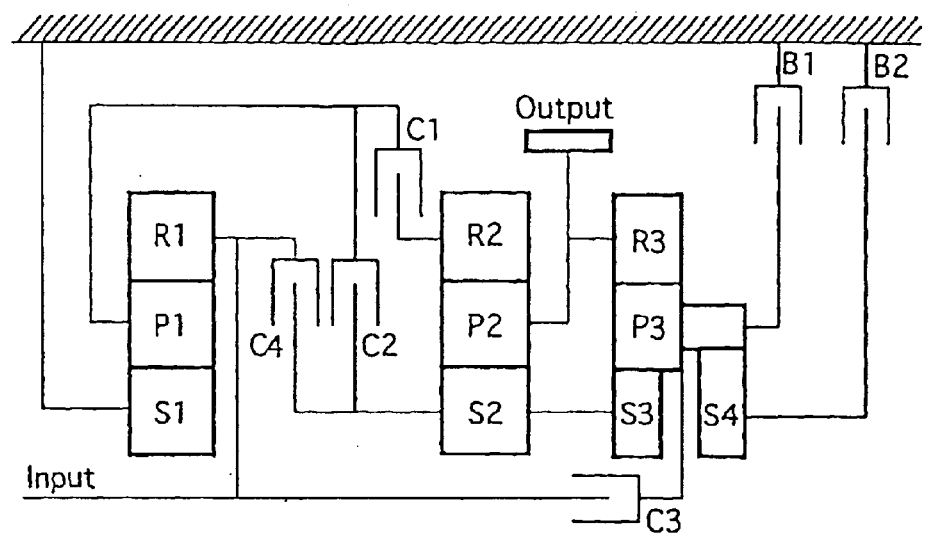
FIGS. 75a and 75b present schematic diagrams showing stepped pinion patterns of a gear-operated speed change apparatus for an automatic transmission of an eleventh embodiment.
Figure 75B:
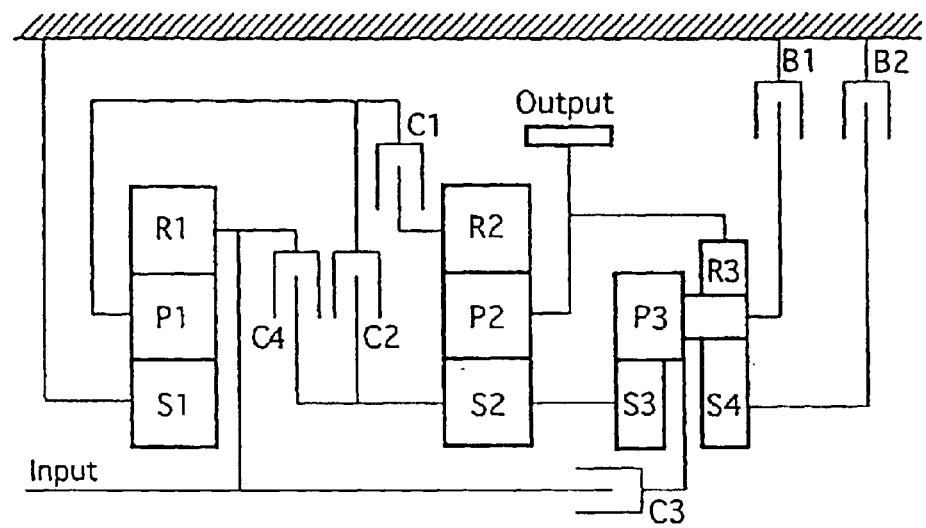

FIG. 75($a$) shows an example, in which the third sun gear S3 and the fourth sun gear S4 of the first embodiment gear-operated speed change apparatus (of the speed-reducing single type 1) are given different tooth numbers to change the third pinion P3 into a third stepped pinion P3 having portions of different tooth numbers and of a larger diameter meshing with the third sun gear S3 and of a smaller diameter meshing with the fourth sun gear S4 and in which the third ring gear R3 meshes with the diametrically larger portion of the third stepped pinion P3.

FIG. 75($b$) shows an example, in which the third sun gear S3 and the fourth sun gear S4 of the first embodiment gear-operated speed change apparatus (of the speed-reducing single type 1) are given different tooth numbers to change the third pinion P3 into a third stepped pinion P3 having portions of different tooth numbers and of a larger diameter meshing with the third sun gear S3 and of a smaller diameter meshing with the fourth sun gear S4 and in which the third ring gear R3 meshes with the diametrically smaller portion of the third stepped pinion P3.

Figure 76A:
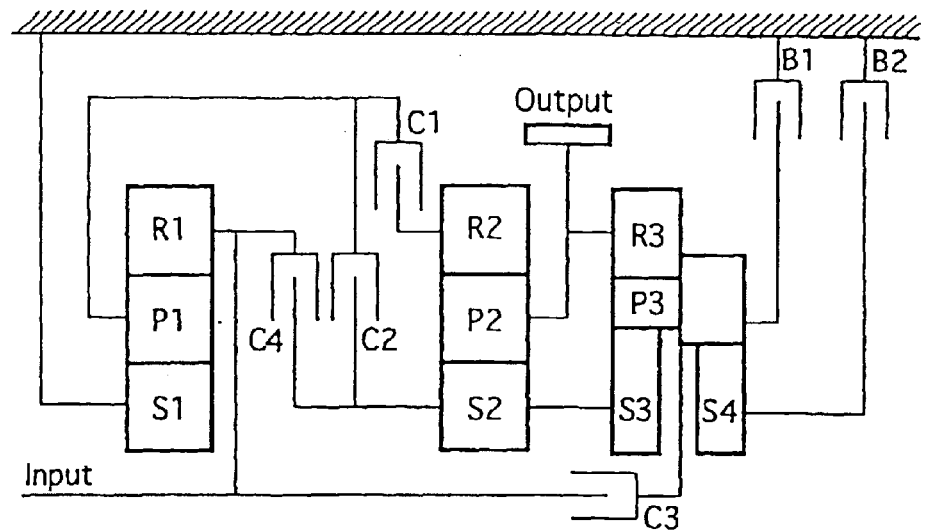
FIGS. 76a and 76b present schematic diagrams showing stepped pinion patterns of the automatic transmission gear-operated speed change apparatus of the eleventh embodiment.
Figure 76B:
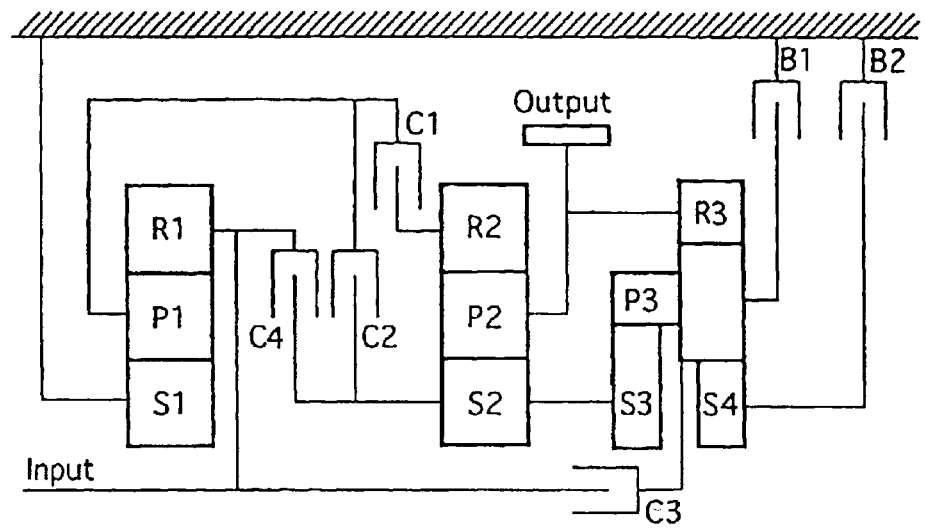

FIG. 76($a$) shows an example, in which the third sun gear S3 and the fourth sun gear S4 of the first embodiment gear-operated speed change apparatus (of the speed-reducing single type 1) are given different tooth numbers to change the third pinion P3 into a third stepped pinion P3 having portions of different tooth numbers and of a smaller diameter meshing with the third sun gear S3 and of a larger diameter meshing with the fourth sun gear S4 and in which the third ring gear R3 meshes with the diametrically smaller portion of the third stepped pinion P3.

FIG. 76($b$) shows an example, in which the third sun gear S3 and the fourth sun gear S4 of the first embodiment gear-operated speed change apparatus (of the speed-reducing single type 1) are given different tooth numbers to change the third pinion P3 into a third stepped pinion P3 having portions of different tooth numbers and of a smaller diameter meshing with the third sun gear S3 and of a larger diameter meshing with the fourth sun gear S4 and in which the third ring gear R3 meshes with the diametrically larger portion of the third stepped pinion P3.

Here, the remaining arrangements are similar to those of the first embodiment so that their descriptions are omitted.

The actions will be described in the following.

Figure 77:
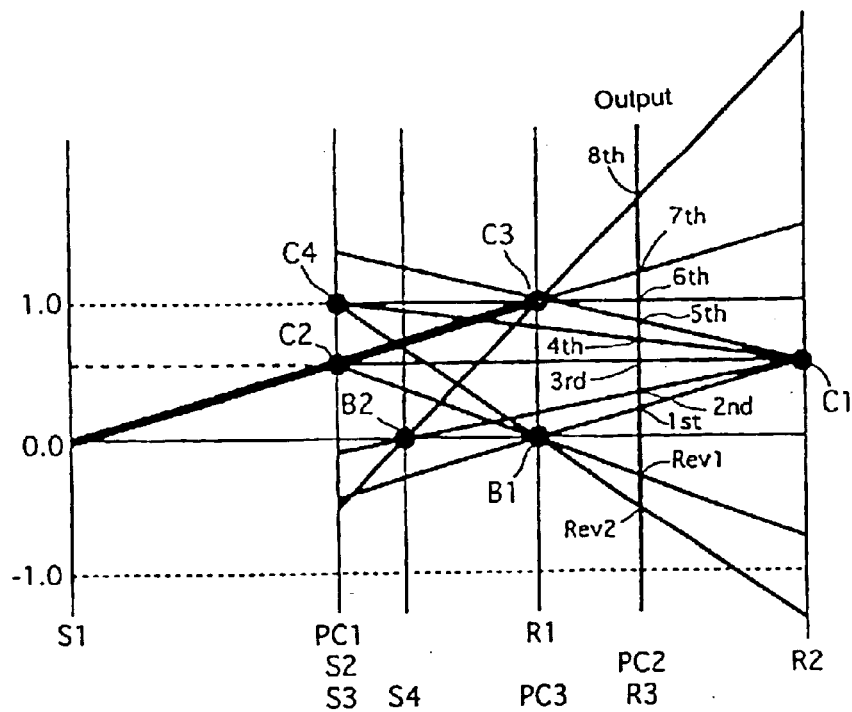
FIG. 77 is a collinear diagram in the eleventh embodiment gear-operated speed change apparatus shown in FIG. 75.
Figure 78:
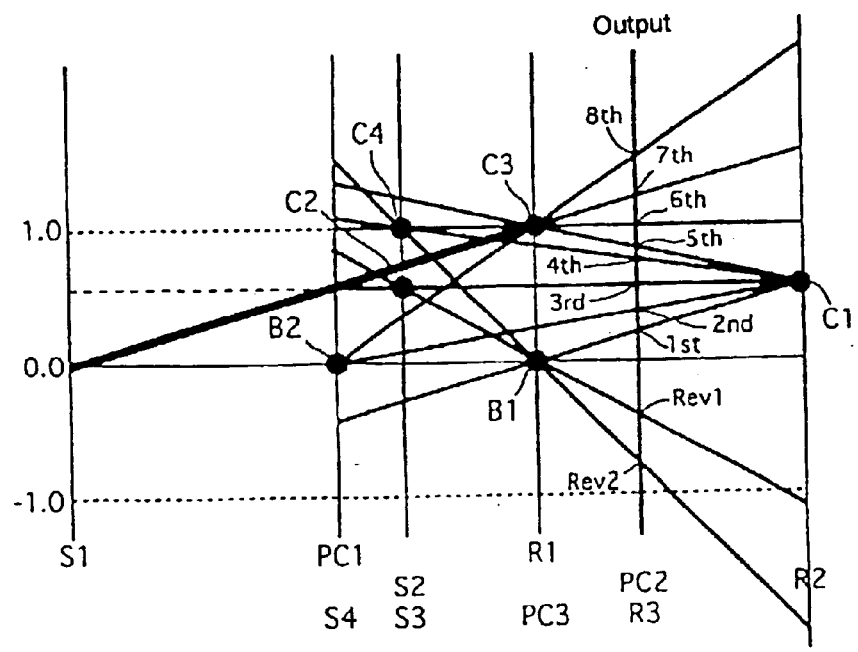
FIG. 78 is a collinear diagram in the eleventh embodiment gear-operated speed change apparatus shown in FIG. 76.

FIG. 77 is a collinear diagram showing the rotation-stopped state of the members at the individual gear ranges in the eleventh embodiment gear-operated speed change apparatus shown in FIG. 75, and FIG. 78 is a collinear diagram showing the rotation-stopped state of the members at the individual gear ranges in the eleventh embodiment gear-operated speed change apparatus shown in FIG. 76.

In the eleventh embodiment, as compared with the first embodiment, the rotational speeds of the second and third sun gears S2 and S3 are different from the rotational speed of the fourth sun gear S4. Here, between the collinear diagram of FIG. 77 and the collinear diagram of FIG. 48, there are reversed the position of the rotary member having the second and third sun gears S2 and S3 and the position of the rotary member having the fourth sun gear S4.

The effects will be described in the following.

As has been described hereinbefore, the automatic transmission gear-operated speed change apparatus of the eleventh embodiment can obtain the following effects in addition to the effects (excepting the effect (7)) of the first embodiment.

(22) The double sun gear type third planetary gear set G3 is the planetary gear set which includes: the two sun gears S3 and S4 having the different tooth numbers; and the third stepped pinion P3 of the different tooth numbers to mesh individually with the two sun gears S3 and S4. Therefore, the ratios between ranges can be made wider to improve the degree of freedom for setting the gear ratios better and to enhance the degree of freedom for the design. Specifically, there is raised the degree of freedom for the gear ratios for the 2nd speed and the highest gear range.

(Twelfth Embodiment)

First of all, the arrangement will be described in the following.

The twelfth embodiment is an example (of a speed-reducing single type 2+a stepped pinion type), in which the third planetary gear set G3 of the second embodiment gear-operated speed change apparatus (of a speed-reducing single type 2) is exemplified by a stepped pinion.

Figure 79A:
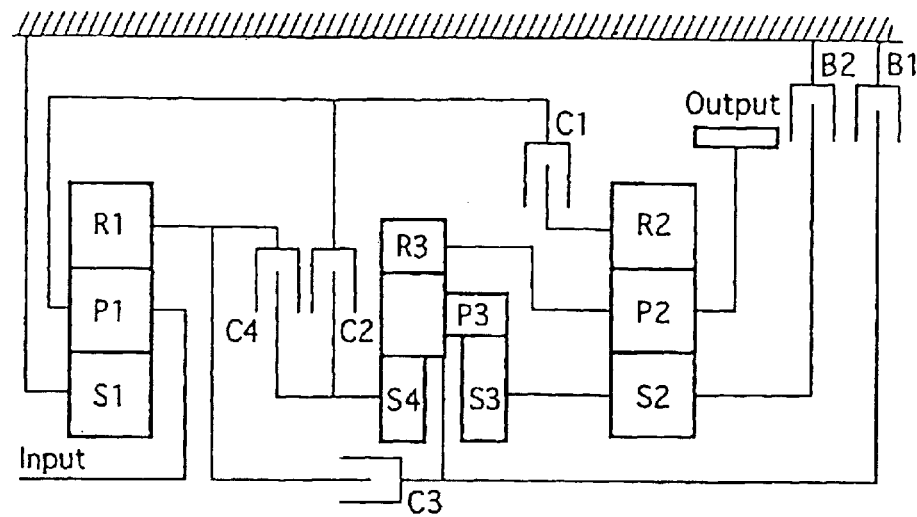
FIGS. 79a and 79b present schematic diagrams showing stepped pinion patterns of a gear-operated speed change apparatus for an automatic transmission of a twelfth embodiment.

FIG. 79($a$) shows an example, in which the third sun gear S3 and the fourth sun gear S4 of the second embodiment gear-operated speed change apparatus (of the speed-reducing single type 2) are given different tooth numbers to change the third pinion P3 into a third stepped pinion P3 having portions of different tooth numbers and of a larger diameter meshing with the fourth sun gear S4 and of a smaller diameter meshing with the third sun gear S3 and in which the third ring gear R3 meshes with the diametrically larger portion of the third stepped pinion P3.

Figure 79B:
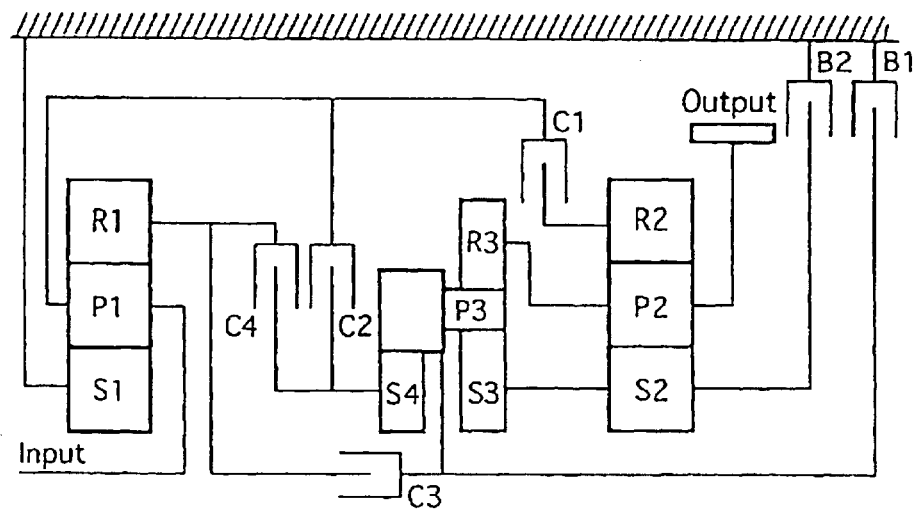

FIG. 79(b) shows an example, in which the third sun gear S3 and the fourth sun gear S4 of the second embodiment gear-operated speed change apparatus (of the speed-reducing single type 2) are given different tooth numbers to change the third pinion P3 into a third stepped pinion P3 having portions of different tooth numbers and of a larger diameter meshing with the fourth sun gear S4 and of a smaller diameter meshing with the third sun gear S3 and in which the third ring gear R3 meshes with the diametrically smaller portion of the third stepped pinion P3.

Figure 80A:
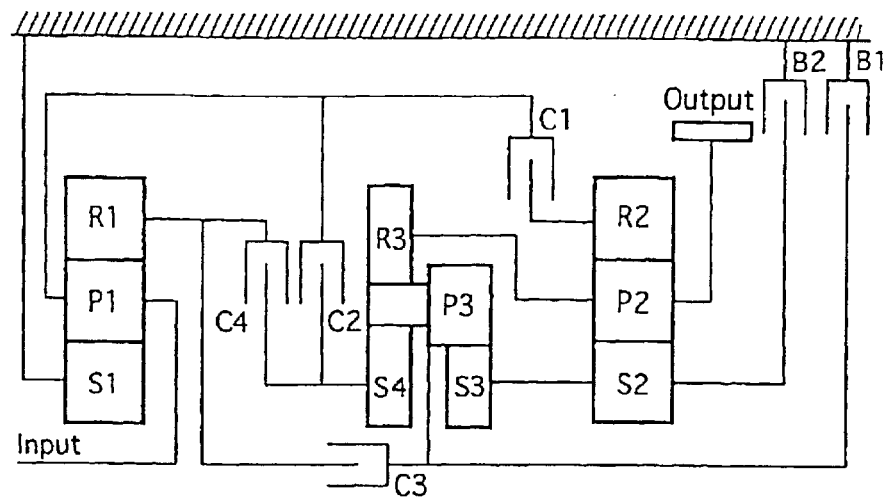
FIGS. 80a and 80b present schematic diagrams showing stepped pinion patterns of the automatic transmission gear-operated speed change apparatus of the twelfth embodiment.

FIG. 80(a) shows an example, in which the third sun gear S3 and the fourth sun gear S4 of the second embodiment gear-operated speed change apparatus (of the speed-reducing single type 2) are given different tooth numbers to change the third pinion P3 into a third stepped pinion P3 having portions of different tooth numbers and of a smaller diameter meshing with the fourth sun gear S4 and of a larger diameter meshing with the third sun gear S3 and in which the third ring gear R3 meshes with the diametrically smaller portion of the third stepped pinion P3.

Figure 80B:
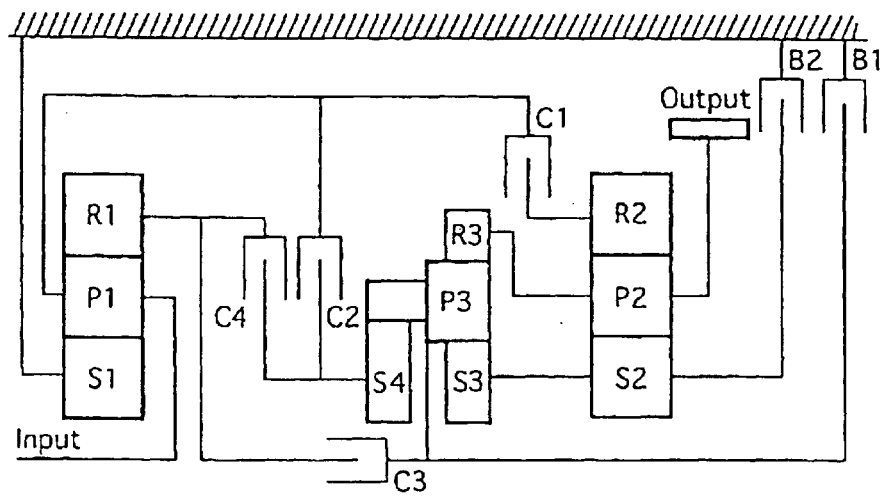

FIG. 80(b) shows an example, in which the third sun gear S3 and the fourth sun gear S4 of the second embodiment gear-operated speed change apparatus (of the speed-reducing single type 2) are given different tooth numbers to change the third pinion P3 into a third stepped pinion P3 having portions of different tooth numbers and of a smaller diameter meshing with the fourth sun gear S4 and of a larger diameter meshing with the third sun gear S3 and in which the third ring gear R3 meshes with the diametrically larger portion of the third stepped pinion P3.

Here, the remaining arrangements are similar to those of the second embodiment so that their descriptions are omitted.

The actions will be described in the following.

Figure 81:
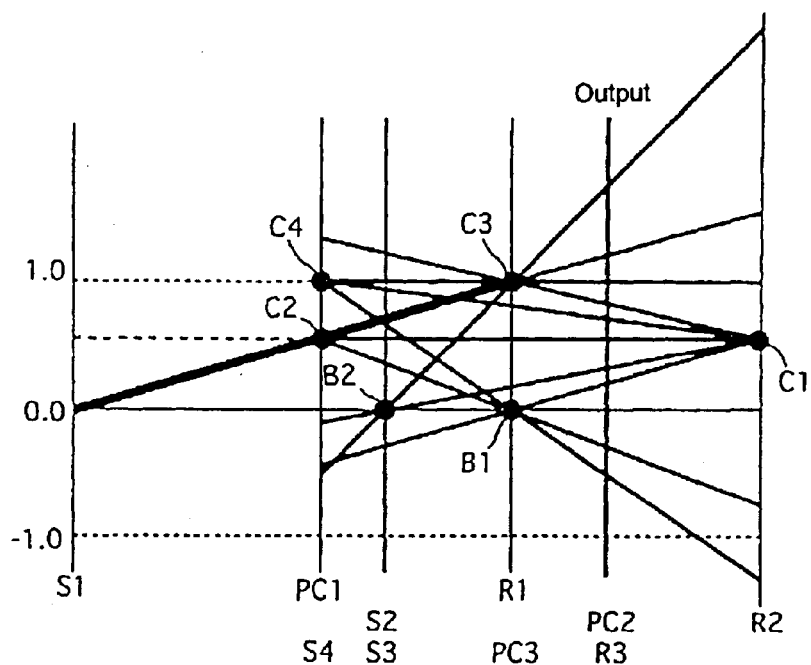
FIG. 81 is a collinear diagram in the twelfth embodiment gear-operated speed change apparatus shown in FIG. 79.
Figure 82:
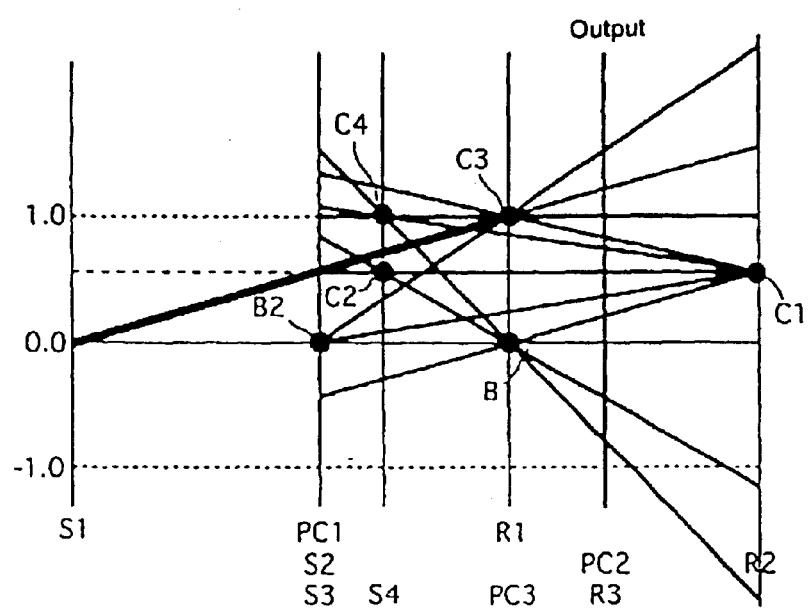
FIG. 82 is a collinear diagram in the twelfth embodiment gear-operated speed change apparatus shown in FIG. 80.

FIG. 81 is a collinear diagram showing the rotation-stopped state of the members at the individual gear ranges in the twelfth embodiment gear-operated speed change apparatus shown in FIG. 79, and FIG. 82 is a collinear diagram showing the rotation-stopped state of the members at the individual gear ranges in the twelfth embodiment gear-operated speed change apparatus shown in FIG. 80.

In the twelfth embodiment, as compared with the second embodiment, the rotational speeds of the second and third sun gears S2 and S3 are different from the rotational speed of the fourth sun gear S4. Here, between the collinear diagram of FIG. 81 and the collinear diagram of FIG. 82, there are reversed the position of the rotary member having the second and third sun gears S2 and S3 and the position of the rotary member having the fourth sun gear S4.

The effects will be described in the following.

As has been described hereinbefore, the automatic transmission gear-operated speed change apparatus of the twelfth embodiment can obtain the following effects, in addition to the effects (excepting the effect (7)) of the second embodiment: the double sun gear type third planetary gear set G3 is the planetary gear set which includes: the two sun gears S3 and S4 having the different tooth numbers; and the third stepped pinion P3 of the different tooth numbers to mesh individually with the two sun gears S3 and S4. Therefore, the ratios between ranges can be made wider to improve the degree of freedom for setting the gear ratios better and to enhance the degree of freedom for the design. Specifically, there is raised the degree of freedom for the gear ratios for the 2nd speed and the highest gear range.

(Thirteenth Embodiment)

First of all, the arrangement will be described in the following.

The thirteenth embodiment is an example (of a speed-reducing double type 1+a stepped pinion type), in which the third planetary gear set G3 of the fifth embodiment gear-operated speed change apparatus (of a speed-reducing double type 1) is exemplified by the stepped pinion.

Figure 83A:
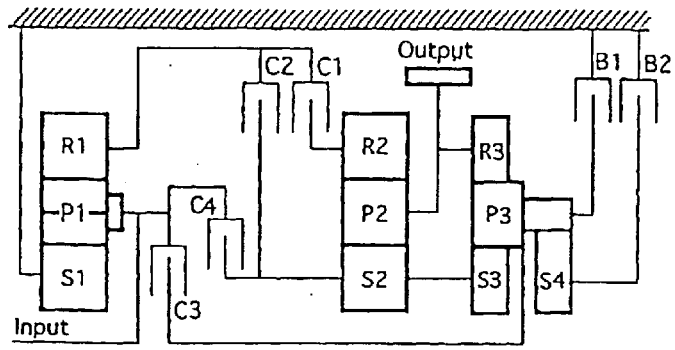
FIGS. 83*a*–83*d* present schematic diagrams showing stepped pinion patterns of a gear-operated speed change apparatus for an automatic transmission of a thirteenth embodiment.

FIG. 83(a) shows an example, in which the third sun gear S3 and the fourth sun gear S4 of the fifth embodiment gear-operated speed change apparatus (of the speed-reducing double type 1) are given different teeth numbers to change the third pinion P3 into a third stepped pinion P3 having portions of different teeth numbers and of a larger diameter meshing with the third sun gear S3 and of a smaller diameter meshing with the fourth sun gear S4 and in which the third ring gear R3 meshes with the diametrically larger portion of the third stepped pinion P3.

Figure 83B:
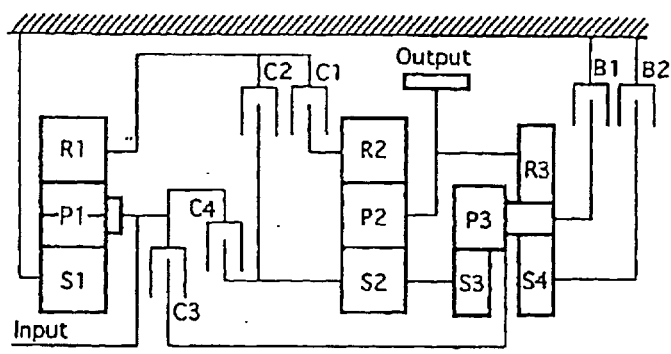

FIG. 83(b) shows an example, in which the third sun gear S3 and the fourth sun gear S4 of the fifth embodiment gear-operated speed change apparatus (of the speed-reducing double type 1) are given different teeth numbers to change the third pinion P3 into a third stepped pinion P3 having portions of different teeth numbers and of a larger diameter meshing with the third sun gear S3 and of a smaller diameter meshing with the fourth sun gear S4 and in which the third ring gear R3 meshes with the diametrically smaller portion of the third stepped pinion P3.

Figure 83C:
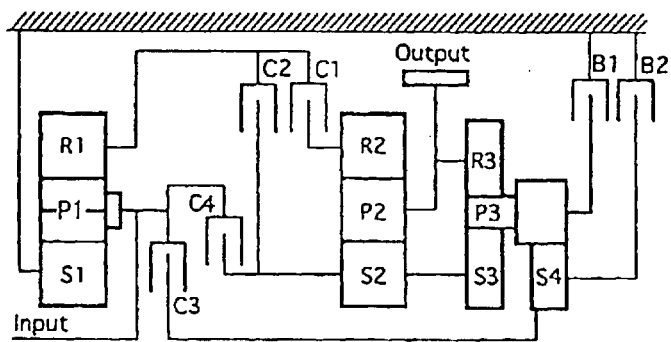

FIG. 83(c) shows an example, in which the third sun gear S3 and the fourth sun gear S4 of the fifth embodiment gear-operated speed change apparatus (of the speed-reducing double type 1) are given different teeth numbers to change the third pinion P3 into a third stepped pinion P3 having portions of different teeth numbers and of a larger diameter meshing with the fourth sun gear S4 and of a smaller diameter meshing with the third sun gear S3 and in which the third ring gear R3 meshes with the diametrically smaller portion of the third stepped pinion P3.

Figure 83D:
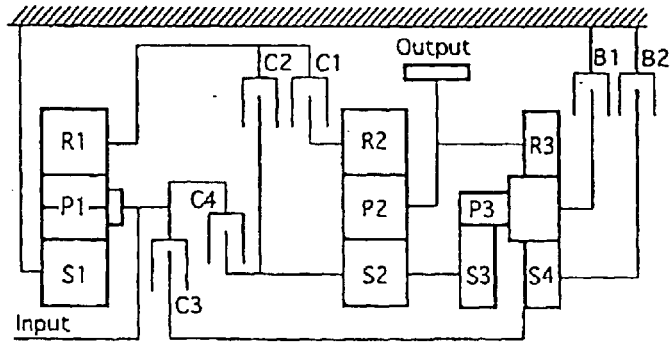

FIG. 83(d) shows an example, in which the third sun gear S3 and the fourth sun gear S4 of the fifth embodiment gear-operated speed change apparatus (of the speed-reducing double type 1) are given different teeth numbers to change the third pinion P3 into a third stepped pinion P3 having portions of different teeth numbers and of a larger diameter meshing with the fourth sun gear S4 and of a smaller diameter meshing with the third sun gear S3 and in which the third ring gear R3 meshes with the diametrically larger portion of the third stepped pinion P3.

Here, the remaining arrangements are similar to those of the fifth embodiment so that their descriptions are omitted.

The actions will be described in the following.

Figure 84:
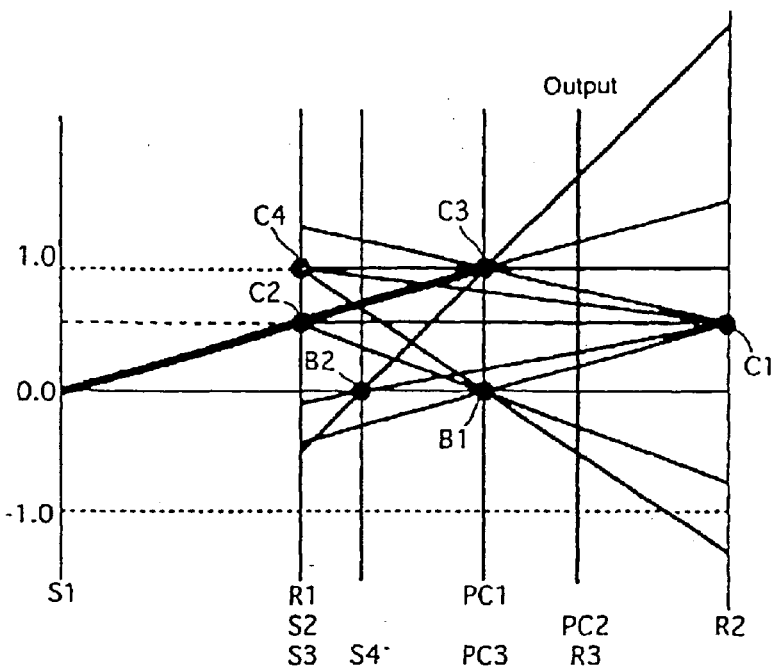
FIG. 84 is a collinear diagram in the thirteenth embodiment gear-operated speed change apparatus shown in FIGS. 83(*a*) and (*b*).
Figure 85:
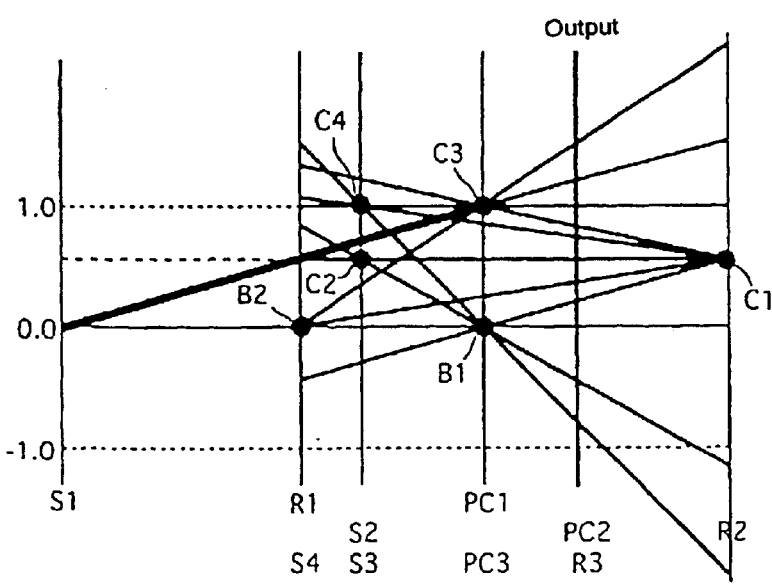
FIG. 85 is a collinear diagram in the thirteenth embodiment gear-operated speed change apparatus shown in FIGS. 83(*c*) and (*d*).

FIG. 84 is a collinear diagram showing the rotation-stopped state of the members at the individual gear ranges in the thirteenth embodiment gear-operated speed change apparatus shown in FIGS. 83(a) and (b), and FIG. 85 is a collinear diagram showing the rotation-stopped state of the members at the individual gear ranges in the thirteenth embodiment gear-operated speed change apparatus shown in FIGS. 83(c) and (d).

In the thirteenth embodiment, as compared with the fifth embodiment, the rotational speeds of the second and third sun gears S2 and S3 are different from the rotational speed of the fourth sun gear S4. Here, between the collinear diagram of FIG. 84 and the collinear diagram of FIG. 85, there are reversed the position of the rotary member having the second and third sun gears S2 and S3 and the position of the rotary member having the fourth sun gear S4.

The effects will be described in the following.

As has been described hereinbefore, the automatic transmission gear-operated speed change apparatus of the thirteenth embodiment can obtain the following effects, in addition to the effects (excepting the effect (7)) of the fifth embodiment: the double sun gear type third planetary gear set G3 is the planetary gear set which includes: the two sun gears S3 and S4 having the different tooth numbers; and the third stepped pinion P3 of the different tooth numbers to mesh individually with the two sun gears S3 and S4. Therefore, the ratios between ranges can be made wider to improve the degree of freedom for setting the gear ratios better and to enhance the degree of freedom for the design. Specifically, there is raised the degree of freedom for the gear ratios for the 2nd speed and the highest gear range.

(Fourteenth Embodiment)

First of all, the arrangement will be described in the following.

The fourteenth embodiment is an example (of a speed-reducing double type 2+a stepped pinion type), in which the third planetary gear set G3 of the sixth embodiment gear-operated speed change apparatus (or the speed-reducing double type 2) is exemplified by the stepped pinion.

Figure 86A:
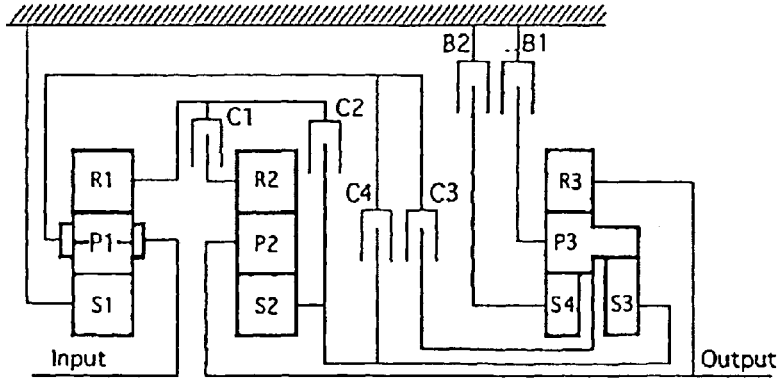
FIGS. 86*a*–86*d* present schematic diagrams showing stepped pinion patterns of a gear-operated speed change apparatus for an automatic transmission of a fourteenth embodiment.

FIG. 86(a) shows an example, in which the third sun gear S3 and the fourth sun gear S4 of the sixth embodiment gear-operated speed change apparatus (of the speed-reducing double type 2) are given different tooth numbers to change the third pinion P3 into a third stepped pinion P3 having portions of different tooth numbers and of a smaller diameter meshing with the third sun gear S3 and of a larger diameter meshing with the fourth sun gear S4 and in which the third ring gear R3 meshes with the diametrically larger portion of the third stepped pinion P3.

Figure 86B:
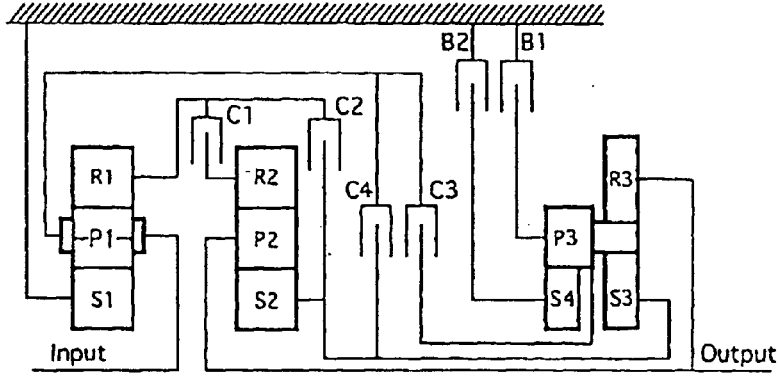

FIG. 86(b) shows an example, in which the third sun gear S3 and the fourth sun gear S4 of the sixth embodiment gear-operated speed change apparatus (of the speed-reducing double type 2) are given different tooth numbers to change the third pinion P3 into a third stepped pinion P3 having portions of different tooth numbers and of a smaller diameter meshing with the third sun gear S3 and of a larger diameter meshing with the fourth sun gear S4 and in which the third ring gear R3 meshes with the diametrically smaller portion of the third stepped pinion P3.

Figure 86C:
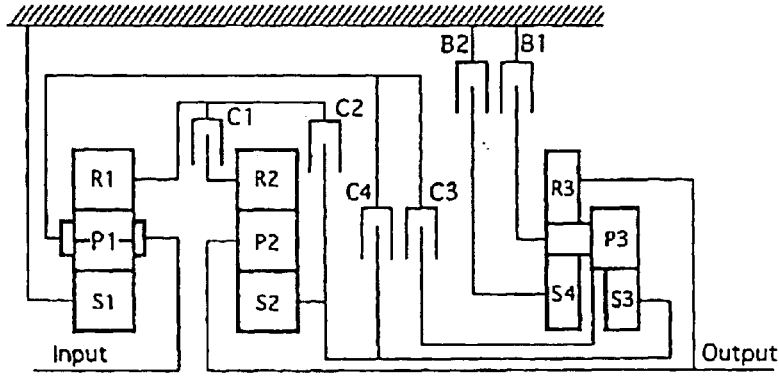

FIG. 86(c) shows an example, in which the third sun gear S3 and the fourth sun gear S4 of the sixth embodiment gear-operated speed change apparatus (of the speed-reducing double type 2) are given different tooth numbers to change the third pinion P3 into a third stepped pinion P3 having portions of different tooth numbers and of a smaller diameter meshing with the fourth sun gear S4 and of a larger diameter meshing with the third sun gear S3 and in which the third ring gear R3 meshes with the diametrically smaller portion of the third stepped pinion P3.

Figure 86D:
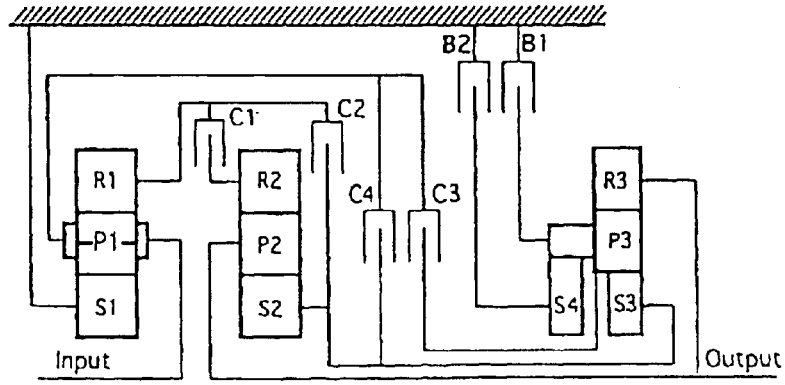

FIG. 86(d) shows an example, in which the third sun gear S3 and the fourth sun gear S4 of the sixth embodiment gear-operated speed change apparatus (of the speed-reducing double type 2) are given different tooth numbers to change the third pinion P3 into a third stepped pinion P3 having portions of different tooth numbers and of a smaller diameter meshing with the fourth sun gear S4 and of a larger diameter meshing with the third sun gear S3 and in which the third ring gear R3 meshes with the diametrically larger portion of the third stepped pinion P3.

Here, the remaining arrangements are similar to those of the sixth embodiment so that their descriptions are omitted.

The actions will be described in the following.

Figure 87:
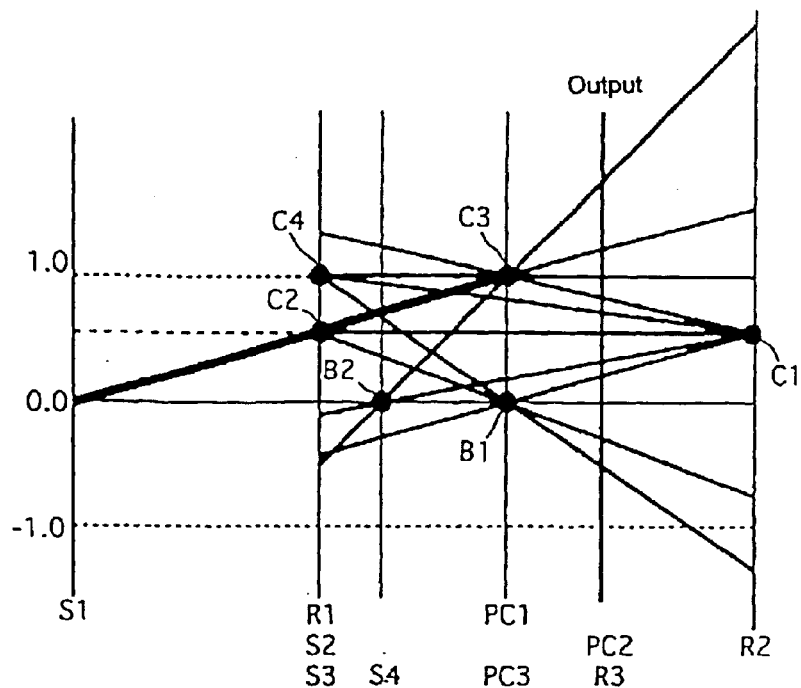
FIG. 87 is a collinear diagram in the fourteenth embodiment gear-operated speed change apparatus shown in FIGS. 86(*a*) and (*b*).
Figure 88:
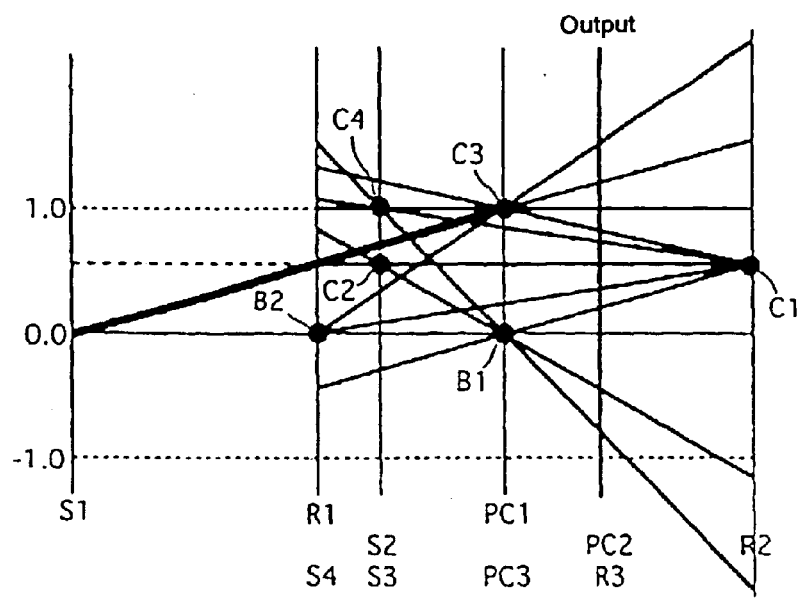
FIG. 88 is a collinear diagram in the fourteenth embodiment gear-operated speed change apparatus shown in FIGS. 86(*c*) and (*d*).

FIG. 87 is a collinear diagram showing the rotation-stopped state of the members at the individual gear ranges in the fourteenth embodiment gear-operated speed change apparatus shown in FIGS. 86(a) and (b), and FIG. 88 is a collinear diagram showing the rotation-stopped state of the members at the individual gear ranges in the fourteenth embodiment gear-operated speed change apparatus shown in FIGS. 86(c) and (d).

In the fourteenth embodiment, as compared with the sixth embodiment, the rotational speeds of the second and third sun gears S2 and S3 are different from the rotational speed of the fourth sun gear S4. Here, between the collinear diagram of FIG. 87 and the collinear diagram of FIG. 88, there are reversed the position of the rotary member having the second and third sun gears S2 and S3 and the position of the rotary member having the fourth sun gear S4.

The effects will be described in the following.

As has been described hereinbefore, the automatic transmission gear-operated speed change apparatus of the fourteenth embodiment can obtain the following effects, in addition to the effects (excepting the effect (7)) of the sixth embodiment: the double sun gear type third planetary gear set G3 is the planetary gear set which includes: the two sun gears S3 and S4 having the different tooth numbers; and the third stepped pinion P3 of the different tooth numbers to mesh individually with the two sun gears S3 and S4. Therefore, the ratios between ranges can be made wider to improve the degree of freedom for setting the gear ratios better and to enhance the degree of freedom for the design. Specifically, there is raised the degree of freedom for the gear ratios for the 2nd speed and the highest gear range.

(Fifteenth Embodiment)

First of all, the arrangement will be described in the following.

The fifteenth embodiment is an example (of a speed-reducing double type 3+a stepped pinion type), in which the third planetary gear set G3 of the seventh embodiment gear-operated speed change apparatus (or the speed-reducing double type 3) is exemplified by the stepped pinion.

Figure 89A:
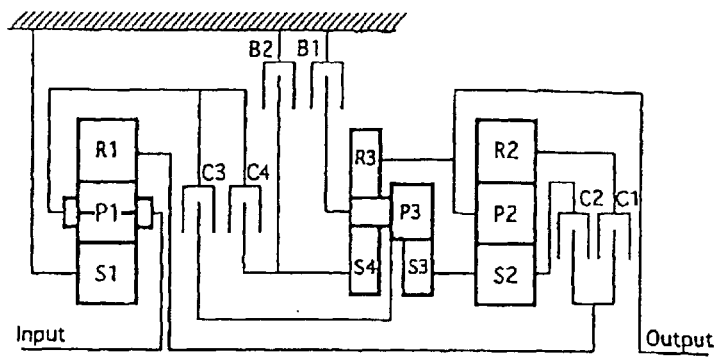
FIGS. 89*a*–89*d* present schematic diagrams showing stepped pinion patterns of a gear-operated speed change apparatus for an automatic transmission of a fifteenth embodiment.

FIG. 89(a) shows an example, in which the third sun gear S3 and the fourth sun gear S4 of the seventh embodiment gear-operated speed change apparatus (of the speed-reducing double type 3) are given different tooth numbers to change the third pinion P3 into a third stepped pinion P3 having portions of different tooth numbers and of a larger diameter meshing with the third sun gear S3 and of a smaller diameter meshing with the fourth sun gear S4 and in which the third ring gear R3 meshes with the diametrically smaller portion of the third stepped pinion P3.

Figure 89B:
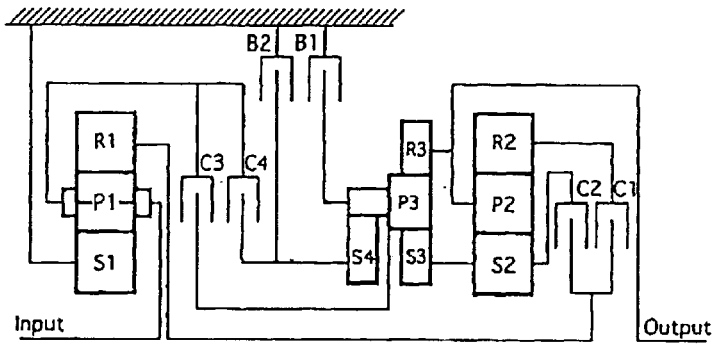

FIG. 89(b) shows an example, in which the third sun gear S3 and the fourth sun gear S4 of the seventh embodiment gear-operated speed change apparatus (of the speed-reducing double type 3) are given different tooth numbers to change the third pinion P3 into a third stepped pinion P3 having portions of different tooth numbers and of a larger diameter meshing with the third sun gear S3 and of a smaller diameter meshing with the fourth sun gear S4 and in which the third ring gear R3 meshes with the diametrically larger portion of the third stepped pinion P3.

Figure 89C:
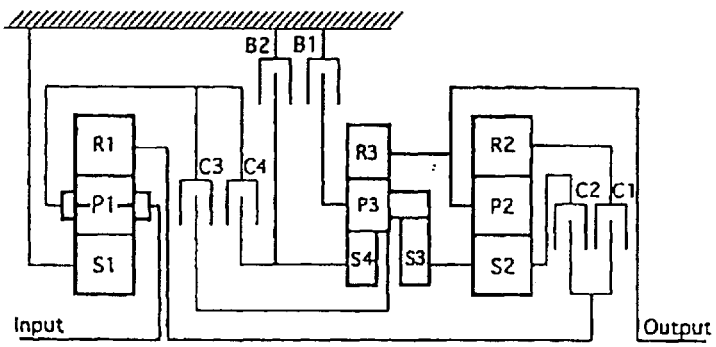

FIG. 89(c) shows an example, in which the third sun gear S3 and the fourth sun gear S4 of the seventh embodiment gear-operated speed change apparatus (of the speed-reducing double type 3) are given different tooth numbers to change the third pinion P3 into a third stepped pinion P3 having portions of different tooth numbers and of a smaller diameter meshing with the fourth sun gear S4 and of a larger diameter meshing with the third sun gear S3 and in which the third ring gear R3 meshes with the diametrically larger portion of the third stepped pinion P3.

Figure 89D:
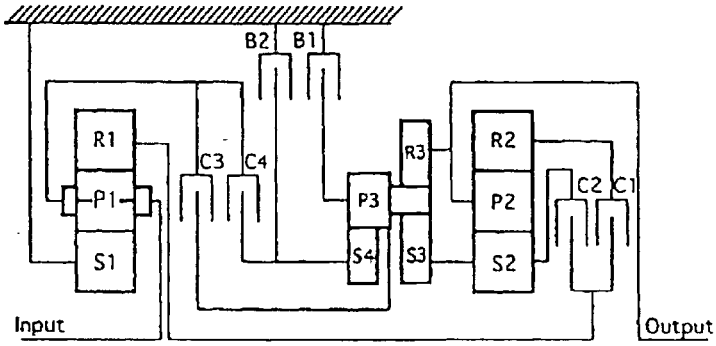

FIG. 89(d) shows an example, in which the third sun gear S3 and the fourth sun gear S4 of the seventh embodiment gear-operated speed change apparatus (of the speed-reducing double type 3) are given different tooth numbers to change the third pinion P3 into a third stepped pinion P3 having portions of different tooth numbers and of a larger diameter meshing with the fourth sun gear S4 and of a smaller diameter meshing with the third sun gear S3 and in which the third ring gear R3 meshes with the diametrically smaller portion of the third stepped pinion P3.

Here, the remaining arrangements are similar to those of the seventh embodiment so that their descriptions are omitted.

The actions will be described in the following.

Figure 90:
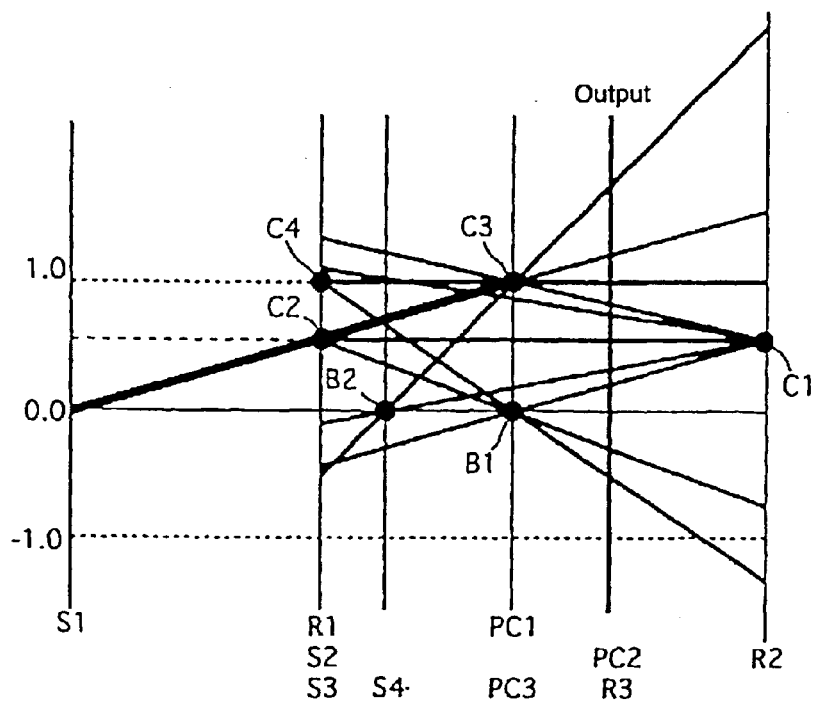
FIG. 90 is a collinear diagram in the fifteenth embodiment gear-operated speed change apparatus shown in FIGS. 89(*a*) and (*b*).
Figure 91:
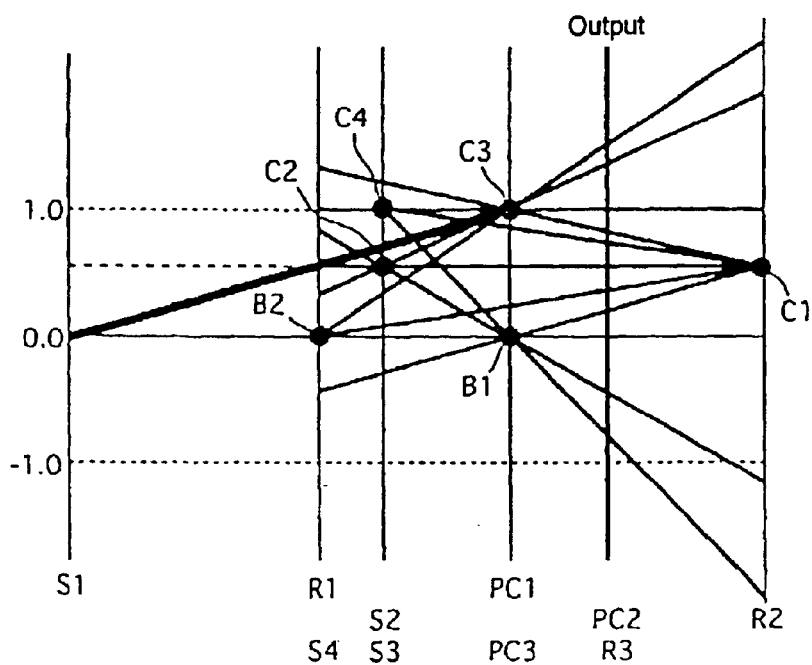
FIG. 91 is a collinear diagram in the fifteenth embodiment gear-operated speed change apparatus shown in FIGS. 89(*c*) and (*d*).

FIG. 90 is a collinear diagram showing the rotation-stopped state of the members at the individual gear ranges in the fifteenth embodiment gear-operated speed change apparatus shown in FIGS. 89(a) and (b), and FIG. 91 is a collinear diagram showing the rotation-stopped state of the members at the individual gear ranges in the fifteenth embodiment gear-operated speed change apparatus shown in FIGS. 89(c) and (d).

In the fifteenth embodiment, as compared with the seventh embodiment, the rotational speeds of the second and third sun gears S2 and S3 are different from the rotational speed of the fourth sun gear S4. Here, between the collinear diagram of FIG. 90 and the collinear diagram of FIG. 91, there are reversed the position of the rotary member having the second and third sun gears S2 and S3 and the position of the rotary member having the fourth sun gear S4.

The effects will be described in the following.

As has been described hereinbefore, the automatic transmission gear-operated speed change apparatus of the fifteenth embodiment can obtain the following effects, in addition to the effects (excepting the effect (7)) of the seventh embodiment: the double sun gear type third planetary gear set G3 is the planetary gear set which includes: the two sun gears S3 and S4 having the different tooth numbers; and the third stepped pinion P3 of the different tooth numbers to mesh individually with the two sun gears S3 and S4. Therefore, the ratios between ranges can be made wider to improve the degree of freedom for setting the gear ratios better and to enhance the degree of freedom for the design. Specifically, there is raised the degree of freedom for the gear ratios for the 2nd speed and the highest gear range.

(Sixteenth Embodiment)

First of all, the arrangement will be described in the following.

The sixteenth embodiment is an example (of a speed-reducing double type 4+a stepped pinion type), in which the second planetary gear set G2 of the eighth embodiment gear-operated speed change apparatus (or the speed-reducing double type 4) is exemplified by the stepped pinion.

Figure 92A:
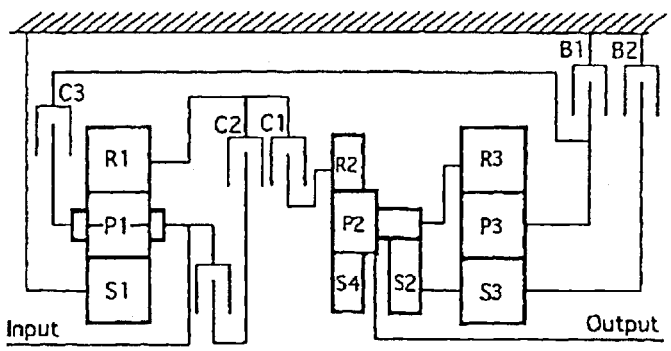
FIGS. 92*a*–92*d* present schematic diagrams showing stepped pinion patterns of a gear-operated speed change apparatus for an automatic transmission of a sixteenth embodiment.

FIG. 92(a) shows an example, in which the second sun gear S2 and the fourth sun gear S4 of the eighth embodiment gear-operated speed change apparatus (of the speed-reducing double type 4) are given different tooth numbers to change the second pinion P2 into a second stepped pinion P2 having portions of different tooth numbers and of a larger diameter meshing with the fourth sun gear S4 and of a smaller diameter meshing with the second sun gear S2 and in which the second ring gear R2 meshes with the diametrically larger portion of the second stepped pinion P2.

Figure 92B:
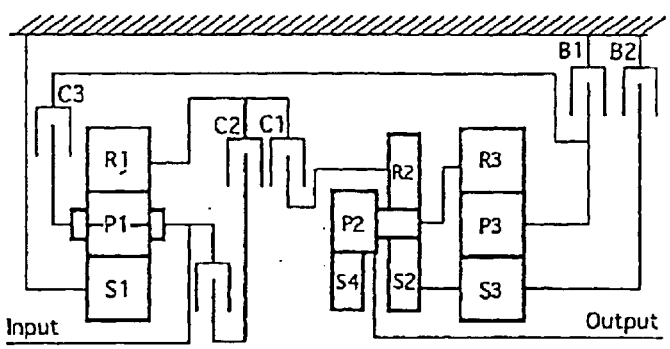

FIG. 92(b) shows an example, in which the second sun gear S2 and the fourth sun gear S4 of the eighth embodiment gear-operated speed change apparatus (of the speed-reducing double type 4) are given different tooth numbers to change the second pinion P2 into a second stepped pinion P2 having portions of different tooth numbers and of a larger diameter meshing with the fourth sun gear S4 and of a smaller diameter meshing with the second sun gear S2 and in which the second ring gear R2 meshes with the diametrically smaller portion of the second stepped pinion P2.

Figure 92C:
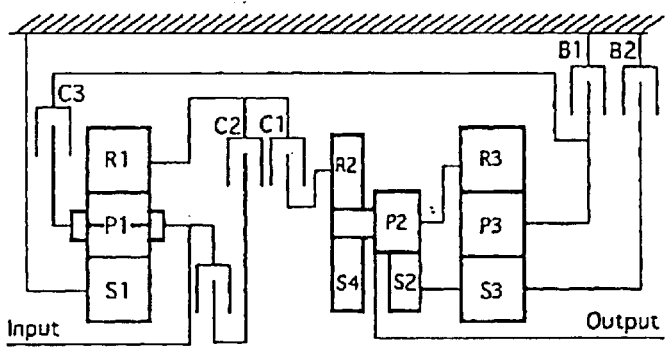
Figure 92D:
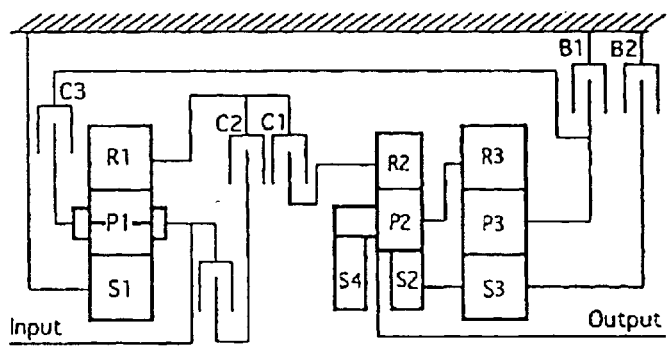

FIG. 92(c) shows an example, in which the second sun gear S2 and the fourth sun gear S4 of the eighth embodiment gear-operated speed change apparatus (of the speed-reducing double type 4) are given different tooth numbers to change the second pinion P2 into a second stepped pinion P2 having portions of different tooth numbers and of a smaller diameter meshing with the fourth sun gear S4 and of a larger diameter meshing with the second sun gear S2 and in which the second ring gear R2 meshes with the diametrically smaller portion of the second stepped pinion P2.

FIG. 89(d) shows an example, in which the second sun gear S2 and the fourth sun gear S4 of the seventh embodiment gear-operated speed change apparatus (of the speed-reducing double type 3) are given different tooth numbers to change the second pinion P2 into a second stepped pinion P2 having portions of different tooth numbers and of a smaller diameter meshing with the fourth sun gear S4 and of a larger diameter meshing with the second sun gear S2 and in which the second ring gear R2 meshes with the diametrically larger portion of the second stepped pinion P2.

Here, the remaining arrangements are similar to those of the eighth embodiment so that their descriptions are omitted.

The actions will be described in the following.

Figure 93:
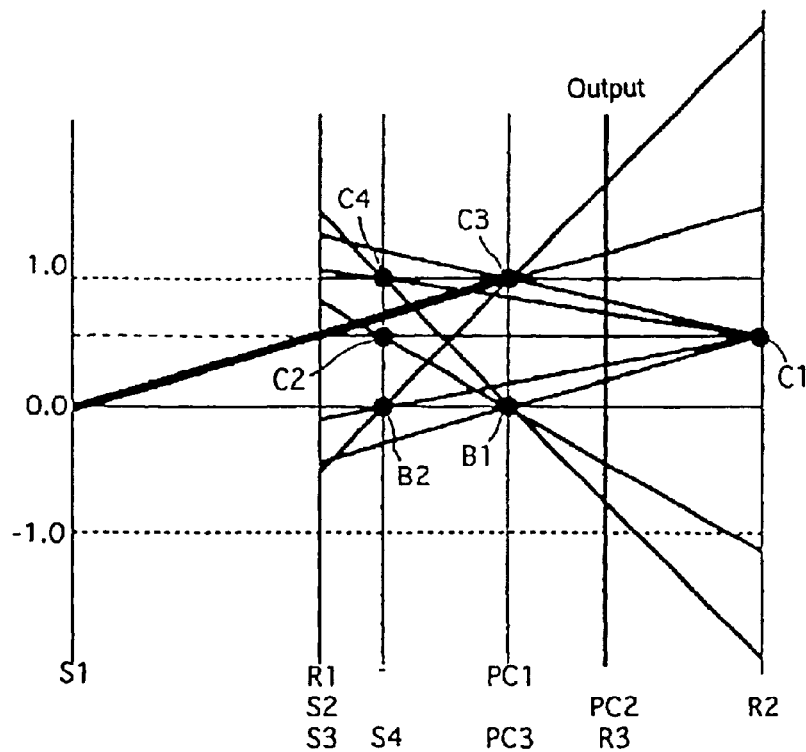
FIG. 93 is a collinear diagram in the sixteenth embodiment gear-operated speed change apparatus shown in FIGS. 92(*a*) and (*b*).
Figure 94:
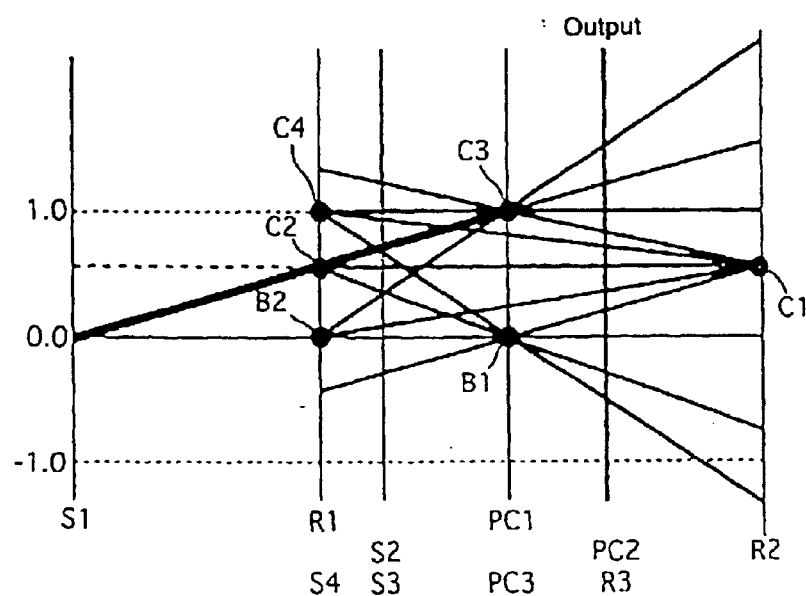
FIG. 94 is a collinear diagram in the sixteenth embodiment gear-operated speed change apparatus shown in FIGS. 92(*c*) and (*d*).
Figure 95A:
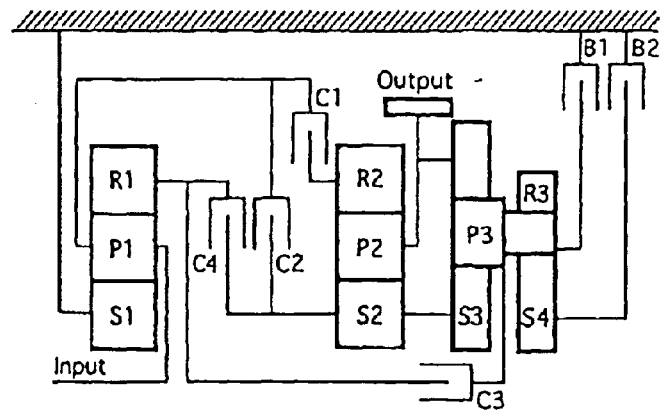
FIGS. 95*a*–95*d* present schematic diagrams showing stepped pinion patterns of a gear-operated speed change apparatus (of a speed-increasing single type 1) for an automatic transmission of a seventeenth embodiment.
Figure 95B:
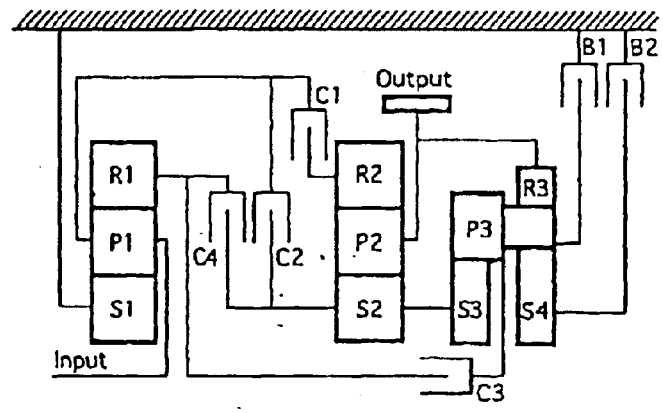
Figure 95C:
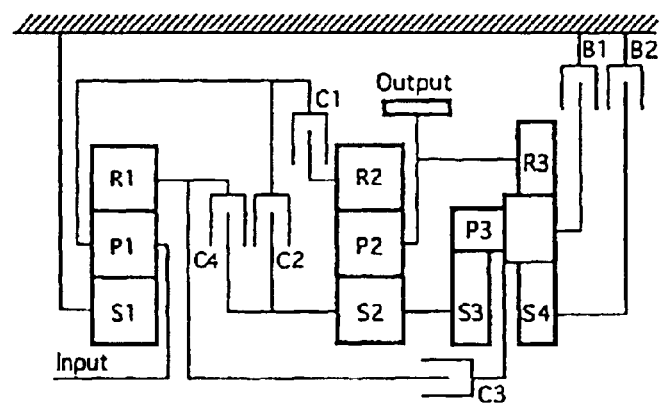
Figure 95D:
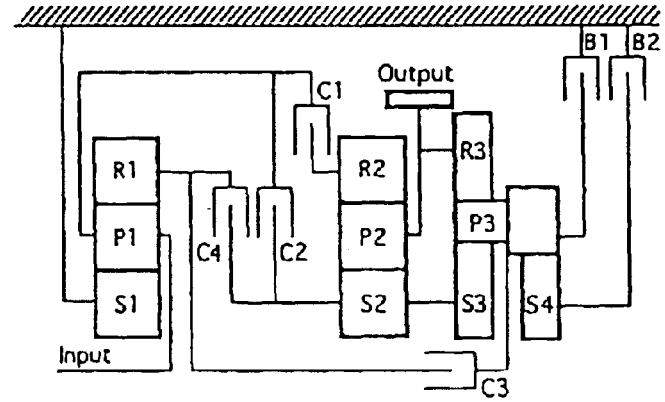
Figure 96A:
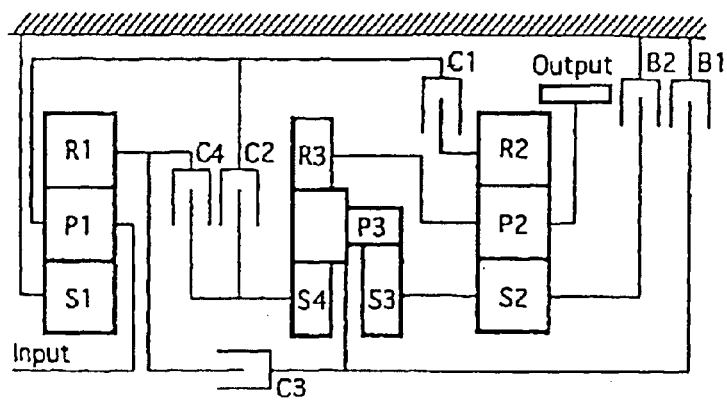
FIGS. 96*a*–96*d* present schematic diagrams showing stepped pinion patterns of a gear-operated speed change apparatus (of a speed-increasing single type 2) for an automatic transmission of a seventeenth embodiment.
Figure 96B:
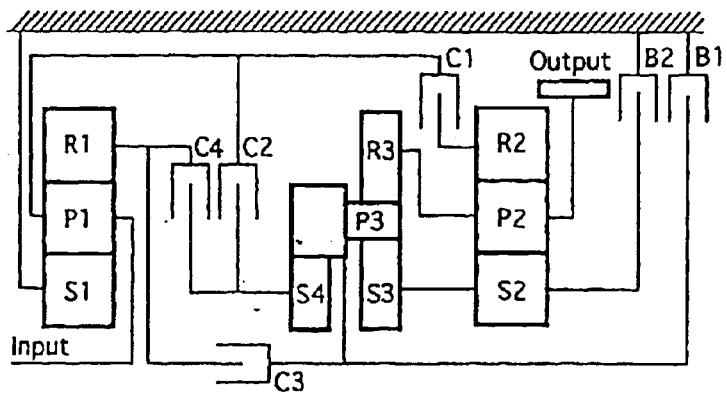
Figure 96C:
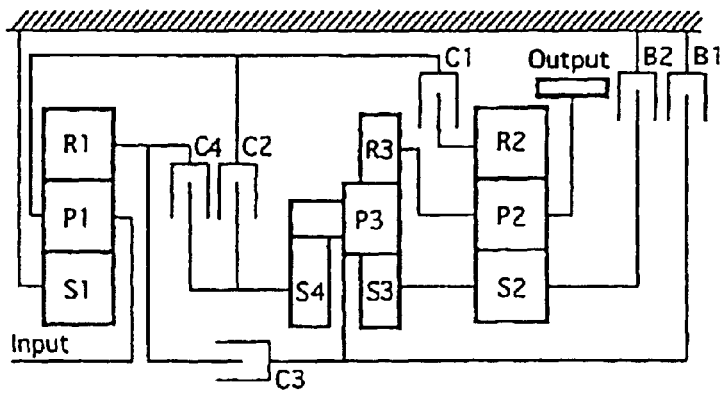
Figure 96D:
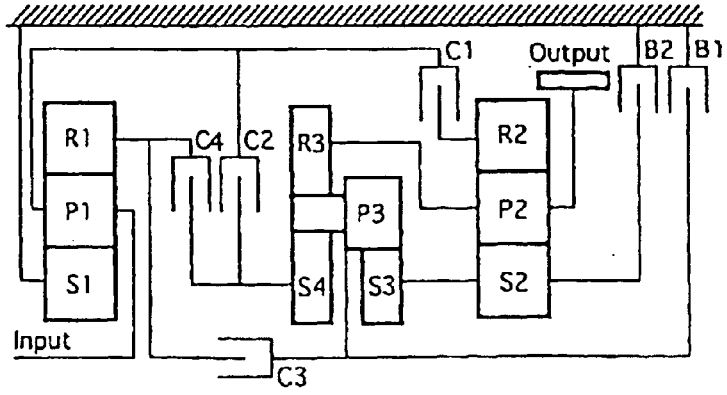
Figure 97A:
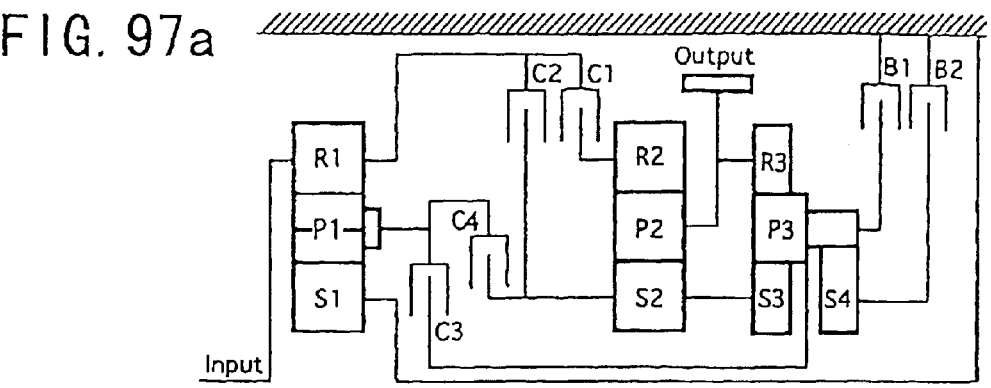
FIGS. 97*a*–97*d* present schematic diagrams showing stepped pinion patterns of a gear-operated speed change apparatus (of a speed-increasing double type 1) for an automatic transmission of a seventeenth embodiment.
Figure 97B:
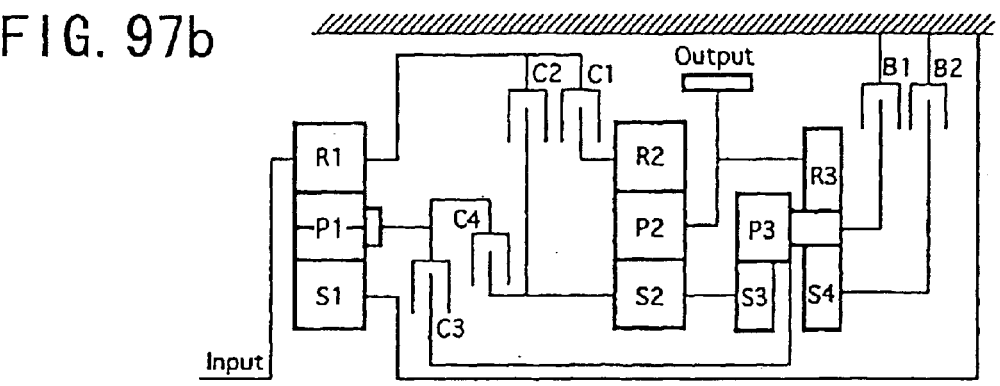
Figure 97C:
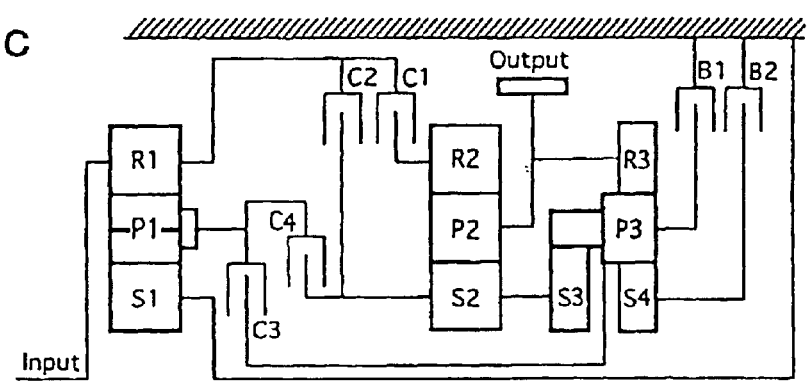
Figure 97D:
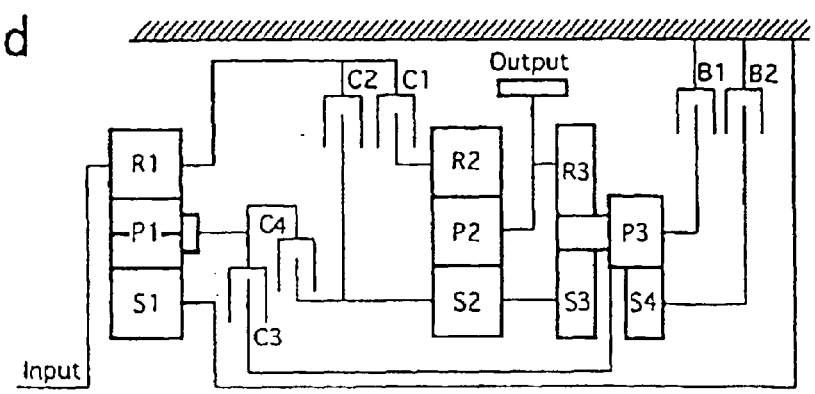

FIG. 93 is a collinear diagram showing the rotation-stopped state of the members at the individual gear ranges in the sixteenth embodiment gear-operated speed change apparatus shown in FIGS. 92(a) and (b), and FIG. 94 is a collinear diagram showing the rotation-stopped state of the members at the individual gear ranges in the sixteenth embodiment gear-operated speed change apparatus shown in FIGS. 92(c) and (d).

In the sixteenth embodiment, as compared with the eighth embodiment, the rotational speeds of the second and third sun gears S2 and S3 are different from the rotational speed of the fourth sun gear S4. Here, between the collinear diagram of FIG. 93 and the collinear diagram of FIG. 94, there are reversed the position of the rotary member having the second and third sun gears S2 and S3 and the position of the rotary member having the fourth sun gear S4.

The effects will be described in the following.

As has been described hereinbefore, the automatic transmission gear-operated speed change apparatus of the sixteenth embodiment can obtain the following effects, in addition to the effects (excepting the effect (7)) of the eighth embodiment: the double sun gear type second planetary gear set G2 is the planetary gear set which includes: the two sun gears S2 and S4 having the different tooth numbers; and the second stepped pinion P2 of the different tooth numbers to mesh individually with the two sun gears S2 and S4. Therefore, the ratios between ranges can be made wider to improve the degree of freedom for setting the gear ratios better and to enhance the degree of freedom for the design. Specifically, there is raised the degree of freedom for the gear ratios for the 2nd speed and the highest gear range.

(Seventeenth Embodiment)

First of all, the arrangement will be described in the following.

The automatic transmission gear-operated speed change apparatus of the seventeenth embodiment is exemplified by combining the speed-increasing single/double type and the stepped pinion.

FIG. 95 shows an example (of the speed-increasing single type 1+the stepped pinion type), in which the third planetary gear set G3 of the third embodiment gear-operated speed change apparatus (of the speed-increasing single type 1) is exemplified by the stepped pinion, and (a), (b), (c) and (d) show four kinds of stepped pinion patterns.

FIG. 96 shows an example (of the speed-increasing single type 2+the stepped pinion type), in which the third planetary gear set G3 of the fourth embodiment gear-operated speed change apparatus (of the speed-increasing single type 2) is exemplified by the stepped pinion, and (a), (b), (c) and (d) show four kinds of stepped pinion patterns.

FIG. 97 shows an example (of the speed-increasing double type 1+the stepped pinion type), in which the third planetary gear set G3 of the ninth embodiment gear-operated speed change apparatus (of the speed-increasing double type 1) is exemplified by the stepped pinion, and (a), (b), (c) and (d) show four kinds of stepped pinion patterns.

Here, the remaining arrangements are similar to those of the third, fourth and ninth embodiments so that their descriptions are omitted.

Next, in the collinear diagram showing the rotation-stopped state of the members at the individual gear ranges in the seventeenth embodiment gear-operated speed change apparatus like the eleventh embodiment to the sixteenth embodiment, the second and third sun gears S2 and S3 take rotational speeds different from that of the fourth sun gear S4.

Next, the effects will be described.

As has been described hereinbefore, the automatic transmission gear-operated speed change apparatus of the seventeenth embodiment can obtain the following effects, in addition to the effects (excepting the effect (7)) of the third, fourth and ninth embodiments: the double sun gear type third planetary gear set G3 is the planetary gear set which includes: the two sun gears S3 and S4 having the different tooth numbers; and the third stepped pinion P3 of the different tooth numbers to mesh individually with the two sun gears S3 and S4. Therefore, the ratios between ranges can be made wider to improve the degree of freedom for setting the gear ratios better and to enhance the degree of freedom for the design. Specifically, there is raised the degree of freedom for the gear ratios for the 2nd speed and the highest gear range.

Although the gear-operated speed change apparatus for the automatic transmission of the present invention has been described on the basis of the first embodiment to the seventeenth embodiment, its specific arrangement should not be limited to those of the embodiments, but a change, an addition and so on can be allowed so long as it does not deviate from the gist of the present invention, as defined in the individual Claims.

INDUSTRIAL APPLICABILITY

As has been described hereinbefore, the automatic transmission gear-operated speed change apparatus according to the present invention is useful as the gear-operated speed change apparatus for a vehicle demanding more gear ranges and is suitable for use in the gear-operated speed change portion of the automatic transmission which is connected to the drive source output shaft of an automobile having an engine or motor mounted thereon as the drive source.

What is claimed is:

1. A gear-operated speed change apparatus for an automatic transmission, comprising:

an input portion for inputting a rotation from a drive source;

an output portion for outputting a speed-changed rotation;

three sets of planetary gear sets;

a plurality of members for connecting a plurality of rotary elements like a single unit;

four selectively connecting/disconnecting clutches and two selectively fixing brakes positioned between the individual rotary elements of the input portion, the output portion, the members and the three planetary gear sets; and speed change control means for achieving at least seven forward speeds and one reverse speed by engaging/releasing said four clutches and two brakes properly, characterized:

in that one planetary gear set of said three planetary gear sets is a speed-reducing device for reducing the speed of the input rotation always;

in that one planetary gear set of the remaining two planetary gear sets is a double sun gear type planetary gear set including: two sun gears; a pinion meshing individually with said two sun gears; a carrier having a center member positioned between said two sun gears for inputting or outputting a rotation; and one ring gear meshing with said pinion;

in that when the planetary gear set as the speed-reducing device is the first planetary gear set, when said double sun gear type planetary gear set is the third planetary gear set and when the remaining planetary gear set is the second planetary gear set, said second planetary gear set and said third planetary gear set are the planetary gear sets which are constructed of five rotary members including connection members for connecting the rotary members of the second planetary gear set and the rotary members of the third planetary gear set like a single unit: and in that said gear-operated speed change apparatus comprises:

a first rotary member having one sun gear of said third planetary gear set and connected to a second brake capable of stopping (or fixing) said one sun gear;

a second rotary member having the other sun gear of said third planetary gear set and connected to a second clutch capable of connecting/disconnecting said sun gear and one member of said first planetary gear set selectively;

a third rotary member having said connection member and connected to said output portion;

a fourth rotary member connected to a third clutch capable of connecting/disconnecting another member of said first planetary gear set and a first brake capable of stopping (or fixing) selectively;

a fifth rotary member connected to a first clutch capable of connecting/disconnecting one member of said first planetary gear set selectively;

a fourth selectively connecting/disconnecting clutch positioned between the two members of said first rotary member, said third rotary member, said fourth rotary member and said fifth rotary member, between the two members of said second rotary member, said third rotary member, said fourth rotary member and said fifth rotary member, or between one of said first rotary member and said second rotary member and the input portion; and said speed change control means for establishing a 1st speed by the engagement of said first clutch and the first brake, a 2nd speed by the engagement of the first clutch and the second brake, a 3rd speed by the engagement of the first clutch and the second clutch, a 4th speed by the engagement of the first clutch and the third clutch, a 5th speed by the engagement of the third clutch and the fourth clutch, a 6th speed by the engagement of the second clutch and the third clutch, a 7th speed by the engagement of the third clutch and the second brake, and a reverse speed by the engagement of the second clutch and the first brake, thereby to establish at least seven forward speeds and one reverse speed.

2. A gear-operated speed change apparatus for an automatic transmission, comprising:

an input portion for inputting a rotation from a drive source;

an output portion for outputting a speed-changed rotation;

three sets of planetary gear sets;

a plurality of members for connecting a plurality of rotary elements like a single unit;

four selectively connecting/disconnecting clutches and two selectively fixing brakes positioned between the individual rotary elements of the input portion, the output portion, the members and the three planetary gear sets; and speed change control means for achieving at least seven forward speeds and one reverse speed by engaging/releasing said four clutches and two brakes properly, characterized:

in that one planetary gear set of said three planetary gear sets is a speed-reducing device for reducing the speed of the input rotation always;

in that one planetary gear set of the remaining two planetary gear sets is a double sun gear type planetary gear set including: two sun gears; a pinion meshing individually with said two sun gears; a carrier having a center member positioned between said two sun gears for inputting or outputting a rotation; and one ring gear meshing with said pinion;

in that when the planetary gear set as the speed-reducing device is the first planetary gear set, when said double sun gear type planetary gear set is the third planetary gear set and when the remaining planetary gear set is the second planetary gear set, said second planetary gear set and said third planetary gear set are the planetary gear sets which are constructed of five rotary members including connection members for connecting the rotary members of the second planetary gear set and the rotary members of the third planetary gear set like a single unit;

in that said gear-operated speed change apparatus comprises:

a first rotary member having one sun gear of said third planetary gear set and connected to a second brake capable of stopping (or fixing) said one sun gear;

a second rotary member having the other sun gear of said third planetary gear set and connected to a second clutch capable of connecting/disconnecting said sun gear and one member of said first planetary gear set selectively;

a third rotary member having said connection member and connected to said output portion;

a fourth rotary member connected to a third clutch capable of connecting/disconnecting another member of said first planetary gear set and a first brake capable of stopping (or fixing) selectively;

a fifth rotary member connected to a first clutch capable of connecting/disconnecting one member of said first planetary gear set selectively;

a fourth selectively connecting/disconnecting clutch positioned between one member of the first rotary member and the second rotary member and the input portion; and said speed change control means for establishing a 1st speed by the engagement of said first clutch and the first brake, a 2nd speed by the engagement of the first clutch and the second brake, a 3rd speed by the engagement of the first clutch and the second clutch, a 4th speed by the engagement of the first clutch and the fourth clutch, a 5th speed by the engagement of the first clutch and the third clutch, a 6th speed by the engagement of the third clutch and the fourth clutch, a 7th speed by the engagement of the second clutch and the third clutch, a 8th speed by the engagement of the third clutch and the second brake, and a reverse speed either by the engagement of the second clutch and the first brake or by the engagement of the fourth clutch and the first brake, thereby to establish at least eight forward speeds and one reverse speed.

3. A gear-operated speed change apparatus for an automatic transmission, comprising:

an input portion for inputting a rotation from a drive source;

an output portion for outputting a speed-changed rotation;

three sets of planetary gear sets;

a plurality of members for connecting a plurality of rotary elements like a single unit;

four selectively connecting/disconnecting clutches and two selectively fixing brakes positioned between the individual rotary elements of the input portion, the output portion, the members and the three planetary gear sets; and speed change control means for achieving at least seven forward speeds and one reverse speed by engaging/releasing said four clutches and two brakes properly, characterized:

in the one planetary gear set of said three planetary gear sets is a speed-increasing device for increasing the speed of the input rotation always;

in that one planetary gear set of the remaining two planetary gear sets is a double sun gear type planetary gear set including: two sun gears; a pinion meshing individually with said two sun gears; a carrier having a center member positioned between said two sun gears for inputting or outputting a rotation; and one ring gear meshing with said pinion;

in that when the planetary gear set as the speed-increasing device is the first planetary gear set, when said double sun gear type planetary gear set is the third planetary gear set and when the remaining planetary gear set is the second planetary gear set, and said second planetary gear set and said third planetary gear set are the planetary gear sets which are constructed of five rotary members including connection members for connecting the rotary members of the second planetary gear set and the rotary members of the third planetary gear set like a single unit; and in that said gear-operated speed change apparatus comprises:

a first rotary member having one sun gear of said third planetary gear set and connected to a second brake capable of stopping (or fixing) said one sun gear selectively;

a second rotary member having the other sun gear of said third planetary gear set and connected to a second clutch capable of connecting/disconnecting said sun gear and one member of said first planetary gear set selectively;

a third rotary member having said connection member and connected to said output portion;

a fourth rotary member connected to a third clutch capable of connecting/disconnecting another member of said first planetary gear set and a first brake capable of stopping (or fixing) selectively;

a fifth rotary member connected to a first clutch capable of connecting/disconnecting one member of said first planetary gear set;

a fourth selectively connecting/disconnecting clutch positioned between the two members of said first rotary member, said third rotary member, said fourth rotary member and said fifth rotary member, between the two members of said second rotary member, said third rotary member, said fourth rotary member and said fifth rotary member, or between one of said first rotary member and said second rotary member and the output increased in speed from the speed-increasing device; and said speed change control means for establishing a 1st speed by the engagement of said first clutch and the first brake, a 2nd speed by the engagement of the first clutch and the second brake, a 3rd speed by the engagement of the first clutch and the second clutch, a 4th speed by the engagement of the first clutch and the third clutch, a 5th speed by the engagement of the third clutch and the fourth clutch, a 6th speed by the engagement of the second clutch and the third clutch, a 7th speed by the engagement of the third clutch and the second clutch, and a reverse speed by the engagement of the second clutch and the first brake, thereby to establish at least seven forward speeds and one reverse speed.

4. A gear-operated speed change apparatus for an automatic transmission, comprising:

an input portion for inputting a rotation from a drive source;

an output portion for outputting a speed-changed rotation;

three sets of planetary gear sets;

a plurality of members for connecting a plurality of rotary elements like a single unit;

four selectively connecting/disconnecting clutches and two selectively fixing brakes positioned between the individual rotary elements of the input portion, the output portion, the members and the three planetary gear sets; and speed change control means for achieving at least seven forward speeds and one reverse speed by engaging/releasing said four clutches and two brakes properly, characterized:

in that one planetary rear set of said three planetary gear sets is a speed-increasing device for increasing the speed of the input rotation always;

in that one planetary gear set of the remaining two planetary gear sets is a double sun gear type planetary gear set including: two sun gears; a pinion meshing individually with said two sun gears; a carrier having a center member positioned between said two sun gears for inputting or outputting a rotation; and one ring gear meshing with said pinion;

in that when the planetary gear set as the speed-increasing device is the first planetary gear set, when said double sun gear type planetary gear set is the third planetary gear set and when the remaining planetary gear set is the second planetary gear set, said second planetary gear set and said third planetary gear set are the planetary gear sets which are constructed of five rotary members including connection members for connecting the rotary members of the second planetary gear set and the rotary members of the third planetary gear set like a single unit; and in that said gear-operated speed change apparatus comprises:

a first rotary member having one sun gear of said third planetary gear set and connected to a second brake capable of stopping (or fixing) said one sun gear selectively;

a second rotary member having the other sun gear of said third planetary gear set and connected to a second clutch capable of connecting/disconnecting said sun gear and one member of said first planetary gear set selectively;

a third rotary member having said connection member and connected to said output portion;

a fourth rotary member connected to a third clutch capable of connecting/disconnecting another member of said first planetary gear set and a first brake capable of stopping (or fixing) selectively;

a fifth rotary member connected to a first clutch capable of connecting/disconnecting one member of said first planetary gear set selectively;

a fourth selectively connecting/disconnecting clutch positioned at its one side on the speed-increased output of the speed-increasing device and at its other side between the first rotary member and the second rotary member; and said speed change control means for establishing a 1st speed by the engagement of said first clutch and the first brake, a 2nd speed by the engagement of the first clutch and the second brake, a 3rd speed by the engagement of the first clutch and the second clutch, a 4th speed by the engagement of the first clutch and the fourth clutch, a 5th speed by the engagement of the first clutch and the third clutch, a 6th speed by the engagement of the third clutch and the fourth clutch, a 7th speed by the engagement of the second clutch and the third clutch, a 8th speed by the engagement of the third clutch and the second brake, and a reverse speed either by the engagement of the second clutch and the first brake or by the engagement of the fourth clutch and the first brake, thereby to establish at least eight forward speeds and one reverse speed.

5. A gear-operated speed change apparatus for an automatic transmission, comprising:
- an input portion for inputting a rotation from a drive source;
- an output portion for outputting a speed-changed rotation;
- three sets of planetary gear sets;
- a plurality of members for connecting a plurality of rotary elements like a single unit;
- four selectively connecting/disconnecting clutches and two selectively fixing brakes positioned between the individual rotary elements of the input portion, the output portion, the members and the three planetary gear sets; and
- speed change control means for achieving at least seven forward speeds and one reverse steed by engaging/releasing said four clutches and two brakes properly, characterized:
- in that one planetary gear set of said three planetary gear sets is a speed-reducing device for reducing the speed of the input rotation always;
- in that one planetary gear set of the remaining two planetary gear sets is a double sun gear type planetary gear set including: two sun gears; a pinion meshing individually with said two sun gears; a carrier having a center member positioned between said two sun gears for inputting or outputting a rotation; and one ring gear meshing with said pinion;
- by comprising:
- a first planetary gear set acting as the speed-reducing device and having a first sun gear, a first ring gear, and a first carrier for supporting a first pinion meshing with the first sun gear and the first ring gear;
- a single-pinion type second planetary gear set having a second sun gear, a second ring gear, and a second carrier for supporting a second pinion meshing with the second sun gear and the second ring gear;
- a double sun gear type third planetary gear set having a third sun gear and a fourth sun gear, a third carrier for supporting a third pinion meshing individually with the two sun gears, a center member, and one third ring gear meshing with said third pinion;
- said input portion connected to the first ring gear;
- said output portion connected to the second carrier;
- a first connection member for connecting the second sun gear and the third sun gear like a single unit;
- a second connection member for connecting the second carrier and the third ring gear like a single unit;
- a first clutch for connecting/disconnecting the first carrier and the second ring gear selectively;
- a second clutch for connecting/disconnecting the first carrier and the second sun gear selectively;
- a third clutch for connecting/disconnecting the input portion and the center member selectively;
- a selectively connecting/disconnecting fourth clutch positioned between two of said first connection member, the second connection member, the second ring gear and the third carrier, between two of the fourth sun gear, the second connection member, the second ring gear and the third carrier, or between one of the second sun gear, the third sun gear and the fourth sun gear and the input portion;
- a first brake for stopping the rotation of the third carrier or the center member selectively;
- a second brake for stopping the rotation of the fourth sun gear selectively; and
- said speed change control means for establishing a 1st speed by the engagement of said first clutch and the first brake, a 2nd speed by the engagement of the first clutch and the second brake, a 3rd speed by the engagement of the first clutch and the second clutch, a 4th speed by the engagement of the first clutch and the third clutch, a 5th speed by the engagement of the third clutch and the fourth clutch, a 6th speed by the engagement of the second clutch and the third clutch, a 7th speed by the engagement of the third clutch and the second brake, and a reverse speed by the engagement of the second clutch and the first brake, thereby to establish at least seven forward speeds and one reverse speed.

6. A gear-operated speed change apparatus for an automatic transmission, comprising:
- an input portion for inputting a rotation from a drive source;
- an output portion for outputting a speed-changed rotation;
- three sets of planetary gear sets;
- a plurality of members for connecting a plurality of rotary elements like a single unit;
- four selectively correcting/disconnecting clutches and two selectively fixing brakes positioned between the individual rotary elements of the input portion, the output portion, the members and the three planetary gear sets; and
- speed change control means for achieving at least seven forward speeds and one reverse speed by engaging/releasing said four clutches and two brakes properly, characterized:
- in that one planetary gear set of said three planetary gear sets is a speed-reducing device for reducing the speed of the input rotation always;
- in that one planetary gear set of the remaining two planetary gear sets is a double sun gear type planetary gear set including: two sun gears; a pinion meshing individually with said two sun gears; a carrier having a center member positioned between said two sun gears for inputting or outputting a rotation; and one ring gear meshing with said pinion;
- by comprising:
- a first planetary gear set acting as the speed-reducing device and having a first sun gear, a first ring gear, and a first carrier for supporting a first pinion meshing with the first sun gear and the first ring gear;
- a single-pinion type second planetary gear set having a second sun gear, a second ring gear, and a second carrier for supporting a second pinion meshing with the second sun gear and the second ring gear;
- a double sun gear type third planetary gear set having a third sun gear and a fourth sun gear, a third carrier and a center member for supporting a third pinion meshing individually with the two sun gears, and one third ring gear meshing with said third pinion;
- said input portion connected to the first ring gear;
- said output portion connected to the second carrier;
- a first connection member for connecting the second sun gear and the third sun gear like a single unit;
- a second connection member for connecting the second carrier and the third ring gear like a single unit;
- a first clutch for connecting/disconnecting the first carrier and the second ring gear selectively;

a second clutch for connecting/disconnecting the first carrier and the fourth sun gear selectively;

a third clutch for connecting/disconnecting the input portion and the center member selectively;

a selectively connecting/disconnecting fourth clutch positioned between two of said first connection member, the second connection member, the second ring gear and the third carrier, between two of the fourth sun gear, the second connection member, the second ring gear and the third carrier, or between one of the second sun gear, the third sun gear and the fourth sun gear and the input portion;

a first brake for stopping the rotation of the center member selectively;

a second brake for stopping the rotation of the second sun gear selectively; and said speed change control means for establishing a 1st speed by the engagement of said first clutch and the first brake, a 2nd speed by the engagement of the first clutch and the second brake, a 3rd speed by the engagement of the first clutch and the second clutch, a 4th speed by the engagement of the first clutch and the third clutch, a 5th speed by the engagement of the third clutch and the fourth clutch, a 6th speed by the engagement of the second clutch and the third clutch, a 7th speed by the engagement of the third clutch and the second brake, and a reverse speed by the engagement of the second clutch and the first brake, thereby to establish at least seven forward speeds and one reverse speed.

7. A gear-operated speed change apparatus for an automatic transmission, comprising:

an input portion for inputting a rotation from a drive source;

an output portion for outputting a speed-changed rotation;

three sets of planetary gear sets;

a plurality of members for connecting a plurality of rotary elements like a single unit;

four selectively connecting/disconnecting clutches and two selectively fixing brakes positioned between the individual rotary elements of the input portion, the output portion, the members and the three planetary gear sets; and speed change control means for achieving at least seven forward speeds and one reverse speed by engaging/ releasing said four clutches and two brakes properly, characterized:

in that one planetary gear set of said three planetary gear sets is a speed-increasing device for increasing the speed of the input rotation always;

in that one planetary gear set of the remaining two planetary gear sets is a double sun gear type planetary gear set including: two sun gears; a pinion meshing individually with said two sun gears; a carrier having a center member positioned between said two sun gears for inputting or outputting a rotation; and one ring gear meshing with said pinion;

by comprising:

a first planetary gear set acting as the speed-increasing device and having a first sun gear, a first ring gear, and a first carrier for supporting a first pinion meshing with the first sun gear and the first ring gear;

a single-pinion type second planetary gear set having a second sun gear, a second ring gear, and a second carrier for supporting a second pinion meshing with the second sun gear and the second ring gear;

a double sun gear type third planetary gear set having a third sun gear and a fourth sun gear, a third carrier for supporting a third pinion meshing individually with the two sun gears, a center member, and one third ring gear meshing with said third pinion;

said input portion connected to the first carrier;

said output portion connected to the second carrier;

a first connection member for connecting the second sun gear and the third sun gear like a single unit;

a second connection member for connecting the second carrier and the third ring gear like a single unit;

a first clutch for connecting/disconnecting the first carrier and the second ring gear selectively;

a second clutch for connecting/disconnecting the first carrier and the second sun gear selectively;

a third clutch for connecting/disconnecting the first ring gear and the center member selectively;

a selectively connecting/disconnecting fourth clutch positioned between two of said first connection member, the second connection member, the second ring gear and the third carrier, between two of the fourth sun gear, the second connection member, the second ring gear and the third carrier, or between one or the second sun gear, the third sun gear and the fourth sun gear and the speed-increased output from the speed-increasing device:

a first brake for stopping the rotation of the third carrier selectively;

a second brake for stopping the rotation of the fourth sun gear selectively; and said speed change control means for establishing a 1st speed by the engagement of said first clutch and the first brake, a 2nd speed by the engagement of the first clutch and the second brake, a 3rd speed by the engagement of the first clutch and the second clutch, a 4th speed by the engagement of the first clutch and the third clutch, a 5th speed by the engagement of the third clutch and the fourth clutch, a 6th speed by the engagement of the second clutch and the third clutch, a 7th speed by the engagement of the third clutch and the second brake, and a reverse speed by the engagement of the second clutch and the first brake, thereby to establish at least seven forward speeds and one reverse speed.

8. A gear-operated speed change apparatus for an automatic transmission, comprising:

an input portion on for inputting a rotation from a drive source;

an output portion for outputting a speed-changed rotation;

three sets of planetary gear sets:

a plurality of members for connecting a plurality of rotary elements like a single unit, four selectively connecting/disconnecting clutches and two selectively fixing brakes positioned between the individual rotary elements of the input portion, the output portion, the members and the three planetary gear sets; and speed change control means for achieving at least seven forward speeds and one reverse speed by engaging/ releasing said four clutches and two brakes properly, characterized:

in that one planetary gear set of said three planetary gear sets is a speed-increasing device for increasing the speed of the input rotation always;

in that one planetary gear set of the remaining two planetary gear sets is a double sun gear type planetary gear set including: two sun gears; a pinion meshing individually with said two sun gears; a carrier having a center member positioned between said two sun gears for inputting or outputting a rotation; and one ring gear meshing with said pinion;

by comprising:

a first planetary gear set acting as the speed-increasing device and having a first sun gear, a first ring gear, and a first carrier for supporting a first pinion meshing with the two first sun gear and the first ring gear;

a single-pinion type second planetary gear set having a second sun gear, a second ring gear, and a second carrier for supporting a second pinion meshing with the second sun gear and the second ring gear;

a double sun gear type third planetary gear set having a third sun gear and a fourth sun gear, a third carrier for supporting a third pinion meshing individually with the two sun gears, a center member, and one third ring gear meshing with said third pinion;

said input portion connected to the first carrier;

said output portion connected to the second carrier;

a first connection member for connecting the second sun gear and the third sun gear like a single unit;

a second connection member for connecting the second carrier and the third ring gear like a single unit;

a first clutch for connecting/disconnecting the first carrier and the second ring gear selectively;

a second clutch for connecting/disconnecting the first carrier and the fourth sun gear selectively;

a third clutch for connecting/disconnecting the first ring gear and the center member selectively;

a selectively connecting/disconnecting fourth clutch positioned between two of said first connection member, the second connection member, the second ring gear and the third carrier, between two of the fourth sun gear, the second connection member, the second ring gear and the third carrier, or between one of the second sun gear, the third sun gear and the fourth sun gear and the speed-increased output from the speed-increasing device;

a first brake for stopping the rotation of the center member selectively;

a second brake for stopping the rotation of the second sun gear selectively; and said speed change control mean for establishing a 1st speed by the engagement of said first clutch and the first brake, a 2nd speed by the engagement of the first clutch and the second brake, a 3rd speed by the engagement of the first clutch and the second clutch, a 4th speed by the engagement of the first clutch and the third clutch, a 5th speed by the engagement of the third clutch and the fourth clutch, a 6th speed by the engagement of the second clutch and the third clutch, a 7th speed by the engagement of the third clutch and the second brake, and a reverse speed by the engagement of the second clutch and the first brake, thereby to establish at least seven forward speeds and one reverse speed.

9. A gear-operated speed change apparatus for an automatic transmission, comprising:

an input portion for inputting a rotation from a drive source;

an output portion for outputting a speed-changed rotation;

three sets of planetary gear sets;

a plurality of members for connecting a plurality of rotary elements like a single unit;

four selectively connecting/disconnecting clutches and two selectively fixing brakes positioned between the individual rotary elements of the input portion, the output portion, the members and the three planetary gear sets; and speed change control means for achieving at least seven forward speeds and one reverse speed by engaging/releasing said four clutches and two brakes properly, characterized:

in that one planetary gear set of said three planetary gear sets is a speed-reducing device for reducing the speed of the input rotation always;

in that one planetary gear set of the remaining two planetary gear sets is a double sun gear type planetary gear set including: two sun gears; a pinion meshing individually with said two sun gears; a carrier having a center member positioned between said two sun gears for inputting or inputting a rotation; and one ring gear meshing with said pinion;

by comprising:

a double-pinion type first planetary gear set acting as the speed-reducing device and having a first sun gear, a first ring gear, and a first carrier for supporting first double pinions meshing with the first sun gear and the first ring gear;

a single-pinion type second planetary gear set having a second sun gear, a second ring gear, and a second carrier for supporting a second pinion meshing with the second sun gear and the second ring gear;

a double sun gear type third planetary gear set having a third sun gear and a fourth sun gear, a third carrier for supporting a third pinion meshing individually with the two sun gears, a center member, and one third ring gear meshing with said third pinion;

said input portion connected to the first carrier;

said output portion connected to the second carrier;

a first connection member for connecting the second sun gear and the third sun gear like a single unit;

a second connection member for connecting the second carrier and the third ring gear like a single unit;

a first clutch for connecting/disconnecting the first ring gear and the second ring gear selectively;

a second clutch for connecting/disconnecting the first ring gear and the second sun gear selectively;

a third clutch for connecting/disconnecting the input portion and the center member selectively;

a selectively connecting/disconnecting fourth clutch positioned between two of said first connection member, the second connection member, the second ring gear and the third carrier, between two of the fourth sun gear, the second connection member, the second ring gear and the third carrier, or between one of the second sun gear, the third sun gear and the fourth sun gear and the input portion;

a first brake for stopping the rotation of the third carrier selectively;

a second brake for stopping the rotation of the fourth sun gear selectively; and said speed change control means for establishing a 1st speed by the engagement of said first clutch and the first brake, a 2nd speed by the engagement of the first clutch and the second brake, a 3rd speed by the engagement of the first clutch and the second clutch, a 4th speed by the engagement of the first clutch and the third clutch, a 5th speed by the engagement of the third clutch and the fourth clutch, a 6th speed by the engagement of the second clutch and the third clutch, a 7th speed by the engagement of the third clutch and the second brake, and a reverse speed by the engagement of the second clutch and the first brake, thereby to establish at least seven forward speeds and one reverse speed.

10. A gear-operated speed change apparatus for an automatic transmission, comprising:

an input portion for inputting a rotation from a drive source;

an output portion for outputting a speed-changed rotation;

three sets of planetary gear sets;

a plurality of members for connecting a plurality of rotary elements like a single unit;

four selectively connecting/disconnecting clutches and two selectively fixing brakes positioned between the individual rotary elements of the input portion, the output portion, the members and the three planetary gear sets; and speed change control means for achieving at least seven forward speeds and one reverse speed by engaging/releasing said four clutches and two brakes properly, characterized:

in that one planetary gear set of said three planetary gear sets is a speed-reducing device for reducing the speed of the input rotation always;

in that one planetary gear set of the remaining two planetary gear sets is a double sun gear type planetary gear set including: two sun gears; a pinion meshing individually with said two sun gears; a carrier having a center member positioned between said two sun gears for inputting or outputting a rotation; and one ring gear meshing with said pinion;

by comprising:

a double-pinion type first planetary gear set acting as the speed-reducing device and having a first sun gear, a first ring gear, and a first carrier for supporting first double pinions meshing with the first sun gear and the first ring gear;

a double sun gear type second planetary gear set having a second sun gear and a fourth sun gear, a second carrier for supporting a second pinion meshing individually with the two sun gears, a center member, and one second ring gear meshing with said second pinion;

a single-pinion type third planetary gear ser having a third sun gear, a third ring gear, and a third carrier for supporting a third pinion meshing with the third sun gear and the third ring gear;

said input portion connected to the first carrier;

said output portion connected to the center member;

a first connection member for connecting the second sun gear and the third sun gear like a single unit;

a second connection member for connecting the second carrier and the third ring gear like a single unit;

a first clutch for connecting/disconnecting the first ring gear and the second ring gear selectively;

a second clutch for connecting/disconnecting the first ring gear and the fourth sun gear selectively;

a third clutch for connecting/disconnecting the input portion and the third carrier selectively;

a selectively connecting/disconnecting fourth clutch positioned between two of said first connection member, the second connection member, the second ring gear and the third carrier, between two of the fourth sun gear, the second connection member, the second ring gear and the third carrier, or between one of the second sun gear, the third sun gear and the fourth sun gear and the input portion;

a first brake for stopping the rotation of the third carrier selectively;

a second brake for stopping the rotation of the third sun gear selectively; and said speed change control means for establishing a 1st speed by the engagement of said first clutch and the first brake, a 2nd speed by the engagement of the first clutch and the second brake, a 3rd speed by the engagement of the first clutch and the second clutch, a 4th speed by the engagement of the first clutch and the third clutch, a 5th speed by the engagement of the third clutch and the fourth clutch, a 6th speed by the engagement of the second clutch and the third clutch, a 7th speed by the engagement of the third clutch and the second brake, and a reverse speed by the engagement of the second clutch and the first brake, thereby to establish at least seven forward speeds and one reverse speed.

11. A gear-operated speed change apparatus for an automatic transmission, comprising:

an input portion for inputting a rotation from a drive source;

an output portion for outputting a speed-changed rotation;

three sets of planetary gear sets;

a plurality of members for connecting a plurality of rotary elements like a single unit;

four selectively connecting/disconnecting clutches and two selectively fixing brakes positioned between the individual rotary elements of the input portion, the output portion, the members and the three planetary gear sets; and speed change control means for achieving at least seven forward speeds and one reverse speed by engaging/releasing said four clutches and two brakes properly, characterized:

in that one planetary gear set of said three planetary gear sets is a speed-increasing device for increasing the speed of the input rotation always;

in that one planetary gear set of the remaining two planetary gear sets is a double sun gear type planetary gear set including: two sun gears; a pinion meshing individually with said two sun gears; a carrier having a center member positioned between said two sun gears for inputting or outputting a rotation; and one ring gear meshing with said pinion;

by comprising:

a double-pinion type first planetary gear set acting as the speed-increasing device and having a first sun gear, a first ring gear, and a first carries for supporting first double pinions meshing with the first sun gear and the first ring gear;

a single-pinion type second planetary gear set having a second sun gear, a second ring gear, and a second carrier for supporting a second pinion meshing with the second sun gear and the second ring gear;

a double sun gear type third planetary gear set having a third sun gear and a fourth sun gear, a third carrier for supporting a third pinion meshing individually with the two sun gears, a center member, and one third ring gear meshing with said third pinion;

said input portion connected to the first ring gear;
said output portion connected to the second carrier;
a first connection member for connecting the second sun gear and the third sun gear like a single unit;
a second connection member for connecting the second carrier and the third ring gear like a single unit;
a first clutch for connecting/disconnecting the first ring gear and the second ring gear selectively;
a second clutch for connecting/disconnecting the first ring gear and the second sun gear selectively;
a third clutch for connecting/disconnecting the first carrier and the center member selectively;
a selectively connecting/disconnecting fourth clutch positioned between two of said first connection member, the second connection member, the second ring gear and the third carrier, between two of the fourth sun gear, the second connection member, the second ring gear and the third carrier, or between one of the second sun gear, the third sun gear and the fourth sun gear and the speed-increased output from the speed-increasing device;
a first brake for stopping the rotation of the third carrier selectively;
a second brake for stopping the rotation of the fourth sun gear selectively; and
said speed change control means for establishing a 1st speed by the engagement of said first clutch and the first brake, a 2nd speed by the engagement of the first clutch and the second brake, a 3rd speed by the engagement of the first clutch and the second clutch, a 4th speed by the engagement of the first clutch and the third clutch, a 5th speed by the engagement of the third clutch and the fourth clutch, a 6th speed by the engagement of the second clutch and the third clutch, a 7th speed by the engagement of the third clutch and the second brake, and a reverse speed by the engagement of the second clutch and the first brake, thereby to establish at least seven forward speeds and one reverse speed.

12. A gear-operated speed change apparatus for an automatic transmission, comprising:
an input portion for inputting a rotation from a drive source;
an output portion for outputting a speed-changed rotation;
three sets of planetary gear sets;
a plurality of members for connecting a plurality of rotary elements like a single unit;
four selectively connecting/disconnecting clutches and two selectively fixing brakes positioned between the individual rotary elements of the input portion, the output portion, the members and the three planetary gear sets; and
speed change control means for achieving at least seven forward speeds and one reverse speed by engaging/releasing said four clutches and two brakes properly characterized:
in that one planetary gear set of said three planetary gear sets is a speed-increasing device for increasing the speed of the input rotation always;
in that one planetary gear set of the remaining two planetary gear sets is a double sun gear type planetary gear set including: two sun gears; a pinion meshing individually with said two sun gears; a carrier having a center member positioned between said two sun gears for inputting or outputting a rotation; and one ring gear meshing with said pinion;
by comprising:
a double-pinion type first planetary gear set acting as the speed-increasing device and having a first sun gear, a first ring gear, and a first carrier for supporting first double pinions meshing with the first sun gear and the first ring gear;
a double sun gear type second planetary gear set having a second sun gear and a fourth sun gear, a second carrier and a center member for supporting a second pinion meshing individually with the two sun gears, and one second ring gear meshing with said second pinion;
a single-pinion type third planetary gear set having a third sun gear, a third ring gear, and a third carrier for supporting a third pinion meshing with the third sun gear and the third ring gear;
said input portion connected to the first ring gear;
said output portion connected to the center member;
a first connection member for connecting the second sun gear and the third sun gear like a single unit;
a second connection member for connecting the second carrier and the third ring gear like a single unit;
a first clutch for connecting/disconnecting the first ring gear and the second ring gear selectively;
a second clutch for connecting/disconnecting the first ring gear and the fourth sun gear selectively;
a third clutch for connecting/disconnecting the first carrier and the third carrier selectively;
a selectively connecting/disconnecting fourth clutch positioned between two of said first connection member, the second connection member, the second ring gear and the third carrier or between two of the fourth sun gear, the second connection member, the second ring gear and the third carrier;
a first brake for stopping the rotation of the third carrier selectively;
a second brake for stopping the rotation of the third sun gear selectively; and
said speed change control means for establishing a 1st speed by the engagement of said first clutch and the first brake, a 2nd speed by the engagement of the first clutch and the second brake, a 3rd speed by the engagement of the first clutch and the second clutch, a 4th speed by the engagement of the first clutch and the third clutch, a 5th speed by the engagement of the third clutch and the fourth clutch, a 6th speed by the engagement of the second clutch and the third clutch, a 7th speed by the engagement of the third clutch and the second brake, and a reverse speed by the engagement of the second clutch and the first brake, thereby to establish at least seven forward speeds and one reverse speed.

13. A gear-operated speed change apparatus for an automatic transmission as set forth in claims 1, 2, 5 or 6, characterized:
in that one planetary gear set of said speed-reducing device is of a single-pinion type.

14. A gear-operated speed change apparatus for an automatic transmission as set forth in claims 1, 2, 9 or 10, characterized:
in that one planetary gear set of said speed-reducing device is of a double-pinion type.

15. A gear-operated speed change apparatus for an automatic transmission as set forth in claims 3, 4, 7 or 8, characterized:

in that one planetary gear set of said speed-increasing device is of a single-pinion type.

16. A gear-operated speed change apparatus for an automatic transmission as set forth in claims 3, 4, 11 or 12, characterized: in that one planetary gear set of said speed-increasing device is of a double-pinion type.

17. A gear-operated speed change apparatus for an automatic transmission as set forth in any of claims 1 to 12, characterized:

in that said double sun gear type planetary gear set is a planetary gear set including two sun gears having different tooth numbers, and a stepped pinion of different tooth numbers meshing individually with said two sun gears.

18. A gear-operated speed change apparatus for an automatic transmission as set forth in any of claims 1 to 12, characterized:

in that said double sun gear type planetary gear set is a planetary gear set including two sun gears having equal tooth numbers, and a stepped pinion meshing individually with said two sun gears.

19. A gear-operated speed change apparatus for an automatic transmission as set forth in claim 5, 6, 9 or 10, characterized:

in that said fourth clutch is connected on its one side to one of the second, third and fourth sun gears and on its other side to the input portion; and in that said speed change control means is means for establishing the 1st speed by the engagement of the first clutch and the first brake, the 2nd speed by the engagement of the first clutch and the second brake, the 3rd speed by the engagement of the first clutch and the second clutch, the 4th speed by the engagement of the first clutch and the fourth clutch, the 5th speed by the engagement of the first clutch and the third clutch, the 6th speed by the engagement of the third clutch and the fourth clutch, the 7th speed by the engagement of the second clutch and the third brake, the 8th speed by the engagement of the third clutch and the second brake, and a reverse speed either by the engagement of the second clutch and the first brake or by the engagement of the fourth clutch and the first brake, thereby to establish at least eight forward speeds and one reverse speed.

20. A gear-operated speed change apparatus for an automatic transmission as set forth in claim 7, 8 or 11, characterized:

in that said fourth clutch is connected on its one side to one of the second, third and fourth sun gears and on its other side to the output side increased in speed from said speed-increasing device; and in that said speed change control means is means for establishing the 1st speed by the engagement of the first clutch and the first brake, the 2nd speed by the engagement of the first clutch and the second brake, the 3rd speed by the engagement of the first clutch and the second clutch, the 4th speed by the engagement of the first clutch and the fourth clutch, the 5th speed by the engagement of the first clutch and the third clutch, the 6th speed by the engagement of the third clutch and the fourth clutch, the 7th speed by the engagement of the second clutch and the third clutch, the 8th speed by the engagement of the third clutch and the second brake, and a reverse speed either by the engagement of the second clutch and the first brake or by the engagement of the fourth clutch and the first brake, thereby to establish at least eight forward speeds and one reverse speed.

* * * * *